United States Patent
Kim et al.

(10) Patent No.: US 9,060,151 B2
(45) Date of Patent: Jun. 16, 2015

(54) METHOD FOR TRANSMITTING A BROADCAST SERVICE, METHOD FOR RECEIVING A BROADCAST SERVICE, AND APPARATUS FOR RECEIVING A BROADCAST SERVICE

(75) Inventors: Kyungho Kim, Seoul (KR); Kwansuk Kim, Seoul (KR); Joonhui Lee, Seoul (KR); Gomer Thomas, Princeton Junction, NJ (US); Kyoungsoo Moon, Seoul (KR); Aettie Ji, Seoul (KR); Jinpil Kim, Seoul (KR); Jongyeul Suh, Seoul (KR); Sanghyun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/126,184

(22) PCT Filed: Jun. 18, 2012

(86) PCT No.: PCT/KR2012/004779
§ 371 (c)(1),
(2), (4) Date: Mar. 7, 2014

(87) PCT Pub. No.: WO2012/173441
PCT Pub. Date: Dec. 20, 2012

(65) Prior Publication Data
US 2014/0204271 A1    Jul. 24, 2014

Related U.S. Application Data

(60) Provisional application No. 61/497,537, filed on Jun. 16, 2011, provisional application No. 61/540,546, filed on Sep. 29, 2011.

(51) Int. Cl.
*H04N 5/44* (2011.01)
*H04N 21/2362* (2011.01)
*H04N 21/434* (2011.01)

(52) U.S. Cl.
CPC ............. *H04N 5/44* (2013.01); *H04N 21/2362* (2013.01); *H04N 21/4345* (2013.01)

(58) Field of Classification Search
USPC ............ 348/553, 552, 725; 725/32, 131–133, 725/139–141
See application file for complete search history.

(56) References Cited

U.S. PATENT DOCUMENTS

| | | | | |
|---|---|---|---|---|
| 7,584,491 | B2 * | 9/2009 | Bruckner et al. | 725/36 |
| 2007/0147419 | A1 * | 6/2007 | Tsujimoto et al. | 370/466 |
| 2011/0075990 | A1 * | 3/2011 | Eyer | 386/241 |
| 2011/0246488 | A1 * | 10/2011 | Eyer | 707/754 |
| 2011/0307920 | A1 * | 12/2011 | Blanchard et al. | 725/32 |

(Continued)

FOREIGN PATENT DOCUMENTS

| | | |
|---|---|---|
| JP | 2008118654 | 5/2008 |
| KR | 1020090021111 | 2/2009 |
| KR | 1020090127826 | 12/2009 |

*Primary Examiner* — Paulos M Natnael
(74) *Attorney, Agent, or Firm* — McKenna Long & Aldridge LLP

(57) ABSTRACT

A broadcast service receiving method of a broadcast receiving device is provided. The method includes: receiving a trigger; receiving a triggered object; when a target of the received trigger is the triggered object, performing a trigger action on the triggered object at a trigger time; receiving real-time data available for the triggered object by an operation of the triggered object according to the performing of the triggered action; and providing a service by using the real-time data.

14 Claims, 104 Drawing Sheets

(56) References Cited

U.S. PATENT DOCUMENTS

2012/0189010 A1* 7/2012 Lee et al. .................. 370/392
2013/0271653 A1* 10/2013 Kim et al. .................. 348/473
2013/0283311 A1* 10/2013 Eyer .......................... 725/32
2013/0305308 A1* 11/2013 Lee et al. .................. 725/116
2014/0059116 A1* 2/2014 OH et al. .................. 709/203
2014/0115644 A1* 4/2014 Kim et al. .................. 725/109

* cited by examiner

FIG.4

| Service protection OMA BCAST DRM | Signaling Channel Service-SMT | OMA BCAST Service Guide | NRT Content Items / Files |
|---|---|---|---|
| | | colspan FLUTE | |
| | | colspan ALC / LCT | |
| colspan=4 UDP | | | |
| colspan=4 IP | | | |
| colspan=4 RS Frame | | | |
| colspan=4 M/H Physical Layer | | | |
| colspan=4 8VSB Physical Layer | | | |

FIG.5

| Syntax | No. of Bits | Format |
|---|---|---|
| virtual_channel_table_section(){ | | |
|     table_id | 8 | 0xC8 |
|     section_syntax_indicator | 1 | '1' |
|     Private_indicator | 1 | '1' |
|     reserved | 2 | '11' |
|     section_length | 12 | uimsbf |
|     transport_stream_id | 16 | uimsbf |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     protocol_version | 8 | uimsbf |
|     num_channels_in_section | 8 | uimsbf |
|     for(i=0;i<num_channels_in_section;i++){ | | |
|         short_name | 7*16 | uimsbf |
|         reserved | 4 | '1111' |
|         major_channel_number | 10 | uimsbf |
|         minor_channel_number | 10 | uimsbf |
|         modulation_mode | 8 | uimsbf |
|         carrier_frequency | 32 | uimsbf |
|         channel_TSID | 16 | uimsbf |
|         program_number | 16 | uimsbf |
|         ETM_location | 2 | uimsbf |
|         access_controlled | 1 | bslbf |
|         hidden | 1 | bslbf |
|         reserved | 2 | '11' |
|         hide_guide | 1 | bslbf |
|         reserved | 3 | '111' |
|         service_type | 6 | uimsbf |
|         source_id | 16 | uimsbf |
|         reserved | 6 | '111111' |
|         descriptors_length | 10 | uimsbf |
|         for)i=0;i<N;i++){ | | |
|             descriptor() | | |
|         } | | |
|     } | | |
|     reserved | 6 | '111111' |
|     additional_descriptors_length | 10 | uimsbf |
|     for(j=0;j<N;j++){ | | |
|         additional_descriptor() | | |
|     } | | |
|     CRC_32 | 32 | rpchof |
| } | | |

FIG.6

| service_type | Meaning |
|---|---|
| 0x00 | [Reserved] |
| 0x01 | analog_television - The virtual channel carries analog television programming |
| 0x02 | ATSC_digital_television - The virtual channel carries television programming (audio, video and optional associated data) conforming to ATSC standards |
| 0x03 | ATSC_audio - The virtual channel carries audio programming (audio service and optional associated data) conforming to ATSC standard s. |
| 0x04 | ATSC_data_only_service - The virtual channel carries a data service conforming to ATSC standards, but no video of stream_type 0x02 or audio of stream_type 0x81. |
| 0x05-0x3F | [Reserved for future ATSC use] |

FIG.7

| Value | Meaning |
|---|---|
| 0x00 | [ Reserved ] |
| 0x01 | Analog_television-The virtual channel carries analog television programming |
| 0x02 | ATSC_digital_television-The virtual channel carries television programming (audio, video and optional data) conforming to ATSC standards. |
| 0x03 | ATSC_audio-The virtual channel carries audio programming (audio service and optional data) conforming to ATSC standards. |
| 0x04 | ATSC_data_only_service-The virtual channel carries a data service conforming to ATSC standards, but no video of stream_type 0x02 or audio of stream_type 0x81. |
| 0x05 | Software Download Data Service see A/97 |
| 0x06 | Unassociated/small screen service see A/65C Amendment 1 |
| 0x07 | Parameterized Service New A/V CODEC |
| 0x08 | ATSC_nrt_service-The virtual channel carries a NRT service conforming to ATSC standards. |
| 0x09-0x7F | [ Reserved for future ] |
| 0x80-0xFF | [ User Private ] |

FIG.8

| Syntax | No. of bits | Format |
|---|---|---|
| data_service_table_section() { | | |
|     table_id | 8 | 0xCF |
|     section_syntax_indicator | 1 | bslbf |
|     private_indicator | 1 | bslbf |
|     reserved | 2 | '11' |
|     private_section_length | 12 | uimsbf |
|     table_id_extension | 16 | uimsbf |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     data_service_table_bytes() | | |
|     CRC_32 | 32 | rpchof |
| } | | |

| Syntax | No. of bits | Format |
|---|---|---|
| data_service_table_bytes() { | | |
|     sdf_protocol_version | 8 | uimsbf |
|     application_count_in_section | 8 | uimsbf |
|     if( application_count_in_section > 0 ) { | | |
|       for(j = 0; j <application_count_in_section; j++) { | | |
|       compatibility_descriptor() | | |
|       app_id_byte_length | 16 | uimsbf |
|       if(app_id_byte_length > 1) { | | |
|         app_id_description | 16 | uimsbf |
|         for(i=0;i< app_id_byte_length-2;i++) { | | |
|         app_id_byte | 8 | bslbf |
|         } | | |
|       } | | |
|       tap_count | 8 | uimsbf |
|       for( i = 0; i < tap_count; i++) { | | |
|         protocol_encapsulation | 8 | uimsbf |
|         action_type | 7 | uimsbf |
|         resource_location | 1 | bslbf |
|         Tap() | | |
|         tap_info_length | 16 | uimsbf |
|         for( k=0; k<N; k++) { | | |
|           descriptor() | | |
|         } | | |
|       } | | |
|       app_info_length | 16 | uimsbf |
|       for( i=0; i< M; i++) { | | |
|         descriptor() | | |
|       } | | |
|       app_data_length | 16 | uimsbf |
|       for( i = 0; i < app_data_length; i++) { | | |
|         app_data_byte | 8 | bslbf |
|       } | | |
|     } | | |
|     } | | |
|     service_info_length | 16 | uimsbf |
|     for(j=0; j<K;j++) { | | |
|       descriptor() | | |
|     } | | |
|     service_private_data_length | 16 | uimsbf |
|     for( j = 0; j < service_private_data_length; j++) { | | |
|       service_private_data_byte | 8 | bslbf |
|     } | | |
| } | | |

FIG.12

| Syntax | No. of Bits | Format |
|---|---|---|
| NRT_service_map_table_section() { | | |
|     table_id | 8 | 0xDB |
|     section_syntax_indicator | 1 | '0' |
|     private_incicator | 1 | '1' |
|     reserved | 2 | '11' |
|     section_length | 12 | uimsbf |
|     table_id_extension { | | |
|         NST_protocol_version | 8 | uimsbf |
|         reserved | 8 | uimsbf |
|     } | | |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     reserved | 4 | '1111' |
|     carrier_frequency | 32 | uimsbf |
|     channel_TSID | 16 | uimsbf |
|     program_number | 16 | uimsbf |
|     source_id | 16 | uimsbf |
|     num_NRT_services | 8 | uimsbf |
|     for (i=0; i<num_NRT_services; i++) | | |
|     { | | |
|         reserved | 4 | '1111' |
|         NRT_service_status | 2 | uimsbf |
|         SP_indicator | 1 | bslbf |
|         CP_indicator | 1 | bslbf |
|         NRT_service_id | 16 | uimsbf |
|         short_NRT_service_name | 8*8 | |
|         reserved | 2 | '11' |
|         NRT_service_category | 6 | uimsbf |
|         num_components | 5 | uimsbf |
|         IP_version_flag | 1 | bslbf |
|         source_IP_address_flag | 1 | bslbf |
|         NRT_service_destination_IP_address_flag | 1 | bslbf |
|         if (source_IP_address_flag) | | |
|             source_IP_address | 32 or 128 | uimsbf |
|         if (NRT_service_destination _IP_address_flag) | | |
|             NRT_service_destination_IP_address | 32 or 128 | uimsbf |
|         for (j=0; j<num_components; j++) | | |
|         { | | |
|             reserved | 1 | '1' |
|             essential_component_indicator | 1 | bsblf |
|             component_destination_IP_address _flag | 1 | bslbf |
|             port_num_count | 5 | uimsbf |
|             component_destination_UDP_port_num | 16 | uimsbf |
|             if (component_destination_IP_address _flag) | | |
|                 component_destination_IP_address | 32 or 128 | uimsbf |
|             Reserved | 4 | '1111' |

FIG.13

| Syntax | No. of Bits | Format |
|---|---|---|
|       num_component_level_descriptors | 4 | uimsbf |
|       for (k=0; k<num_component_level_descriptors; k++) | | |
|       { | | |
|           component_level_descriptor() | var | |
|       } | | |
|   } | | |
|   reserved | 4 | '1111' |
|   num_NRT_service_level_descriptors | 4 | uimsbf |
|   for (m=0; m<num_MH_service_level_descriptors; m++) | | |
|   { | | |
|       NRT_service_level_descriptor() | var | |
|   } | | |
| } | | |
| reserved | 4 | '1111' |
| num_virtual_channel_level_descriptors | 4 | uimsbf |
| for (n=0; n<num_virtual_channel_level_descriptors; n++) { | | |
| { | | |
|     virtual_channel_level_descriptor() | var | |
| } | | |
| } | | |

FIG.14

| Syntax | No. of Bits | Format |
|---|---|---|
| MH_component_descriptor() { | | |
|     descriptor_tag | 8 | 0x8D |
|     descriptor_length | 8 | uimsbf |
|     component_type | 7 | uimsbf |
|     component_encryption_flag | 1 | bsblf |
|     if (component_encryption_flag == '1') { | | |
|         num_STKM_streams | 8 | uimsbf |
|         for (i=0; i<num_STKM_streams; i++) { | | |
|             STKM_stream_id | 8 | uimsbf |
|         } | | |
|     MH_component_ data(component_type) | var | |
| } | | |

FIG.15

| Syntax | No. of Bits | Format |
|---|---|---|
| NRT_component_ data() { | | |
|     TSI | 16 | uimsbf |
|     session_start_time | 32 | uimsbf |
|     session_end_time | 32 | uimsbf |
|     reserved | 5 | '11111' |
|     tias_bandwidth_indicator | 1 | bslbf |
|     as_bandwidth_indicator | 1 | bslbf |
|     FEC_OTI_indicator | 1 | bslbf |
|     if (tias_bandwidth_indicator == '1'){ | | |
|         tias_bandwidth | 16 | uimsbf |
|     } | | |
|     if (as_bandwidth_indicator == '1'){ | | |
|         as_bandwidth | 16 | uimsbf |
|     } | | |
|     if (FEC_OTI_indicator == '1'){ | | |
|         FEC_encoding_id | 8 | uimsbf |
|         FEC_instance_id | 16 | uimsbf |
|     } | | |
| } | | |

FIG. 16

| Syntax | No.of Bits | Format |
|---|---|---|
| NRT_information_table_section() { | | |
|    table_id | 8 | 0xTBD |
|    section_syntax_indicator | 1 | '1' |
|    private_indicator | 1 | '1' |
|    reserved | 2 | '11' |
|    section_length | 12 | uimsbf |
|    service_id | 16 | uimsbf |
|    reserved | 2 | '11' |
|    NRT_IT_version_number | 5 | uimsbf |
|    current_next_indicator | 1 | '1' |
|    section_number | 8 | uimsbf |
|    last_section_number | 8 | uimsbf |
|    protocol_version | 8 | uimsbf |
|    time_span_start | 32 | uimsbf |
|    reserved | 5 | '11111' |
|    time_span_length | 11 | uimsbf |
|    num_items_in_section | 8 | uimsbf |
|    for(j=0; j<num_items_in_section; j++) { | | |
|       content_linkage | 32 | uimsbf |
|       updates_available | 1 | bslbf |
|       reserved | 1 | '1' |
|       TF_available | 1 | bslbf |
|       low_latency | 1 | bslbf |
|       playback_length_in_seconds | 20 | uimsbf |
|       content_length_included | 1 | bslbf |
|       playback_delay_included | 1 | bslbf |
|       expiration_included | 1 | bslbf |
|       reserved | 1 | '1' |
|       duration | 12 | uimsbf |
|       if(content_length_included=1) { | 40 | uimsbf |
|          content_length | | |
|       } | | |
|       if(playback_delay_included=1) { | | |
|          reserved | 4 | '1111' |
|          playback_delay | 20 | uimsbf |
|       } | | |
|       if(expiration_included=1) { | | |
|          expiration | | |
|       } | 32 | uimsbf |
|       content_name_lingth | | |
|       content_name_text() | 8 | uimsbf |
|       reserved | var | |
|       content_descriptors_length | 4 | '1111' |
|       for(i=-;i<N; i++) { | 12 | uimsbf |
|          content_descriptor() | | |
|       } | | |
|    } | | |
|    reserved | 6 | '111111' |
|    descriptors_length | 10 | uimsbf |
|    for(i=0; i<M; i++) { | | |
|       descriptor() | | |
|    } | | |
| } | | |

FIG.17

| Syntax | No. of bits | Format |
|---|---|---|
| NRT_content_table_section ( ) { | | |
|     table_id | 8 | uimsbf |
|     section_syntax_indicator | 1 | '1' |
|     private_indicator | 1 | '1' |
|     reserved | 2 | bslbf |
|     section_length | 12 | uimsbf |
|     NRT_Channel_ID | 16 | uimsbf |
|     reserved | 2 | bslbf |
|     version_number | 5 | uimsbf |
|     current_next_indicator | 1 | 1 |
|     section_number | 8 | uimsbf |
|     last_section_number | 8 | uimsbf |
|     protocol_version | 8 | uimsbf |
|     num_contents_in_section | 8 | uimsbf |
|     for (j=0; j < num_contents_in_section; j++) { | | |
|         content_version | 32 | uimsbf |
|         content_id | 32 | uimsbf |
|         content_available_start_time | 32 | uimsbf |
|         content_available_end_time | 32 | uimsbf |
|         ETM_location | 2 | uimsbf |
|         content_length_in_seconds | 30 | uimsbf |
|         content_size | 48 | uimsbf |
|         content_delivery_bit_rate | 32 | uimsbf |
|         content_title_length | 8 | uimsbf |
|         content_title_text ( ) | var | |
|         descriptors_length | 16 | uimsbf |
|         for (i=0; i < N; i++) { | | |
|             descriptor ( ) | | |
|         } | | |
|     } | | |
| } | | |

| Syntax | No.of Bits | Format |
|---|---|---|
| service_map_table_section() { | | |
|   table_id | 8 | 0xDB |
|   section_syntax_indicator | 1 | '0' |
|   private_indicator | 1 | '1' |
|   reserved | 2 | '11' |
|   section_length | 12 | uimsbf |
|   table_id_extension { | | |
|     SMT_protocol_version | 8 | uimsbf |
|     ensemble_id | 8 | uimsbf |
|   } | | |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   num_services | 8 | uimsbf |
|   for (j=0;j< num_services; j++) { | | |
|     service_id | 16 | uimsbf |
|     multi_ensemble_service | 2 | uimsbf |
|     service_status | 2 | uimsbf |
|     SP_indicator | 1 | bslbf |
|     short_service_name_length | 3 | uimsbf |
|     short_service_name | 16*m | |
|     reserved | 2 | '11' |
|     service_category | 6 | uimsbf |
|     num_components | 5 | uimsbf |
|     IP_version_flag | 1 | bslbf |
|     source_IP_address_flag | 1 | bslbf |
|     service_destination_IP_address_flag | 1 | bslbf |
|     if (source_IP_address_flag) | | |
|       source_IP_address | 32 or 128 | uimsbf |
|     if (service_destination_IP_address_flag) | | |
|       service_destination_IP_address | 32 or 128 | uimsbf |
|     for (j=0;j< num_components; j++) | | |
|     { | | |
|       reserved | 1 | '1' |
|       essential_component_indicator | 1 | bslbf |
|       component_destination_IP_address_flag | 1 | bslbf |
|       port_num_count | 5 | uimsbf |
|       component_destination_UDP_port_num | 16 | uimsbf |
|       if (component_destination_IP_address_flag) | | |
|         component_destination_IP_address | 32 or 128 | uimsbf |
|       reserved | 4 | '1111' |
|       num_component_level_descriptors | 4 | uimsbf |
|       for (k=0;k< num_components_level_descriptors; k++) | | |
|       { | | |
|         component_level_descriptor() | var | |
|       } | | |
|     } | | |
|     reserved | 4 | '1111' |
|     num_service_level_descriptors | 4 | uimsbf |
|     for (m=0; m<num_service_level_descriptors; m++) { | | |
|       service_level_descriptor() | var | |
|     } | | |
|   } | | |
|   reserved | 4 | '1111' |
|   num_ensemble_level_descriptors | 4 | uimsbf |
|   for (n=0; n<num_ensemble_level_descriptors; n++) { | | |
|     ensemble_level_descriptor() | var | |
|   } | | |
| } | | |

```
<?xml version="1.0' encoding="UTF-8"?>
<xs:schema xmlns="urn:atsc:nrt:flute:fdt:2009" xmlns:xs="http://www.w3.org/2001/XMLSchema"
targetNamespace="urn:atsc:nrt:flute:fdt:2009" elementFormDefault="qualified">
  <xs:element name="FDT-Instance" type="FDT-InstanceType"/>
  <xs:complexType name="FDT-InstanceType">
    <xs:sequence>
      <xs:element name="File" type="File-Type" maxOccurs="unbounded"/>
      <xs:element name="FDT-Content-ID" type="xs:unsignedShort" minOccurs='0' maxOccurs="unbounded"/>  ①
      <xs:any namespace="##other" processContents="skip" minOccurs="0" maxOccurs="unbounded"/>
    </xs:sequence>
    <xs:attribute name='Expires" type="xs:string" use="required"/>
    <xs:attribute name='Complete" type="xs:boolean" use="optional"/>
    <xs:attribute name='Content-Type" type="xs:string" use="optional'/>
    <xs:attribute name='Content-Encoding" type="xs:string" use="optional"/>
    <xs:attribute name='FEC-OTI-FEC-Encoding-ID" type="xs:unsignedLong" use="optional"/>
    <xs:attribute name='FEC-OTI-FEC-Instance-ID" type="xs:unsignedLong" use="optional"/>
    <xs:attribute name='FEC-OTI-Maximum-Source-Block-Length" type='xs:unsignedLong" use="optional"/>
    <xs:attribute name='FEC-OTI-Encoding-Symbol-Length" type="xs:unsignedLong" use="optional"/>
    <xs:attribute name="FEC-OTI-Max-Number-of-Encoding-Symbols" type='-xs:unsignedLong" use="optional"/>
    <xs:attribute name='FEC-OTI-Scheme-Specific-Info" type="xs:base64Binary" use="optional"/>
    <xs:anyAttribute processContents="skip"/>
  </xs:complexType>
  <xs:complexType name="File-Type">
    <xs:sequence>
      <xs:element name="File-Content-ID" type="Content-ID-Type" minOccurs="0" maxOccurs="unbounded"/>  ②
      <xs:any namespace="##other" processContents="skip" minOccurs="0" maxOccurs="unbounded"/>
    </xs:sequence>
    <xs:attribute name="Content-Location" type="xs:anyURI" use="required"/>
    <xs:attribute name='TOI" type="xs:positiveInteger" use="required"/>
    <xs:attribute name='Content-Length" type="xs:unsignedLong" use="required"/>
    <xs:attribute name='Transfer-Length" type="xs:unsignedLong" use="optional'/>
    <xs:attribute name='Content-Type" type="xs:string" use="optional"/>
    <xs:attribute name='Content-Encoding" type="xs:string" use="optional"/>
    <xs:attribute name='Content-MD5" type="xs:base64Binary" use="optional"/>
    <xs:attribute name='FEC-OTI-FEC-Encoding-ID" type="xs:unsignedLong" use="optional"/>
    <xs:attribute name='FEC-OTI-FEC-Instance-ID" type="xs:unsignedLong" use="optional"/>
    <xs:attribute name='FEC-OTI-Maximum-Source-Block-Length" type="xs:unsignedLong" use="optional"/>
    <xs:attribute name='FEC-OTI-Encoding-Symbol-Length" type="xs:unsignedLong" use="optional"/>
    <xs:attribute name='FEC-OTI-Max-Number-of-Encoding-Symbols" type="xs:unsignedLong" use="optional"/>
    <xs:attribute name='FEC-OTI-Scheme-Specific-Info" type="xs:base64Binary" use="optional"/>
    <xs:anyAttribute processContents="skip"/>
  </xs:complexType>
  <xs:complexType name="Content-ID-Type">
    <xs:attribute name="Content-ID" type="xs:unsingedShort" use="required"/>
    <xs:attribute name="entry" type="xs:boolean " default="false" use="optional"/>  ③
    <xs:anyAttribute processContents="skip"/>
  </xs:complexType>
</xs:schema>
```

```xml
<?xml version="1.0" encoding="UTF-8"?>
<xs:schema xmlns="urn:atsc:nrt:flute:fdt:2009" xmlns:xs="http://www.w3.org/2001/XMLSchema"
targetNamespace="urn:atsc:nrt:flute:fdt:2009" elementFormDefault="qualified">
  <xs:element name="FDT-Instance" type="FDT-InstanceType"/>
  <xs:complexType name="FDT-InstanceType ">
    <xs:sequence >
      <xs:element name="File" type="File-Type" maxOccurs ="unbounded"/>
      <xs:element name="FDT-Content-ID" type="FDT-Content-ID-Type" minOccurs="0" maxOccurs="unbounded"/>
      <xs:any namespace="##other" processContents ="skip" minOccurs="0" maxOccurs="unbounded"/>
    </xs:sequence>
    <xs:attribute name="Expires" type="xs:string" use="required"/>
    <xs:attribute name="Complete" type="xs:boolean" use="optional"/>
    <xs:attribute name="Content-Type" type="xs:string" use="optional"/>
    <xs:attribute name="Content-Encoding" type="xs:string" use="optional"/>
    <xs:attribute name="FEC-OTI-FEC-Encoding-ID" type="xs:unsignedLong" use="optional"/>
    <xs:attribute name="FEC-OTI-FEC-Instance-ID" type="xs:unsignedLong" use="optional"/>
    <xs:attribute name="FEC-OTI-Maximum-Source-Block-Length" type="xs:unsignedLong" use="optional"/>
    <xs:attribute name="FEC-OTI-Encoding-Symbol-Length" type="xs:unsignedLong" use="optional"/>
    <xs:attribute name="FEC-OTI-Max-Number-of-Encoding-Symbols" type="xs:unsignedLong" use="optional"/>
    <xs:attribute name="FEC-OTI-Scheme-Specific-Info" type="xs:base64Binary" use="optional"/>
    <xs:anyAttribute processContents ="skip"/>
  </xs:complexType>
  <xs:complexType name="File-Type">
    <xs:sequence>
      <xs:element name="File-Content-ID" type="Content-ID-Type" minOccurs="0" maxOccurs ="unbounded"/>
      <xs:any namespace="##other" processContents="skip" minOccurs="0" maxOccurs="unbounded"/>
    </xs:sequence>
    <xs:attribute name="Content-Location" type="xs:anyURI" use="required"/>
    <xs:attribute name="TOI" type="xs:positiveInteger" use="required"/>
    <xs:attribute name="Content-Length" type="xs:unsignedLong" use="required"/>
    <xs:attribute name="Transfer-Length" type="xs:unsignedLong" use="optional"/>
    <xs:attribute name="Content-Type" type="xs:string" use="optional"/>
    <xs:attribute name="Content-Encoding" type="xs:string" use="optional"/>
    <xs:attribute name="Content-MD5" type="xs:base64Binary" use="optional"/>
    <xs:attribute name="FEC-OTI-FEC-Encoding-ID" type="xs:unsignedLong" use="optional"/>
    <xs:attribute name="FEC-OTI-FEC-Instance-ID" type="xs:unsignedLong" use="optional"/>
    <xs:attribute name="FEC-OTI-Maximum-Source-Block-Length" type="xs:unsignedLong" use="optional"/>
    <xs:attribute name="FEC-OTI-Encoding-Symbol-Length" type="xs:unsignedLong" use="optional"/>
    <xs:attribute name="FEC-OTI-Max-Number-of-Encoding-Symbols" type="xs:unsignedLong" use="optional"/>
    <xs:attribute name="FEC-OTI-Scheme-Specific-Info" type="xs:base64Binary" use="optional"/>
    <xs:anyAttribute processContents ="skip"/>
  </xs:complexType>
  <xs:complexType name="FDT-Content-ID-Type">
    <xs:sequence>
      <xs:element name="Entry-Content-Location" type=xs:anyURI" minOccurs="0" maxOccurs="unbounded"/>
    </xs:sequence>
    <xs:attribute name="Content-ID" type="xs:unsingedShort" use="required"/>
    <xs:anyAttribute processContents="skip"/>
  </xs:complexType>
  <xs:complexType name="Content-ID-Type">
    <xs:attribute name="Content-ID" type="xs:ursingedShort" use="required"/>
    <xs:attribute name="entry" type="xs:boolean" default="false" use="optional"/>
    <xs:anyAttribute processContents ="skip"/>
  </xs:complexType>
</xs:schema>
```

| Syntax | No. of Bits | Format |
|---|---|---|
| tdo_trigger_table_section() { | | |
|     table_id | 8 | 0xTBD |
|     section_syntax_indicator | 1 | 0 |
|     private_indicator | 1 | 1 |
|     reserved | 2 | 11 |
|     section_length | 12 | uimsbf |
|     source_id | 16 | uimsbf |
|     reserved | 2 | 11 |
|     TTT_version_number | 5 | uimsbf |
|     current_next_indicator | 1 | 1 |
|     section_number | 8 | uimsbf |
|     last_section_number | 8 | uimsbf |
|     num_triggers_in_section | 8 | uimsbf |
|     for (i=0; i< num_triggers_in_section; i++) { | | uimsbf |
|         trigger_id | 32 | uimsbf |
|         trigger_time | 32 | uimsbf |
|         trigger_action | 16 | uimsbf |
|         trigger_description_length | 8 | uimsbf |
|         trigger_description_text | var | |
|         service_id_ref | 16 | uimsbf |
|         content_linkage | 32 | uimsbf |
|         num_trigger_descriptors | 8 | uimsbf |
|         for (j=0; j<num_bundle_descriptors ; j++) { | | |
|             trigger_descriptor   () | var | |
|         } | | |
|     } | | |
| } | | |

FIG.27

| Syntax | No. of bits | Format |
|---|---|---|
| synchronized_data_packet(){ | | |
|     data_identifier | 8 | uimsbf |
|     sub_stream_id | 8 | uimsbf |
|     PTS_extension_flag | 1 | bslbf |
|     output_data_rate_flag | 1 | bslbf |
|     reserved | 2 | '11' |
|     synchronized_data_packet_header_length | 4 | uimsbf |
|     if (PTS_extension_flag=='1'){ | | |
|         reserved | 7 | '1111111' |
|         PTS_extension | 9 | uimsbf |
|     } | | |
|     for (i=0;i<N1;i++){ | | |
|         synchronized_data_private_data_byte | 8 | bslbf |
|     } | | |
|     for (i=0;i<N2;i++){ | | |
|         synchronized_data_byte | 8 | bslbf |
|     } | | |
| } | | |

FIG.28

| Syntax | No. of bits | Format |
|---|---|---|
| contentTypeDescriptor(){ | | |
|     descriptorTag | 8 | 0x72 |
|     descriptorLength | 8 | uimsbf |
|     for(i=0;i<descriptorLength;i++){ | | |
|         contentTypeByte | 8 | bslbf |
|     } | | |
| } | | |

FIG.29

| Syntax | No. Of bits |
|---|---|
| TS_program_map_section(){ | |
| table_id | 8 |
| section_syntax_indicator | 1 |
| '0' | 1 |
| reserved | 2 |
| section_length | 12 |
| program_number | 16 |
| reserved | 2 |
| version_number | 5 |
| current_next_indicator | 1 |
| section_number | 8 |
| last_section_number | 8 |
| reserved | 3 |
| PCR_PID | 13 |
| reserved | 4 |
| program_info_length | 12 |
| for(i=0;i<N;i++){ | |
|    descriptor() | |
| } | |
| for(i=0;i<N1;i++){ | |
|    steam_type | 8 |
|    reserved | 3 |
|    elementary_PID | 13 |
|    reserved | 4 |
|    ES_info_length | 12 |
|    for(i=0;i<N2;i++){ | |
|       descriptor() | |
|    } | |
| } | |
| CRC_32 | 32 |
| } | |

| Syntax | No. of Bits | Format |
|---|---|---|
| service_id_descriptor() { | | |
|    descriptor_tag | 8 | 0xC2 |
|    descriptor_length | 8 | uimsbf |
|    service_count | 8 | uimsbf |
|    for (i=0; i<service_count; i++) | | |
|       service_id | 16 | bslbf |
|       for (j=0; j< N; j++) { | | |
|          reserved | 8 | bslbf |
|       } | | |
| } | | |

FIG.30

| Syntax | No. Of bits |
|---|---|
| TS_program_map_section(){ | |
| table_id | 8 |
| section_syntax_indicator | 1 |
| '0' | 1 |
| reserved | 2 |
| section_length | 12 |
| program_number | 16 |
| reserved | 2 |
| version_number | 5 |
| current_next_indicator | 1 |
| section_number | 8 |
| last_section_number | 8 |
| reserved | 3 |
| PCR_PID | 13 |
| reserved | 4 |
| program_info_length | 12 |
| for(i=0;i<N;i++){ | |
|    descriptor() | |
| } | |
| for(i=0;i<N1;i++){ | |
|    steam_type | 8 |
|    reserved | 3 |
|    elementary_PID | 13 |
|    reserved | 4 |
|    ES_info_length | 12 |
|    for(i=0;i<N2;i++){ | |
|       descriptor() | |
|    } | |
| } | |
| CRC_32 | 32 |
| } | |

| Syntax | No. of Bits | Format |
|---|---|---|
| Trigger_stream_descriptor() { | | |
|    descriptor_tag | 8 | 0xC2 |
|    descriptor_length | 8 | uimsbf |
|    target_service_count | 8 | uimsbf |
|    for (i=0; i<service_count; i++) { | | |
|       target_service_id | 16 | bslbf |
|       target_content_item_count | 8 | uimsbf |
|       for(k=0; k<target_content_item_count; k++) { | | |
|          target_content_linkage | 32 | bslbf |
|    } | | |
|    for (j=0; j< N; j++) { | | |
|       reserved | 8 | bslbf |
|    } | | |
| } | | |

FIG.31

|  | No. of bits | Identifier |
|---|---|---|
| application_information_section(){ |  |  |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     test_application_flag | 1 | bslbf |
|     application_type | 15 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved_future_use | 4 | bslbf |
|     common_descriptors_length | 12 | uimsbf |
|     for(i=0;i<N;i++){ |  |  |
|         descriptor() |  |  |
|     } |  |  |
|     reserved_future_use | 4 | bslbf |
|     application_loop_length | 12 | uimsbf |
|     for(i=0;i<N;i++){ |  |  |
|         application_identifier() |  |  |
|         application_control_code | 8 | uimsbf |
|         reserved_future_use | 4 | bslbf |
|         application_descriptors_loop_length | 12 | uimsbf |
|         for(j=0;j<N;j++){ |  |  |
|             descriptor() |  |  |
|         } |  |  |
|     } |  |  |
|     CRC_32 | 32 | rpchof |
| } |  |  |

FIG.32

| Syntax | No. of Bits | Format |
|---|---|---|
| System_time_table_section(){ | | |
|     table_id | 8 | uimsbf |
|     section_syntax_indicator | 1 | '1' |
|     private_indicator | 1 | '1' |
|     reserved | 2 | '11' |
|     section_length | 12 | uimsbf |
|     table_id_extension | 16 | 0x0000 |
|     reserved | 2 | '11' |
|     version_number | 5 | '00000' |
|     current_next_indicator | 1 | '1' |
|     section_number | 8 | 0x00 |
|     last_section_number | 8 | 0x00 |
|     protocol_version | 8 | uimsbf |
|     system_time | 32 | uimsbf |
|     GPS_UTC_offset | 8 | uimsbf |
|     daylight_savings | 16 | uimsbf |
|     for (i=0;i<N;i++){ | | |
|         descriptor() | | |
|     } | | |
|     CRC_32 | 32 | rpchof |
| } | | |

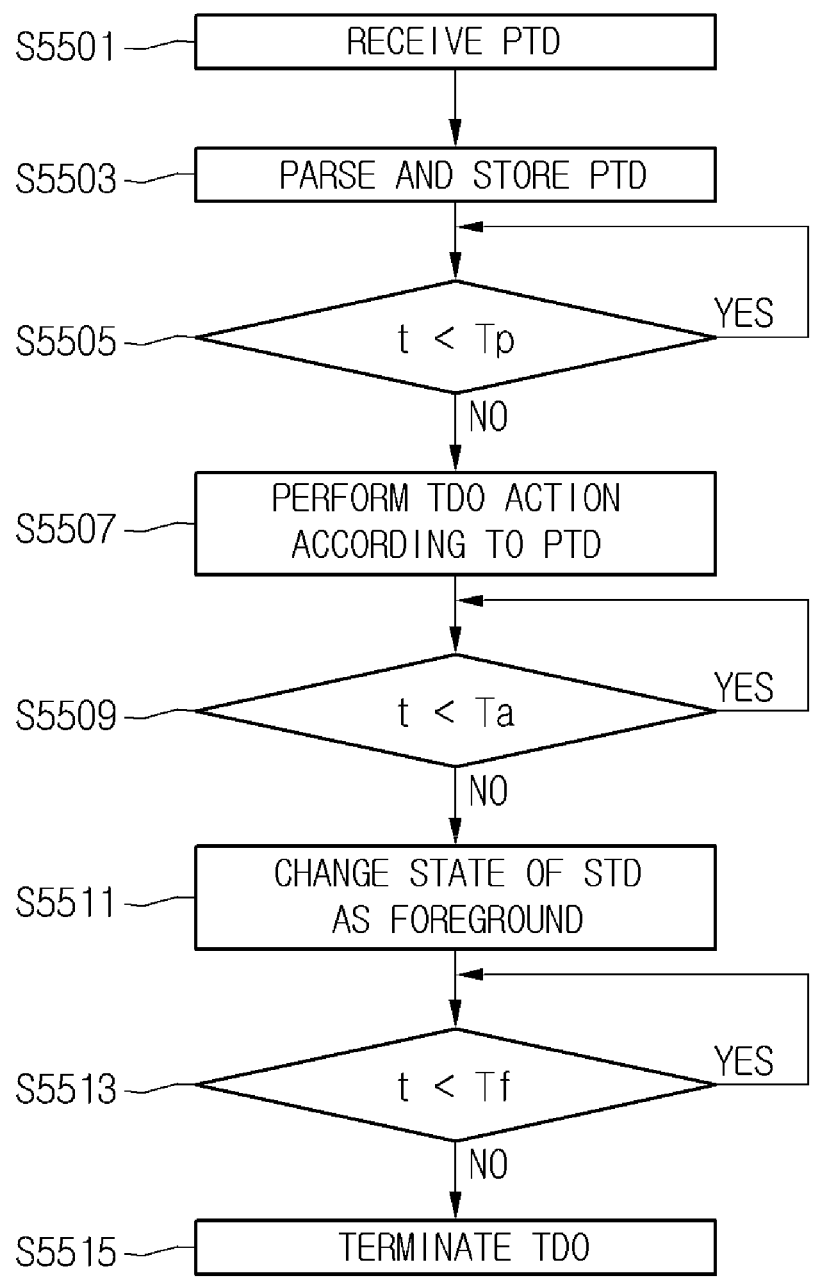

FIG.51

| Syntax | No. Bits | Format |
|---|---|---|
| tdo_trigger_table_section() { | | |
|     table_id | 8 | 0xTBD |
|     section_syntax_indicator | 1 | '0' |
|     private_indicator | 1 | '1' |
|     reserved | 2 | '11' |
|     section_length | 12 | uimsbf |
|     source_id | 16 | uimsbf |
|     reserved | 2 | '11' |
|     TTT_version_number | 5 | uimsbf |
|     current_next_indicator | 1 | '1' |
|     section_number | 8 | uimsbf |
|     last_section_number | 8 | uimsbf |
|     num_triggers_in_section | 8 | uimsbf |
|     for (i=0; i< num_triggers_in_section; i++) { | | uimsbf |
|         trigger_id | 32 | uimsbf |
|         trigger_time | 32 | uimsbf |
|         trigger_type | 8 | uimsbf |
|         trigger_action | 16 | uimsbf |
|         trigger_description_length | 8 | uimsbf |
|         trigger_description_text | var | |
|         service_id_ref | 16 | uimsbf |
|         content_linkage | 32 | uimsbf |
|         target_trigger_id_ref | 32 | uimsbf |
|         num_trigger_descriptors | 8 | uimsbf |
|         for (j=0; j<num_trigger_descriptors; j++) { | | |
|             trigger_descriptor() | var | |
|         } | | |
|     } | | |
| } | | |

FIG.52

| Syntax | No. of Bits | Format |
|---|---|---|
| Content_Items_descriptor() { | | |
|     descriptor_tag | 8 | 0xC2 |
|     descriptor_length | 8 | uimsbf |
|     service_count | 8 | uimsbf |
|     for (i=0; i<service_count; i++) { | | |
|         service_id_ref | 16 | bslbf |
|         content_item_count | 8 | uimsbf |
|         for(k=0; k<content_item_count; k++) | | |
|             content_linkage | 32 | bslbf |
|     } | | |
|     for (j=0; j< N; j++) { | | |
|         reserved | 8 | bslbf |
|     } | | |
| } | | |

FIG.53

| Syntax | No. of Bits | Format |
|---|---|---|
| internet_location_descriptor() { | | |
|     descriptor_tag | 8 | 0xC9 |
|     descriptor_length | 8 | uimsbf |
|     reserved | 3 | '111' |
|     URL_count | 5 | uimsbf |
|     for (i=0; i<URL_count; i++) { | | |
|         URL_length | 8 | uimsbf |
|         URL() | var | |
|     } | | |
|     for (j=0; j< N; j++) { | | |
|     reserved | 8 | bslbf |
|     } | | |
| } | | |

FIG.58

```
link_descriptor() {
descriptor_tag                              8 0xe8
descriptor_length                           8 uimsbf
number_of_links                             8 uimsbf
for (i=0; i<number_of_links; i++) {
    link_type                               8 uimsbf
    link_media                              8 uimsbf
    mime_type_length                        8 uimsbf
    mime_type                               var
    description_length                      8 uimsbf
    description                             var
    link_length                             uimsbf
    link_byte                               var
  }
}
```

FIG.59

|              | link_type |
|--------------|-----------|
| Html Portal  | 0x01      |
| Thumbnail    | 0x02      |
| Preview Clip | 0x03      |
| EPG          | 0x04      |
| Highlight    | 0x05      |
| MultiView    | 0x06      |
| TDO          | 0x07      |

FIG.60

|  | link_media | link_byte |
|---|---|---|
| NRT service | 0x02 | service_id content_linkage |
| Internet service | 0x03 | URI |

FIG.67

| Syntax | No. of Bits | Format |
|---|---|---|
| NRT_service_descriptor() { | | |
|     descriptor_tag | 8 | 0xC4 |
|     descriptor_length | 8 | uimsbf |
|     reserved | 2 | '11' |
|     consumption_model | 6 | uimsbf |
|     auto-update | 1 | bslbf |
|     storage_reservation_present | 1 | bslbf |
|     default_content_length_present | 1 | bslbf |
|     reserved | 5 | '11111' |
|     if (storage_reservation_present==1) { | | |
|         storage_reservation | 24 | uimsbf |
|     if (default_content_length_present==1) { | | |
|         default_content_length | 32 | uimsbf |
|     } | | |
|     for (j=0; j< N; j++) { | | bslbf |
|     reserved | 8 | |
|     } | | |
| } | | |

FIG.68

| Consumption_model | Meaning |
|---|---|
| 0x00 | Forbidden. |
| 0x01 | Browse & Download - The NRT service describes content that can be selected for later download. |
| 0x02 | Portal - The NRT service provides an experience similar to a web browser access. Files needed to support text/graphics rendering are available in the associated FLUTE session. |
| 0x03 | Push - The NRT service offers request-based content. Receivers are expected to offer the user a choice whether or not to automatically update content associated with the service. For such services, if the user selects the auto-update option, the receiver caches and service-related content and automatically updates files as new versions are made available. When the user returns to a requested Push service, content that had been pre-loaded is displayed. |
| 0x04 | TDO - The NRT service offers TDO(Triggered Declarative Object). |
| 0x05 - 0x3F | Reserved for use by ATSC or other SDOs who register the use with ATSC. |

FIG.71

| Syntax | No. of Bits | Format |
|---|---|---|
| TDO_metadata_descriptor() { | | |
| descriptor_tag | 8 | 0xTBD |
| descriptor_length | 8 | Uimsbf |
| scheduled_activation_start_time | 32 | uimsbf |
| scheduled_activation_end_time | 32 | uimsbf |
| priority | 8 | uimsbf |
| activation_repeat_flag | 1 | bslbf |
| reserved | 7 | '11111' |
| if (repeating==1) { | | |
| repeat_interval | 8 | uimsbf |
| } | | |
| for (j=0; j< N; j++) { | | |
| reserved | 8 | bslbf |
| } | | |
| } | | |

FIG.75

| Syntax | No. of Bits | Format |
|---|---|---|
| internet_location_descriptor() { | | |
| descriptor_tag | 8 | 0xC9 |
| descriptor_length | 8 | uimsbf |
| reserved | 3 | '111' |
| URL_count | 5 | uimsbf |
| for (i=0; i<URL_count; i++) { | | |
| URL_length | 8 | uimsbf |
| URL() | var | |
| } | | |
| for (j=0; j< N; j++) { | | |
| reserved | 8 | bslbf |
| } | | |
| } | | |

FIG. 80

| Syntax | No. Bits | Format |
|---|---|---|
| NRT_information_table_section() { | | |
| table_id | 8 | 0xDF |
| section_syntax_indicator | 1 | '0' |
| private_indicator | 1 | '1' |
| reserved | 2 | '11' |
| section_length | 12 | uimsbf |
| table_id_extension { | | |
|     protocol_version | 8 | uimsbf |
|     subnet_id | 8 | uimsbf |
| } | | |
| reserved | 2 | '11' |
| NRT_IT_version_number | 5 | uimsbf |
| current_next_indicator | 1 | '1' |
| section_number | 8 | uimsbf |
| last_section_number | 8 | uimsbf |
| service_id | 16 | uimsbf |
| time_span_start | 32 | uimsbf |
| reserved | 5 | '11111' |
| time_span_length | 11 | uimsbf |
| num_content_items_in_section | 8 | uimsbf |
| for (j=0; j< num_content_items_in_section; j++) { | | |
|     content_linkage | 32 | uimsbf |
|     updates_available | 1 | bslbf |
|     TF_available | 1 | bslbf |
|     content_security_conditions_indicator | 1 | bslbf |
|     available_on_internet | 1 | bslbf |
|     playback_length_included | 1 | bslbf |
|     playback_delay_included | 1 | bslbf |
|     expiration_included | 1 | bslbf |
|     content_length_included | 1 | bslbf |
| | | |
|     reserved | 3 | '111' |

FIG.81

| | | |
|---|---|---|
| acquisition_time | 12 | uimsbf |
| if (playback_length_included==1) { | | |
|     reserved | 4 | '1111' |
|     playback_length_in_seconds | 20 | uimsbf |
| } | | |
| if (playback_delay_included==1) { | | |
|     reserved | 4 | '1111' |
|     playback_delay | 20 | uimsbf |
| } | | |
| if (expiration_included==1) { | | |
|     expiration | 32 | uimsbf |
| } | | |
| if (content_length_included==1) { | | |
|     content_length | 40 | uimsbf |
| } | | |
| content_name_length | 8 | uimsbf |
| content_name_text() | var | |
| num_content_descriptors_length | 8 | uimsbf |
| for (i=0; i<num_content_descriptors; i++) { | | |
|     content_descriptor() | var | |
| } | | |
| } | | |
| num_descriptors | 8 | uimsbf |
| for (i=0; i<num_descriptors; i++) { | | |
|   descriptor() | var | |
| } | | |
| } | | |

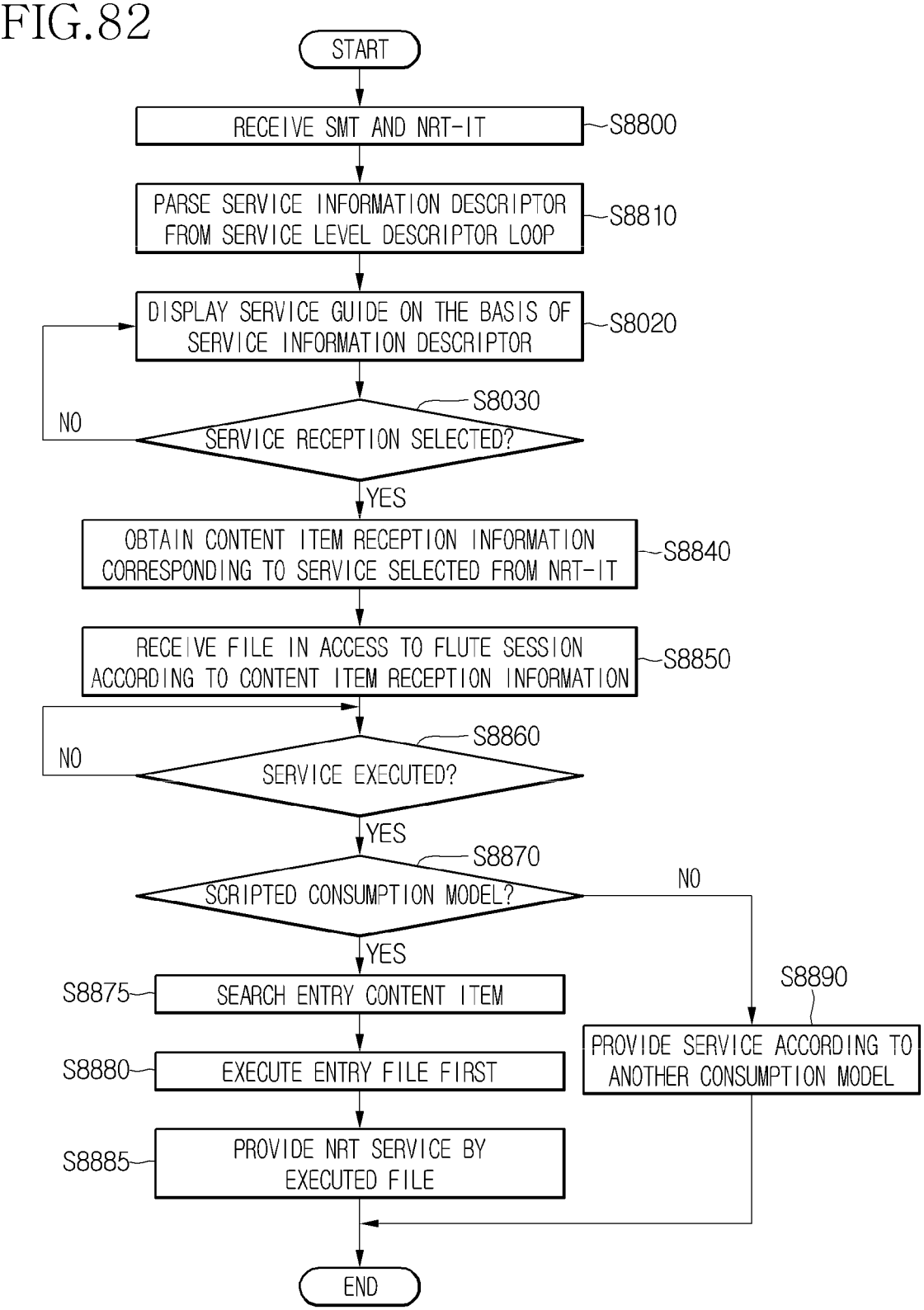

FIG.84

| Syntax | No. of Bits | Format |
|---|---|---|
| NRT_service_descriptor() { | | |
| descriptor_tag | 8 | 0xC4 |
| descriptor_length | 8 | uimsbf |
| reserved | 2 | '11' |
| consumption_model | 6 | uimsbf |
| auto-update | 1 | bslbf |
| storage_reservation_present | 1 | bslbf |
| default_content_length_present | 1 | bslbf |
| equivalent_service_not_present | 1 | bslbf |
| reserved | 4 | '1111' |
| if (storage_reservation_present==1) { | | |
| storage_reservation | 24 | uimsbf |
| if (default_content_length_present==1) { | | |
| default_content_length | 32 | uimsbf |
| } | | |
| if (equivalent_service_not_present==0) { | | |
| num_equivalent_services | 8 | uimsbf |
| for (i=0; i< num_equivalent_services ; i++) { | | |
| equivalent_service_id | 16 | uimsbf |
| } | | |
| } | | |
| for (j=0; j< N; j++) { | | |
| reserved | 8 | bslbf |
| } | | |
| } | | |

FIG.85

| Syntax | No. Bits | Format |
|---|---|---|
| NRT_information_table_section() { | | |
| table_id | 8 | 0xDF |
| section_syntax_indicator | 1 | '0' |
| private_indicator | 1 | '1' |
| reserved | 2 | '11' |
| section_length | 12 | uimsbf |
| table_id_extension { | | |
|     protocol_version | 8 | uimsbf |
|     subnet_id | 8 | uimsbf |
| } | | |
| reserved | 2 | '11' |
| NRT_IT_version_number | 5 | uimsbf |
| current_next_indicator | 1 | '1' |
| section_number | 8 | uimsbf |
| last_section_number | 8 | uimsbf |
| service_id | 16 | uimsbf |
| time_span_start | 32 | uimsbf |
| reserved | 5 | '11111' |
| time_span_length | 11 | uimsbf |
| num_content_items_in_section | 8 | uimsbf |
| for (j=0; j< num_content_items_in_section; j++) { | | |
|     content_linkage | 32 | uimsbf |
| updates_available | 1 | bslbf |
| TF_available | 1 | bslbf |
| content_security_conditions_indicator | 1 | bslbf |
| available_on_internet | 1 | bslbf |
| playback_length_included | 1 | bslbf |
| playback_delay_included | 1 | bslbf |
| expiration_included | 1 | bslbf |
| content_length_included | 1 | bslbf |
| no_entry_flag | 1 | bslbf |
| available_on_currrent_service | 1 | bslbf |
| reserved | 3 | '111' |

FIG.86

| | | |
|---|---|---|
| reserved | 3 | '111' |
| acquisition_time | 12 | uimsbf |
| if (playback_length_included==1) { | | |
|     reserved | 4 | '1111' |
|     playback_length_in_seconds | 20 | uimsbf |
| } | | |
| if (playback_delay_included==1) { | | |
|     reserved | 4 | '1111' |
|     playback_delay | 20 | uimsbf |
| } | | |
| if (expiration_included==1) { | | |
|     expiration | 32 | uimsbf |
| } | | |
| if (content_length_included==1) { | | |
|     content_length | 40 | uimsbf |
| } | | |
| content_name_length | 8 | uimsbf |
| content_name_text() | var | |
| num_content_descriptors_length | 8 | uimsbf |
| for (i=0; i<num_content_descriptors; i++) { | | |
|     content_descriptor() | var | |
| } | | |
| } | | |
| num_descriptors | 8 | uimsbf |
| for (i=0; i<num_descriptors; i++) { | | |
|   descriptor() | var | |
| } | | |
| } | | |

FIG.87

| Syntax | No. Bits | Format |
|---|---|---|
| Other_NRT_location_descriptor() { | | |
| descriptor_tag | 8 | TBD |
| descriptor_length | 8 | uimsbf |
| reserved | 2 | '11' |
| num_other_NRT_locations | 6 | uimsbf |
| for (i=0; i< num_other_NRT_locations ; i++) { | | |
| other_service_id | 16 | uimsbf |
| } | | |
| } | | |

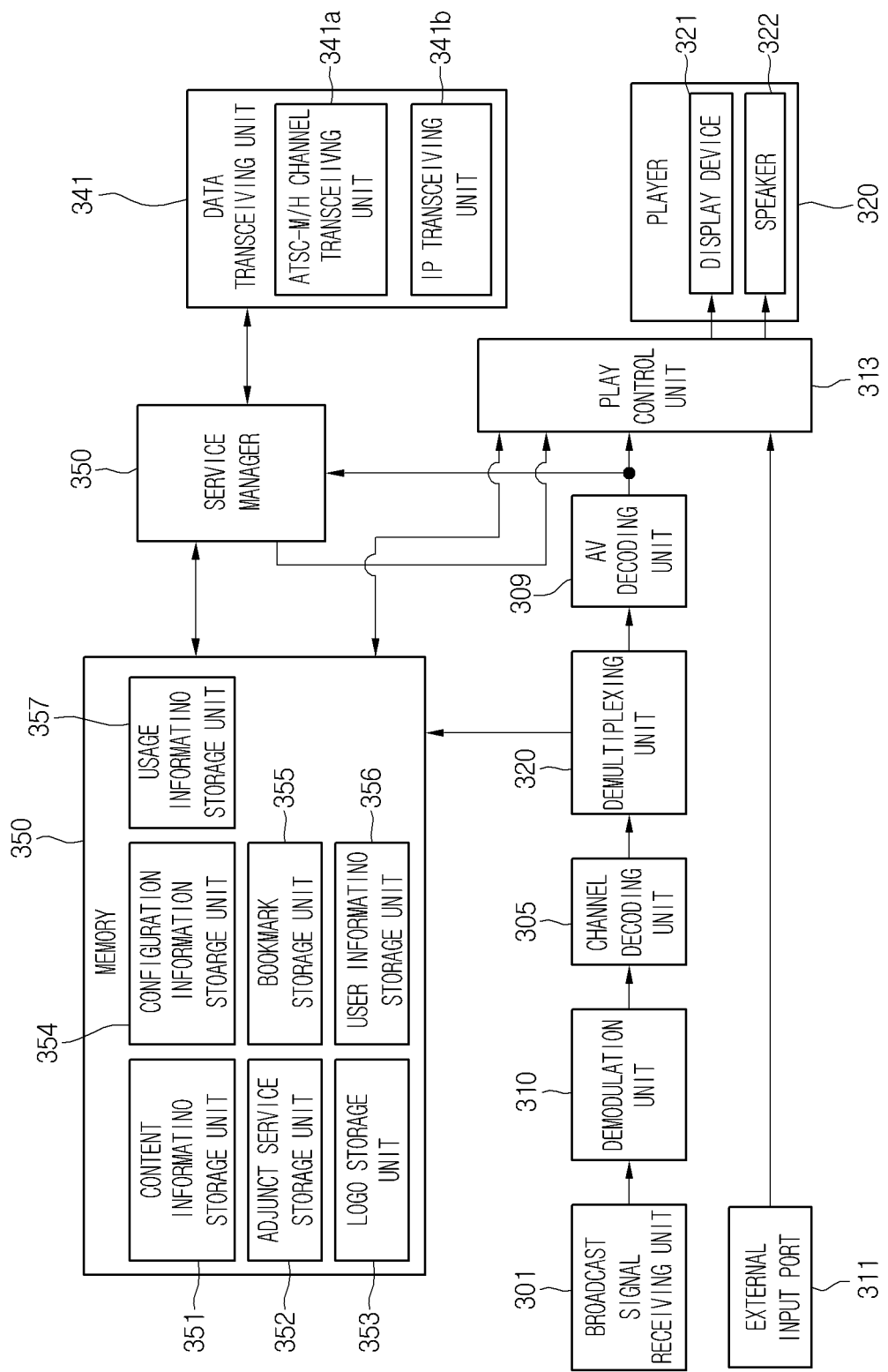

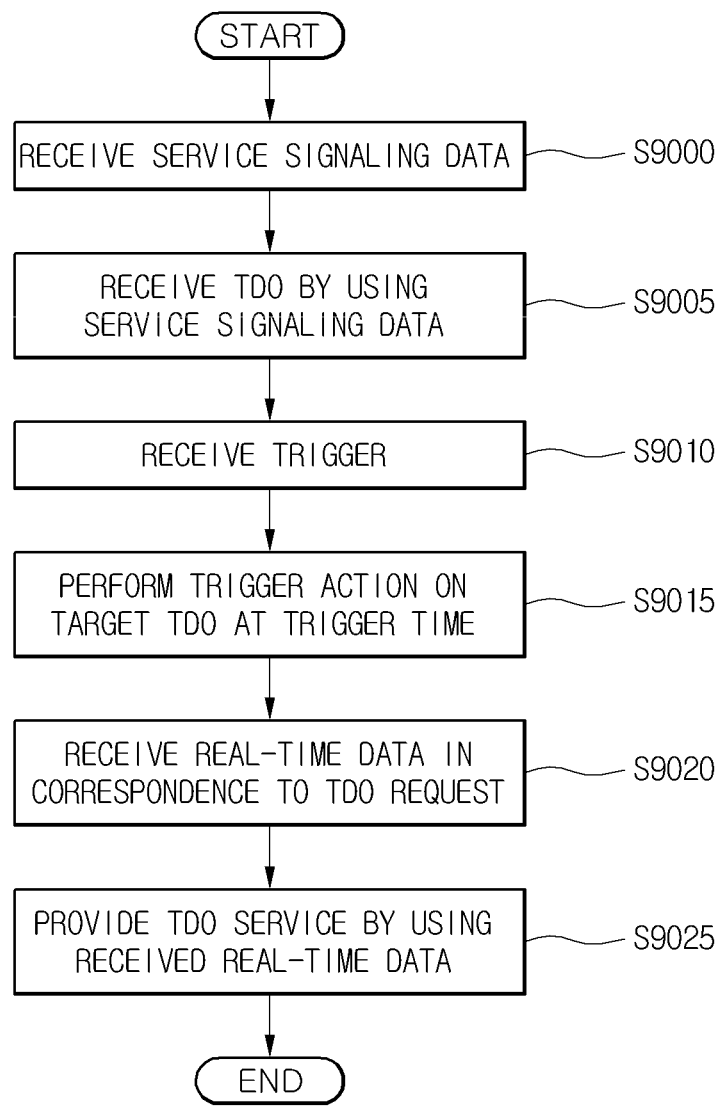

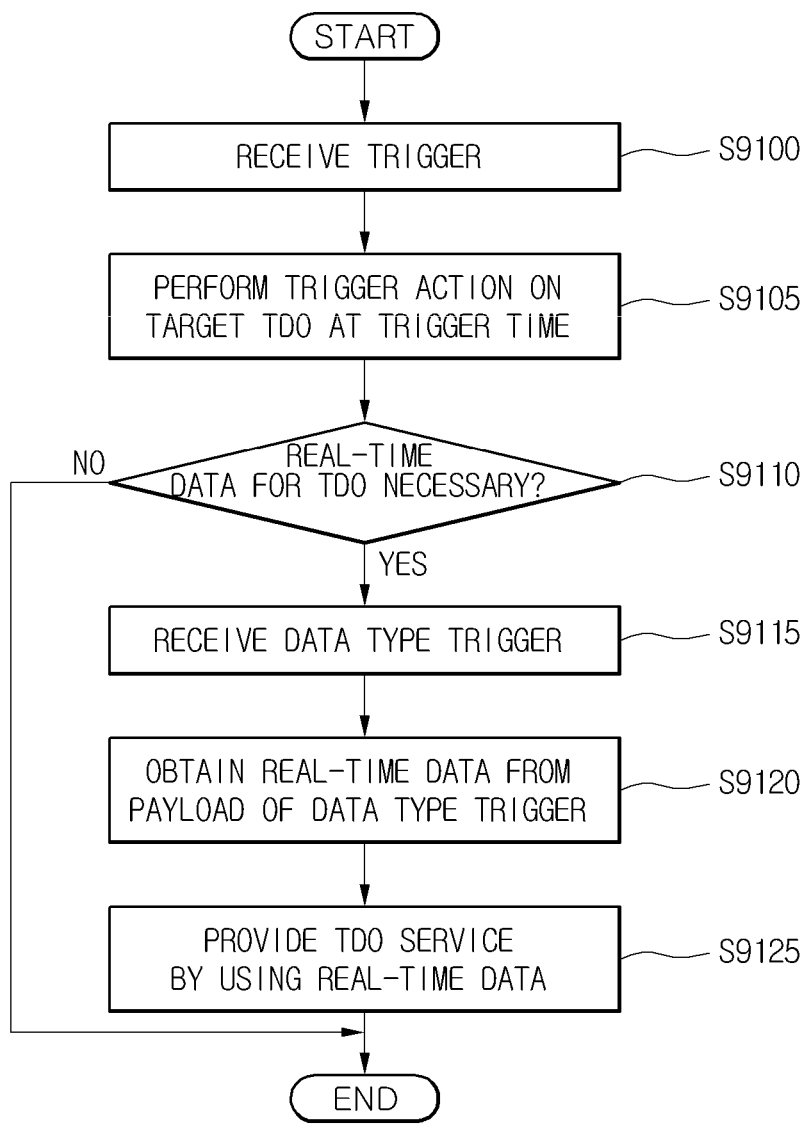

FIG.101

| Consumption_model | Meaning |
|---|---|
| 0x00 | Forbidden. |
| 0x01 | Browse & Download - The NRT service describes content that can be selected for later download. |
| 0x02 | Portal - The NRT service provides an experience similar to a web browser access. Files needed to support text/graphics rendering are available in the associated FLUTE session. |
| 0x03 | Push - The NRT service offers request-based content. Receivers are expected to offer the user a choice whether or not to automatically update content associated with the service. For such services, if the user selects the auto-update option, the receiver caches and service-related content and automatically updates files as new versions are mada available. When the user returns to a requested Push service, content that had been pre-loaded is displayed. |
| 0x04 | TDO - The NRT service offers TDO(Triggered Downloadable Object). |
| 0x05 | Data stream - The NRT service offers one or more streams of files would bee downloaded and delivered to a DO only if the DO requests such delivery via an API provided as part of the execution environment. |
| 0x06-0x3F | Reserved for use by ATSC or other SDOs who register the use with ATSC. |

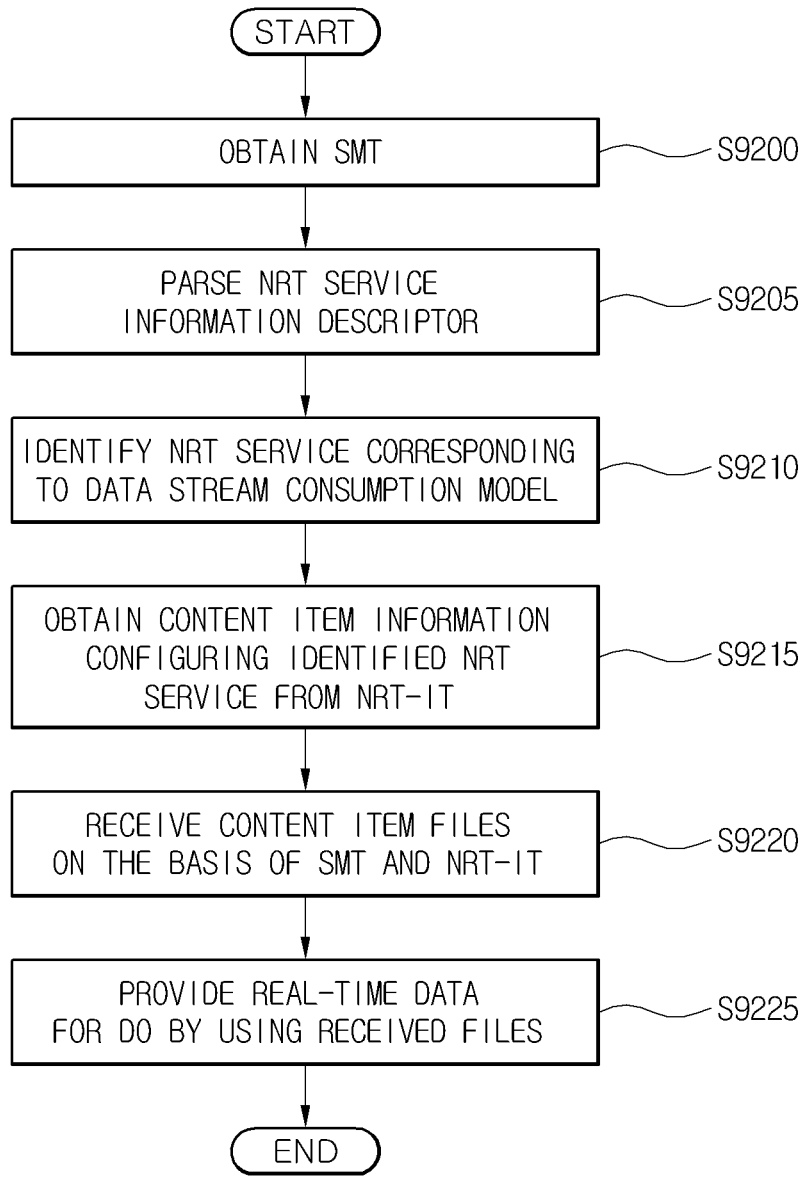

FIG.103

| Syntax | No. Bits | Format |
|---|---|---|
| NRT_information_table_section(){ | | |
| table_id | 8 | 0xDF |
| ... | 1 | '0' |
| service_id | 16 | uimsbf |
| ... | 32 | uimsbf |
| num_content_items_in_section | 8 | uimsbf |
| for(j=0; j<num_content_items_in_section; j++) { | | |
| content_linkage | 32 | uimsbf |
| updates_available | 1 | bslbf |
| TF_available | 1 | bslbf |
| content_security_conditions_indicator | 1 | bslbf |
| reserved | 1 | '1' |
| playback_length_included | 1 | bslbf |
| playback_delay_included | 1 | bslbf |
| expiration_included | 1 | bslbf |
| content_size_included | 1 | bslbf |
|     available_on_internet | 1 | bslbf |
|     available_in_broadcast | 1 | bslbf |
| reserved | 6 | '111111' |
| ... | | |
| } | | |

METHOD FOR TRANSMITTING A BROADCAST SERVICE, METHOD FOR RECEIVING A BROADCAST SERVICE, AND APPARATUS FOR RECEIVING A BROADCAST SERVICE

This application is a 35 USC §371 National Stage entry of International Application No. PCT/KR2012/004779 filed on Jun. 18, 2012, and claims priority of U.S. Provisional Application Nos. 61/497,537 filed on Jun. 16, 2011 and 61/540,546 filed on Sep. 29, 2011, which are hereby incorporated by reference in its entirety.

TECHNICAL FIELD

The present disclosure relates to a method of transmitting broadcast service, a method of receiving the broadcast service, and a receiver therefor.

BACKGROUND ART

A digital television (DTV) is now presented to offer various services in addition to a television (TV)'s original function such as playing video and audio. For example, broadcasting information such as Electronic Program Guide (EPG) may be provided to a user, and also, broadcasting services from at least two channels may be simultaneously provided to a user. Especially, since a receiving system of the DTV includes a large capacity of a storage device, and is connected to a data communication channel and the internet (through which two-way communication is available), more services become accessible through broadcast signals. Additionally, since services offered through broadcast signals become more diversified, needs for utilizing the diversified services accurately are increased.

DISCLOSURE OF THE INVENTION

Technical Problem

Embodiments provide a broadcast service receiving method and a broadcast service receiving device for improving a quality of broadcast service.

Embodiments also provide a broadcast service receiving method and a broadcast service receiving device for receiving data real-time-linkable to broadcast service.

Embodiments also provide a broadcast service transmitting method for efficiently providing broadcast service through an internet network or a broadcast network, its receiving device, and a broadcast service receiving device.

Embodiments also provide a broadcast service transmitting method for providing improved broadcast service without affecting a typical receiver, a receiving device thereof, and an adjunct service processing method of the receiving device.

Technical Solution

In one embodiment, provided is a broadcast service receiving method of a broadcast receiving device, the method includes: receiving a trigger; receiving a triggered object; when a target of the received trigger is the triggered object, performing a trigger action on the triggered object at a trigger time; receiving real-time data available for the triggered object by an operation of the triggered object according to the performing of the triggered action; and providing a service by using the real-time data.

In another embodiment, a broadcast service receiving device includes: a service manager receiving service signaling data through a service signaling channel and receiving a triggered object transmitted through a non-real-time service on the basis of the service signaling data; and a trigger receiving unit receiving a trigger, wherein, when a target of the received trigger is the triggered object, the service manager performs a trigger action on the triggered object at a trigger time and, by an operation of the triggered object according to the performing of the trigger action, receives real-time data available for the triggered object and provides a service by using the real-time data.

In further another embodiment, a broadcast service transmitting method includes: generating a triggered object; generating a trigger including at least one of identification information of the triggered object, a trigger time, and a trigger action; transmitting the trigger and the triggered object; generating real-time data available for the triggered object; and transmitting the generated real-time data.

Advantageous Effects

According to an embodiment of the present invention, improved broadcast service may be provided by using real-time data.

Additionally, according to an embodiment of the present invention, real-time data for broadcast service object may be received.

Furthermore, according to an embodiment of the present invention, the transmission of an efficient broadcast service is possible by improving service signaling data.

BRIEF DESCRIPTION OF THE DRAWINGS

FIG. 4 is view illustrating one example of the protocol stack for mobile NRT service.

FIG. 5 is a view illustrating a bit stream section of a TVCT table section (VCT) according to an embodiment.

FIGS. 6 and 7 are views illustrating how to define a value of a service_type field according to an embodiment.

FIG. 8 is view of data_service_table_section) for identifying an application of NRT service and bit stream syntax of data_service_table_bytes in a DST section.

FIGS. 12 and 13 are views illustrating a bit stream syntax of NST according to an embodiment.

FIG. 14 is a view illustrating a bit stream syntax of NRT_component_descriptor (MH_component_descriptor) according to an embodiment.

FIG. 15 is a view illustrating a bit stream syntax of NRT_component_descriptor including NRT_component_data according to an embodiment.

FIG. 16 is a view illustrating a bit stream syntax of NRT-IT section for signaling NRT application according to an embodiment.

FIG. 17 is a view illustrating a syntax structure of bit stream for NRT section (NRT_content_table_section) according to an embodiment.

FIG. 18 is a view illustrating a bit stream syntax structure of an SMT session providing signaling information on NRT service data according to an embodiment.

FIG. 19 is a view illustrating an FDT schema for mapping a file and content_id according to an embodiment.

FIG. 20 is a view illustrating an FDT schema for mapping a file and content_id according to another embodiment.

FIG. 25 is a view illustrating a bit stream syntax of a trigger according to an embodiment.

FIG. 27 is a view illustrating a synchronized data packet structure of PES payload for transmitting trigger as bit stream syntax according to an embodiment.

FIG. 28 is a view illustrating a content type descriptor structure in tap( ) on DST according to an embodiment FIG. 29 is a view illustrating a syntax of PMT and service identifier descriptor according to an embodiment.

FIG. 30 is a view illustrating a trigger stream descriptor according to an embodiment.

FIG. 31 is a view of AIT according to an embodiment.

FIG. 32 is a view of STT according to an embodiment.

FIG. 50 is a flowchart illustrating a preparation trigger receiving method according to another embodiment of the present invention.

FIG. 51 is a view illustrating a bitstream syntax of a trigger configured according to another embodiment of the present invention.

FIG. 52 is a view illustrating a syntax of a content item descriptor according to an embodiment of the present invention.

FIG. 53 is a view illustrating a syntax of an internet location descriptor according to an embodiment of the present invention.

FIG. 58 is a view illustrating a syntax of a link_descriptor according to an embodiment of the present invention.

FIGS. 59 and 60 are views illustrating contents of fields included in a link descriptor.

FIG. 67 is a view illustrating a syntax of an NRT service descriptor (NRT_service_descriptor), that is, a service level descriptor according to an embodiment of the present invention.

FIG. 68 is a view illustrating a meaning according to each value of a consumption_model field in an NRT service descriptor according to an embodiment of the present invention.

FIG. 71 is a view illustrating a TDO metadata descriptor according to an embodiment of the present invention.

FIG. 75 is a view illustrating a syntax of an internet location descriptor according to an embodiment of the present invention.

FIGS. 80 and 81 are views illustrating an NRT-IT to transmit information on an entry content item according to an embodiment of the present invention.

FIG. 82 is a view illustrating an operation method of a receiver when an entry content item is transmitted according to an embodiment of the present invention.

FIG. 84 is a view illustrating a syntax of an NRT service descriptor included in an SMT according to an embodiment of the present invention.

FIGS. 85 and 86 are views illustrating a syntax of another NRT-IT according to another embodiment of the present invention.

FIG. 87 is a view illustrating a syntax of an Other NRT location descriptor (Other_NRT_location_descriptor) according to another embodiment of the present invention.

FIG. 98 is a view of a receiver 300 according to an embodiment of the present invention.

FIG. 99 is a flowchart illustrating an operation of a receiver receiving real-time data for a TDO and a broadcast service receiving and service providing method according thereto.

FIG. 100 is a flowchart illustrating an operation of a receiver receiving real-time data for TDO and a broadcast service receiving and service providing method according thereto in accordance with another embodiment of the present invention.

FIG. 101 is a view illustrating a consumption model field including a data stream consumption model according to an embodiment of the present invention.

FIG. 102 is a flowchart illustrating a broadcasting service receiving method of a receiver that provides data for DO by receiving an NRT service allocated as a data stream consumption model.

FIG. 103 is a view illustrating a configuration of an NRT-IT that further includes information on a network through which all files configuring a content item are transmitted according to an embodiment of the present invention.

MODE FOR CARRYING OUT THE INVENTION

Preferred embodiments of the present invention will be described below in more detail with reference to the accompanying drawings. The configurations and operations of the present invention shown in and described with the accompanying drawings are explained as at least one example, and the technical idea of the present invention and its core configurations and operations are not limited thereby.

The terms used in the present invention are selected as currently used general terms if possible in the consideration of functions of the present invention but could vary according to intentions or conventions of those in the art or the advent of new technology. In certain cases, there are terms that are selected by an applicant arbitrarily, and in such a case, their meanings will be described in more detail in the specification. Accordingly, the terms used in the present invention should be defined on the basis of the meanings of the terms and contents over the present invention not the simple names of the terms.

Moreover, among the terms in the present invention, a real time (RT) service literally means a service in real time. That is, the service is time-restricted. In contrast, a non-real time (NRT) service is a service in NRT other than the RT service. That is, the NRT service is not restricted by time. Furthermore, data for NRT service is called NRT service data.

A broadcast receiver according to the present invention may receive NRT service through a medium such as a terrestrial wave, a cable, and the internet.

The NRT service may be stored in a storage medium of the broadcast receiver, and then may be displayed on a display device according to a predetermined time or at the user's request. The NRT service is received in a file format, and is stored in a storage medium according an embodiment.

The storage medium may be an HDD embedded in the broadcast receiver according to an embodiment. As another example, the storage medium may be a Universal Serial Bus (USB) memory or an external HDD, which is connected to the broadcast receiving system.

Signaling information is necessary to receive files constituting the NRT service, store them in a storage medium, and provide a service to a user. The present invention may designate the above signaling information as NRT service signaling information or NRT service signaling data.

The NRT service includes Fixed NRT service and Mobile NRT service according to a method of obtaining IP datagram including NRT service signaling data. Especially, the Fixed NRT service is provided to a fixed broadcast receiver, and the Mobile NRT service is provided to a mobile broadcast receiver.

Figure 1:
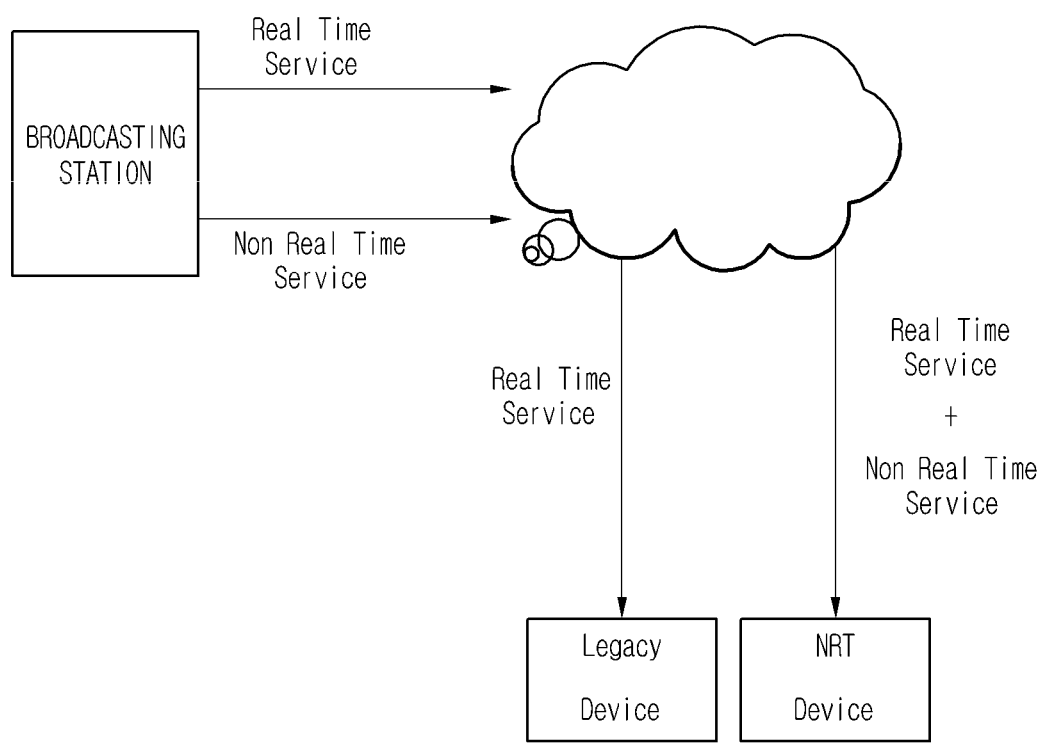
FIG. 1 is a conceptual diagram illustrating how RT service and NRT service are provided.

FIG. 1 is a conceptual diagram illustrating how RT service and NRT service are provided.

A broadcasting station transmits the RT service according to a traditional way, that is, like current terrestrial broadcasting (or mobile broadcasting). At this point, the broadcasting station transmits the RT service, and then, by using a remaining bandwidth during the transmission or an exclusive bandwidth, may provide the NRT service. That is, the RT service and NRT service are transmitted through the same or different channel. Accordingly, in order for a broadcast receiver to separate the RT service and the NRT service and store the separated NRT service in order to provide it to a user if necessary, service signaling information (or NRT service signaling data) is required. The NRT service signaling information (or NRT service signaling data) will be described in more detail later.

For example, a broadcasting station transmits broadcasting service data in real time and transmits news clip, weather information, advertisements, and Push VOD in non-real time. Additionally, the NRT service may be specific scenes, detail information of a specific program, and preview in real-time broadcasting stream in addition to news clip, weather information, advertisements, and Push VOD.

A typical broadcast receiver (i.e., a legacy device) may receive and process the RT service but may not receive and process the NRT service. That is, the typical broadcast receiver (i.e., a legacy device) is not influenced, in principle, by an NRT stream in a channel broadcasting RT service. That is, even when receiving NRT service, the typical broadcast receiver cannot process the received NRT service because it does not include a unit for processing it properly.

On the contrary, the broadcast receiver (i.e., an NRT device) of the present invention receives NRT service combined with RT service and properly processes the NRT service, so that it provides more various functions to a viewer than a typical broadcast receiver.

Figure 2:
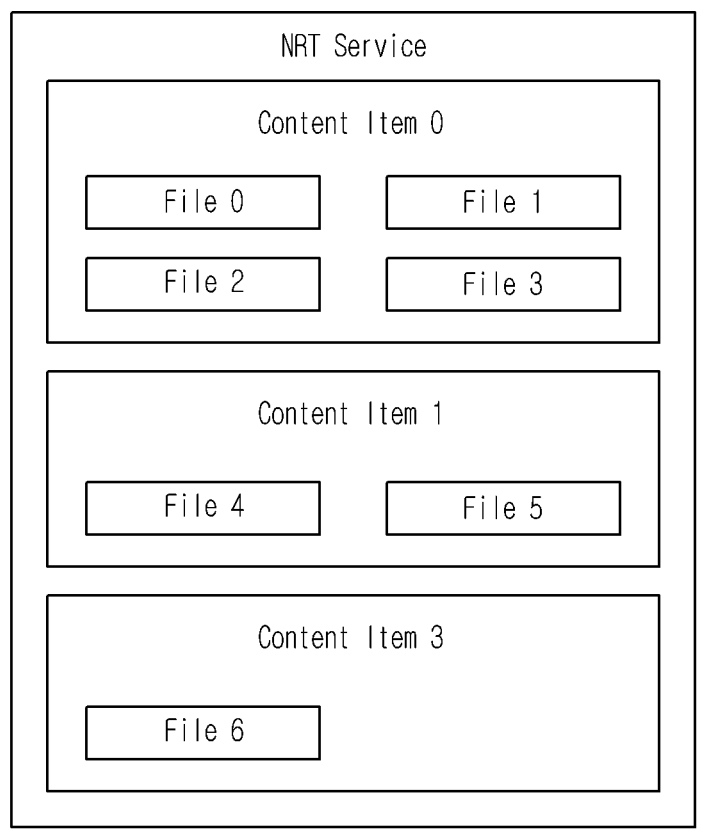
FIG. 2 is a view illustrating a structure of NRT service according to an embodiment.

FIG. 2 is a view illustrating a structure of NRT service according to an embodiment.

The NRT service includes at least one content item (or content or NRT content) as shown in FIG. 2, and the content item includes at least one file according to an embodiment. A file and object have the same meaning in the present invention.

The content item is a minimum unit playable independently. For example, news is provided in NRT. If the news includes business news, political news, and lift news, it may be NRT service, and each may be designated as a content item. Moreover, each of the business news, political news, and life news may include at least one file.

At this point, the NRT service may be transmitted in an MPEG-2 transport stream (TS) packet format through the same broadcasting channel as the RT service or an exclusive broadcasting channel. In this case, in order to identify the NRT service, a unique PID may be allocated to the TS packet of the NRT service data and then transmitted. According to an embodiment of the present invention, IP based NRT service data is packetized into an MPEG-2 TS packet and then transmitted.

At this point, NRT service signaling data necessary for receiving the NRT service data is transmitted through an NRT service signaling channel. The NRT service signaling channel is transmitted through a specific IP stream on an IP layer, and at this point, this specific IP stream may be packetized into an MPEG-2 TS packet and then transmitted. The NRT service signaling data transmitted through the NRT service signaling channel may include at least one of a Service Map Table (SMT), an NRT Service Table (NST), an NRT Content Table (NCT), an NRT Information Table (NRT-IT), and a Text Fragment Table (TFT). The NST or SMT provides access information on at least one NRT service operating on an IP layer, or the content items or files constituting the NRT service. The NRT-IT or NCT provides access information on the content items or files constituting the NRT service.

Additionally, NRT service signaling data including SMT (or NST) and NRT-IT (or NCT) may be included in a PSIP table on MPEG-2 TS or may be transmitted through an NRT service signaling channel on an IP layer in a virtual channel. Moreover, a plurality of NRT service data may be provided through one virtual channel.

The NRT-IT includes information describing a content downloadable to be stored in a receiving device. Information provided to the NRT-IT may include a content title (for example, the name of a downloadable program), available time for downloading content, content recommendation, availability of caption service, content identification, and other metadata.

Additionally, the TFT provides detailed description on a content item or service. The TFT may include a data structure supporting multi languages and, as a result, may represent detailed descriptions (e.g., each string corresponds to one language) in different languages. The text fragment table may be included in private sections having a table_id value (TBD) and may be identified by TFT_id. A TFT section may be included IP packets in a service signaling channel, and a multicast IP address (224.0.23.60) and a port (4937) may be allocated to the service signaling channel by IANA.

First, a receiver may identify whether a corresponding service is the NRT service with reference to a service_category field in the SMT, for example. Additionally, the receiver may uniquely identify the NRT service from the SMT through an NRT_service_id field.

Additionally, the NRT service may include a plurality of content items. The receiver may identify an NRT content item through a content_id_field in the NCT or NRT-IT. In addition, the NRT content item and NRT service may be connected to each other by matching the NRT_channel_id field of the NCT to the NRT_service_id field.

Moreover, the NRT service may be transmitted through a FLUTE session and the receiver may extract FDT information from the FLUTE session. Then, content_id in the extracted FDT information is mapped into content_id of NCT or OMA-BCAST SG in order to confirm and receive the NRT service content that a user selects. If the mapping method is described briefly, for example, the receiver identifies each file constituting the NRT content item through the TOI and Content-Location fields in the FDT in the FLUTE session. Each TOI or the Content-Location and content item maps the content_ID of the FDT into the content_id field of the NCT or the content_id field of the OMA BCAST SG, so as to confirm and receive the NRT service content.

Figure 3:
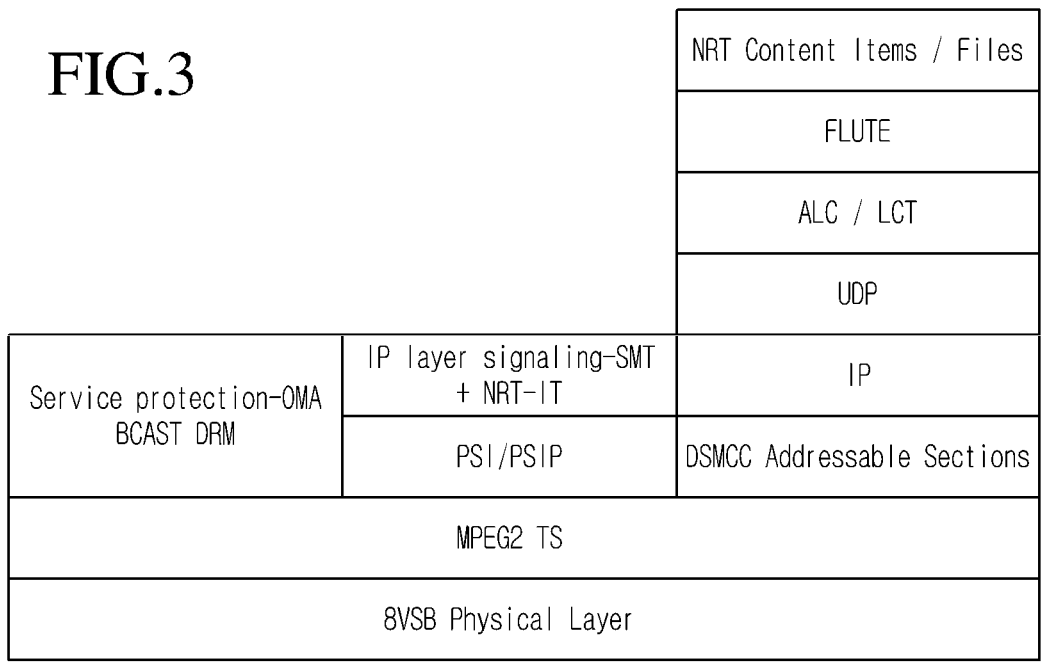
FIG. 3 is a view illustrating a protocol stack for NRT service according to an embodiment.

FIG. 3 is a view illustrating a protocol stack for NRT service according to an embodiment.

For Fixed NRT service, the NRT service of a file format is IP-packetized in an IP layer, and then, is transmitted in an MPEG-2 TS format through a specific channel.

Through an MPEG-2 based Program Specific Information (PSI) or Program and System Information Protocol (PSIP) table, for example, a VCT, it is determined whether there is NRT service in a virtual channel and identification information of NRT service is signaled.

According to an embodiment, the NRT service signaling channel, which transmits NRT service signaling data signaling the access information of the IP based NRT service, is IP packetized into a specific IP stream in the IP layer, and then, is transmitted in an MEPG-2 TS format.

That is, a broadcasting station packetizes the NRT content item or files according to a file transfer protocol method as shown in FIG. 3, and then, packetizes the packetized NRT content item or files in an Asynchronous Layered Coding (ALC) or Layered Coding Transport (LCT) method. Then, the packetized ALC or LCT data are packetized according to a UDP method. Then, the packetized UDP data is packetized according to the IP method again, and then, becomes IP data. Here, the IP data may include a File Description Table (FDT) having information on a File Delivery over Unidirectional Transport (FLUTE) session. The packetized IP data may be designated as IP datagram for convenience of description in the present invention.

Additionally, the IP datagram of NRT service is encapsulated in an addressable section structure and is packetized again in an MPET-2 TS format. That is, one addressable section structure has a section header and CRC checksum, which are added to one IP datagram. The format of the addressable section structure is matched to a Digital Storage Media Command and Control (DSM-CC) section format for private data transmission in terms of a structure. Accordingly, the addressable section may be designated as a DSM-CC addressable section.

Moreover, NRT service signaling data including at least one of SMT (or NST) and NRT-IT (or NCT) necessary for receiving NRT content/files may be transmitted through an NRT service signaling channel on an IP layer. Accordingly, the NRT service signaling data may be packetized according to an IP method in order to transmit it through the NRT service signaling channel on an IP layer. The NRT service signaling channel is encapsulated in the IP datagram having a well-known IP address and is multi-casted according to an embodiment.

Additionally, the NRT service signaling data may be included in Program Specific Information (PSI) or Program and System Information Protocol (PSIP) table section data and then transmitted. Moreover, the PSI table may include a Program Map Table (PMT) and a Program Association Table (PAT). The PSIP table may include a Virtual Channel Table (VCT), a Terrestrial Virtual Channel Table (TVCT), a Cable Virtual Channel Table (CVCT), a System Time Table (STT), a Rating Region Table (RRT), an Extended Text Table (ETT), a Direct Channel Change Table (DCCT), a Direct Channel Change Selection Code Table (DCCSCT), an Event Information Table (EIT), and a Master Guide Table (MGT).

Furthermore, as data for digital rights management and encryption of broadcasting service to protect the NRT service from illegal distribution and reproduction, BroadCast Services Enabler Suite Digital Rights Management (BCAST DRM) suggested by Open Mobile Alliance (OMA) may be used.

Moreover, the above mentioned Program Specific Information (PSI), Program and System Information Protocol (PSIP) table section data, DSM-CC addressable section data, and OMA BCAST DRM data are divided by a 184 byte unit, and then, a 4 byte MEPG header is added to each 184 bytes in order to obtain a 188 byte MPEG-2 TS packet. At this point, a value allocated to the PID of the MPEG header is a unique value identifying a TS packet for transmitting the NRT service and NRT service signaling channel.

MPEG-2 TS packets may be modulated in a predetermined transmission method in a physical layer, for example, an 8-VSB transmission method, and then, may be transmitted to a receiving system.

Moreover, FIG. 4 is a view illustrating a protocol stack for NRT service according to another embodiment.

FIG. 4 is view illustrating one example of the protocol stack for mobile NRT service. As shown in FIG. 4, an adaption layer is included between an IP layer and a physical layer. As a result, without using an MPEG-2 TS format, the IP datagram of mobile service data and IP datagram of signaling information may be transmitted.

That is, a broadcasting station packetizes the NRT content/files according to a file transfer protocol method as shown in FIG. 4, and then, packetizes them according to an Asynchronous Layered Coding (ALC)/Layered Coding Transport (LCT) method. Then, the packetized ALC/LCT data are packetized according to a UDP method. Then, the packetized ALC/LCT/UDP data is packetized again according to the IP method and becomes ALC/LCT/UDP/IP data. The packetized ALC/LCT/UDP/IP data may be designated as IP datagram for convenience of description in the present invention. At this point, OMA BCAST SG information undergoes the same process as the NRT content/file to constitute IP datagram.

Additionally, when NRT service signaling information (for example, SMT) necessary for receiving the NRT content/files is transmitted through a service signaling channel, the service signaling channel is packetized according to a User Datagram protocol (UDP) method, and the packetized UDP data is packetized again according to the IP method to become UDP/IP data. The UDP/IP data may be designated as IP datagram for convenience of description in the present invention. At the time, the service signaling channel is encapsulated in the IP datagram including Well-known IP destination address and well-known destination UDP port number, and is multicasted according to an embodiment.

In addition, in relation to OMA BCAST DRM for service protection, a UDP header and an IP header are sequentially added to constitute one IP datagram.

The IP datagram of the NRT service, NRT service signaling channel, and mobile service data are collected in an adaption layer to generate a RS frame. The RS frame may include IP datagram of OMA BCAST SG.

The length (i.e., the number of rows) of a column in the RS frame is set by 187 bytes, and the length (i.e., the number of columns) of a row is N bytes (N may vary according to signaling information such as a transmission parameter (or TPC data).

The RS frame is modulated in a predetermined transmission method in a mobile physical layer (for example, VSB transmission method) and then is transmitted to a receiving system.

Moreover, whether the NRT service is transmitted is signaled through a PSI/PSIP table. As one example, whether the NRT service is transmitted is signaled to the VCT or TVCT.

FIG. 5 is a view illustrating a bit stream section of a TVCT table section (VCT) according to an embodiment.

Referring to FIG. 5, the TVCT table section has a table form of an MPEG-2 private section as one example, but is not limited thereto.

When the VCT and PID of the audio/video are parsed and then transmitted through the TVCT, the packet identification (PID) information may be obtained.

Accordingly, the TVCT table section includes a header, a body, and a trailer. A header part ranges from a table_id field to a protocol_version field. A transport_stream_id field is a 16 bit field and represents an MPEG-2 TS ID in a program association table (PAT) defined by a PID value of 0 for multiplexing. In a body part, a num_channels_in_section field is an 8 bit field and represents the number of virtual channels in a VCT section. Lastly, a trailer part includes a CRC_32 field.

First, the header part will be described as follows.

A table_id field (8 bits) is set with 0xC8 and identifies that a corresponding table section is a table section constituting TVCT.

A section_syntax_indicator field (1 bit) is set with 1 and represents that the section follows a general section syntax.

A private_indicator field (1 bit) is set with 1.

A section_length field (12 bits) describes that the number of bits remaining in the section to the last of the section from immediately after the section_length field. The value of the section_length field may not be greater than 1021.

A table_id_extension field (16 bits) may be set with 0x000.

A version_number field (5 bits) may have 0 and means the version number of VCT.

A current_next_indicator field (1 bit) represents that a corresponding table section is applicable currently if set with 1.

A section_number field (8 bits) indicates the number of corresponding table section among TVCT sections. In a first section of TVCT, section_number should be set with 0x00.

A last_section_number field (8 bits) means the table section of the last and highest number among TVCT sections.

A protocol_version field (8 bits) is a function that allows a table type delivering parameters having a different structure than one defined in a current protocol. Today, only one valid value of protocol_version is 0. The protocol_version having other than 0 may be used for the future version of the standard in order to recognize another table having a different structure.

Next, the body part will be described.

A num_channels_in_section field (8 bits) designates the numbers of virtual channels in the VCT section. The numbers are restricted by a table section length.

A short_name field (16 bits) represents the name of the virtual channel using 16 bit code value from 1 to 7 sequentially.

A major_channel_number field (10 bits) represents a major channel number related to a virtual channel defined by repetition in a "for" loop. Each virtual channel should relate to a major channel number and a minor channel number. The major channel number together with the minor channel number serve as a reference number of a virtual channel of a user.

A minor_channel_number field (10 bits) represent minor or sub channel numbers ranging from '0' to '999'. This field together with major_channel_number serves as the second of the number or a channel number of second part representing the right portion. The minor_channel_number is set with 0 if service_type is an analog television. When the service_type is an ATSC_digital_television or an ATSC_audio_only, it uses a minor_number_ranging from 1 to 99. A value of the minor_channel_number does not overlap that of the major_channel_number in a TVCT.

A modulation mode field (8 bits) represents a modulation mode for carrier related to a virtual channel.

A carrier_frequnecy field (32 bits) has a recommendation value of 0. Although the field is used to identify a carrier frequency, it is not recommended.

A channel_TSID field (16 bits) is an unsigned integer field representing an MPEG-2 TS ID related to a TS containing an MPEG-2 program, which is reference by a virtual channel in a range from '0x0000' to '0xFFFF'.

A program_number field (16 bits) identifies an unsigned integer number related to a virtual channel defined in an MPEG-2 program association table (PAT) and a TS program map table (PMT). A virtual channel corresponding to analog service includes program_number of '0xFFFF'.

An ETM_location field (2 bits) describes the existence and location of an extended text message (ETM).

An access_controlled field (1 bit) indicates an access to events related to a virtual channel is controlled once it is set. If the flag is set with 0, an event access is not restricted.

A hidden field (1 bit) indicates that a user by a direct entry of a virtual channel number cannot access a virtual channel once it is set. A hidden virtual channel is omitted when a user surfs a channel, and is shown when the user accesses undefined or direct channel entry. A typical application of a hidden channel is a test signal and NVOD service. The hidden channel and its events may be shown on an EPG display according to a state of a hide_guide bit.

A hidden_guide field allows a virtual channel and its events to be displayed on an EPG display once it is set with 0 for a hidden channel. The bit is not related to a channel having no hidden bit set and thus non-hidden channels and their events are always displayed on an EPG display regardless of a state of a hide_guide bit. A typical application of a hidden channel, in which a hidden_guide bit set is set with 1, is a test signal and service easily obtainable through an application level pointer.

A service_type field (6 bits) represents a type of service transmitted from a virtual channel. FIGS. 6 and 7 are views illustrating how to define a value of a service_type field according to an embodiment. According to an embodiment, a service_type value (i.e., '0x04') shown in FIG. 6 means that service_type is ATSC_data_only_service and NRT service is transmitted through a virtual channel. According to another embodiment, a service_type value (i.e., '0x08') shown in FIG. 7 means that service_type is ATSC_nrt_service and a virtual channel provides NRT service satisfying the ATSC standard.

A source_id field (16 bits) represents the source of a program related to a virtual channel.

A descriptors_length field represents the total length (byte unit) of a descriptor for the following virtual channel.

A descriptor( ) field includes at least zero descriptor.

An additional_descriptors_length field represents a total length (byte unit) of the following VCT descriptor.

Lastly, in relation to the trailer part, a CRC_32 field is a 32 bit field and includes a cyclic redundancy check (CRC) value, which ensures zero output from registers of a decoder defined in an MPEG-2 system after processing an entire STT section.

FIG. 8 is view of data_service_table_section) for identifying an application of NRT service and bit stream syntax of data_service_table_bytes in a DST section. A broadcasting station NRT service data or NRT service signaling data, satisfying ASIC standard, may be transmitted through the DST table section of FIG. 8.

Hereinafter, semantic of fields including a data_service_table_section structure is as follows.

A table_id field (8 bits) as a field for type identification of a corresponding table section is a table section in which a corresponding table section constitutes DST through this field. For example, a receiver identifies that a corresponding table section is a table section constituting DST if a value of the field is 0XCF.

A section_syntax_indicator field (1 bit) is an indicator defining a section format of DST, and the section format may be short-form syntax (0) of MPEG, for example.

A private_indicator_field (1 bit) represents whether the format of a corresponding section follows a private section format and may be set with 1.

A private_section_length field (12 bits) represents a remaining table section length after a corresponding field. Additionally, a value of this field does not exceed '0xFFD'.

A table_id_extension field (16 bits) is dependent on a table, and may be a logical part of a table_id field providing a range of the remaining fields.

A version_number field (5 bits) represents the version number of DST.

A current_next_indicator field (1 bit) indicates whether a transmitted DST table section is applicable currently. If the field value is 0, it means that there is no table yet and the next table is valid.

A section_number field (8 bits) represents a section number in sections in which a corresponding table section constitutes a DST table. section_number of the first section in DST is set with '0x00'. The section_number is increased by one as the section of DST is increased.

A last_section_number field (8 bits) represents the last section number constituting a DST table, i.e., the highest section_number.

data_service_table_bytes represents a data block constituting DST, and its detailed structure will be described below.

A CRC_32 field is a 32 bit field and includes a cyclic redundancy check (CRC) value, which ensures zero output from registers of a decoder defined in an MPEG-2 system after processing an entire DST section.

Hereinafter, semantic of fields including a data_service_table_bytes structure is as follows.

An sdf_protocol_version field (8 bits) describes the version of a Service Description Framework protocol.

An application_count_in_section field (8 bits) represents the number of applications listed in a DST section.

A compatibility_descriptor( ) field represents that a corresponding structure includes a DSM-CC compatible descriptor. Its purpose is to signal compatible requirements of an application in a receiving platform in order to use a corresponding data service after determining its ability.

An app_id_byte_length field (16 bits) describes the number of bytes used for identifying an application.

An app_id_description field (16 bits) describes the format and semantic of the following application identification bytes. For example, a value of an app_id_description may be defined as Table 1.

TABLE 1

| Value | Application Identifier Format |
|---|---|
| 0x0000 | DASE application |
| 0x0001-0x7FFF | ATSC reserved |
| 0x8000-0xFFFF | User private |

An app_id_byte field (8 bits) represents a byte of an application identifier.

A tap_count field (8 bits) describes the number of Tap( ) structures used for corresponding application.

A protocol_encapsulation field (8 bits) describes a protocol encapsulation type used for transmitting a specific data element referenced by a Tap( ) field. A value of the protocol_encapsulation field is defined as Table 2.

TABLE 2

| Value | Encapsulated Protocol |
|---|---|
| 0x00 | Not in a MPEG-2 Transport Stream |
| 0x01 | Asynchronous non-flow controlled scenario of the DSM-CC Download protocol encapsulated in DSM-CC sections |

TABLE 2-continued

| Value | Encapsulated Protocol |
|---|---|
| 0x02 | Non-streaming Synchronized Download protocol encapsulated in DSM-CC sections |
| 0x03 | Asynchronous multiprotocol datagrams in Addressable Sections using LLC/SNAP header |
| 0x04 | Asynchronous IP datagrams in Addressable Sections |
| 0x05 | Synchronized streaming data encapsulated in PES |
| 0x06 | Synchronous streaming data encapsulated in PES |
| 0x07 | Synchronized streaming multiprotocol datagrams in PES using LLC/SNAP header |
| 0x08 | Synchronous streaming multiprotocol datagrams in PES using LLC/SNAP header |
| 0x09 | Synchronized streaming IP datagrams in PES |
| 0x0A | Synchronous streaming IP datagrams in PES |
| 0x0B | Proprietary Data Piping |
| 0x0C | SCTE DVS 051 asynchronous protocol [19] |
| 0x0D | Asynchronous carousel scenario of the DSM-CC Download protocol encapsulated in DSM-CC sections |
| 0x0E | Reserved for harmonization with another standard body |
| 0x0F-0x7F | ATSC reserved |
| 0x80-0xFF | User defined |

An action_type field (7 bits) represents attribute of data referenced by a Tap( ).

A resource_location field (1 bit) describes a position of an association tag field matching to an association_tag value listed in the next Tap structure. When a corresponding field is set with 0, association_tag exists in PMT of a current MPEG-2 program. Like this, when the corresponding field is set with 1, a matching association_tag exits in DSM-CC Resource Descriptor in a Network Resources Table of a corresponding data service.

A Tap( ) field may include information on searching a data element of an application state in a communication channel of a lower layer. An association_tag field in a Tap( ) field may include correspondence information between data elements of an application state. A value of an association_tag field in one Tap structure corresponds to a value of an association_tag field of one association tag descriptor in a current PMT. For example, a Tap( ) field may have a specific structure including fields of Table 3.

TABLE 3

| Syntax | No. of bits | Format |
|---|---|---|
| Tap ( ) { | | |
| tap_id | 16 | uimsbf |
| use | 16 | uimsbf |
| association_tag | 16 | uimsbf |
| selector( ) | | |
| } | | |

A tap_id field (16 bits) is used by an application to identify data elements. A value of tap_id has a range defined by values of app_id_byte fields related to Tap( ) in DST. A tap_id value is selected by a data service provider. Additionally, the tap_id value may be used for application to deal with a data element.

A Use field (16 bits) is used to specify a communication channel referenced by association_tag.

An association_tag field (16 bits) uniquely identifies one of a DSM-CC resource descriptor listed in a Network Resource Table or data elementary stream listed in PMT. A value of a corresponding field may be identical to an association_tag value of association_tag_descriptor.

A Selector( ) field describes a specific data element available in a communication channel or data elementary stream referenced by the association tag field. Additionally, the selector structure may indicate a protocol required for a corresponding data element.

A tap_info_length field (16 bits) describes the number of bytes of descriptors in the next of a corresponding field.

A descriptor( ) field may include descriptor information according to a corresponding descriptor format.

An app_info_length field (8 bits) describes the number of bytes of the next descriptors of a corresponding field.

A descriptor( ) field may include descriptor information according to a corresponding descriptor format.

An app_data_length field (16 bits) describes the length of a byte unit of app_data_byte fields.

An app_data_byte (8 bits) field represents input parameters related to application and other private data fields in 1 byte.

A service_info_length field (8 bits) describes the number of byte units of the next descriptor.

A descriptor( ) field may include descriptor information according to a corresponding descriptor format.

A service_private_data_length field (16 bits) describes the length of a byte unit in private fields.

A service_private_data_byte field (8 bits) represents a private field in 1 byte.

Figure 9:
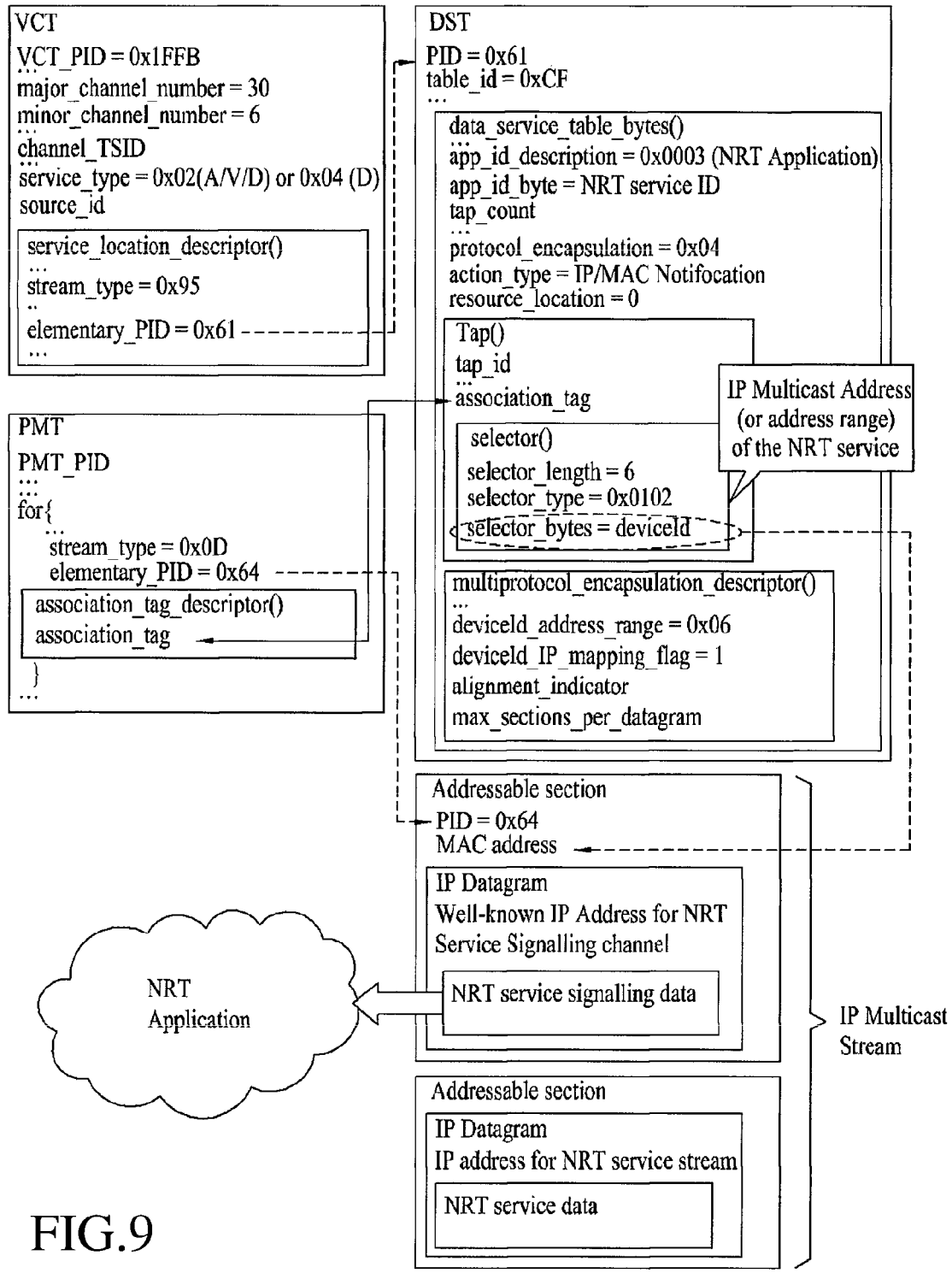
FIG. 9 is a view illustrating a method of receiving and providing NRT service in a receiving system by using ATSC A/90 standard for transmitting data broadcasting stream and ATSC A/92 standard for transmitting IP multicast stream.

FIG. 9 is a view illustrating a method of receiving and providing NRT service in a receiving system by using ATSC A/90 standard for transmitting data broadcasting stream and ATSC A/92 standard for transmitting IP multicast stream.

That is, information on stream constituting each virtual channel is signaled to service location descriptor of VCT or ES_loop of PMT. For example, as shown in FIG. 7 or 8, if VCT service type is 0x02 (i.e., digital A/V/Data), 0x04(i.e., Data only), or 0x08(i.e., NRT Only service), NRT service stream may be transmitted to the virtual channel. At this point, if 0x95(i.e., DST transmission) is allocated to a stream_type field value in a service location descriptor (or ES loop of PMT), it means that broadcast is transmitted. If the stream_type field value has no value or is not 0x95, only typical A/V is transmitted. That is, if the stream_type field value in service location descriptor has 0x95, an Elementary_PID field value at this point is a PID value of a Data Service Table (DST). Accordingly, DST may be received through the Elementary_PID.

Through the DST, types of application and detailed information on data broadcasting stream transmitted through the channel may be obtained. The DST is used to identify NRT application (i.e., NRT service).

That is, the App_id_descrption field of DST defines the format and interpretation of the following application identification bytes. According to an embodiment, '0x0003' is allocated to the App_id_descrption field to identify NRT application. The above numerical value is just one example, and does not restrict the range of the rights of the present invention.

If the App_id_descrption field value is '0x0003', the next following Application_id_byte value becomes a Service ID value of the NRT application. A service ID for the NRT application may have a URI value uniquely identifying a corresponding service around the world.

After the NRT application is identified, PID of an MPEG-2 TS packet divided from the IP datagram of an NRT service signaling channel is searched through Tap information. Then, IP datagram transmitting a NRT service signaling channel may be obtained from MPEG-2 TS packets having PID obtained through the tap information, and NRT service signaling data may be obtained from the obtained IP datagram. At this point, the IP access information of the NRT service signaling channel may be well-known IP access information, i.e., well-known IP address and well-known UDP port number.

That is, if the Protocol_encapsulation field value in the DST is 0x04, asynchronous IP stream is transmitted, and if the Selector_type field value is 0x0102, a device_id value indicating destination address may be delivered through selector_bytes. multiprotocol_encaplsulation_descriptor is used to accurately interpret the selector_bytes value and the number of valid bytes in the device_id value is signaled. As a result, through the Tap information, an IP Multicast address (or address range) of the NRT service signaling channel, transmitted to the corresponding PID, is obtained.

Accordingly, a receiver accesses thezMulticast address (or address range) to receive IP stream, i.e., IP packet, and then, extracts NRT service signaling data from the received IP packet.

Then, the receiver receives NRT service data, i.e., NRT content item/files to store them in a storage medium or display them on a display device, on the basis of the extracted NRT service signaling data.

According to another embodiment, a Stream Type field value of DST may have new 0x96 instead of 0x95 to signal NRT service. This is because NRT service, i.e., new application, may malfunction when a typical receiver determines whether there is data broadcasting stream only on the basis of whether there is stream having a stream type of 0x95. In this case, with designating a stream newly, a typical receiver may disregard it to guarantee backwards compatibility.

Figure 10:
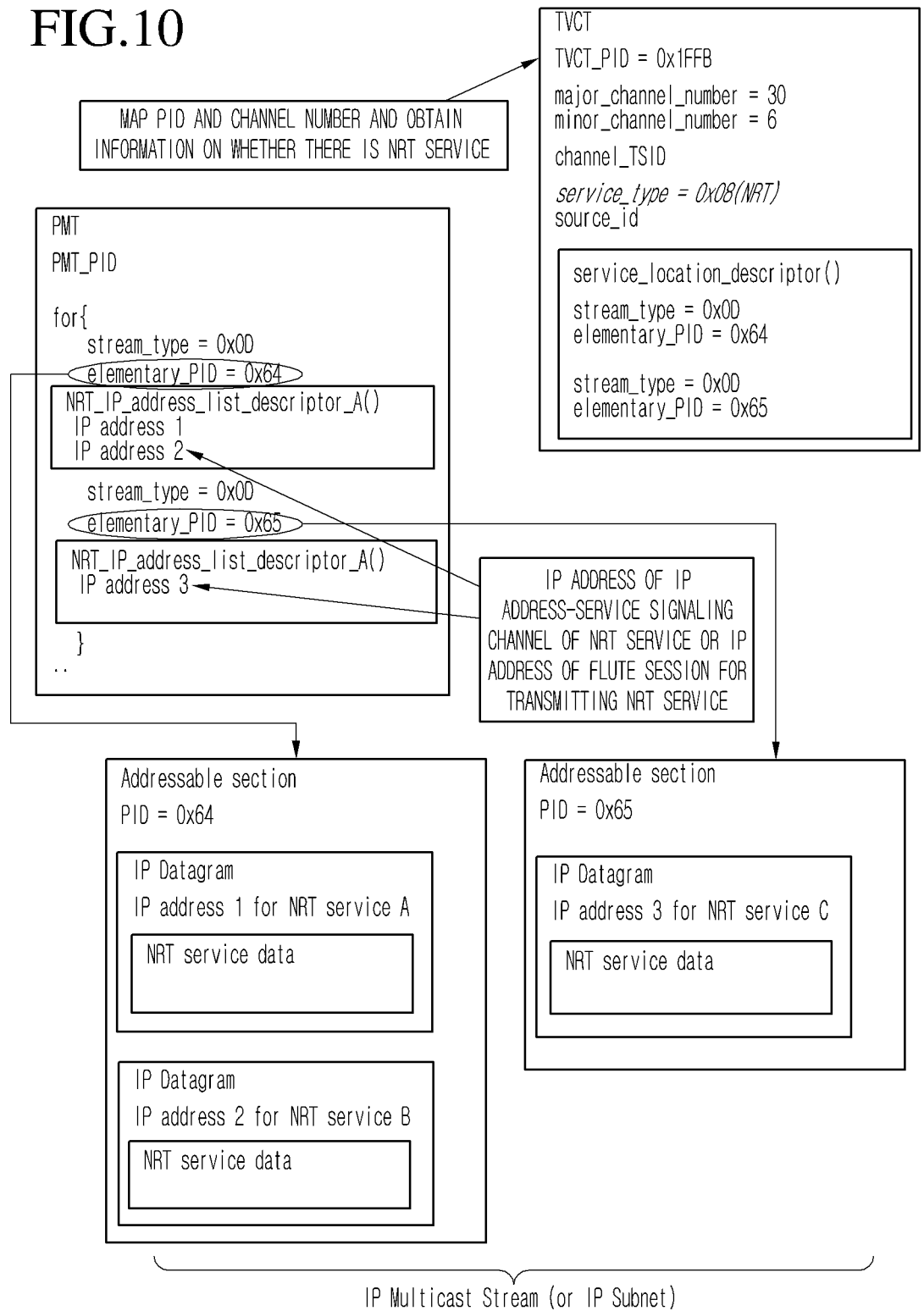
FIG. 10 is a view illustrating a method of signaling a DSM-CC addressable section data by using VCT according to another embodiment.
Figure 11:
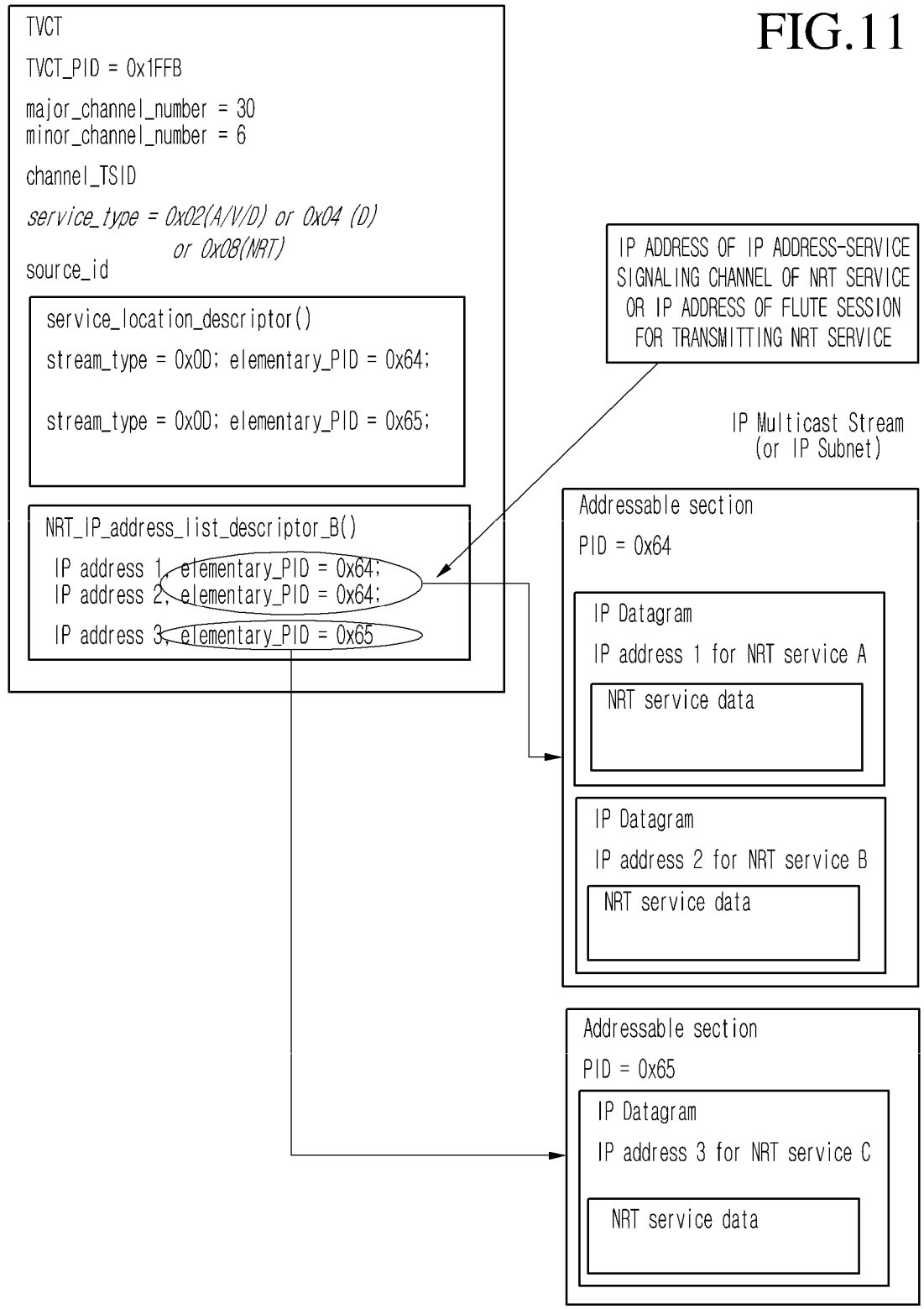
FIG. 11 is a view illustrating a method of signaling DSM-CC addressable section data by using VCT according to another embodiment of the present invention.

FIGS. 10 and 11 are views illustrating a method of receiving NRT service by using DSM-CC addressable section data according to another embodiment.

A data transmission method using DST is a standard for transmitting all kinds of IP datagram through digital broadcasting stream, and may be inefficient for the NRT service. Accordingly, FIGS. 10 and 11 illustrate a method of receiving the NRT service by signaling the PID of a specific stream including IP address information and section data of the IP datagram with respect to the NRT service through the data of the DSM-CC addressable section.

As shown in FIG. 10, the receiver may obtain information that NRT service stream is transmitted through the virtual channel when a service type of VCT (or TVCT) is 0x08 (i.e., NRT Only service). That is, the receiver may obtain information on whether there is NRT service according to service_type information by mapping the PID of a virtual channel into a channel number.

At this point, if 0x0D is allocated to a stream_type field value in service location descriptor of VCT (or ES loop of PMT), it means that DSM-CC stream is transmitted. An Elementary_PID_field value at this point may be the PID value of a DSM-CC addressable section. Accordingly, the receiver receives a DSM-CC addressable section including NRT service data through Elementary_PID.

That is, the receiver may obtain the PID of the DSM-CC addressable section through VCT or PMT. Here, the receiver may obtain an NRT_IP_address_list_descriptor_A( ) field including an IP address of an NRT service signaling channel or an IP address of the FLUTE session for transmitting NRT service data, which corresponds to the PID obtained from PMT of the corresponding stream.

Moreover, the receiver may receive DSM-CC addressable section data from IP multicast stream or IP subnet on the basis of the IP address obtained from an NRT_IP_address_list_descriptor_A( ) field. The receiver may obtain a corresponding IP datagram including a specific NRT service (for example, A, B, or C) data by searching a DSM-CC addressable section having PID corresponding to the obtained elementary_PID from the received DSM-CC addressable section data.

FIG. 11 is a view illustrating a method of signaling a DSM-CC addressable section data by using VCT according to another embodiment.

As mentioned above, the receiver may obtain information that NRT service stream may be transmitted when a service_type in VCT is 0x02, 0X04 of 0x08. Also, the receiver may obtain elementary_PID having a stream type of OXOD from the service_location_descriptor( ) field to receive the DSM-CC stream. Here, the receiver may obtain an NRT_IP_address_list_descriptor_B( ) field including an IP address of an NRT service signaling channel or an IP address of the FLUTE session for transmitting NRT service data, which corresponds to the obtained elementary_PID.

Moreover, the receiver may receive DSM-CC addressable section data from IP multicast stream or IP subnet on the basis of the IP address obtained from an NRT_IP_address_list_descriptor_B( ) field. The receiver may obtain the IP datagram including specific NRT service (for example, A, B, or C) that it wants to receive from the received DSM-CC addressable section data by parsing the DSM-CC addressable section having PID corresponding to the obtained elementary_PID.

The processes for extracting NRT service signaling data and NRT service data are described as follows. Here, 0x08 is allocated to the service_type field value in VCT, and indicates that at least one NRT service is transmitted to a corresponding virtual channel.

That is, when the receiver is turned on and a channel is selected by default or a user through a tuner, the PSI/PSIP section handler obtains VCT and PMT from a broadcast signal received through the selected channel. Also, the PSI/PSIP section handler parses the obtained VCT to confirm whether there is NRT service. This is confirmed by checking the service_type field value in a virtual loop of the VCT. For example, when the service_type field value is not 0x08, the corresponding virtual channel does not transmit NRT service. At this point, since the virtual channel transmits existing service (i.e., legacy ATSC service), the receiver operates properly according to information in the virtual channel.

Additionally, in relation to a demultiplexing unit, if a service_type field value is 0x08 according to a control of a service manager, a corresponding virtual channel transmits NRT service. In this case, PID of DST is extracted by parsing a service location descriptor in a virtual channel loop of the VCT. Moreover, DST is received by using the extracted PID.

Moreover, the receiver confirms whether a corresponding service provided through a channel selected from the received DST is NRT service.

The NRT service is confirmed by an App_id_descrption field value.

According to an embodiment, '0x0003' is allocated to the App_id_descrption field to identify NRT application. The above numerical value is just one example, and does not restrict the range of the rights of the present invention.

If the App_id_descrption field value in the DST is '0x0003', the next following Application_id_byte value becomes a Service ID value of the NRT application (i.e., NRT service). Therefore, the service manager or PSI/PSIP section handler extracts Tap( ) to PID of an MEGP-2 TS packet separated from the IP datagram of the NRT service signaling channel after identifying the NRT application (i.e., NRT service). Then, stream PID including association_tag of the extracted Tap is extracted from PMT.

Also, the addressable section handler may recover the DSM-CC addressable section by removing decapsulation, i.e., an MPEG-2 header, after receiving MPEG-2 TS packets corresponding to the extracted stream PID.

Then, the receiver recovers the IP datagram transmitting an NRT service signaling channel by removing a section header and CRC checksum from the DSM-CC addressable section and obtains NRT service signaling data from the recovered IP datagram. Here, access information on the IP datagram transmitting the NRT service signaling channel is a well-known destination IP address and a well-known destination UDP port number.

That is, if the Protocol_encapsulation field value in the DST is 0x04, asynchronous IP stream is transmitted, and if the Selector_type field value is 0x0102, a device_id value indicating a destination address may be delivered through selector_bytes. multiprotocol_encaplsulation_descriptor is used to accurately interpret the selector_bytes value and the number of valid bytes in the device_id value is signaled. As a result, through the Tap information, an IP Multicast address (or address range) of the NRT service signaling channel, transmitted to the corresponding PID, is obtained.

Accordingly, a receiver accesses the Multicast address (or address range) to receive IP stream, i.e., IP packet, and then, extracts NRT service signaling data from the received IP packet.

The receiver receives NRT service data, i.e., NRT content item/files to store them in a storage medium or display them on a display device, on the basis of the extracted NRT service signaling data.

Moreover, the NRT service may be provided Dynamic Content Delivery (DCD) service according to an embodiment. The DCD service is service for transmitting content to a receiver periodically or at the user request, and the content is selected from a server according to receiver information. The DCD service supports a point-to-point method and a broadcast method in a communication means for content delivery, and the above NRT service is transmitted through an OMA BCAST method and one of the broadcast methods of the DCD service.

NRT service data may be transmitted through the DCD service of the OMA BCAST method. In this case, the receiver may obtain the DCD channel information to receive NRT service and may receive the NRT service through a corresponding DCD channel on the basis of the DCD channel information.

Moreover, the DCD channel information may be included in the NST and transmitted. For example, the receiver receives NST, and obtains DCD channel information through DCD bootstrap.

Additionally, the NST may include DCD channel metadata, received through a DCD administrative channel, for signaling of the DCD channel information. Accordingly, the receiver may obtain information on a channel for receiving NRT service and metadata through NST.

Accordingly, when NST including DCD channel information is transmitted, the receiver accesses the DCD channel through NST without transmission of the NRT service signal data, and then receives the NRT service.

Like this, if NST includes metadata of a channel for receiving NRT service, there are several advantages.

First, without receiving the NRT service signaling data on the basis of the service type of a virtual channel, service access speed may be increased by receiving channel metadata that directly receives NRT service from NST.

Additionally, update signaling for a channel change item may be performed in real time in a broadcast environment.

Moreover, access information in OMA BCAST SG may be obtained by referring to NST. For example, the receiver receives DCD channel meta data on the basis of the DCD channel information in NST, and obtains access information to receive NRT service on the basis of the NRT service signaling data and DCD channel metadata obtained from NST.

Lastly, NST including a list of NRT service related to another virtual channel may be transmitted. Accordingly, list information of the NRT service may be transmitted through a specific NRT service signaling channel on an IP layer not on a PSI or PSIP layer. Accordingly, in this case, backwards compatibility to PSI or PSIP may be reserved.

In addition, as mentioned above, the DCD channel information including the DCD channel metadata may be included in the access information of SG in OMA BCAST, and the access information corresponds to the NRT service information in NST. In more detail, the receiver may obtain NRT service information in NST from an access fragment of OMA BCAST SG. Accordingly, the receiver may obtain information on receiving NRT service by receiving NST corresponding to the obtained NRT service information.

Moreover, the NRT service transmitted through the DCD channel may be divided by a service category allocated. For example, the service category of the NRT service transmitted through the DCD channel may be identified by 0X0F.

FIGS. 12 and 13 are views illustrating a bit stream syntax of NST according to an embodiment.

Here, the corresponding syntax is created in an MPEG-2 private section format to help understanding, but the format of the corresponding data may vary. For example, the corresponding data may be expressed in a Session Description Protocol (SDP) format and signaled through a Session Announcement Protocol (SAP) according to another method.

NST describes service information and IP access information in a virtual channel for transmitting NST, and provides NRT broadcast stream information of a corresponding service by using an identifier of the NRT broadcast stream, i.e., NRT_service_id, in each service. Furthermore, the NST describes description information of each fixed NRT service in one virtual channel, and a descriptor area may include other additional information.

A table_id field (8 bits) as a field for type identification of a corresponding table section is a table section in which a corresponding table section constitutes NST through this field.

A section_syntax_indicator field (1 bit) is an indicator defining a section format of NST, and the section format may be short-form syntax (0) of MPEG, for example.

A private_indicator field (1 bit) represents whether the format of a corresponding section follows a private section format and may be set with 1.

A section_length field (12 bits) represents a remaining table section length after a corresponding field. Additionally, a value of this field does not exceed '0xFFD'.

A table_id_extension field (16 bits) is dependent on a table, and may be a logical part of a table_id field providing a range of the remaining fields. Here, a table_id_extension field includes an NST_protocol_version field.

The NST_protocol_version field (8 bits) shows a protocol version for notifying that NST transmits parameters having a different structure than other defined in a current protocol. Currently, this field value is 0. If the field value is designated with other than 0 later, it is for a table having a different structure.

A version_number field (5 bits) represents the version number of NST.

A current_next_indicator field (1 bit) indicates whether a transmitted NST table section is applicable currently. If the field value is 0, it means that there is no table yet and the next table is valid.

A section_number field (8 bits) represents a section number in sections in which a corresponding table section constitutes a NST table.

section_number of the first section of an NRT Service Table (NST) is set with '0x00'. The section_number is increased by one each time a section of the NST is increased.

A last_section_number field (8 bits) represents the last section number constituting a NST table, i.e., the highest section_number. (Highest_section_number)

A carrier_frequency field (32 bits) notifies a transmission frequency corresponding to a channel.

A channel_TSID field (16 bits) means a unique channel identifier of broadcast stream in which a corresponding NST section is currently transmitted.

A program_number field (16 bits) represents the number of a program related to a virtual channel.

A source_id field (16 bits) represents the source of a program related to a virtual channel.

A num_NRT_services field (8 bits) represents the number of NRT services in an NST section.

Additionally, NST provides information on a plurality of fixed NRT services by using a 'for' loop. Hereinafter, the same field information may be provided to each fixed NRT service.

An NRT_service_status field (2 bits) identifies a state of a corresponding mobile service. Here, MSB indicates whether a corresponding mobile service is active (1) or inactive (0), and whether the corresponding mobile service is hidden (1) or not (0). Here, if the mobile service is NRT service, a state of the corresponding NRT service is identified. Hidden service is mainly used for exclusive application and a typical receiver disregards it.

A SP_indicator field (1 bit) is a field representing service protection if the service protection applied to at least one of components necessary for providing meaningful presentation of a corresponding mobile service is set.

A CP_indicator field (1 bit) represents whether content protection of a corresponding NRT service is set. If the CP_indicator field value is 1, it means that the content protection is applied to at least one of components required to provide a meaningful presentation of a corresponding NRT service.

An NRT_service_id field (16 bits) is an indicator that uniquely identifies a corresponding NRT service in a range of a corresponding NRT broadcast. The NRT_service_id is not changed during the corresponding service. Here, if the service is terminated, in order to evade confusion, NRT_service_id for the service may not be used for another service until an appropriate time elapses.

A Short_NRT_service_name field (8*8 bits) displays a short name of the NRT service. If there is no short name of the NRT service, the field may be filled with a null value (for example, 0x00).

An NRT_service_category field (6 bits) identifies a type of service in the corresponding NRT service.

A num_components field (5 bits) displays the number of IP stream components in the NRT service.

If an IP_version_flag field (1 bit) is set with 0, it indicates that a source_IP_address field, an NRT_service_destination_IP address field, and a component_destination_IP_address field are IPv4 addresses. If set with 1, a source_IP_address field, an NRT_service_destination_IP_address field, and a component_destination_IP_address field are IPv6 addresses.

A source_IP_address_flag field (1 bit) indicates when a flag is set that there is a source IP address value for corresponding NRT service to indicate source specific multicast.

An NRT_service_destination_IP_address_flag field (1 bit) indicates when a flag is set with 1 that there is an NRT_service_destination_IP_address field for providing a default IP address for components of a corresponding NRT service.

In relation to a source_IP_address field (128 bits), there is a corresponding field if source_IP_address_flag is set with 1, but there is no corresponding field if set with 0. If there is a corresponding field, the corresponding field includes a source IP address of all IP datagram transmitting components of the corresponding NRT service. A restricted use of a 128 bit long address of a corresponding field is for future use of IPv6, which is not currently used though. Source_IP_address becomes a source IP address of the same server transmitting all channels of a FLUTE session.

In relation to an NRT_service_destination_IP_address field (128 bits), if source_IP_address_flag is set with 1, there is a source_IP_address field, but if source_IP_address_flag is set with 0, there is no corresponding source_IP_address field. If there is no corresponding source_IP_address field, a component_destination_IP_address field exists for each component in a num_components loop. A restricted use of a 128 bit long address of a corresponding source_IP_address field is for future use of IPv6, which is not currently used though. NRT_service_destination_IP_Address is signaled if there is a destination IP address of a session level of the FLUTE session.

Additionally, NST provides information on a plurality of components by using a 'for' loop. An essential_component_indicator field (1 bit) indicates when a value of a corresponding value is set with 1 that a corresponding component is a necessary component for NRT service. If not, the corresponding component is a selected component.

A port_num_count field (6 bits) indicates numbers of UDP ports related to a corresponding UDP/IP stream component. Values of the destination UDP port numbers are increased by one, starting from a component_destination_UDP_port_num field value.

A component_destination_IP_address_flag field (1 bit) is a flag representing that there is a component_destination_IP_address field for corresponding component if set with 1.

In relation to component_destination_IP_address field (128 bits), if component_destination_IP_address_flag is set with 1, there is corresponding field, but if component_destination_IP_address_flag is set with 0, there is no corresponding field. If there is a corresponding field, the corresponding field includes a source IP address of all IP datagram transmitting components of the corresponding NRT service. A restricted use of a 128 bit long address of a corresponding field is for future use of IPv6, which is not currently used though.

A component_destination_UDP_port_num field (16 bits) represents a destination UDP port number for corresponding UDP/IP stream component.

A num_component_level_descriptors field (4 bits) provides the number of descriptors providing additional information on corresponding IP stream component.

A component_level_descriptors field identifies at least one descriptor providing additional information on a corresponding IP stream component.

A num_NRT_service_level_descriptors field (4 bits) represents the number of NRT service level descriptors for corresponding service.

NRT_service_level_descriptor( ) identifies no or at least one descriptor providing additional information on corresponding NRT service. Here, a specific service type for NRT service may be provided. The specific service type includes a portal service providing web content, push VOD, and A/V download.

A num_virtual_channel_level_descriptors field (4 bits) describes the number of virtual channel level descriptors for a corresponding virtual channel.

virtual_channel_level_descriptor( ) represents a descriptor providing additional information on a virtual channel that a corresponding NST describes.

Moreover, NRT service is transmitted through FLUTE, and access information on the NST table is connected to FLUTE session information as follows.

Source_IP_address is a source IP address of the same server transmitting all channels of the FLUTE session.

NRT_service_destination_IP_Address is signaled if there is a destination IP address of a session level of the FLUTE session.

A component may be mapped into a channel in the FLUTE session, and an additional destination IP address (which is different from an IP address signaled by session) is signaled through component_destination_IP_address at each channel.

Additionally, a destination port number is signaled through component_destination_UDP_port_num and the number of destination ports starting from component_destination_UDP_port_num may be additionally designated through port_num_count.

A plurality of channels may be configured for one destination IP address by designating a port in plurality. Here, one component designates a plurality of channels. However, it is desired to identify a channel through a destination IP address in general. Here, one channel is typically mapped into one component.

Content items/files for NRT service are transmitted through FLUTE, and corresponding FLUTE session information is signaled using access information on the NST table.

FIG. 14 is a view illustrating a bit stream syntax of NRT_component_descriptor (MH_component_descriptor) according to an embodiment.

NRT_component_descriptor( ) is shown in a component descriptor loop in each component of each NRT service in NST. Then, all parameters in a corresponding descriptor correspond to parameters used for components of NRT service.

Hereinafter, each field information transmitted through the NRT_component_descriptor of FIG. 14 will be described as follows.

A component_type field (7 bits) identifies an encoding format of a component. The identification value may be one of values allocated for payload_type of a RTP/AVP stream. Additionally, the identification value may be a dynamic value ranging from 96 to 127. Values of the field for components constituting media transmitted through RTP are identical to those in payload_type in an RTP header of IP stream transmitting a corresponding component.

An adding value of a component_type field in a range of 43 to 71 will be defined in the future version of the standard. When NRT service stream is transmitted based on FLUTE, in order to additionally signal parameters (described below) necessary for FLUTE session, 38 (which is component_type defined for a FLUTE component in ATSC) may be used, or 43 (i.e., an unallocated value) may be defined as component_type for new NRT transmission, and used.

A num_STKM_streams field (8 bits) identifies numbers of STKM streams related to a corresponding component.

A STKM_stream_id field (8 bits) identifies STKM stream having keys in order to decrypt the obtained corresponding protected component. Here, the STKM_stream_id field in the component descriptor for the STKM stream is referred.

An NRT_component_data (component_type) field provides at least one of encoding parameters necessary for expressing a corresponding component and other parameters. Here, a structure of an NRT_component_data element is determined by a value of a component_type field.

A File Delivery Table (FDT) of FLUTE sessions is used for delivering item lists of all content items, and provides sizes, data types, and other information of items related to obtain the items.

Accordingly, the present invention obtains information for accessing the FLUTE session transmitting a corresponding content by using NST, in order to receive a selected content from SG obtained by using NRT-IT. Moreover, the present invention maps information in a file transmitted through a corresponding FLUTE session into information on a content item of NRT-IT. In this case, identification of service including the selected content item is resolved through NRT_service_id of the NST.

NRT service is transmitted through FLUTE, and access information on the NST table is connected to FLUTE session information as follows.

Source_IP_address is a source IP address of the same server transmitting all channels of the FLUTE session.

NRT_service_destination_IP_Address is signaled if there is a destination IP address of a session level of the FLUTE session.

A component may be mapped into a channel in the FLUTE session, and an additional destination IP address (which is different from an IP address signaled by session) is signaled through component_destination_IP_address at each channel. Additionally, a destination port number is signaled through component_destination_UDP_port_num and the number of destination ports starting from component_destination_UDP_port_num may be additionally designated through port_num_count.

A plurality of channels may be provided to one destination IP address by designating a plurality of ports, and in such a case, one component designates a plurality of channels. However, it is recommended that a channel be distinguished through a destination IP address, and in such a case, one channel is mapped into one component.

component_attribute_byte may be used to signal an additional attribute of a component constituting a session. Additional parameters necessary for signaling a FLUTE session may be signaled through this.

In this regard, parameters for signaling the FLUTE session are required, and include definitely necessary required parameters and optional necessary parameters related to a corresponding FLUTE session. Firstly, the definitely necessary parameters include parameters such as a source IP address, the number of channels in the session, the destination IP address and port number for each channel in the session, the Transport Session Identifier (TSI) of the session, and the start time and end time of the session. The optional necessary parameters related to a corresponding FLUTE session include parameters such as FEC Object Transmission Information, some information that tells receiver in the first place, that the session contains files that are of interest and bandwidth specification.

The number of channels in the session may be explicitly provided, or may be obtained by adding up the number of streams constituting the session. Through the NST and component_descriptor, parameters such as start time and end time of the session, source IP address, destination IP address and port number for each channel in the session, Transport Session Identifier (TSI) of the session, and number of channels in the session may be signaled.

FIG. 15 is a view illustrating a bit stream syntax of NRT component descriptor including NRT_component_data according to an embodiment.

One NRT service may be included in multiple FLUTE sessions. Each session may be signaled using at least one NRT component descriptors depending on IP addresses and ports used for the session.

Hereinafter, each field of NRT_component_data will be described as follows.

A TSI field (16 bits) represents TSI of a FLUTE session.

A session_start_time field indicates a start time of the FLUTE session. If all values of the corresponding fields are 0, it means that a session started already.

A session_end_time field indicates an end time of the FLUTE session. If all values of the corresponding fields are 0, it means that a session continues infinitely.

A tias_bandwidth_indicator field (1 bit) indicates flags including Transport Independent Application Specific (TIAS) bandwidth information. If it indicates that the TIAS bandwidth field exists, a corresponding bit is set with 1, and if it indicates that the TIAS bandwidth field does not exist, the corresponding bit is set with 0.

In relation to an as_bandwidth_indicator field (1 bit), flags include Application Specific (AS) bandwidth information. If it indicates that the AS bandwidth field exists, a corresponding bit is set with 1, and if it indicates that the AS bandwidth field does not exist, the corresponding bit is set with 0.

An FEC_OTI_indicator field (1 bit) represents whether FEC object transmission information (OTI) is provided.

A tias_bandwidth field represents a TIAS maximum bandwidth.

An as_bandwidth field has an AS maximum bandwidth value.

An FEC_encoding_id field represents FEC encoding ID used in the corresponding FLUTE session.

An FEC_instance_id field represents FEC instance ID used in the corresponding FLUTE session.

Provided is a method of providing all Information necessary for receiving the FLUTE session by signaling the same parameters as above through FLUTE component data bytes, and of receiving files by obtaining information on all the files delivered through the FLUTE session that uses FDT received through the session.

This FLUTE component descriptor may be delivered through a Component_level_descriptor loop of NST. If the FLUTE channel is in plurality, since TSI and session_start_time, session_end_Time, i.e., parameters of a session level, should be signaled once, a FLUTE component descriptor may be transmitted only in one of components in several channels through a Component_level_descriptor loop.

FIG. 16 is a view illustrating a bit stream syntax of NRT-IT section for signaling NRT application according to an embodiment.

Information provided from NRT-IT includes a title of content (for example, a name of downloadable program), download available time and information, content advisories, caption service availability, content identification, and other metadata. One item of content may include at least one file. For example, an audio/video clip may be played in a JPEG thumbnail image used for displaying a screen.

An instance of NRT-IT may include data corresponding to an arbitrarily predetermined period, or may describe a NRT content starting at a predetermined time and ends at the indefinite future. Each NRT-IT represents a start time and a duration period that may be indefinite. Each NRT-IT instance may be divided into 256 sections. Each section includes information on a plurality of content items. Information of a specific content item cannot be divided and stored in at least two sections.

The downloadable content item, which is more extended than a period that at least one NRT-IT instance takes, is the first of NRT-IT. The content item description is stored in NRT_information_table_section ( ) in an availability order. Accordingly, when a value of last_section_number is greater than 0 (it means that NRT-IT is transmitted to a plurality of sections), all content item description in a specific section not the first section may have the same as or higher availability than the content item description of the next section.

Each NRT-IT identifies an NRT service related to a specific value of a valid service_id in a specific virtual channel during the period.

A table_id field (8 bits) is set with 0xTBD to identify a table section that a corresponding table section constitutes NRT-IT.

A service_id_field (16 bits) describes a service_id field related to NRT service showing a content item that the section describes.

An NRT_IT_version_number field (5 bits) is defined as a set in at least one NRT_content_table_section( ) having a common value with respect to service_id, current_next_indicator, protocol_version, and time_span_start fields. It identifies a version number of an NRT-IT instance. The version number is increased by 1 modulo 32 when a field of NRT-IT instance is changed.

A current_next_indicator field (1 bit) represents that a corresponding table section is applicable currently if set with 1.

A protocol_version field (8 bits) is set with 0. A function of protocol_version allows a table type having parameters in the future, which has a different structure than those defined in the current protocol. Currently, only one valid value of protocol_version is 0. A value other than 0 in protocol_version is used for the future version of standard to recognize other tables having different structures.

A time_span_start field (32 bits) represents a start time of an instance period represented in GPS sec from 00:00:00 UTC, Jan. 6, 1980. A time of day of time_span_start is set to 00 min of the time. A value 0 of time_span_start represents a period of an NRT-IT instance starting from a negative past. A value of time_span is identical at each section of multi-sectioned NRT-IT instance. Values of time_span_start and time_span_length are set not to overlap another NRT-IT instance of an IP subnet at a specified period.

A time_span_length field (11 bits) identifies a number of min starting at the time recognized at time_span_start that the instance covers. Once it is set, a value of time_span_length does not change in a value of time_span_start. If a value of time_span_length is 0, an NRT-IT instance covers an entire time starting from time_span_start at the indefinite future. When a value of time_span_start is 0, there is no meaning in time_span_length.

A value of time_span_start is identical at each section of multi-sectioned NRT-IT instance. Values of time_span_start and time_span_length are set not to overlap another NRT-IT instance of an IP subnet at a specified period.

A num_items_in_section field (8 bits) represents the number of content items described in an NRT-IT section.

A content_linkage field (16 bits) represents an identification number within a range from 0x0001 to 0xFFFF. 0x0000 is not used. content_linkage is a linkage function for two: this links at least one file of FLUTE FDT related to NRT service with metadata of NRT-IT and forms TF_id (identifier for Text Fragement in Text FragmentTable). A value of a content_linkage field corresponds to a value of an FDTCotent-Linkage element or a value of a File-Content-Linkage element in FLUTE FDT of each file related to a content item. A priority rule is applied when each content linkage value including a corresponding content linkage element in FLUTE FDT is matched.

A TF_availiable flag (Boolean flag) is set with 1 when Text Fragment exists in a Text Fragment Table of a service signaling channel. If Text Fragment is not included in a service signaling channel for the content item, a value of the TF availiable field is set with 0.

If a low_lantency flag (Boolean flag) is set with 1, as a user waits, content is valid in a current digital transmission of sufficiently low delay time that collection attempts. If set with 0, a collection delay time becomes longer and a user interface suggests a post view to a user.

A playback_length_in_seconds (20 bits) is an integer representing a playing time of a content in sec. A content including texts and/or still images has a value of 0. In relation to a content including audio or audio/video content, playback_length_in_seconds represents a playing time of audio or audio/video content.

If a content_length_included flag (Boolean flag) is set with 1, a content_length field exists in the repetition in a 'for' loop. If set with 0, it indicates that the content_length field does not exist in the repetition in a 'for' loop.

If a playback_delay_included flag (Boolean flag) is set with 1, it indicates that a playback_delay field exists in the repetition in a 'for' loop. If set with 0, it indicates that the playback_delay field does not exist in the repetition in a 'for' loop.

If an expiration_included flag (Boolean flag) is set with 1, an expiration field exits in the repetition in a 'for' loop. If set with 0, it indicates that the expiration field does not exist in the repetition in a 'for' loop.

A duration (12 bits) field represents an expected cycle time of carousel including a referenced content item in a range of 1 to 2880 in min. A receiver uses a duration parameter determining a time taking for the referenced content capture.

playback_delay (20 bits) is represented with a number of the next sec of the first byte before playing a related content while incoming stream is buffered. A value of 0 represents playing starts immediately. When playback_delay is not set, a receiver collects a complete file or a file before playing.

An expiration field (32 bits) represents expiration time expressed in GPS sec from 00:00:00 UTC, Jan. 6, 1980. After expiration, the content is deleted from the memory. If it is not expired, the receiver uses a method that a company for managing a memory resource selects.

A content_name_length_field (8 bits) represents the length (byte unit) of content_name_text.

A content_name_text( ) field represents a content item title in a system having a plurality of string structures.

A content_descriptors_length field (12 bits) represents an entire length (byte unit) of content_descriptor providing additional information on a content level.

content_descriptor is a descriptor that is additionally applied to each content item.

descriptor_length (10 bits) represents an entire length (byte unit) of a descriptor.

A descriptor is generally applied to all content items described in the current NRT-IT section.

FIG. 17 is a view illustrating a syntax structure of bit stream for NRT section (NRT_content_table_section) according to an embodiment. Detailed description of each field in the NCT section is as follows.

In FIG. 17, a table_id field (8 bits) as the identifier of a table includes an identifier identifying NCT.

A section_syntax_indicator field (1 bit) is an indicator defining a section format of NCT.

A private_indicator field (1 bit) represents whether NCT follows a private section.

A section_length field (12 bits) represents the section length of NST.

An NRT_channel_id field (16 bits) represents a value uniquely identifying NRT service including content described in NCT.

A version_number field (5 bits) represents the version number of NCT.

A current_next_indicator field (1 bit) represents whether information in a corresponding NCT section is applicable currently or in the future.

A section_number field (8 bits) represents the section number of a current NCT section.

A last_section_number field (8 bits) represents the last section number of NCT.

A protocol_version field (8 bits) indicates a protocol version for allowing NCT, which transmits parameters having different structures then those defined in a current protocol. (An 8-bit unsigned integer field whose function is to allow, in the future, this NRT Content Table to carry parameters that may be structured differently than those defined in the current protocol. At present, the value for the protocol_version shall be zero. Non-zero values of protocol_version may be used by a future version of this standard to indicate structurally different tables.)

A num_contents_in_section field (8 bits) indicates the number of contents in the NCT. At this point, the number of contents represents the number of contents transmitted through a virtual channel that source_id specifies.

Later, a 'for' loop (or a content loop) is performed as many as the number of contents corresponding to the num_contents_in_section field value, to provide the detailed information of a corresponding content by each content.

A content_version field (32 bits) indicates the version number for content (or a file) having a specific content_id value. That is, let's assume that if content_id of a content that a receiver receives previously is 0x0010, the same content, i.e., its content_id value is 0x0010 is transmitted. At this point, if the content_version field value is different, the previously stored content is updated or replaced by receiving the newly announced content through the NCT. In this embodiment, the content_version field value means a series number representing a release version but may actually represent published (released) time directly. At this point, if the content_version field is difficult to represent publish time, a new field may be used to represent the published (released) time.

A content_id field (16 bits) indicates an identifier uniquely identifying the content (or file).

A content_available_start_time field (32 bits) and a content_available_end_time field (32 bits) represent a start time and end time of a FLUTE session transmitting the content.

An ETM_location field (2 bits) describes the existence and location of an extended text message (ETM).

A content_length_in_seconds field (30 bits) represents an actual play time of a corresponding content in sec unit when the content (or file) is an A/V file.

A content_size field (48 bits) represents the size of the content (or file) in byte unit.

A content_delivery_bit_rate field (32 bits) represents a bit rate at which the content (or file) is transmitted, and means a target bit rate. That is, when a service provider or broadcasting station transmits a corresponding content, the content_delivery_bit_rate field displays how wide a bandwidth is to be allocated. Accordingly, if a receiver uses content_size and content_delivery_bit_rate, the minimum time for receiving a corresponding content (or file) is obtained. That is, the time for receiving content is estimated and provided to a user. Also, the minimum receiving time is obtained by calculating (conent_size*8)/(content_delivery_bit_rate) and its unit is in sec.

A content_title_length field (8 bits) represents the length of content_title_text( ) in byte unit. If this field is used, the receiver knows how many bytes need to be read to obtain content_title_text ( ) information.

A content_title_text( ) field represents a content title in the format of a multiple string structure.

That is, the receiver uses the NCT to obtain configuration information on NRT content/file, and provides a guide for the NRT/file on the basis of the obtained configuration information on NRT content/file. Moreover, the receiver obtains access information of FLUTE session, which transmits the content/file selected by the guide, from NST, and receives the selected content by using the obtained FLUTE session access information.

Moreover, the present invention may include container information, encoding information, and decoding parameters of media objects, necessary for rendering of the content/files constituting NRT service, in the NCT, and then transmit it. Accordingly, a receiving system extracts the container information, the encoding information, and the decoding parameters of media objects by each content, necessary for rendering of the corresponding content/files, and uses them in rendering.

FIG. 18 is a view illustrating a bit stream syntax structure of an SMT session providing signaling information on NRT service data according to an embodiment.

Here, the corresponding syntax is created in an MPEG-2 private section format to help understanding, but the format of the corresponding data may vary.

The SMT describes signaling information (or signaling information of NRT service) and IP access information of a mobile service in Ensemble in which SMT is transmitted. The SMT uses Transport_Stream_ID, i.e., an identifier of broadcast stream including each service, and provides broadcasting stream information of a corresponding service. Furthermore, SMT includes description information of each mobile service (or NRT service) in one Ensemble, and includes other additional information in a descriptor area.

As mentioned above, the SMT session may be included as the IP stream format in the RS frame, and then, transmitted. In this case, RS frame decoders of a receiver describe later decode inputted RS frames, and outputs the decoded RS frames as a corresponding RS frame handler. Moreover, each RS frame handler divides the inputted RS frame by a row unit to constitute M/H TP, and outputs it as an M/H TP handler.

In addition, examples of fields transmitted through SMT are as follows.

A table_id field (8 bits) is a field indicating a table type, and through this, it is confirmed that this table section is a table section in SMT. (table_id: An 8-bit unsigned integer number that indicates the type of table section being defined in Service Map Table (SMT)).

A section_syntax_indicator field (1 bit) is an indicator defining a session format of SMT, and its session format may be a short-form syntax ('0') of MPEG (section_syntax_indicator: This 1-bit field shall be set to '0' to always indicate that this table is derived from the "short" form of the MPEG-2 private section table).

A private_indicator field (1 bit) indicates whether SMT follows a private section (private_indicator: This 1-bit field shall be set to '1').

A section_length field (12 bits) represents the remaining session length of SMT after a corresponding field (section_length: A 12-bit field. It specifies the number of remaining bytes this table section immediately following this field. The value in this field shall not exceed 4093 (0xFFD)).

A table_id_extension field (16 bits) is dependent on a table, and may be a logical part of a table_id field providing a range of the remaining fields (table_id_extension: This is a 16-bit field and is table-dependent. It shall be considered to be logically part of the table_id field providing the scope for the remaining fields).

Here, a table_id_extension field includes an SMT_protocol_version field.

The SMT_protocol_version field (8 bits) shows a protocol version that allows SMT transmitting parameters having a different structure than those defined in a current protocol (SMT_protocol_version: An 8-bit unsigned integer field whose function is to allow, in the future, this SMT to carry parameters that may be structured differently than those defined in the current protocol. At present, the value for the SMT_protocol_version shall be zero. Non-zero values of SMT_protocol_version may be used by a future version of this standard to indicate structurally different tables).

An ensemble_id field (8 bits) includes values of '0x00' to '0x3F', as an ID value related to corresponding Ensemble (ensemble_id: This 8-bit unsigned integer field in the range 0x00 to 0x3F shall be the Ensemble ID associated with this Ensemble. The value of this field shall be derived from the parade_id carried from the baseband processor of physical layer subsystem, by using the parade_id of the associated Parade for the least significant 7 bits, and using '0' for the most significant bit when the Ensemble is carried over the Primary RS frame, and using '1' for the most significant bit when the Ensemble is carried over the Secondary RS frame).

A version_number field (5 bits) represents the version number of SMT. A current_next_indicator field (1 bit) indicates whether a transmitted SMT table session is applicable currently (current_next_indicator: A one-bit indicator, which when set to '1' shall indicate that the Service Map Table sent is currently applicable. When the bit is set to '0', it shall indicate that the table sent is not yet applicable and will be the next table to become valid. This standard imposes no requirement that "next" tables (those with current_next_indicator set to '0') must be sent. An update to the currently applicable table shall be signaled by incrementing the version_number field).

A section_number_field (8 bits) represents a current SMT session number (section_number: This 8-bit field shall give the section number of this NRT Service Signaling table section. The section_number of the first section in an NRT Service Signaling table shall be 0x00. The section_number shall be incremented by 1 with each additional section in the NRT Service Signaling table).

A last_section_number field (8 bits) represents the last session number constituting an SMT table.

(last_section_number: This 8-bit field shall give the number of the last section (i.e., the section with the highest section_number) of the Service Signaling table of which this section is a part).

A num_services field (8 bits) indicates the number of services in an SMT session. (num_services: This 8 bit field specifies the number of services in this SMT section). At least one mobile service, at least one NRT service, or mobile and NRT services may be received through Ensemble having the SMT. If only NRT services are transmitted through the Ensemble having SMT, it may indicate the number of NRT services in the SMT.

Later, a 'for' loop (or a service loop) is performed as many times as the number of services corresponding to the num_service field value, to provide signaling information on a plurality of services. That is, signaling information of a corresponding service is displayed by each service in the SMT session. Here, the service may be mobile or NRT service. At this point, the following field information may be provided to each service.

A service_id field (16 bits) represents a value uniquely identifying a corresponding service (A 16-bit unsigned integer number that shall uniquely identify this service within the scope of this SMT section). The service_id of a service shall not change throughout the life of the service.

To avoid confusion, it is recommended that if a service is terminated, then the service_id for the service should not be used for another service until after a suitable interval of time has elapsed. Here, if the service is NRT service, the service_id may identify the NRT service.

A Multi_ensemble_service field (2 bits) identifies whether a corresponding service is transmitted through at least one Ensemble.

Additionally, the corresponding field identifies whether service is rendered as a portion of the service transmitted through a corresponding Ensemble. That is, if the service is NRT service, the filed identifies whether NRT service is transmitted through at least one Ensemble (multi_ensemble_service: A two-bit enumerated field that shall identify whether the Service is carried across more than one Ensemble. Also, this field shall identify whether or not the Service can be rendered only with the portion of Service carried through this Ensemble).

A service_status field (2 bits) identifies a state of a corresponding service. Here, MSB indicates whether a corresponding service is active (1) or inactive (0), and LSB indicates whether a corresponding service is hidden (1) or not (0). Here, when the service is NRT service, MSB of the service_status field indicates whether a corresponding NRT service is active (1) or inactive (0), and LSB indicates whether a corresponding NRT service is hidden (1) or not (0).

A SP_indicator field (1 bit) represents whether service protection of a corresponding service is set. If a SP_indicator field value is 1, service protection is applied to components required for providing meaningful presentation of a corresponding service.

A short_service_name_length field (3 bits) represents the length of a short service name in a short_service_name field in byte unit.

A short_service_name field represents a short name of a corresponding service (short_service_name: The short name of the Service, each character of which shall be encoded per UTF-8[29]. When there is an odd number of bytes in the short name, the second byte of the last of the byte pair per the pair count indicated by the short_service_name_length field shall contain 0x00). For example, if the service is mobile service, a short name of the mobile service is displayed, and if it is NRT service, a short name of the NRT service is displayed.

A service_category field (6 bits) identifies a type category of a corresponding service. If a value of a corresponding field is set with a value indicating "informative only", it is dealt as an informative description for the category of the service. And, a receiver is required to test a component_level_descriptors( ) field of SMT in order to identify an actual category of the received service. The service_category field has an NTP time based component for services having video and/or audio component.

Especially, in regards to the present invention, if a service_category field value has '0x0E', a corresponding service indicates NRT service. In this case, it is indicated that signaling information of service currently described in an SMT session is signaling information of NRT service.

A num_services field (5 bits) indicates the number of IP stream components in this service.

IP_version_flag field (1 bit), when set to '0', shall indicate that source_IP_address, service_destination_IP_address, and component_destination_IP_address fields are IPv4 addresses. The value of '1' for this field is reserved for possible future indication that source_IP_address, service_destination_IP_address, and component_destination_IP_address fields are for IPv6. Use of IPv6 addressing is not currently defined.

A source_IP_address_flag field (1 bit) shall indicate, when set, that a source IP address value for this Service is present to indicate a source specific multicast.

When a service_destination_IP_address_flag field (1 bit) is set, it indicates that a corresponding IP stream component is transmitted through IP datagram having a different target IP address than service_destination_IP_address.

Accordingly, if the flat is set, a receiving system uses component_destination_IP_address as destination_IP_address, and disregards a service_destination_IP_address field in a num_channels loop (service_destination_IP_address_flag: A 1-bit Boolean flag that indicates, when set to '1', that a service_destination_IP_address value is present, to serve as the default IP address for the components of this Service).

In relation to the source_IP_address field (32 or 128 bits), if source_IP_address_flag is set with 1, interpretation is required, but if not set with 0, no interpretation is required.

When the source_IP_address_flag field is set with '1' and the IP_version_flag field is set with '0', this field indicates a 32 but IPv4 address representing a source of a corresponding circuit channel. If the IP_version_flag field is set with '1', this field indicates a 32 bit IPv6 address representing a source of a corresponding virtual channel (source_IP_address: This field shall be present if the source_IP_address_flag is set to '1' and shall not be present if the source_IP_address_flag is set to '0'. If present, this field shall contain the source IP address of all the IP datagram carrying the components of this Service. The conditional use of the 128 bit-long address version of this field is to facilitate possible use of IPv6 in the future, although use of IPv6 is not currently defined).

If the service is NRT service, the Source_IP_address field becomes a source IP address of the same server transmitting all channels of the FLUTE session.

In relation to the service_destination_IP_address field (32 or 128 bits), if service_destination_IP_address_flag is set with 1, interpretation is required, but if set with 0, no interpretation is required. When the service_destination_IP_address_flag field is set with '1' and the IP_version_flag field is set with '0', this field indicates a 32 bit destination IPv4 address for a corresponding virtual channel.

When the service_destination_IP_address_flag field is set with '1' and the IP_version_flag field is set with '1', this field indicates a 64 bit destination IPv6 address for a corresponding virtual channel. If the corresponding service_destination_IP_address cannot be interpreted, a component_destination_IP_address field in a num_components loop needs to be interpreted, and a receiving system uses component_destination_IP_address to access an IP stream component (service_destination_IP_address: This field shall be present if the service_destination_IP_address_flag is set to '1' and shall not be present if the service_destination_IP_address_flag is set to '0'. If this service_destination_IP_address is not present, then the component_destination_IP_address field shall be present for each component in the num_components loop. The conditional use of the 128 bit-long address version of this field is to facilitate possible use of IPv6 in the future, although use of IPv6 is not currently defined). If the service is NRT service, the service_destination_IP_Address field is signaled with a destination IP address of a session level of the FLUTE session.

Additionally, SMT provides information on a plurality of components by using a 'for' loop.

Later, a 'for' loop (or a component loop) is performed as many times as the number of components corresponding to the num_components field value, to provide access information on a plurality of components. That is, access information on each component in a corresponding service is provided. At this point, the following field information on each component may be provided. Here, one component corresponds to one FLUTE session according to an embodiment.

An essential_component_indicator field (1 bit), when set to '1', shall indicate that this component is an essential component for the service. Otherwise, this field indicates that this component is an optional component).

A component_destination_IP_address_flag field (1 bit) shall indicate, when set to '1', that the component_destination_IP_address is present for this component.

A port_num_count field (6 bits) shall indicate the number of destination UDP ports associated with this UDP/IP stream component. The values of the destination UDP port numbers shall start from the component_destination_UDP_port_num field and shall be incremented by one, except in the case of RTP streams, when the destination UDP port numbers shall start from the component_estination_UPD_port_num field and shall be incremented by two, to allow for the RTCP streams associated with the RTP streams.

A component_destination_UDP_port_num (16 bits) represents the destination UDP port number for this UDP/IP stream component. For RTP streams, the value of component_estination_UDP_port_num shall be even, and the next higher value shall represent the destination UDP port number of the associated RTCP stream).

A component_destination_IP_address field (32 or 128 bits) shall be present if the component_destination_IP_address_flag is set to '1' and shall not be present if the component_destination_IP_address_flag is set to '0'. When this field is present, the destination address of the IP datagram carrying this component of the M/H Service shall match the address in this field. When this field is not present, the destination address of the IP datagram carrying this component shall match the address in the M/H_service_destination_IP_address field. The conditional use of the 128 bit-long address version of this field is to facilitate possible use of IPv6 in the future, although use of IPv6 is not currently defined.

A num_component_level_descriptors field (4 bits) indicates the number of descriptors providing additional information on a component level.

component_level_descriptor( ) fields are included in the component loop as many as a number corresponding to the num_component_level_descriptors field value, so that additional information on the component is provided.

A num_service_level_descriptors field (4 bits) indicates the number of descriptors providing additional information on a corresponding service level.

service_level_descriptor( ) fields are included in the service loop as many as a number corresponding to the num_service_level_descriptors field value, so that additional information on the service is provided. If the service is mobile service, additional information on the mobile service is provided, and if it is NRT service, additional information on the NRT service is provided.

A num_ensemble_level_descriptors field (4 bits) indicates the number of descriptors providing additional information on an ensemble level.

ensemble_level_descriptor( ) fields are included in the ensemble loop as many as a number corresponding to the num_ensemble_level_descriptors field value, so that additional information on the ensemble is provided.

Moreover, component_descriptor( ) as component_level_descriptors( ) may be provided to SMT of FIG. 18.

The component_descriptor( ) is used as one of omponent_level_descriptors( ) of SMT, and describes additional signaling information of a corresponding component.

Accordingly, in relation to mobile NRT service, signaling information necessary for receiving a corresponding FLUTE session may be provided using the component descriptor of FIG. 14.

For example, if a component_type field value of the component descriptor of FIG. 14 is 38, a component_data (component_type) field provides data for FLUTE file delivery as shown in FIG. 15. Since each field description of FIGS. 14 and 15 is made above, overlapping descriptions will be omitted.

FIG. 19 is a view illustrating an FDT schema for mapping a file and content_id according to an embodiment. FIG. 20 is a view illustrating an FDT schema for mapping a file and content_id according to another embodiment. They represent an FDT instant level entry file designating method. NRT content includes a plurality of files. However, since each file has no mark, it is difficult to search a file related to NRT content. Accordingly, as shown in FIGS. 19 and 20, content_id is inserted into FDT in each file.

Hereinafter, an FDT instance level means, if a common attribute of all files declared in FDT needs to be defined, a level including a definition portion for the common attribute. An FDT file level may mean a level including definition for an individual attribute of each file.

A receiver identifies whether a service transmitted through a corresponding channel is an SMT based NRT service. Additionally, the receiver identifies a content item and file of the corresponding NRT service.

As mentioned above, although the receiver may identify a file and content item in the NRT service, it does not have information on files of the content item and thus cannot match them. Accordingly, the receiver may not process the NRT service.

Accordingly, the present invention provides a method of identifying whether a content item is related. That is, a corresponding method shows what kinds of files are included in a content item. In this case, the receiver may properly process the received NRT service. Accordingly, the corresponding method may be designated on the basis of FDT information in FLUTE session transmitting NRT service. For example, each file constituting a content item is identified on the basis of a content-location and TOI field designated in the FLUTE session. content_id in FDT is matched to a content identifier (content_id) of NCT or a content identifier of content fragment in OMB BCAST SG.

Referring to FIGS. 19 and 20, a portion indicated with 1 declares a content identifier in an FDT-Instance level, and this declared content identifier is assigned to all files declared in a corresponding FDT-Instance. Of course, this information may be overridden by assigning a new content identifier in a file level. Or, if a specific file belongs to another content item not a content item defined in the FDT-Instance level, this may be notified through assigning a file level content_id described below. This embodiment expresses content_id in 16 bits.

In relation to a portion indicated with 2, when a file in the FDT Instance is included different content items with content_id declaration in a file level, this method signals which file, all files of a content item and content, belongs to which entry.

A portion 3 is a method of notifying whether a corresponding file for each file is an entry file. That is, a file corresponding to a root file, which is played first among several files constituting a content item or is necessarily executed first to access a content item is called an entry file, and represents a method of notifying this information. An entry attribute may be omitted, and its default value is false. When it is omitted, it means that a corresponding file is not an entry file. "Entry" is a head of a file that needs to be processed to execute the file. For example, "index.html" may be an "entry". Accordingly, an entry file may be set with "true" and other files are set with "false". Through the entry file, transmitting the same file repeatedly may be effectively controlled. Once a file is downloaded, the entry file indicates a file of content for another reference, so that there is no need to download it in another or an additional instance.

A specific file functions as an entry in a specific group as a group related to a file level signals whether entry is possible, but its corresponding role may fail in another group. When a content identifier is assigned in an FDT-instance level, a method of notifying an entry file may be considered as the following two methods.

1) A method of additionally assigning a file level content identifier to a file corresponding to an entry file and setting its entry attribute with true: in this case, a content identifier is duplicated in an FDT-Instance level and a file level, but has the most flexible structure. That is, although one of the File-level and FDT-instance level may designate content_id, if another content_id is designated together in the File-level and FDT-instance, the content_id of the File level has priority to that of the FDT-instance level.

2) like another embodiment of the FDT schema of FIG. 20, files functioning as an entry file may be directly referenced in content identifier definition in the FDT-instance level. For this, according to the embodiment of FIG. 20, FDT-Content-ID-Type is additionally defined for an FDT-instance level content identifier, and as shown in the portion 2, extends to include a content location of an entry file. In the case of the portion 2, an entry level is defined with its content_id. For example, each content_id shows which entry file exists.

In this method, content-location is duplicated so signaling may be problematic, but entry file configuration information may be immediately obtained by each content item.

Figure 21:
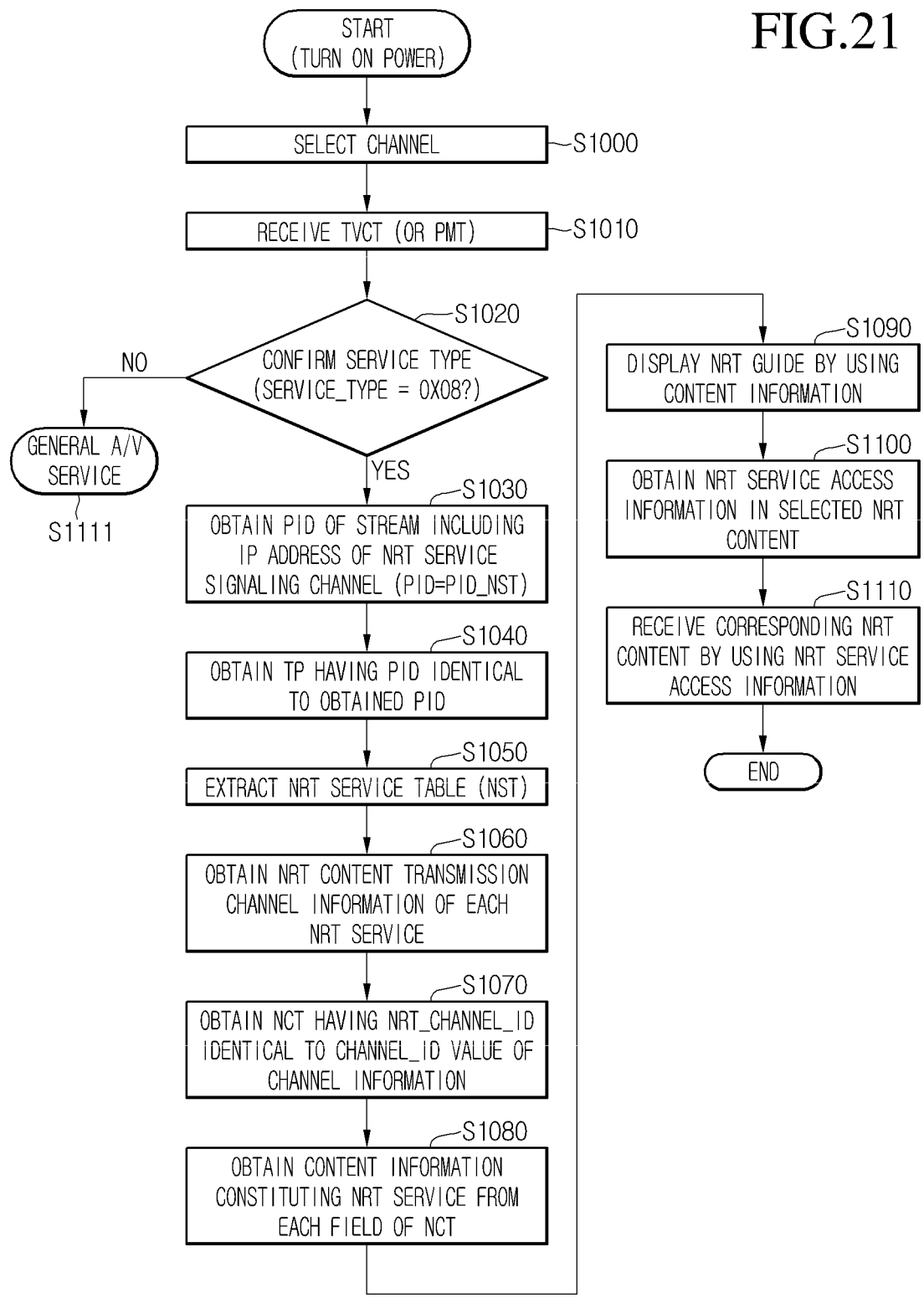
FIG. 21 is a flowchart illustrating an operation of a receiver according to an embodiment.

FIG. 21 is a flowchart illustrating an operation of a receiver according to an embodiment.

Referring to FIG. 21, according to an embodiment, a receiver receives NRT service signaling data through an NRT service signaling channel, displays NRT guide information on the basis of the received NRT service signaling data, and receives NRT service data for the selected NRT content, in order to provide NRT service.

First, once the receiver is turned on, a user selects a channel in operation S1000. Then, a physical transmission channel is turned according to the selected channel.

Then, VCT and PMT are obtained from a broadcast signal received through the tuned physical transmission channel in operation S1010. Then, it is confirmed in operation S1020 whether there is NRT service by parsing the obtained TVCT (VCT). This is confirmed by checking the service_type field value in a virtual loop of the VCT. For example, if a service_type field has 0x08, there is NRT service. Moreover, if not 0x08, since a corresponding virtual channel does not transmit the NRT service, a proper operation such as general A/V service may be performed according to information in the virtual channel in operation S1111.

Moreover, if it is determined that there is NRT service, since a corresponding virtual channel transmits NRT service, PID (PID=PID_NST) matching to a specific PID (PID_NST) of stream including a well known IP address for NRT service signaling channel address is obtained in operation S1030.

Moreover, the receiver receives a Transport Packet (TP) having the same PID as the obtained PID value (PID_NST) in operation S1040.

Then, the receiver extracts NRT service signaling data including a NRT service table (NST) from the received TP, or extracts an IP address for the NRT service signaling channel access from the received TP, in order to receive NRT service signaling data transmitted in another format through an IP layer in operation S1050.

Then, the receiver obtains channel information on NRT service data transmission by each NRT service from NST in operation S1060.

Then, the receiver obtains an NRT content table (NCT) including an NRT_channel_id field value identical to a value of Channel_id, an identifier of the obtained channel information, from the NRT service signaling data in operation S1070.

Then, the receiver obtains content information on NRT content constituting each NRT service from each field of the obtained NCT in operation S1080. For example, the content information may include at least one of content_delevery_bit_ rate, content_available_start_time, content_available_end_time and content_title_text( ) fields according to an embodiment of the NCT.

Then, the receiver displays NRT guide information by using content information in operation S1090. A user may select NRT content to use or be received, from the displayed NRT guide information.

Then, the receiver obtains NRT service access information having the selected NRT content from NST in operation S1100. The NRT service access information may include channel information or IP address information for receiving NRT service data, for example.

Moreover, the receiver receives a corresponding NRT content in operation S1110 by using the obtained NRT service access information after accessing a channel or server for transmitting NRT service, and performs a proper operation according to the NRT content.

Figure 22:
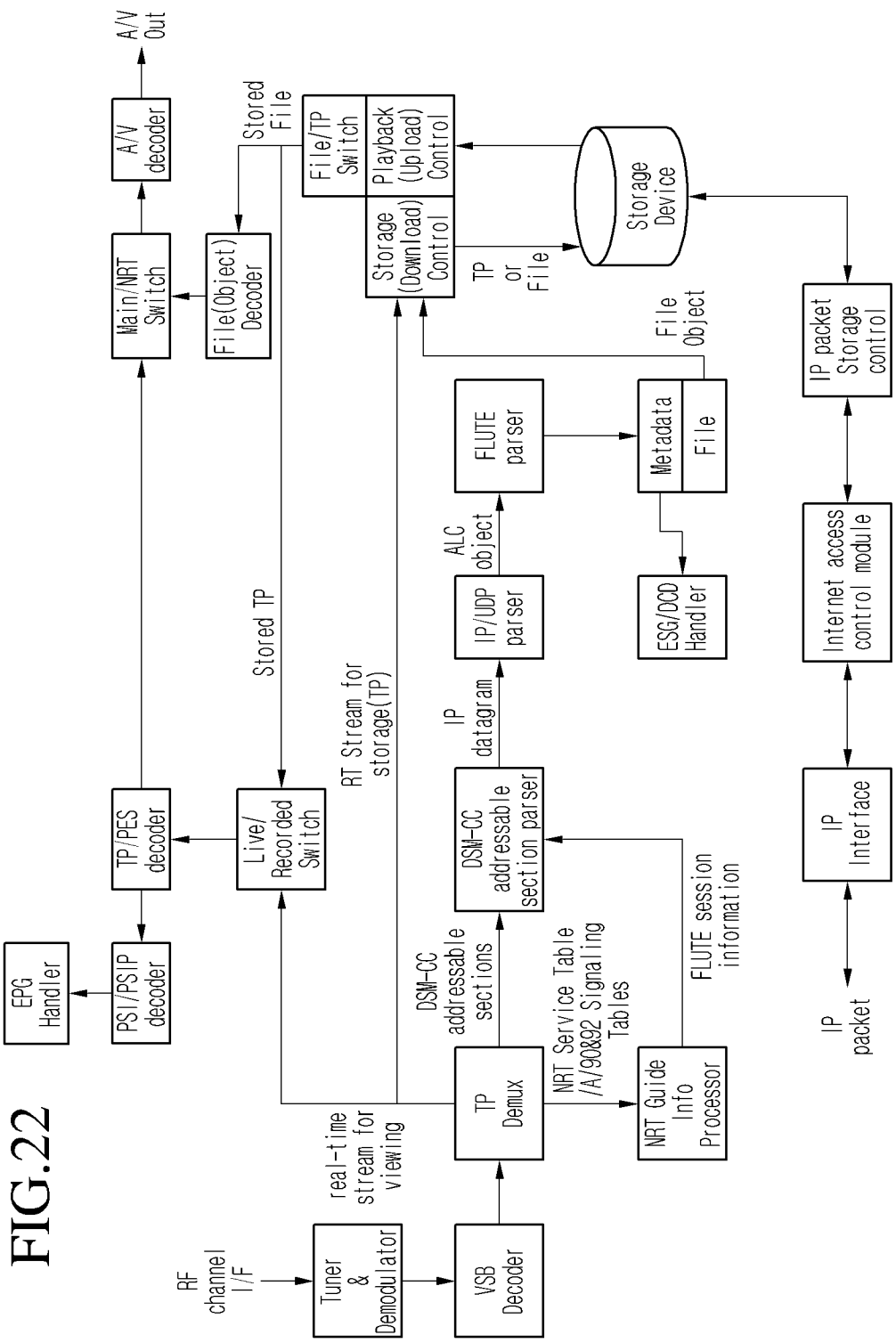
FIGS. 22 and 23 are views illustrating a receiving system receiving, storing, and playing an NRT content for NRT service according to another embodiment.
Figure 23:
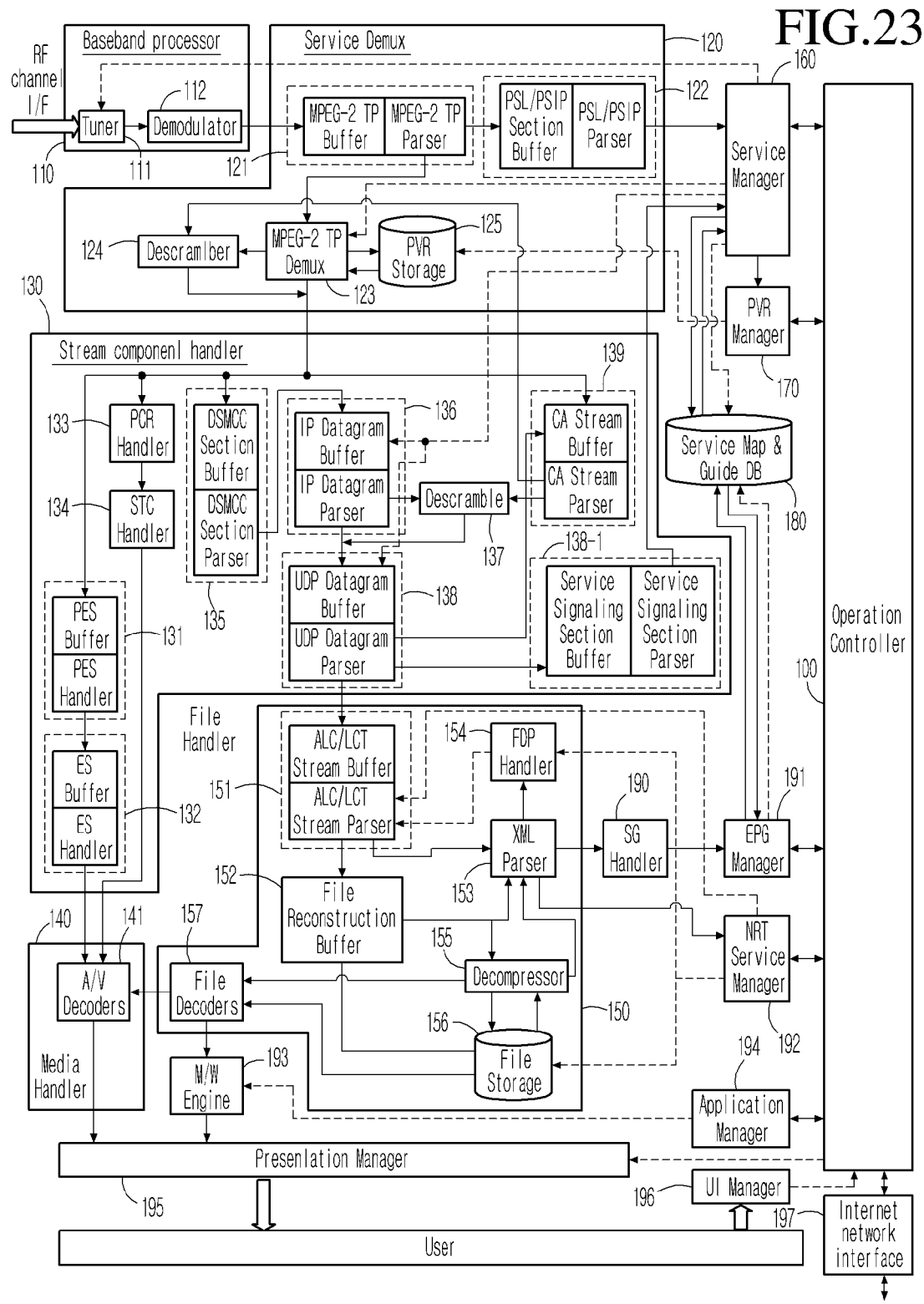

FIGS. 22 and 23 are views illustrating a receiving system receiving, storing, and playing an NRT content for NRT service according to another embodiment.

The receiver of FIG. 23 may include an operation controlling unit 100, a baseband processing unit 110, a service demultiplexer 120, a stream component handler 130, a media handler 140, a file handler 150, a service manager 160, a PVR manager 170, a first storage unit 180, an SG handler 190, an EPG manager 191, an NRT service manager 192, an application manager 194, a middleware engine 193, a presentation manager 195, and a User Interface (UI) manager 196.

The baseband processing unit 110 may include a tuner 111 and a demodulator. The service demultiplexer 120 may include an MPEG-2 TP handler 121, a PSI/PSIP handler 122, an MPEG-2 TP demultiplexer 123, a descrambler 124, and a second storage unit 125.

The stream component handler 130 may include a Packetized Elementary Stream (PES) demodulator 131, an Elementary Stream (ES) demodulator 132, a PCR handler 133, a STC handler 134, a DSM-CC addressable section handler 135, an IP datagram handler 136, a descrambler 137, a UDP handler 138, a service signaling section handler 138-1, and a Conditional Access System (CAS) 139.

The media handler 140 may include an A/V demodulator 141. The file handler 150 may include an ALC/LCT stream handler 151, a file reconstruction buffer 152, an XML parser 153, an FDT handler 154, a decompressor 155, a third storage unit 156, and a file decoder 157.

In FIG. 23, the tuner 111 tunes a broadcast signal of a desired channel among broadcast signals received through a terrestrial wave according to a control of the service manager 160, and then down-converts the tuned broadcast signal into an Intermediate Frequency (IF) signal to output it to the demodulator 112. The tuner 111 may receive real-time stream and non-real-time stream. The non-real-time stream is called an NRT stream in the present invention.

The demodulator 112 performs automatic gain control, carrier recovery, and timing recovery on a digital IF signal of a pass band inputted from the tuner 111, converts the digital IF signal into a baseband signal, and performs channel equalization. For example, when the broadcast signal is a VSB modulation signal, a VSB demodulation process is performed for automatic gain control, carrier recovery, and timing recovery.

The demodulated and channel-equalized data in the demodulator 112 is outputted to the MPEG-2 TP handler 121 in an MPEG-2 Transport Stream (TS) packet format.

The MPEG-2 TP handler 121 includes an MPEG-2 TP buffer and an MPEG-2 TP parser, and analyzes a TS header after temporarily storing an output of the demodulator 112. Then, if an output of the demodulator 112 is an A/V TS packet for real time or an NRT TS packet, it is outputted to the demultiplexer 123, and if it is a TS packet for PSI/PSIP table, it is outputted to the PSI/PSIP handler 122.

The PSI/PSIP handler 122 includes a PSI/PSIP section buffer and a PSI/PSIP parser, and after temporarily storing a TS packet outputted from the MPEG-2 TP handler 121, restores and parses a corresponding table from PSI/PSIP section data in a payload of the TS packet, with reference to a table identifier. At this point, it is determined whether one table includes one section or a plurality of sections through a table_id field, a section_number field, and a last_section_number field in a corresponding section. Also, sections having the same table identifier are collected to complete a corresponding table. For example, sections having a table identifier allocated to VCT are collected to complete VCT. Moreover, the parsed information of each table is collected by the service manager 160 to be stored in the first storage unit 180. Table information such as VCT, PAT, PMT, and DST are stored in the first storage unit through the above processes. The service manager 160 stores the table information in the first storage unit 180 in a service map and guide data format.

The demultiplexer 123, if the inputted TS packet is an A/V TS packet in real time, divides the TS packet into an audio TS packet and a video TS packet, and then outputs them into the PES decoder 131. If the inputted TS packet is an NRT TS packet, it is outputted to the DSM-CC handler 135.

Additionally, the demultiplexer 123, if the TS packet includes a Program Clock Reference (PCR), outputs it to the PCR handler 133, and if it includes Conditional Access (CA) information, outputs it to the CAS 139. An NRT TS packet includes a TS packet having NRT service data and a TS packet having NRT service signaling channel. A unique PID for identifying the NRT service is allocated to a TS packet of the NRT service data, and PID of a TS packet including the NRT service signaling channel is extracted using DST and PMT.

The demultiplexer 123, if a payload of the inputted TS packet is scrambled, outputs it to the descrambler 124, and then, the descrambler 124 receives information (control words used for scramble) necessary for descramble from the CAS 139, and performs descramble on the TS packet.

The demultiplexer 123 stores an A/V packet in real time, inputted at the one request of temporary recording, scheduled recording, and time shift, in the second storage unit 125. The second storage unit 125 is a mass storage medium and may include HDD, for example. The second storage unit 125 performs downloading (i.e., storing) and updating (i.e., playing) according to a control of the PVR manager 170.

The demultiplexer 123 separates an audio TS packet and a video TS packet from the A/V TS packet updated from the second storage unit and then outputs them to the PES decoder 131 at the playing request.

The demultiplexer 123 is controlled by the service manager 160 and/or the PVR manager 170 to perform the above processes.

That is, if a service_type field value in VCT indicates that NRT service is transmitted, the service manger 160 extracts identification information of each NRT service from NRT_service_descriptor( ) received from a virtual channel loop of the VCT and stores it, and then extracts DST PID from a service location descriptor (or an ES loop of PMT) of the VCT to receive DST.

Then, NRT service is identified from the received DST, and PID of an MPEG-2 TS packet including the NRT service signaling channel is extracted to receive the identified NRT service by using DST and PMT. The extracted PID is outputted to the demultiplexer 123. The demultiplexer 123 outputs MPEG-2 TS packets corresponding to PID, outputted from the service manager 160, to the addressable section handler 135.

The PCR is a time reference value used for time synchronization of audio ES and video ES in the A/V decoder 141. The PCR handler 133 restores PCR in the payload of the inputted TS packet and outputs it to the STC handler 134. The STC handler 134 restores System Time Clock (STC), i.e., a reference clock of a system, from the PCR, and outputs it to the A/V decoder 141.

The PES decoder 131 includes a PES buffer and a PES handler, and after temporarily storing an audio TS packet and a video TS packet, removes a TS header from the TS packet to restore audio PES and video PES. The restored audio PES and video PES are outputted to the ES decoder 132. The ES decoder 132 includes an ES buffer and an ES handler, and removes each PES header from audio PES and video PES to restore audio ES and video ES, i.e., pure data. The restored audio ES and video ES are outputted to the A/V decoder 141.

The A/V decoder 141 decodes the audio ES and video ES through each decoding algorithm to restore a previous state of compression, and then outputs it to the presentation manager 195. At this point, time synchronization is performed when audio ES and video ES are decoded according to the STC. As one example, an audio decoding algorithm includes at least one an AC-3 decoding algorithm, an MPEG 2 audio decoding algorithm, an MPEG 4 audio decoding algorithm, an AAC decoding algorithm, an AAC+ decoding algorithm, an HE AAC decoding algorithm, an AAC SBR decoding algorithm, an MPEG surround decoding algorithm, and a BSAC decoding algorithm. A video decoding algorithm includes at least one of an MPEG 2 video decoding algorithm, an MPEG 4 video decoding algorithm, an H.264 decoding algorithm, an SVC decoding algorithm, and a VC-1 decoding algorithm.

The CAS 139 includes a CA stream buffer and a CA stream handler, and after temporarily storing a TS packet outputted from the MPEG-2 TP handler or service protection data restored and outputted from a UDP datagram handler 138, restores information (for example, control words used for scramble) necessary for descramble from the stored TS packet or service protection data. That is, Entitlement Management Message (EMM) and Entitlement Control Message (ECM) in the payload of the TS packet are extracted and information necessary for descramble is obtained by analyzing the extracted EMM and ECM. The ECM may include a control word (CW) used in scramble. At this point, the control word may be encrypted using an encryption key. The EMM may include an encryption key and qualification information of corresponding data. Information necessary for descramble obtained from the CAS 139 is outputted to the descrambler 124 and 137.

The DSM-CC section handler 135 includes a DSM-CC section buffer and a DSM-CC section parser, and after temporarily storing a TS packet outputted from the demultiplexer 123, restores an addressable section in the payload of the TS packet. After restoring IP datagram by removing a header and CRC checksum of the addressable section, the restored IP datagram is outputted to the IP datagram handler 136.

The IP datagram handler 136 includes an IP datagram buffer and an IP datagram parser. After buffering IP datagram delivered from the DSM-CC section handler 135, the IP datagram handler 136 extracts and analyzes a header of the buffered IP datagram to restore UDP datagram from the payload of the IP datagram, and then, outputs it to the UDP datagram handler 138.

At this point, if the IP datagram is scrambled, the scrambled UDP datagram is descrambled in the descrambler 137 and then is outputted to the UDP datagram handler 138. As one example, the descrambler 137 receives information (e.g., a control word used for scramble) necessary for descramble from the CAS 138 and performs descramble on the UDP datagram to output it to the UDP datagram handler 138.

The UDP datagram handler 138 includes an UDP datagram buffer and a UDP datagram parser. After buffering IP datagram delivered from the IP datagram handler 136 or the descrambler 137, the UDP datagram handler 138 extracts and analyzes a header of the buffered UDP datagram to restore the data included in the payload of the UDP datagram. At this point, if the restored data is service protection data, it is outputted to the CAS 139; if the restored data is NRT service signaling data, it is outputted to the service signaling section handler 138-1; and if the restored data is NRT service data, it is outputted to the ALC/LCT stream handler 151.

That is, access information on the IP datagram transmitting the NRT service signaling channel is a well-known destination IP address and a well-known destination UDP port number.

Accordingly, the IP datagram handler 136 and the UDP datagram handler 138 include a well-known destination IP multicast address and a well-known destination UDP port number, and extracts an IP multicast stream transmitting an NRT service signaling channel, i.e., NRT service signaling data, to output it to the service signaling section handler 138-1.

Moreover, the service signaling section handler 138-1 includes a service signaling section buffer and a service signaling section parser, and restores and parses NST from the NRT service signaling data to output it to the service manager 160. When the NST is parsed, access information of the FLUTE session that transmits content/files constituting NRT service and signaling information necessary for rendering the NRT service may be extracted. For example, information necessary for rendering content/files of the NRT service, transmitted from the NST to each FLUTE session, may be extracted. Information necessary for rendering the content/files of the NRT service may include container information, encoding information, or decoding parameters of a media object.

The parsed information from the NST is collected by the service manager 160, and then, stored in the first storage unit 180. The service manager 160 stores the extracted information from the NST in the first storage unit 180 in a service map and guide data format. As another example, the NRT service manager 182 may serve as the service manager 160. That is, the parsed information from the NST is collected by the NRT service manager 192, and then, stored in the first storage unit 180.

The ALC/LCT stream hander 151 includes an ALC/LCT stream buffer and an ALC/LCT stream parser, and after buffering data having an ALC/LCT structure outputted fro the UDP datagram handler 138, analyzes a header and header extension of an ALC/LCT session from the buffer data. On the basis of the analysis result of the header and header extension of the ALC/LCT session, if data transmitted to the ALC/LCT session has an XML structure, it is outputted to the XML parser 153. If the data has a file structure, after being temporarily stored in the file reconstruction buffer 152, it is outputted to the file decoder 157 or stored in the third storage unit 156. The ALC/LCT stream handler 151 is controlled by the NRT service manager 192 if data transmitted to the ALC/LCT session is data for NRT service. At this point, if data transmitted to the ALC/LCT session is compressed, after decompressed in the decompressor 155, it is outputted to at least one of the XML parser 153, the file decoder 157, and the third storage unit 156.

The XML parser 153 analyzes XML data transmitted through the ALC/LCT session, and if the analyzed data is for a file based service, it is outputted to the FDT handler 154. If the analyzed data is for service guide, it is outputted to the SG handler 190.

The FDT handler 154 analyzes and processes a file description table of the FLUTE protocol through an ALC/LCT session. The FDT handler 154 is controlled by the NRT service manager 192 if the received file is for NRT service.

The SG handler 190 collects and analyzes data for service guide transmitted in the XML structure and then output it to the EPG manager 191.

The file decoder 157 decodes a file outputted from the file reconstruction buffer 152, a file outputted from the decompressor 155, or a file uploaded from the third storage unit 156 through a predetermined algorithm, thereby outputting it to the middleware engine 193 or the A/V decoder 141.

The middleware engine 193 interprets and executes data having a file structure, i.e., application. Moreover, the application may be outputted to a screen or speaker through the presentation manager 195. The middleware engine 193 is a JAVA based middleware engine according to an embodiment.

The EPG manager 191 receives service guide data from the SG handler 190 according to a user input, and then, converts the received service guide data into a display format to output it to the presentation manager 195. The application manager 194 performs general managements on processing application data received in the format such as a file.

The service manager 160 collects and analyzes PSI/PSIP table data or NRT service signaling data transmitted to an NRT service signaling channel to create a service map, and then stores it in the first storage unit 125. Additionally, the service manager 160 controls access information on NRT service that a user wants, and also controls the tuner 111, the demodulator 112, and the IP datagram handler 136.

The operation controller 100 controls at least one of the service manager 160, the PVR manger 170, the EPG manager 191, the NRT service manager 192, the application manager 194, and the presentation manager 195 according to a user command, and thus, performs a function that a user wants.

The NRT service manager 192 performs general management on NRT service transmitted in a content/file format through the FLUTE session on an IP layer.

The UI manager 196 delivers a user input to the operation controller 100 through UI.

The presentation manager 195 provides to a user through at least one of a speaker and a screen at least one of audio/video data outputted from the A/V decoder 141, file data outputted from the middleware engine 193, and service guide data outputted from the EPG manager 191.

Moreover, one of the service signaling section handler 138-1, the service manager 160, and the NRT service manager 192 obtains content constituting the NRT service or IP access information on the FLUTE session transmitting a file, from a FLUTE session loop of NST (or an a component loop of NST). Additionally, the one obtains FLUTE level access information from component_descriptor( ) received in the component loop of the NST.

Then, the ALC/LCT stream handler and the file decoder 157 access the FLUTE file delivery session by using the obtained FLUTE level access information to collect files in the session. Once the files are collected, they constitute one NRT service. This NRT service may be stored in the third storage unit 156, or outputted to the middleware engine 193 or the A/V decoder 141 to be displayed on a display device.

The third storage unit 158, i.e., a storage medium storing a file such as NRT service data, may be shared with the second storage unit 125, or may be separately used.

Figure 24:
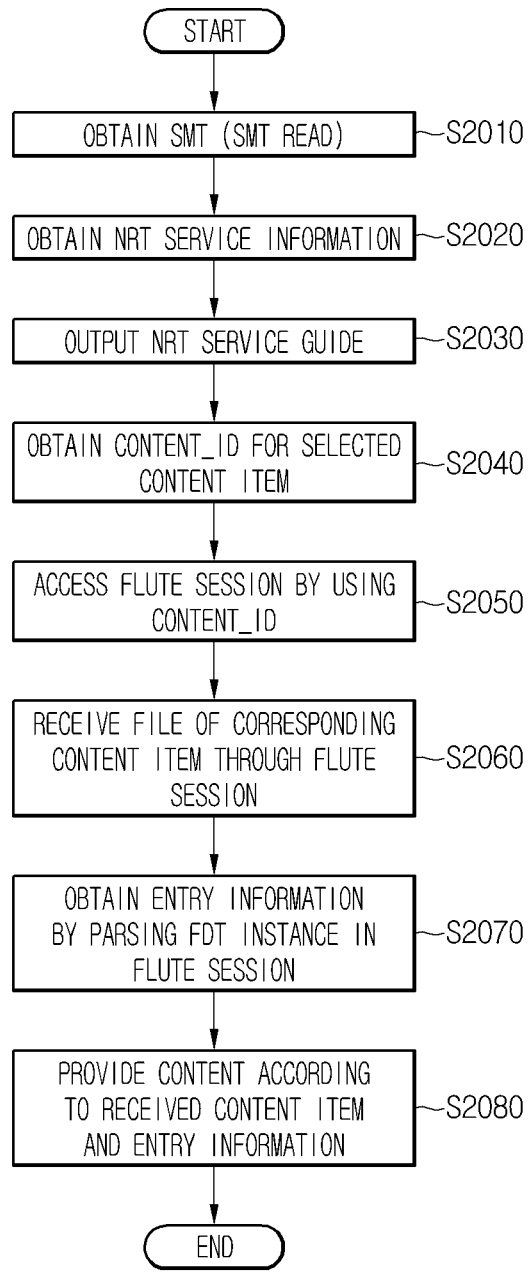
FIG. 24 is a flowchart illustrating a method of a receiver to receive and provide NRT service according to an embodiment.

FIG. 24 is a flowchart illustrating a method of a receiver to receive and provide NRT service according to an embodiment.

The receiver may obtain NRT service signaling information through an NRT service signaling channel or by receiving IP datagram in the case of mobile NRT service, and obtains SMT from the NRT service signaling information in operation S2010.

Then, the receiver obtains NRT service information from SMT in operation S2020. The NRT service information may be obtained by parsing NRT_service_info_descriptor in a service level descriptor loop. The obtained NRT service information may include requirement information on an application type for each NRT service or other NRT services.

Later, the receiver outputs NRT service guide on the basis of the obtained NRT service information in operation S2030. The NRT service guide may include application and service category information on each service. Additionally, detailed information may be further displayed on the basis of each field of NRT service info descriptor. The detailed information may include capacity information on corresponding NRT service according to a storage requirement field or audio or video codec information on corresponding NRT service according to an audio_codec_type or video_codec_type field. A user may select NRT service to receive and use it on the basis of the information in the service guide.

Then, the receiver obtains identifier (content_id) for content items constituting the selected NRT service from NCT in operation S2040. The receiver obtains NRT_service_id corresponding to the selected NRT service from SMT, obtains NCT having the same NRT_channel_id value as the obtained NRT_service_id, and obtains an identifier (content_id) for content items constituting a corresponding NRT service through the obtained NCT.

Then, the receiver accesses the FLUTE session to receive a file constituting the corresponding content item by using the obtained content item identifier (content_id) in operation S2050. Since each file constituting the content item is matched to TOI or a content location field of FDT in the FLUTE session, the receiver receives a file of a corresponding content item by using the FLUTE session in operation S2060. The receiving of the file may include receiving a corresponding file or object when a Content-ID attribute field for a corresponding file is identical to the obtained content_id after reading FDT in a corresponding FLUTE session.

Additionally, the receiver parses FDT instances in a corresponding FLUTE session to obtain a list of files corresponding to the content item. Moreover, the receiver obtains entry information including a list of files serving as an entry among lists of files.

Lastly, the receiver provides NRT service to a user on the basis of the receiver content item and the list of files corresponding thereto or entry information in operation S2080.

The content downloaded through the NRT service may be used at the timing that a user wants, being separated from real-time broadcasting.

Additionally, after transmitting NRT service in advance and storing it in a receiver, a broadcasting station may designate a content item of the corresponding NRT service, which is executed at the timing of when a specific real-time broadcasting is transmitted or the NRT service is displayed.

According to an embodiment of the present invention, the NRT service may include content, which is downloaded in advance linking with real-time broadcasting and executed at the specific timing. Additionally, according to an embodiment of the present invention, the NRT service may include content, which is prepared in advance to execute specific NRT service at the specific timing. An NRT service content triggered at the specific timing linked with real-time broadcasting to execute a specific action for a specific NRT service is called a Triggered Declarative Object (TDO). Accordingly, an NRT service application is classified as a non-real time declarative object (NDO) or a triggered declarative object (TDO) according to whether it is executed at the specific timing.

According to an embodiment of the present invention, a broadcasting station may transmit trigger information on triggering the TDO. The trigger information may include information on performing a specific action for a specific TDO at the specific timing.

Additionally, the trigger information may include trigger signaling data (trigger signaling information) for signaling a trigger, and trigger data constituting a trigger. Additionally, data stream transmitting trigger data may be designated as trigger stream. Also, the trigger data may mean itself.

Such a trigger may include at least one of a trigger identifier for identifying a trigger, a TDO identifier for identifying NRT service for trigger, and action information and trigger time on TDO.

The trigger identifier may be an identifier uniquely identifying a trigger. For example, a broadcasting station may include at least one trigger in broadcasting program information of a predetermined time provided through EIT. In this case, the receiver may perform an action on the trigger target TDO at the timing designated for each trigger on the basis of at least one trigger. At this point, the receiver may identify each trigger by using a trigger identifier.

A TDO identifier may be an identifier for identifying an NRT service content, i.e., a target of trigger. Accordingly, the TDO identifier may include at least one of a trigger NRT service identifier (NRT_service_id), content linkage (content_linkage), and URI or URL of an NRT content item entry. Moreover, the TDO identifier may include a target identifier (target_service_id) for identifying a trigger target TDO described later.

Additionally, TDO action information may include information on action for TDO of a trigger target. The action information may be at least one of execution, termination, and extension commands of the target TDO. Additionally, the action information may include commands for generating a specific function or event in the target TDO. For example, if the action information includes the execution command of the target TDO, a trigger may request the activation of the target TDO to the receiver.

Additionally, if the action information includes the extension command of the target TDO, a trigger may notify the receiver that the target TDO would extend. Additionally, if the action information includes the termination command of the target TDO, a trigger may notify the receiver that the target TDO would terminate. Thus, the broadcasting station may control a TDO operation in the receiver according to a real-time content through trigger.

Moreover, a trigger time may mean a time designated for performing (triggering) an action designated for the target TDO. Additionally, the trigger time may be synchronized with video stream in a specific virtual channel in order to link NRT service with real-time broadcasting. Accordingly, the broadcasting station may designate a trigger time with reference to PCR that video stream refers. Accordingly, the receiver may trigger TDO at the timing that the broadcasting station designates with reference to PCR that video stream refers. Moreover, the broadcasting station may signal a trigger with a trigger identifier in a header of video stream in order to transmit accurate trigger time.

Additionally, the trigger time may be designated with UTC time. In the case of UTC time, the trigger time is not a relative time but an absolute time.

The trigger time may be accurate trigger timing or may include an approximate start time. Moreover, the receiver may prepare an action for target TDO in advance before accurate trigger timing by receiving approximate time. For example, the receiver may prepare TDO execution in advance so that TDO operates smoothly at the trigger time.

FIG. 25 is a view illustrating a bit stream syntax of a trigger according to an embodiment.

Here, trigger or trigger data is in a trigger table form, and a corresponding syntax is in an MPEG-2 private section form to help understanding. However, the format of corresponding data may vary. For example, the corresponding data may be expressed in a Session Description Protocol (SDP) format and signaled through a Session Announcement Protocol (SAP) according to another method.

A table_id field is set with 0XTBD arbitrarily, and identifies that a corresponding table section is a table section constituting a trigger.

A section_syntax_indicator field is set with 1 and indicates that the section follows a general section syntax.

A private_indicator field is set with 1.

A section_length field describes that the number of bits remaining in the section to the last of the section from immediately after the section_length field.

A source_id field represents the source of a program related to a virtual channel.

A TTT_version_number field represents version information of a trigger. Additionally, the version information of a trigger represents the version of a trigger protocol. The trigger version information may be used for determining where there is change in a trigger structure or a trigger itself. For example, the receiver determines that there is no trigger change if the trigger version information is identical. Additionally, the receiver determines that there a trigger change if the trigger version information is different. For example, the trigger version information may include a plurality of version numbers, and the receiver may determine whether there is a trigger change on the basis of some of the plurality of version numbers.

A current_next_indicator field represents that a corresponding table section is applicable currently if set with 1.

A section_number field indicates a number of a corresponding table section.

A last_section_number field means a table section of the last and highest number among sections.

A num_triggers_in_section field means the number of triggers in a corresponding table section. The number of triggers in one session may be one or in plurality. Additionally, the next 'for' loop is performed as many times as the number of triggers.

A trigger_id field represents an identifier uniquely identifying a trigger.

A trigger_time field represents a time for which a trigger is performed. Moreover, this field may not be included in the session, and in this case, the trigger time may be a time designated from broadcasting stream as mentioned above.

A trigger_action field represents action information of a trigger performed at the trigger time. A trigger action may include at least one of a preparation command for target TDO, a target TDO execution command, a target TDO extension command, and a target TDO termination command. The trigger action may further include a command generating a specific command or event.

A trigger_description_length field represents the length of trigger_description_text.

A trigger_description_text field represents description for a corresponding trigger in a text format.

A service_id_ref field represents an identifier identifying a target TDO of a trigger. Accordingly, for example, a service_id_ref field may indicate an NRT_service_id field of SMT or NST to identify NRT service of a trigger target TDO.

A content_linkage field represents an identifier identifying a target TDO content item of a trigger. For example, a content_linkage field may indicate a content_linkage field of NRT-IT or NCT to identify a target TDO content item of a trigger. Additionally, a service_id_ref field and a content_linkage field may be included in a class for indicating one target TDO.

A num_trigger_descriptors field represents the number of trigger descriptors.

A trigger_descriptor( ) field represents a descriptor including information on a trigger.

When a trigger is in a table format of the MPEG-2 private section, a broadcasting station may transmit one trigger according to a virtual channel.

A first method of a broadcasting station to transmit a trigger may include transmitting 0X1FF stream including the trigger table, i.e., PSIP basic PID. The first method may distinguish the trigger table from other tables by allocating table_id of the trigger table.

Moreover, a second method of transmitting a trigger includes allocating PID corresponding to a trigger table to a Master Guide Table (MGT) and transmitting a corresponding PID stream having the trigger table. The second method processes all tables in a corresponding PID stream by using the trigger table.

Moreover, according to an embodiment, at least one of trigger and trigger signaling information is transmitted through an MPEG-2 Packetized Elementary Stream (PES) in order to designate the accurate timing synchronized with video and audio as a trigger time.

Here, the video and audio synchronization of MPEG-2 PES will be described as follows. A receiver decoder operates in synchronization with a time stamp of a transmitter encoder. The encoder has a main oscillator, called a System Time Clock (STC), and a counter. The STC is included in a specific program and a main clock of program for video and audio encoders.

Moreover, if a video frame or an audio block occurs in an encoder input, STC is sampled. A sampling value and a constant value as much as delay of the encoder and decoder buffers are added to generate display time information, i.e., Presentation Time Stamp (PTS) and then are inserted into the first portion of a picture or audio block. When frame reordering occurs, Decode Time Stamp (DTS) representing a time at which data needs to be decoded in a decoder is inserted. Except for the frame reordering of the B picture, DTS and PTS are same. DTS is additionally required in the case of the frame reordering. When DTS is used, there is PTS always. They may be inserted at an interval of less than about 700 msec. Additionally, it is defined in ATSC that PTS and DTS are inserted at the starting portion of each picture.

Moreover, an output of an encoder buffer includes a time stamp such as Program Clock Reference (PCR) in a transport packet level. Moreover, a PCT time stamp occurs at an interval of less than 100 msec, and is used for synchronizing STC of a decoder and STC of an encoder.

Moreover, video stream and audio stream may have each PTS or DTS corresponding to a common STC, for synchronization of audio stream and the decoder. Accordingly, PTS and DTS indicate when audio stream and video stream are played at each decoding unit, and are used to synchronize audio and video.

For example, a decoder of receiver outputs a PES packet in the received TS stream as a video PES depacketizer, and outputs a PCR value inserted in a TS packet header to a PCR counter. The PCR counter counts 100 of the PCR value and outputs it to a comparison unit. Moreover, the video PES depacketizer outputs a header of a PES packet to a DTS/PTS extractor, buffers Elementary Stream, i.e., image data to be displayed, in an Elementary Stream Buffer&Decoder. The DTS/PTS extraction unit extracts DTS and PTS values from the PES packet header and outputs them to the comparison unit. The comparison unit, if the PCR value inputted from the PCR counter becomes a DTS value or the PCR value of 100 becomes a PTS value, outputs each signal for that to a decoding/display control unit. The decoding/display control unit receives a signal that the PCR value becomes the DTS value from the comparison unit, and decodes the image data buffered in the elementary stream buffer & decoder to store them in a decoded stream memory. Additionally, the decoding/display control unit displays the decoded image data stored in the decoded stream memory through a display unit when receiving the signal that the PCR value becomes the PTS value from the comparison unit Accordingly, MPEG-2 PES includes PTS and DTS in its header, which synchronize data transmitted during data transmission with one elementary stream (ES) or presentation time between a plurality of ES. This is called a synchronized data stream method.

That is, according to an embodiment, a broadcasting station includes trigger data or trigger stream in the payload of PES and designates trigger time as a PTS value of the PES packet header by using the above synchronized data stream method. In this case, the receiver may trigger a target TDO at the accurate timing according to the PCR value that PTS of PES including a trigger refers. Accordingly, a broadcasting station may synchronize a trigger at the accurate timing of audio and video presentation that the broadcasting station is to trigger by using the PTS of the PES packet header designated as a trigger time and the PTS of the audio and video PES packet header.

Moreover, in relation to the header of the PES stream packet including a trigger, a stream_type value may be 0x06 to indicate a synchronized data stream method, stream_id may indicate a identifier of a predetermined stream, and PES_packet_length may indicate the length of PES stream including the payload of PES stream.

Figure 26:
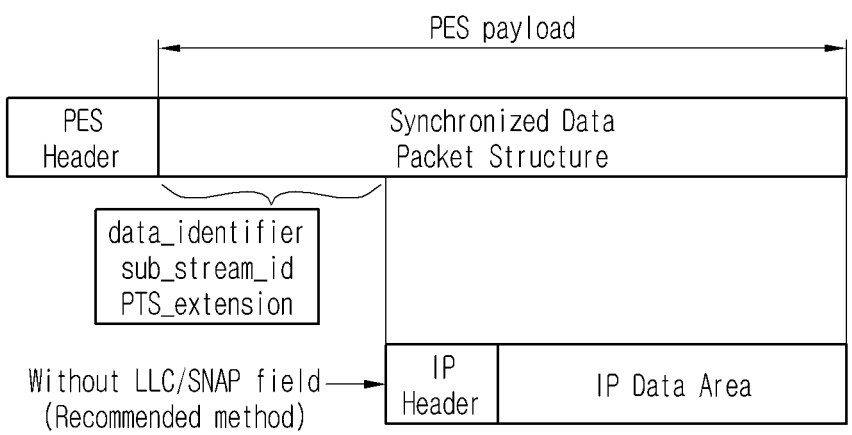
FIG. 26 is a view illustrating a PES structure according to a synchronized data stream method including a trigger according to an embodiment.

FIG. 26 is a view illustrating a PES structure according to a synchronized data stream method including a trigger according to an embodiment.

As shown in FIG. 26, PES of the synchronized data stream method may include a PES header and PES payload. The PES payload may include a synchronized data packet structure. As mentioned above, the trigger including a trigger table or another type of data may be included in the PES payload of FIG. 26 and then transmitted. Additionally, a broadcasting station may packetize the trigger in an IP datagram format, and may include and transmit the packetized trigger in an IP data area.

FIG. 27 is a view illustrating a synchronized data packet structure of PES payload for transmitting trigger as bit stream syntax according to an embodiment.

As shown in FIGS. 26 and 27, the trigger may be included in the synchronized data packet structure and then transmitted. Detailed description of each field in the structure is as follows.

A data_identifier field is an identifier identifying a type of data included in a PES data packet. This may be set with 0x22 according to a type.

A sub_stream_id field is an identifier (user private) settable by a user.

A PTS_extention_flag field indicates whether there is a PTS_extention_field. If this field value is 1, the PTS_extension field may be in the PES_data_packet field. Additionally, this field may be 0 when there is no PTS_extension field.

An output_data_rate_flag field may be set with 0.

A syncnronized_data_packet_header_length field represents the length of an optical field in the PES packet header. This field may be included If the PTS_extention_flag field is 1, and represents the length including synchroziced_data_privete_data_byte(s).

A PTS_extension field extends PTS delivered from the header of a corresponding PES packet. This field may include 9 bit Program Clock Reference (PCR) extension information. Additionally, a receiver may extend the PTS resolution of synchronized data from 11.1 μs (90 kHz), i.e., the MPEG-2 standard, to 37 ns (27 MHz).

A synchronized_data_private_data_byte field represents a payload byte of a synchronized PES packet. If the protocol_encapsulation of DST represents one of synchronized datagram, IP datagram not including LLC/SNAP, and multiprotocol including LLS/SNAP, the synchronized_data_byte field may include one unique datagram. Accordingly, when LLC/SNAP is used, an 8 byte LLC/SNAP header may be shown in only the first 8 byte synchronized_data_byte of the PES packet.

Accordingly, if a broadcasting station includes a trigger in a synchronized data stream (stream_type) of PES and transmits it, a receiver may extract trigger stream from the payload of PES. Additionally, the receiver may perform an action on a target TDO by using the PTS value of the PES header as a trigger time. Accordingly, TDO may be trigged at the accurate timing of a frame unit by synchronizing a trigger on the basis of PTS, i.e., a reference time for presentation synchronization of video and audio. Additionally, when a trigger time is designated with PTS, video and audio synchronization may be easily obtained.

Moreover, trigger signaling information on obtaining trigger stream is transmitted according to an embodiment. A receiver receives trigger signaling information and obtains trigger stream in the synchronized data stream of PES on the basis of the received trigger signaling information.

A method of transmitting trigger signaling information to obtain trigger stream transmitted using synchronized data streaming may vary. One of the following methods is used to transmit trigger signaling information: 1. a transmission method through DST; 2. a transmission method through a service id descriptor; 3. a transmission method through a trigger stream descriptor; and 4. a transmission method by defining a stream type of trigger stream.

According to an embodiment, trigger signaling information may be transmitted through DST for NRT service. DST is a table session for transmitting data service. Since its description and description for its data_service_bytes( ) identical to those of FIG. 8, overlapping description will be omitted.

The DST may include signaling data for receiving each Elementary Stream (ES) constituting data service. Accordingly, trigger signaling data for receiving trigger stream may be included in DST.

Moreover, each data service may include at least one application, and each application may in an application identification structure including an application identifier such as app_id. Moreover, each application may include at least one data element constituting a corresponding application or data stream.

Accordingly, in order to transmit trigger stream through data service, a broadcasting station includes one trigger stream in a specific virtual channel and transmits it. Moreover, the broadcasting station may include one trigger stream in each application and transmit it. Accordingly, embodiments for transmitting trigger signaling information will be described according to two methods.

When one trigger stream is included a virtual channel, a data service for transmitting trigger stream is called a trigger service. In this case, a broadcasting station may allocate a fixed service identifier (service ID) to a trigger service.

Accordingly, a receiver may identify that one trigger stream is transmitted to a virtual channel when the service identifier has 0X01 as a fixed value.

Here, the broadcasting station may include trigger signaling information in an application identification structure in DST and transmit it.

For example, the broadcasting station adds 0x0001 as an App_id_description field value of DST to set a value that means interactive application for linking NT service such as TDO with a real-time broadcast Additionally, app_id_byte_length may use 3 bytes (0x0003) and app_id_byte may be allocated with 0x01 to indicate that corresponding data service includes trigger stream signaling information.

Accordingly, the receiver receives DST through the above method, and may identify tap( ) including trigger signaling information when app_id_byte_length is 0x0003, app_id_description is 0x0001, and app_id_byte is 0x01. The receiver extracts trigger signaling information including an association_tag value from the identified tap( ) structure, and association_tag_descriptor receives stream having the same PID as the extracted association_tag from data elementary stream (ES) listed in PMT extracted from broadcasting stream in order to receive trigger stream.

As mentioned above, NRT service is signaled through SMR or NST, and may be uniquely identified through 16 bit service identifier (sevice_id). Additionally, content items constituting NRT service may be identified through conent_lengate or a content identifier in NCT or NRT-IT. Accordingly, trigger service may be transmitted like NRT service by extending app_id_byte through DST. For example, app_id_byte may include data combining a service identifier (service id) field of trigger service and a content linkage field. Accordingly, the first 16 bits of app_id_byte correspond to a service id field in SMT or NST, and the later 32 bits correspond to a content linkage field in NCT or NRT-IT.

As above, the broadcasting station may include trigger signaling information in tap( ) and transmits it through an application identification structure of DST when one stream is included in each channel.

Moreover, according to an embodiment, trigger signaling information may be transmitted through a protocol_encapsulation field of DST. For example, if app_id_byte_length in DST is set with 0x0000, app id is not allocated. If protocol_encapsulation has 0x0F, it indicates that trigger signaling information is included in a corresponding tap( ) structure. Accordingly, a receiver may receive trigger signaling information from the corresponding tap( ) structure if app_id_byte_length is 0x0000 and protocol_encapsulation is 0x0F. Through this, a PID value on PMT indicating trigger stream is obtained and trigger stream is received as mentioned above.

Moreover, according to another embodiment, trigger signaling information may be transmitted through a content type descriptor field of DST.

As shown in FIG. 28, a content type descriptor structure in tap( ) on DST according to an embodiment is as follows.

A descriptorTag may have 0x72 to represent contentType-Descriptor.

A descriptorLenth field represents the total length of a descriptor in a byte unit.

A contentTypeByte field represents a MIME media type value of data referenced by tap connected to the descriptor. The MIME media type is defined in 5 of RFC2045 section [8].

Accordingly, a content type descriptor may be added to a tap( ) structure including trigger signaling information according to an embodiment. Accordingly, a receiver may receive trigger signaling information from the corresponding tap( ) structure if app_id_byte_length is 0x0000 and content type descriptor of the tap( ) structure corresponds to the predetermined content. Through this, a PID value on PMT indicating trigger stream is obtained and trigger stream is received as mentioned above. The MIME media type may be designated with a specific type to identify that there is trigger service signaling information through a content type descriptor.

As mentioned above, one NRT service may be a trigger service for transmitting trigger stream and may transmit respectively different stream to content items in the trigger service. In this case, each application may include one trigger stream.

Accordingly, an embodiment may include trigger stream in each content item of NRT service and may transmit it. In this case, the above-mentioned application identification structure may be used. For example, if app_id_byte_length is 0x0003, it indicates that trigger stream is transmitted through one NRT service by using one service identifier. If app_id_byte_length is 0x0007, it indicates that trigger stream is transmitted by each content item by using a service identifier and content linkage. If defined as above, each trigger stream may be transmitted in correspondence to each NRT service or content item. Since the next stage of a method of transmitting and receiving trigger stream is identical to that of transmitting one trigger stream for each virtual channel, overlapping description will be omitted.

FIG. 29 is a view illustrating a syntax of PMT and service identifier descriptor according to an embodiment.

As shown in FIG. 29, a Program Map Table (PMT) represents information of a program broadcasted in each channel. A Program AssociationTable (PAT), in which 'packet ID' is defined as '0x00' and transmitted, may receive PMT by parsing 'packet ID' of PMT.

Moreover, a service identifier descriptor may be included in a descriptor loop for each ES of PMT. Then, it may include list information of services in each program element.

A structure of the service identifier descriptor will be described as follows.

A descriptor_tag field indicates that the descriptor is service_id_descriptor( ) and may have 0xC2.

A descriptor_length_field represents a byte unit length from this field to the termination of the descriptor.

A service_count field indicates the number of services in a program element having the descriptor.

A service_id field indicates a service identifier in a program element having the descriptor.

According to an embodiment, trigger stream may be transmitted through a well-known IP address. Moreover, in order to signal a trigger, a broadcasting station may include a specific service identifier (service id, for example, 0x01) corresponding trigger stream in a service identifier descriptor and may transmit it. That is, trigger signaling information on receiving trigger stream may be transmitted through a service identifier descriptor. Accordingly, if a service identifier of service_id_descriptor in an ES descriptor loop in an ES loop of PMT is 0x01, the receiver determines that elementray_PID in the ES loop is PID indicating trigger stream and receives the trigger stream through the PID.

FIG. 30 is a view illustrating a trigger stream descriptor according to an embodiment. According to an embodiment, a trigger may be signaled using a trigger stream descriptor. Like the above service identifier descriptor, the trigger stream descriptor may be included in an ES descriptor loop in an ES loop of PMT. Accordingly, if there is trigger stream, a trigger stream descriptor may exist in an ES descriptor loop. If identifying a trigger stream descriptor, a receiver may receive trigger stream by obtaining PID of the trigger stream from elementary_PID in a corresponding ES loop.

Like this, a trigger stream descriptor for transmitting trigger signaling information may include at least one of a service identifier (target service id) of TDO, a trigger target in trigger stream, and an IP address list transmitting trigger stream. The trigger stream descriptor of FIG. 30 is provided according to an embodiment and its structure will be described as follows.

A descriptor_tag field indicates a trigger_stream_descriptor if set with a predetermined value.

A descriptor_length field represents a byte unit length from this field to the termination of the descriptor.

A target_service_count field represents the number of target NRT service (TOD) of at least one trigger in trigger stream.

A target_service_id field represents a service identifier (service_id) of target NRT service (TOD) of at least one trigger in trigger stream. A receiver may identify a service identifier (service_id) before receiving trigger stream by using the target_service_id field.

A target_content_item_count field represents the number of target NRT service content items of at least one trigger in trigger stream.

A target_content_linkage field represents a target NRT service content item linkage (content_linkage) of at least one trigger in trigger stream.

Moreover, a trigger stream descriptor is provided according to an embodiment, and thus, it is apparent that it may include additional information or have another configuration. For example, when one trigger stream is transmitted for each channel, a content item field may be omitted. Additionally, at least one of a trigger stream identification information field and a profile information field may be added to identify trigger stream.

A broadcasting station may transmit list information of trigger target NRT service such as TDO by using the trigger stream descriptor. Additionally, the broadcasting station may transmit trigger signaling information by using the target_service_id and targe_content_linkage fields if there is another trigger according to a content item. Additionally, a trigger stream descriptor may further include a list of IP address information or port numbers transmitting trigger stream.

According to an embodiment, a broadcasting station designates a stream type and transmits trigger signaling information. A receiver extracts trigger signaling information by using a stream type from PMT and receives trigger stream through the trigger signaling information. For example, 0x96, one of stream types set preliminarily at the present, may be designated as trigger stream. In this case, a typical receiver has no information that a stream type is 0x96 and thus may not process trigger stream and disregard it. Accordingly, backwards compatibility for sub model receiver is guaranteed.

According to an embodiment, a trigger may be included in an Application information Table (AIT) for transmitting application information in data broadcasting such as Multimedia Home Platform (MHP) or Advanced Common application platform (ACAP), and may be transmitted. FIG. 31 is a view of AIT according to an embodiment.

Moreover, according to another embodiment a trigger may be included in a descriptor of STT to refer to a System Time Table (STT) as a trigger time, and then transmitted. FIG. 32 is a view of STT according to an embodiment.

Figure 33:
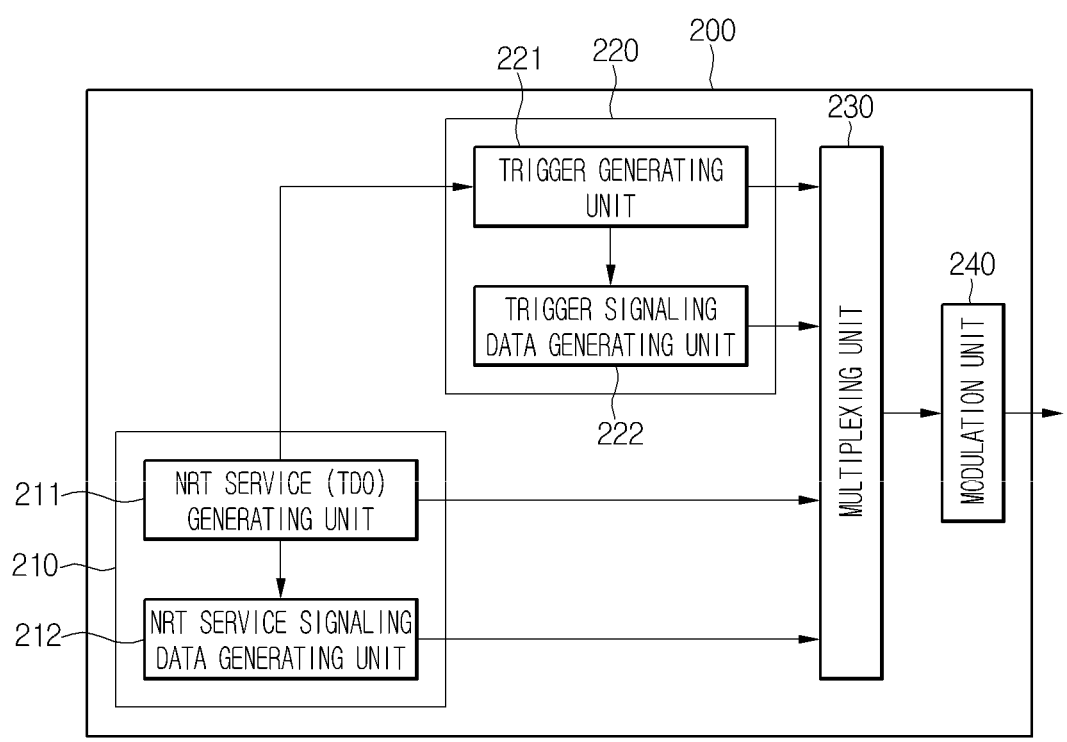
FIG. 33 is a block diagram illustrating a transmitter for transmitting TDO and a trigger according to an embodiment.

FIG. 33 is a block diagram illustrating a transmitter for transmitting TDO and a trigger according to an embodiment.

Referring to FIG. 33, the transmitter 200 includes an NRT service transmitting unit 210, a trigger transmitting unit 220, a multiplexing unit 230, and a demodulation unit 240. The NRT service transmitting unit 210 includes an NRT service (TDO) generating unit 211 and an NRT service signaling data generating unit 212. The trigger transmitting unit 220 includes a trigger generating unit 221 and a trigger signaling data generating unit 222.

The NRT service (TDO) generating unit 211 receives data for NRT service generation from a service provider to generate the NRT service, packetizes the generated NRT service into IP datagram, and then packetized the packetized IP datagram into a transmission packet (TP). The packetized NRT service data is transmitted to the multiplexing unit 230.

The NRT service generating unit 211 transmits metadata including channel information about NRT service in transmission and service_id, to the NRT service signaling data generating unit 212. Additionally, if the generated NRT service is TDO, the NRT service generating unit 211 extracts trigger information including a trigger time for triggering TDO, identification information, and trigger action information of a target TDO, and then transmits it to the trigger generating unit 221.

The NRT service signaling data generating unit 212 generates NRT service signaling data for receiving NRT service by using the NRT service metadata, and packetizes the generated NRT service signaling data to the transmission packet (TP) to transmit it to the multiplexing unit 230.

Additionally, the trigger generating unit 221 generates trigger data by using trigger information of the TDO received from the NRT service (TDO) generating unit. The generated trigger data is packetized into a transmission packet to transmit it to the multiplexing unit 230. Moreover, the trigger generating unit 221 transmits metadata for receiving a trigger such as the packet identifier (PID) of the transmitted trigger data to the trigger signaling data generating unit 222.

The trigger signaling data generating unit 22 generates trigger signaling data on the basis of the received metadata, and packetizes the trigger signal in data into a transmission packet to transmit it to the multiplexing unit 230.

The multiplexing unit 230 multiplexes the received transmission packets by each channel, and then transmits the multiplexed signal to the modulation unit 240.

The modulation unit 240 modulates the multiplexed signal and transmits it to the external. The modulation method may vary, and the present invention is not limited thereto.

Figure 34:
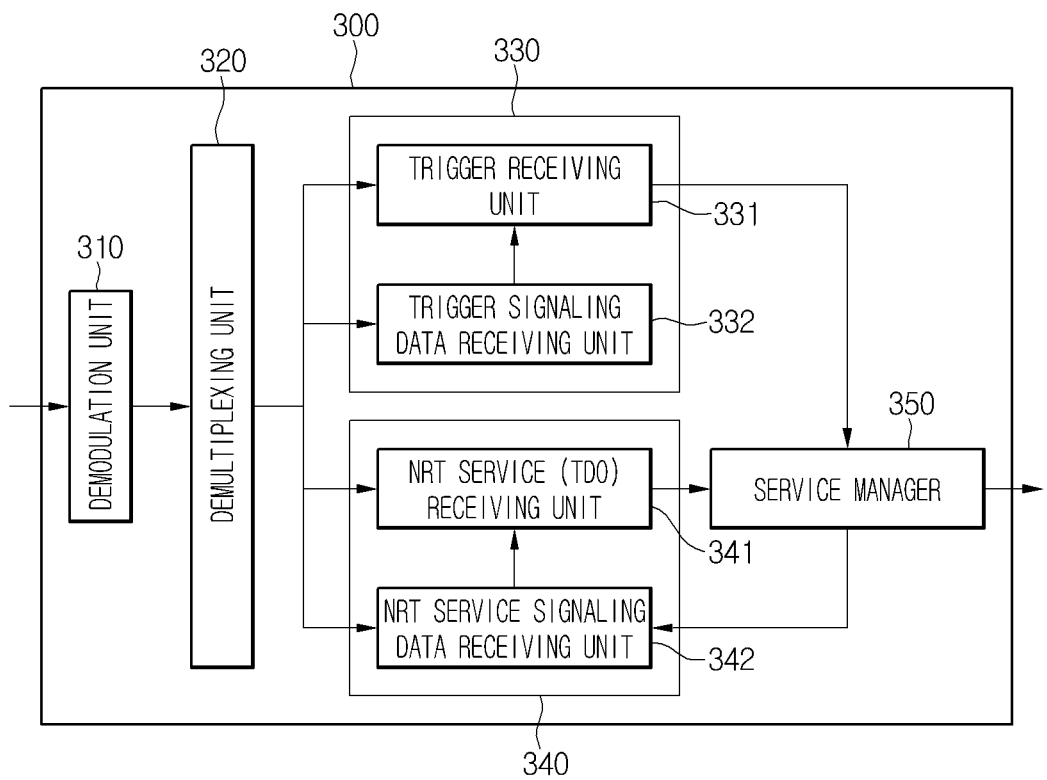
FIG. 34 is a block diagram illustrating a receiver for receiving TDO and a trigger according to an embodiment.

FIG. 34 is a block diagram illustrating a receiver for receiving TDO and a trigger according to an embodiment.

Referring to FIG. 34, the receiver 300 includes a demodulation unit 310, a demultiplexing unit 320, a trigger processing unit 330, an NRT service processing unit 340, and a service manager 350. The trigger processing unit 330 includes a trigger receiving unit 331 and a trigger signaling data receiving unit 332. The NRT service processing unit 340 includes an NRT service (TDO) receiving unit 341 and an NRT service signaling data receiving unit 342.

The demodulation unit 310 receives a modulated signal from the transmitter 200, and demodulates the received signal according to a predetermined demodulation method to transmit it to the demultiplexing unit 320.

The demultiplexing unit 320 demultiplexes the demodulated signal to restore an original transmission packet for each channel to transmit them to each receiving unit of the trigger processing unit 330 or the NRT service processing unit 340.

The NRT service signaling data receiving unit 342 receives and restores the packetized NRT service signaling data from the multiplexing unit 320 to extract information on NRT service, and then transmits it to the NRT service (TDO) receiving unit 341. The NRT service (TDO) receiving unit 341 receives transmission packets of NRT service from the multiplexing unit 320 by using information on receiving NRT service, and restores it as service data to transmit it to the service manager 350.

Moreover, the NRT service signaling data receiving unit 332 receives and restores the packetized trigger signaling data from the multiplexing unit 320, extract information on receiving a trigger, and then, transmits it to the trigger receiving unit 331. The trigger receiving unit 331 receives transmission packets including a trigger from the multiplexing unit 32 by using information on receiving a trigger, and restores trigger data to transmit it to the service manager 350.

The service manager 350 receives at least one of trigger data or NRT service (TDO) data from the trigger processing unit 330 or the NRT processing unit 340. Moreover, the service manager 350 performs and applies a trigger action on a trigger target TDO at the trigger timing, so that a trigger action on TDO is performed.

Figure 35:
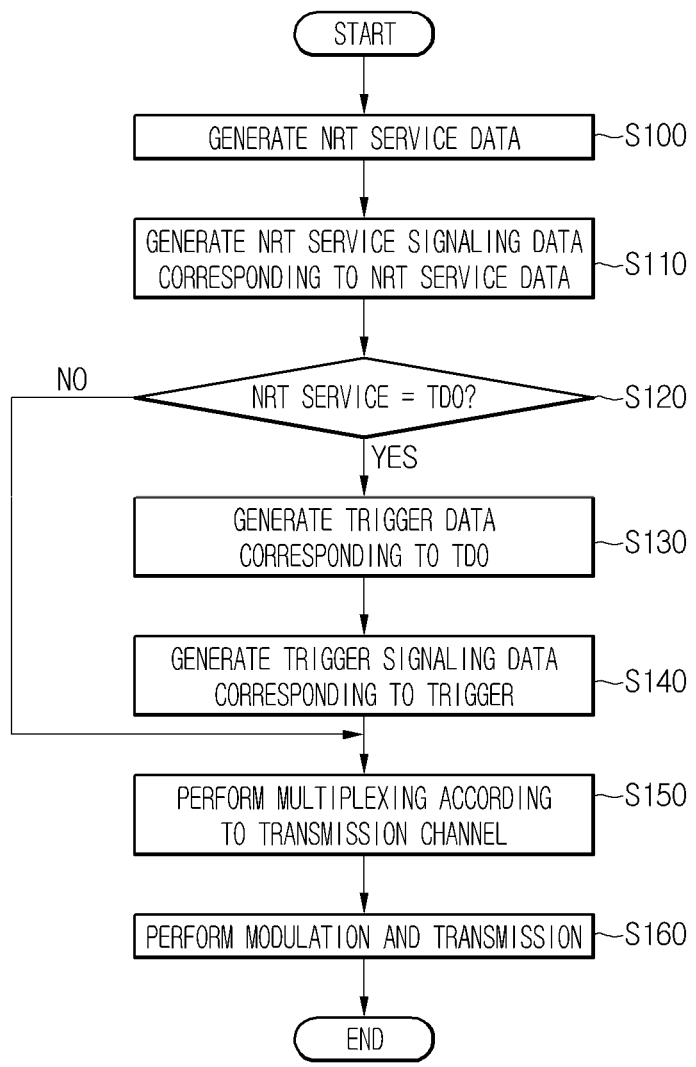
FIG. 35 is a flowchart illustrating a trigger transmitting method according to an embodiment.

FIG. 35 is a flowchart illustrating a trigger transmitting method according to an embodiment.

Referring to FIG. 35, the NRT service generating unit 211 generates NRT service data by receiving NRT service data from external or on the basis of data received from the NRT service provider in operation S100. Moreover, the NRT service generating unit 211 packets the generated data into a transmission packet. Additionally, the NRT service generating unit 211 transmits information on receiving transmission packets including NRT service to the NRT service signaling data generating unit 212.

Then, the NRT service signaling data generating unit 212 generates the above described NRT service signaling data and packetizes it into a transmission packet in operation S110.

Moreover, the NRT service generating unit 211 determines whether the generated NRT service is a trigger declarative object, i.e., TDO in operation S120.

Additionally, if the generated NRT service is TDO, the NRT service generating unit 211 transmits trigger information including a trigger time for triggering TDO, trigger action, target TDO identification information, to the trigger generating unit 221, and the trigger generating unit 211 generates trigger data by using the received triggered information in operation S130. The generated trigger data is packetized into a transmission packet and transmitted to the multiplexing unit. For example, a target service identifier for target TDO and trigger action information applied to a target service may be inserted into a packetized stream, i.e., the payload of PES, and then transmitted. Additionally, trigger time information is designated into a PTS or DTS format, inserted into the payload or header of PES, and then is transmitted. When the synchronized data streaming method is used, PTS of trigger stream and PTS of video and audio stream are synchronized to set the accurate play timing.

Moreover, the trigger signaling data generating unit 222 generates trigger signaling data for identifying and receiving a trigger transmitted from the trigger generating unit 221 and packetized the generated trigger signaling data into a transmission packet to transmit it to the multiplexing unit in operation S140. Here, the trigger signaling data may include a trigger stream descriptor or a service identifier descriptor, inserted in a program map table, and may include a packet identifier of trigger stream corresponding to each descriptor. Additionally, trigger signaling data may include a packet identifier of trigger stream in a TAP structure of DST.

Later, the multiplexing unit 230 multiplexes at least one of transmission-packetized NRT service data, NRT service signaling data, trigger data, and trigger signaling data by each transmission channel and then transmits it to the modulation unit 240.

Moreover, the modulation unit 240 performs modulation to transmit the multiplexed signal and transmits it to external receiver or a broadcasting network in operation S160.

Figure 36:
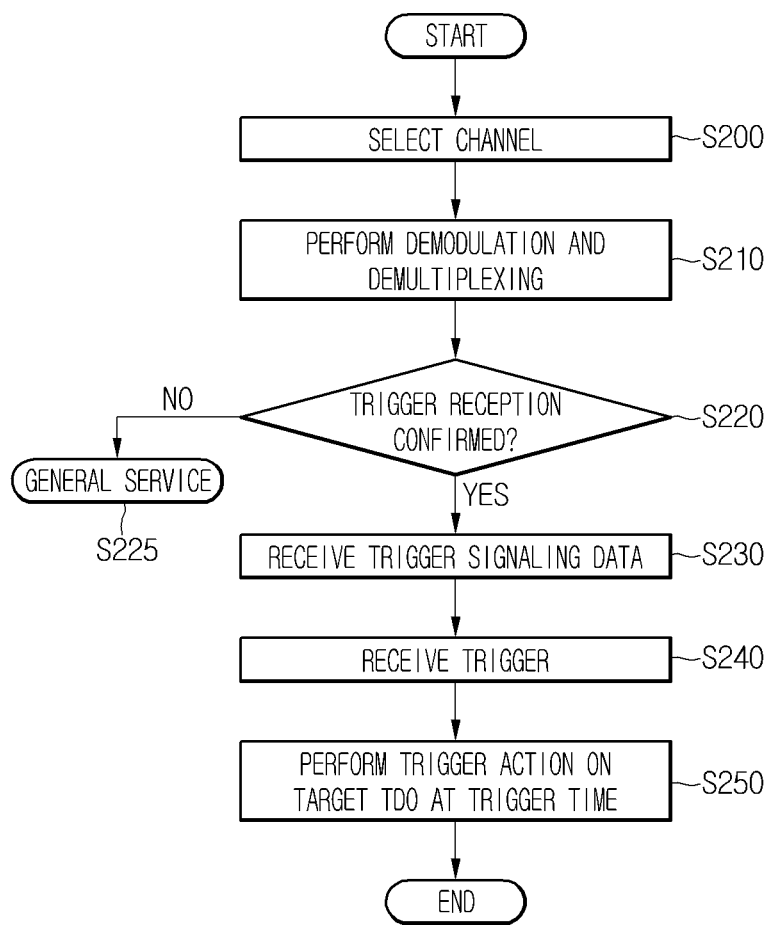
FIG. 36 is a flowchart illustrating an operation of a receiver 300 according to an embodiment.

FIG. 36 is a flowchart illustrating an operation of a receiver 300 according to an embodiment.

First, when the receiver 300 is turned on, a channel is selected by a user or a predetermined channel is selected in operation S200. The demodulation unit 310 demodulates the received signal from the selected channel, and the demultiplexing unit 320 demultiplexes the demodulated signal by each transmission channel. Also, the NRT service receiving unit 341 and the NRT service signaling data receiving unit 342 receive NRT service data and transmit it to the service manager 350 as described above.

Then, the trigger signaling data receiving unit 332 or the NRT service signaling data receiving unit 342 confirms whether trigger reception is possible in operation s220. The trigger reception confirmation may use one of the above-mentioned methods. That is, the trigger signaling data receiving unit 332 or the NRT service signaling data receiving unit 342 uses one of a method of confirming PID corresponding to a trigger in MGT or PSIP based PID, a method of using a tap structure of DST, a method of using a service identifier descriptor or a trigger stream descriptor, a method of using a trigger stream type, and a method of using AIT or STT, in order to confirm whether trigger reception is possible.

Moreover, when it is confirmed that trigger reception is possible, the trigger signaling data receiving unit 332 receives a transmission packet including trigger signaling data to restore the trigger signaling data, and then transmits it to the trigger receiving unit 331 in operation S230.

Later, the trigger receiving unit 331 extracts trigger data from the received transmission packet by using the trigger signaling data, and transmits it to the service manager 350 in operation S240. For example, the trigger receiving unit 331 may receive trigger stream by using a packet identifier corresponding to the trigger stream descriptor. Additionally, the trigger receiving unit 331 extracts trigger information from trigger stream and transmits it to the service manager 350. Additionally, if the received trigger stream is PES, PTS in the header of PES is extracted as a trigger time, and a target service identifier and trigger action in the payload of PES are extracted, in order to transmit them to the service manager 350.j Moreover, the service manager 350 performs a trigger action on a target TDO at the trigger timing, so that a trigger action on TDO is performed in operation S250. Especially, if the PTS of PES is a trigger time, the PTS of trigger stream is synchronized with the PTS in the header of audio and video stream, to satisfy the accurate play timing.

Figure 37:
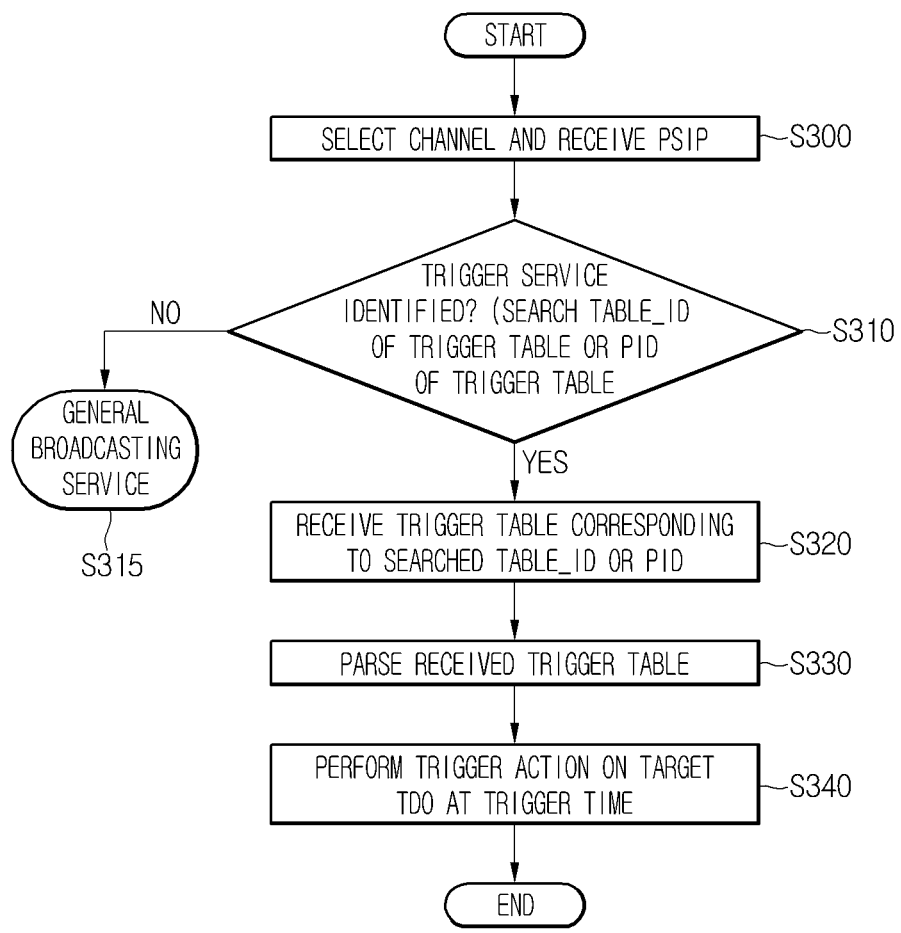
FIG. 37 is a flowchart illustrating a trigger receiving method by using a trigger table according to an embodiment.

FIG. 37 is a flowchart illustrating a trigger receiving method by using a trigger table according to an embodiment.

The demodulation unit 310 receives and demodulates a broadcast signal for selected channel. Moreover, the trigger signaling data receiving unit 332 receives a PSIP table through the demultiplexing unit 320 and determines whether there is a trigger table in the received table to identify a trigger service in operation S310. The trigger signaling data receiving unit 332 searches PID allocated to a trigger table from an MGT or PSIP based table, or searches a table corresponding to Table_id allocated to a trigger table to identify a trigger service.

If the trigger service is not identified, the receiver 300 provides general broadcasting services.

Moreover, if the trigger service is identified, the trigger receiving unit 331 receives the searched trigger table and parses it in operations S320 and S330.

Then, the service manger 350 receives trigger information including trigger time, trigger action, and target TDO identification information parsed in the trigger table, and performs a corresponding trigger action on a corresponding TDO at the corresponding trigger timing in operation S340.

Figure 38:
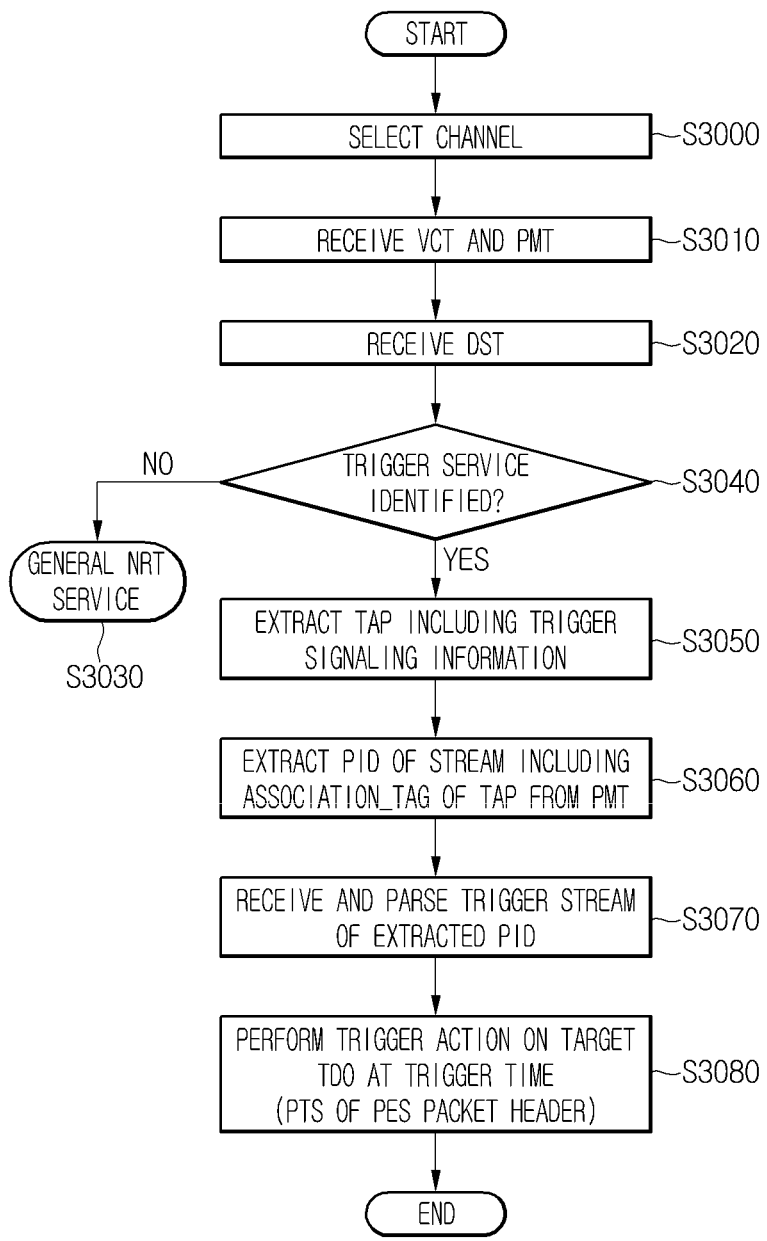
FIG. 38 is a flowchart illustrating an operation of a receiver when trigger signaling information and trigger are transmitted using DST according to an embodiment.

FIG. 38 is a flowchart illustrating an operation of a receiver 300 when trigger signaling information and trigger are transmitted using DST according to an embodiment.

When a physical transmission channel is selected in operation S3000 and a channel selected by a tuner is tuned, the receiver 300 obtains VCT and PMT from a broadcast signal received through the tuned physical transmission channel by using the demodulation unit 310 and the demultiplexing unit 320 in operation S3010. Then, the PSI/PSIP section handler or the trigger signaling data receiving unit 332 or the NRT service signaling data receiving unit 342 parses the obtained VCT and PMT to confirm whether there is NRT service.

For example, when the service_type field value of VCT is not 0x04 or 0x08, since the corresponding virtual channel does not transmit NRT only service, the receiver 300 operates properly according to information in the virtual channel. However, even though the service_type field value does not mean NRT only service, the corresponding virtual channel may include NRT service. This case is called adjunct NRT service included in the corresponding virtual channel, and the receiver 300 may perform the same process as the case of receiving NRT service.

Then, the NRT service signaling data receiving unit 342 or the trigger signaling data receiving unit 332 determines that NRT service is received through a corresponding virtual channel if a service_type field value is 0x04 or 0x08. In this case, if a stream_type field value in a service location descriptor of VCT (or an ES loop of PMT) is 0x95 (i.e., DST transmission), DST is received using an Elementary_PID field value in operation S3020. This may be performed in the demultiplexing unit 320 according to a control of the service manager 350.

Also, the trigger signaling data receiving unit 342 identifies a trigger service from the received DST in operation S3040. A method of identifying a trigger service uses one of a method of identifying a specific value allocated to app_id_description and app_id_byte by using an application identification structure, a method of identifying a specific value allocated to a protocol_encapsulation field, and a method of identifying tap including a content type descriptor.

If the trigger service is not identified from the received DST, since trigger data transmits general NRT service through a corresponding virtual channel, the receiver 300 operates properly according to NRT service in the corresponding virtual channel in operation S3030.

Moreover, when the trigger service is identified from DST, the trigger signaling data receiving unit 332 extracts tap from DST including trigger signaling information (PID of trigger stream) in operation S3060.

Then, the trigger signaling data receiving unit 332 extracts stream PID from PMT including association tag of the extracted Tap in operation S3070.

The trigger receiving unit 331 receives MPEG-2 TS packets corresponding to the extracted stream PID, and removes decapsulation, i.e., TS header, to restore PES stream including trigger stream. The stream_type of a PES packet including trigger stream may be 0x06 representing synchronized data stream. The trigger receiving unit 331 parses at least one of PTS of a PES packet header from the restored PES stream, a target TDO identifier in trigger stream, a trigger identifier, or trigger action information in operation S3070.

Then, the service manager 350 performs an action on the target TDO at the trigger timing by using the PTS of the PES packet header including a trigger as the trigger timing in operation S3080. Here, the target TDO may be NRT service indicated by the parsed target TDO identifier. Additionally, the action may be one of preparation, execution, extension, and termination commands provided from the parsed trigger action information.

Figure 39:
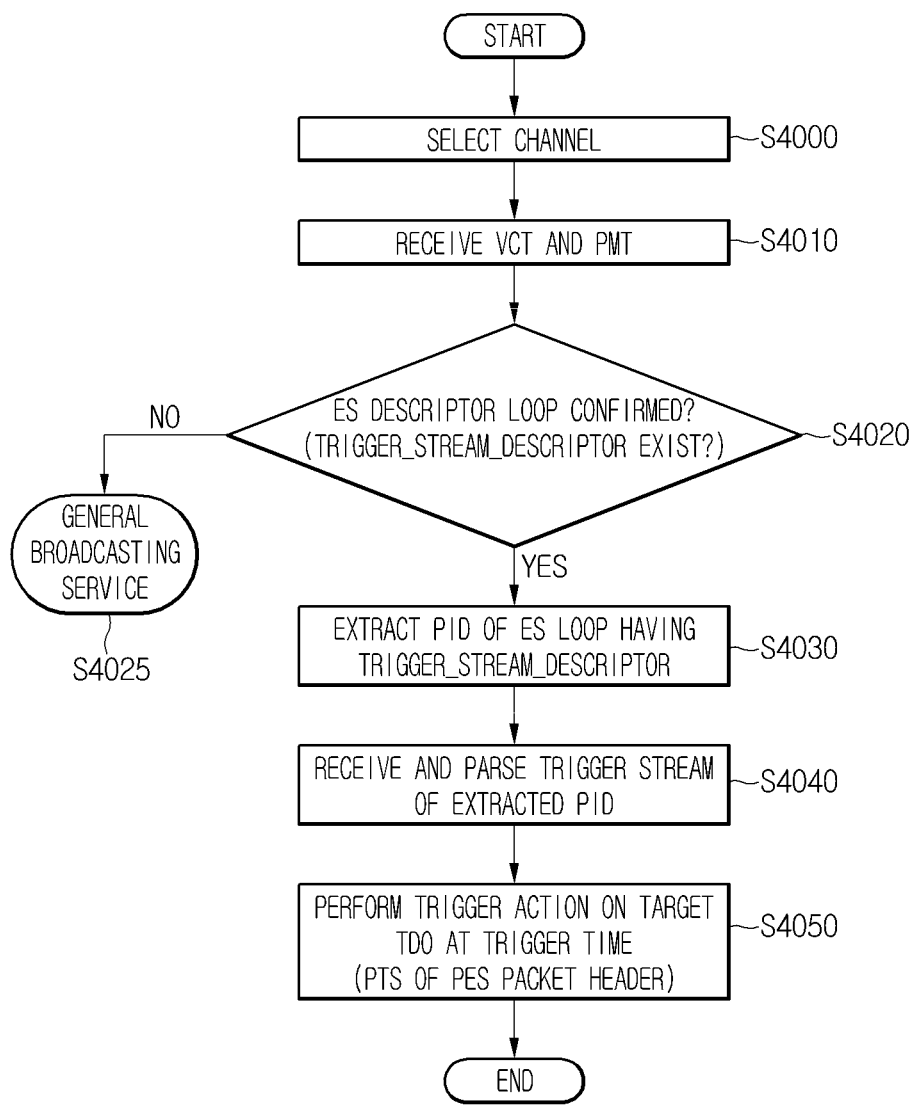
FIG. 39 is a flowchart illustrating an operation of a receiver when a trigger is transmitted using a trigger stream descriptor according to an embodiment.

FIG. 39 is a flowchart illustrating an operation of a receiver 300 when a trigger is transmitted using a trigger stream descriptor according to an embodiment.

When a physical transmission channel is selected in operation S3000 and a channel selected by a tuner is tuned, the receiver 300 obtains VCT and PMT from a broadcast signal received through the tuned physical transmission channel by using the demodulation unit 310 and the demultiplexing unit 320 in operation S4000. The broadcast signal includes VCT and PMT, and the trigger signaling data receiving unit 332 or the PSI/PSIP section handler parses the obtained VCT and PMT.

Also, the trigger signaling data receiving unit 332 confirms whether a trigger is transmitted from the VCT and PMT to a corresponding virtual channel. For this, the trigger signaling data receiving unit 332 determines whether there is the Trigger_stream_descriptor in the ES descriptor loop corresponding to a corresponding virtual channel in operation S4020. Whether there is Trigger_stream_descriptor is determined by using whether a stream_type value is 0x06 (synchronized data streaming) and a descriptor_tag field of a corresponding descriptor is identical to a value set to correspond to a trigger stream descriptor after searching descriptors in an ES descriptor loop.

If it is determined that Trigger_stream_descriptor is not identified from PMT and thus there is no Trigger_stream_descriptor, since a corresponding virtual channel does no transmit a trigger, the receiver 300 operates properly according to broadcast service in the corresponding virtual channel in operation S4025.

Then, if there is Trigger_stream_descriptor, the trigger signaling data receiving unit 332 extracts Elementary_PID in the corresponding ES loop of PMT in operation S4030. The extracted stream PID may be a PID value of stream including trigger stream.

Then, the trigger receiving unit 331 receives MPEG-2 TS packets corresponding to the extracted stream PID, and performs decapsulation (i.e., removes a TS header) to restore PES stream including trigger stream. The stream_type of a PES packet including trigger stream may be 0x06 representing synchronized data stream. The trigger receiving unit 331 parses at least one of PTS of a PES packet header from the restored PES stream, a target TDO identifier in trigger stream, a trigger identifier, or trigger action information in operation S4040.

Then, the service manager 350 performs an action on the target TDO at the trigger timing by using the PTS of the PES packet header including a trigger as the trigger timing in operation S4050. Here, the target TDO may be NRT service indicated by the parsed target TDO identifier. Additionally, the action may be one of preparation, execution, extension, and termination commands provided from the parsed trigger action information.

Figure 40:
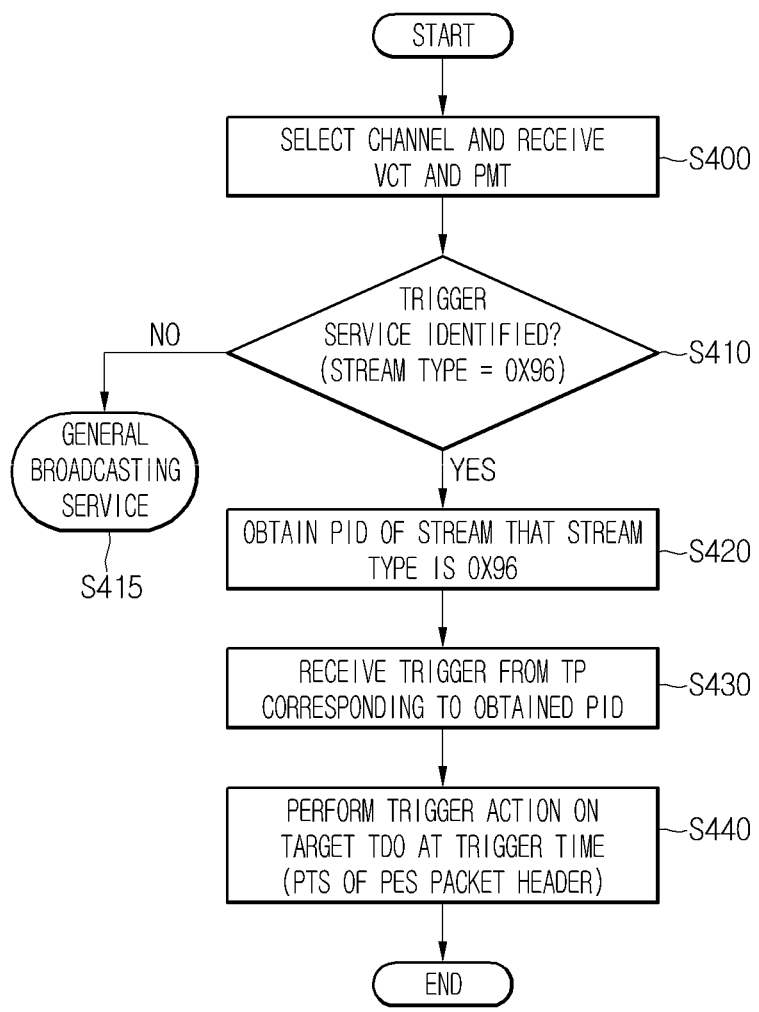
FIG. 40 is a flowchart illustrating an operation of a receiver when a trigger is transmitted using a stream type according to an embodiment.

FIG. 40 is a flowchart illustrating an operation of a receiver when a trigger is transmitted using a stream type according to an embodiment.

When a physical transmission channel is selected and a channel selected by a tuner is tuned, the receiver 300 obtains VCT and PMT from a broadcast signal received through the tuned physical transmission channel by using the demodulation unit 310 and the demultiplexing unit 320. The broadcast signal includes VCT and PMT, and the trigger signaling data receiving unit 332 or the PSI/PSIP section handler parses the obtained VCT and PMT in operation S400.

Also, the trigger signaling data receiving unit 332 confirms whether a trigger is transmitted from the VCT and PMT to a corresponding virtual channel. For this, the trigger signaling data receiving unit 332 determines whether there is 0x96, i.e., the specific stream type in the ES descriptor loop corresponding to a corresponding virtual channel in operation S410.

If it is determined that 0x96 is not identified from stream type and thus there is no stream type, since a corresponding virtual channel does no transmit a trigger, the receiver 300 operates properly according to broadcast service in the corresponding virtual channel in operation S415.

Then, if the stream type is 0x96, the trigger signaling data receiving unit 332 extracts Elementary_PID in the corresponding ES loop of PMT in operation S420. The extracted stream PID may be a PID value of stream including trigger stream.

Then, the trigger receiving unit 331 receives MPEG-2 TS packets corresponding to the extracted stream PID, and performs decapsulation (i.e., removes a TS header) to restore PES stream including trigger stream. The trigger receiving unit 331 parses at least one of PTS of a PES packet header from the restored PES stream, a target TDO identifier in trigger stream, a trigger identifier, or trigger action information in operation S430.

Then, the service manager 350 performs an action on the target TDO at the trigger timing by using the PTS of the PES packet header including a trigger as the trigger timing in operation S440. Here, the target TDO may be NRT service indicated by the parsed target TDO identifier. Additionally, the action may be one of preparation, execution, extension, and termination commands provided from the parsed trigger action information.

Figure 41:
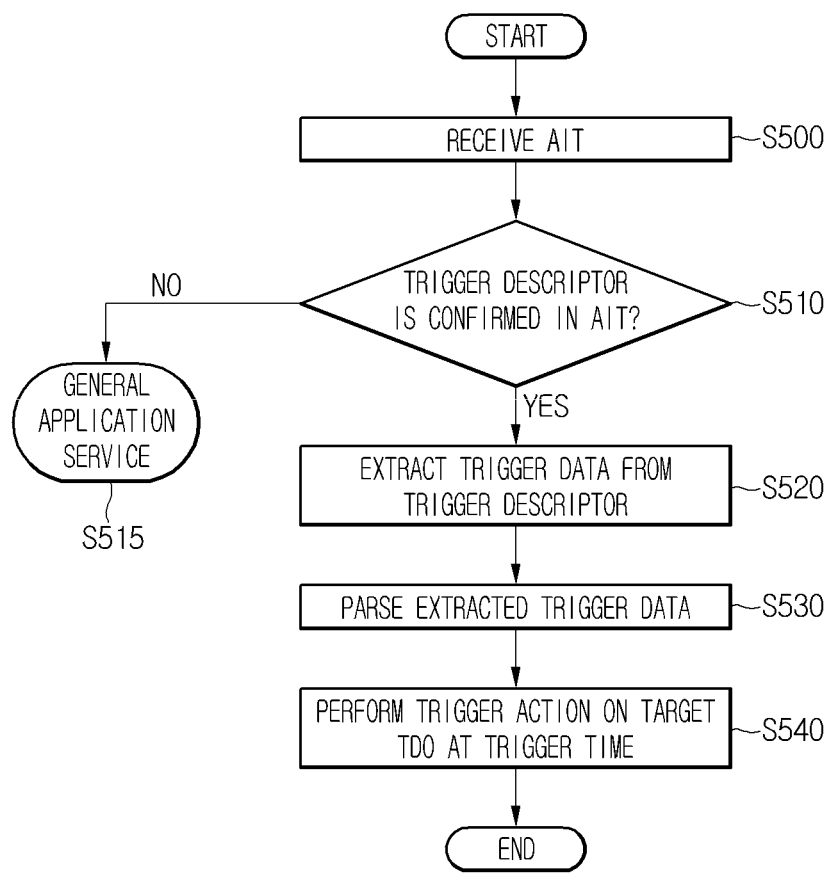
FIG. 41 is a flowchart illustrating an operation of a receiver when a trigger is transmitted using AIT according to an embodiment.

FIG. 41 is a flowchart illustrating an operation of a receiver when a trigger is transmitted using AIT according to an embodiment.

The trigger signaling data receiving unit 332 receives AIT by using the demodulation unit 310 and the demultiplexing unit 320 in operation S500.

Also, the trigger signaling data receiving unit 332 confirms whether a trigger is transmitted from AIT. For this, the trigger signaling data receiving unit 332 confirms whether there is a trigger descriptor in AIT in operation S510.

If it is determined that there is no trigger descriptor, since a corresponding application does not include a trigger, the receiver 300 operates properly according to corresponding application service in operation S515.

Also, if there is a trigger descriptor, the trigger receiving unit 332 extracts trigger data from the trigger descriptor and parses the extracted trigger data to transmit it to the service manager 350 in operation S530.

Then, the service manager 350 performs an action on the target TDO at the trigger timing by using the parsed trigger data in operation S540. Here, the target TDO may be NRT service indicated by the parsed target TDO identifier. Additionally, the action may be one of preparation, execution, extension, and termination commands provided from the parsed trigger action information.

Figure 42:
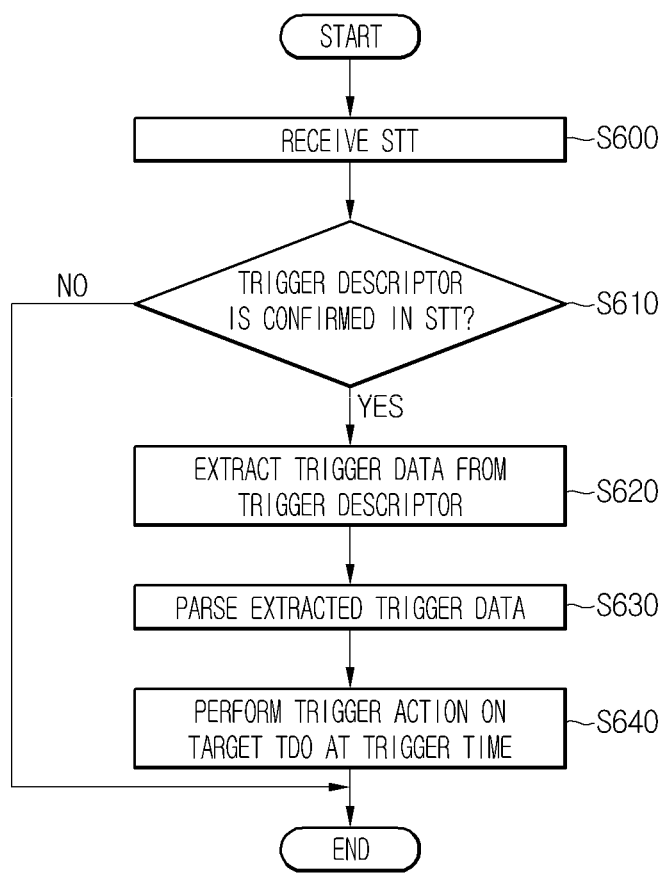
FIG. 42 is a flowchart illustrating an operation of a receiver when a trigger is transmitted using STT according to an embodiment.

FIG. 42 is a flowchart illustrating an operation of a receiver when a trigger is transmitted using STT according to an embodiment.

The trigger signaling data receiving unit 332 receives STT by using the demodulation unit 310 and the demultiplexing unit 320 in operation S600.

Also, the trigger signaling data receiving unit 332 confirms whether a trigger is transmitted from STT. For this, the trigger signaling data receiving unit 332 confirms whether there is a trigger descriptor in STT in operation S610.

If it is determined that there is no trigger descriptor, since a corresponding STT does not include a trigger, the receiver 300 operates properly according to a broadcast signal in operation S615.

Also, if there is a trigger descriptor, the trigger receiving unit 332 extracts trigger data from the trigger descriptor and parses the extracted trigger data to transmit it to the service manager 350 in operation S630.

Then, the service manager 350 performs an action on the target TDO at the trigger timing by using the parsed trigger data in operation S540. Here, the target TDO may be NRT service indicated by the parsed target TDO identifier. Additionally, the action may be one of preparation, execution, extension, and termination commands provided from the parsed trigger action information.

Figure 43:
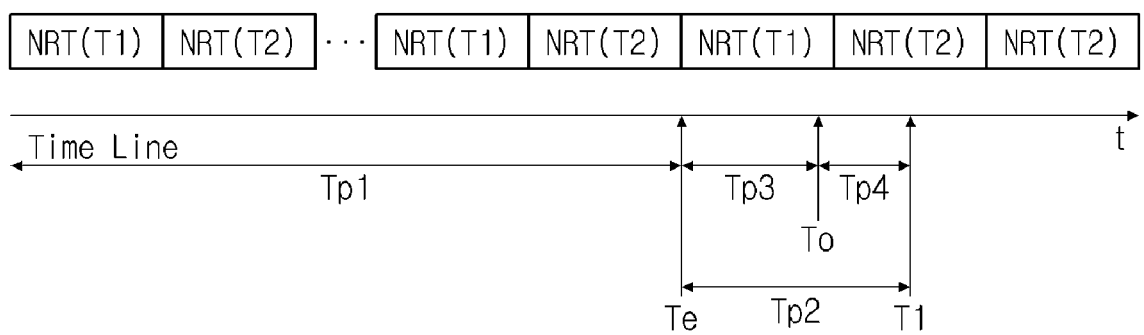
FIG. 43 is a timing diagram according to an embodiment of the present invention.

FIG. 43 is a timing diagram according to an embodiment of the present invention.

As shown in FIG. 43, since the transmitter 200 does not know when the receiver 300 changes a channel, when the receiver 300 is power on, and when the receiver 300 selects a channel where a corresponding NRT service exists, the transmitter 200 may transmit download contents transmitted in an NRT way through terrestrial broadcasting periodically and repeatedly.

For this reason, the transmitter 200 may also transmit activation triggering data periodically. However, when activation triggering data are transmitted in a very short period, a transmission band may be wasted and overhead may occur because the receiver 300 needs to check the activation triggering data periodically. On the contrary, when activation triggering data are transmitted in a very long period, even if the receiver 300 receives NRT data corresponding to activation triggering data, it may not activate the received NRT data. Accordingly, a proper transmission timing of activation triggering data is required.

Referring to FIG. 43, an activation time T1 indicates a time at which the activation of an NRT(T1) service is triggered. An effective time Te indicates a time at which the NRT(T1) starts to be transmitted lastly before an activation time T1. A transmission period change time To indicates a time at which a period of transmitting activation triggering data is changed. The transmission period change time To is a time parameter that the transmitter 200 determines. A time window Tp1 indicates a time prior to the effective time Te. A time window Tp2 indicates a time between the effective time Te and the activation time T1. A time window Tp3 indicates a time between the effective time Te and the transmission period change time To. A time window Tp4 indicates a time between the transmission period change time To and the activation time T1.

In order to execute the NRT(T1) service at the activation T1, the receiver 300 may need to complete the reception and storage of the NRT(T1) service before the activation time T1 and then, receive activation triggering data for the NRT(T1) service. For this, if the receiver 300 tunes a channel transmitting the NRT(T1) service before the effective time Te and maintains a corresponding channel until the reception completion of the NRT(T1) service, it may store the NRT(T1) service before the activation time T1. Accordingly, even when activation triggering data are transmitted in the time window Tp2, since the receiver 300 does not receive the NRT(T1) service, transmitting the activation triggering data in the time window Tp2 may be meaningless.

However, if the receiver 300 tunes a channel transmitting the NRT(T1) service in the time window Tp1 and performs channel changing to another channel after the NRT(T1) service is received completely, as the receiver performs channel changing to a channel transmitting the NRT(T1) service in the time window Tp2, it may have the NRT(T1) service. Accordingly, the transmitter 200 may be required to transmit activation triggering data in the time window Tp2.

Moreover, the transmitter 200 may transmit activation triggering data by distinguishing the time window Tp3 and the time window Tp4 from each other using the transmission period change time To. Since a time of the time window Tp4 is left until the NRT(T1) service is executed before the time period change time To, the transmitter 200 transmits activation triggering data in a long period. At this point, the transmitter 200 may transmit activation triggering data in a period of n*Tp4.

On the other hand, since there is little time left between the transmission period change time To and the activation time T1 until the NRT(T1) service is executed, the transmitter 200 transmits activation triggering data in a short period. At this point, the transmitter 200 may transmit activation triggering data as many times as a short period transmission count M. At this point, the short period P(Tp4) may be [Tp4/M]. [ ] indicates a Gaussian symbol. The short period transmission count M may be designed in consideration of a channel change time. Accordingly, when the receiver 300 performs channel changing to a channel providing the NRT(T1) service before the activation time T1 by P(Tp4), the NRT(T1) service is provided normally.

As the receiver 300 enters a channel providing the NRT (T1) service between T1 ?? P(Tp4) and the activation time T1, the NRT(T1) service may not be provided normally. However, due to a very short time, it is less likely to occur. Additionally, this case may be compensated by maintenance triggering data described later.

As mentioned above, although the effective time Te is prior to the transmission period change time To, the present invention is not limited thereto. That is, the transmission period change time To may be prior to the effective time Te.

Figure 44:
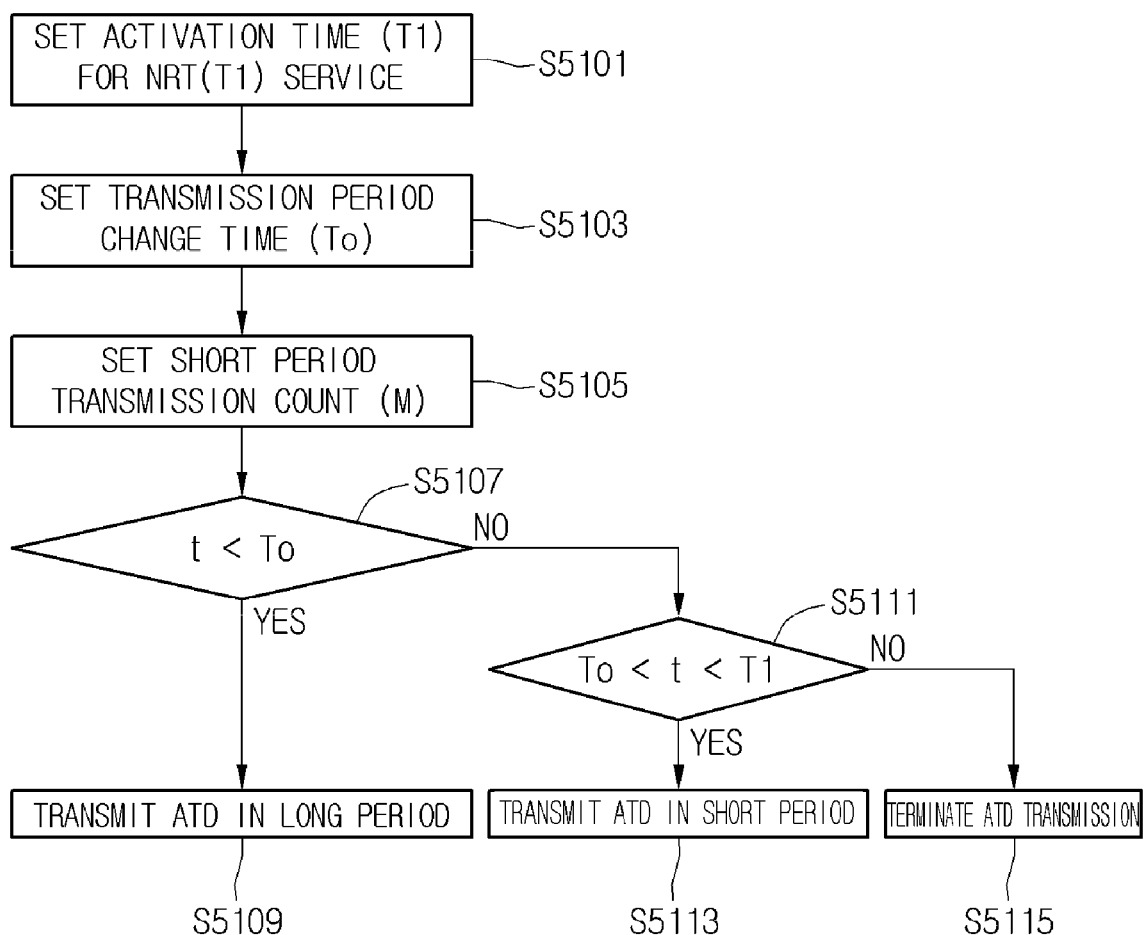
FIG. 44 is a flowchart illustrating an activation trigger data transmitting method according to an embodiment of the present invention.

FIG. 44 is a flowchart illustrating an activation triggering data transmitting method according to an embodiment of the present invention.

First, the trigger transmission unit 220 sets an activation time T1 of an NRT(T1) service, i.e., a target object, in operation S5101, sets a transmission period change time To in operation S5103, and sets a short period transmission count M in operation S5105.

When a current system time t is prior to the transmission period change time To in operation S5107, the trigger transmission unit 220 transmits activation triggering data for the NRT(T1) service in a long period in operation S5109. At this point, the trigger transmission unit 220 may transmit activation triggering data in a period of n*Tp4.

When a current system time t is subsequent to the transmission period change time To and prior to the activation time T1 of the NRT(T1) service in operation S5111, the trigger transmission unit 220 transmits activation triggering data for NRT(T1) service in a short period in operation S5113.

When the current system time t is subsequent to the activation time T1 of the NRT(T1) service in operation S5111, the trigger transmission unit 220 terminates the transmission of the activation triggering data for NRT(T1) service in operation S5115.

In FIG. 44, the current system time t is compared to the transmission period change time To or the activation time T1 of the NRT(T1) service. Accordingly, the time references of the current system time t, the transmission period change time To, and the activation time T1 of the NRT(T1) service need to be the same. For example, the current system time t, the transmission period change time To, and the activation time T1 of the NRT(T1) service all may be the UTC time. If the activation time T1 of the NRT(T1) is given as a PTS, since the PTS uses a PCR as reference, the current system time t may correspond to an STC. This may be applied to a time comparison mentioned in this specification.

Hereinafter, referring FIGS. 45 to 47, a triggering data transmission pattern is described according to another embodiment of the present invention. Especially, a transmission pattern of maintenance triggering data (MTD) is described.

According to an embodiment, triggering data including a trigger action set to a value corresponding to maintenance may be maintenance triggering data.

If an object corresponding to a target service identifier of maintenance triggering data is activated already, maintenance trigger information may trigger the maintenance of the activation of the object. Then, If an object corresponding to a target service identifier of maintenance triggering data is not activated yet, maintenance trigger information may trigger the activation of the object.

Figure 45:
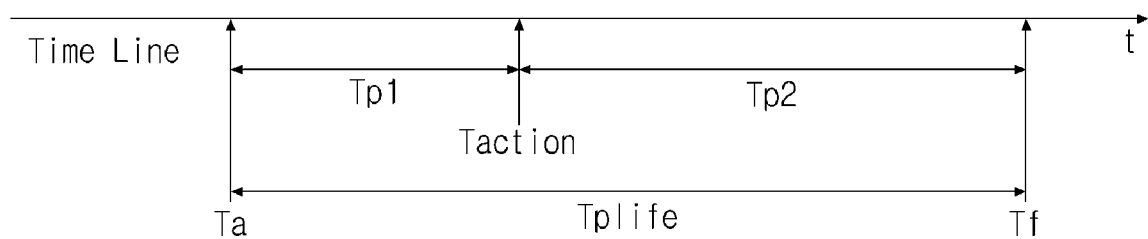
FIG. 45 is a timing diagram according to another embodiment of the present invention.

FIG. 45 is a timing diagram according to another embodiment of the present invention.

In FIG. 45, an activation time Ta indicates an activation time of a TDO and a termination time Tf indicates a termination time of a TDO. An additional action time Taction indicates a time at which another additional action for TDO is triggered (activated) after the activation time Ta and before the termination time Tf. A time window Tplife indicates a time between the activation time Ta and the termination time Tf, especially, the lifetime of a TDO. A time window Tp1 indicates a time between the activation time Ta and the additional action time Taction. A time window Tp2 indicates a time between the additional action time Taction and the termination time Tf.

When the receiver 300 changes a tuning channel from a channel A into a channel B and then returns to the channel A, it may need to re-execute a TDO executed before. Or, when NRT content, i.e., a TDO, corresponding to the channel A is pre-stored in the receiver 300, and the receiver 300 returns to the channel A after the activation time Ta of the TDO, the receiver 300 nay need to execute the TDO. For this case, the transmitter 200 may transmit maintenance triggering data according to an embodiment of the present invention.

If the receiver 300 downloads and stores corresponding NRT content in advance, it may require MTD in the following case. That is, after the receiver 300 changes a tuning channel from the channel A into the channel B and then returns to the channel A in the time window Tplife, it may require MTD. Additionally, after the receiver 300 is powered off in the channel A and powered on and then returns to the channel A in the time window Tplife, it may require MTD. After the receiver 300 changes a tuning channel from the channel A into the channel B in the time window Tplife and then returns to the channel A in the time window Tplife, it may require MTD. After the receiver 300 is powered off in the channel A in the in the time window Tplife and powered on and then, returns to the channel A in the time window Tplife, it may require MTD.

When MTD is required, the transmitter 200 may continuously transmit the MTD in the time window Tplife, so as to allow a TDO relating to the MTD to be re-executed. A transmission period Pmtd of MTD may be set in consideration of a time for power on/off and a time at which a channel change occurs.

Moreover, FIG. 45 illustrates a case of when a TDO action occurs one time at a Taction time in the time window Tplife. In this case, the transmitter 200 may configure MTD having the same format as ATD and then, transmit them in the time window Tp1. Additionally, the transmitter 200 may configure MTD having a format in which a specific additional behavior is added to ATD and then, transmit them. In a time window Tp2 after the TDO action occurs, the transmitter 200 may configure MTD having the same format as triggering data corresponding to the TDO action, and then transmit them, or may configure MTD having a format in which a specific additional behavior is added to triggering data corresponding to the TDO action, and then transmit them.

Figure 46:
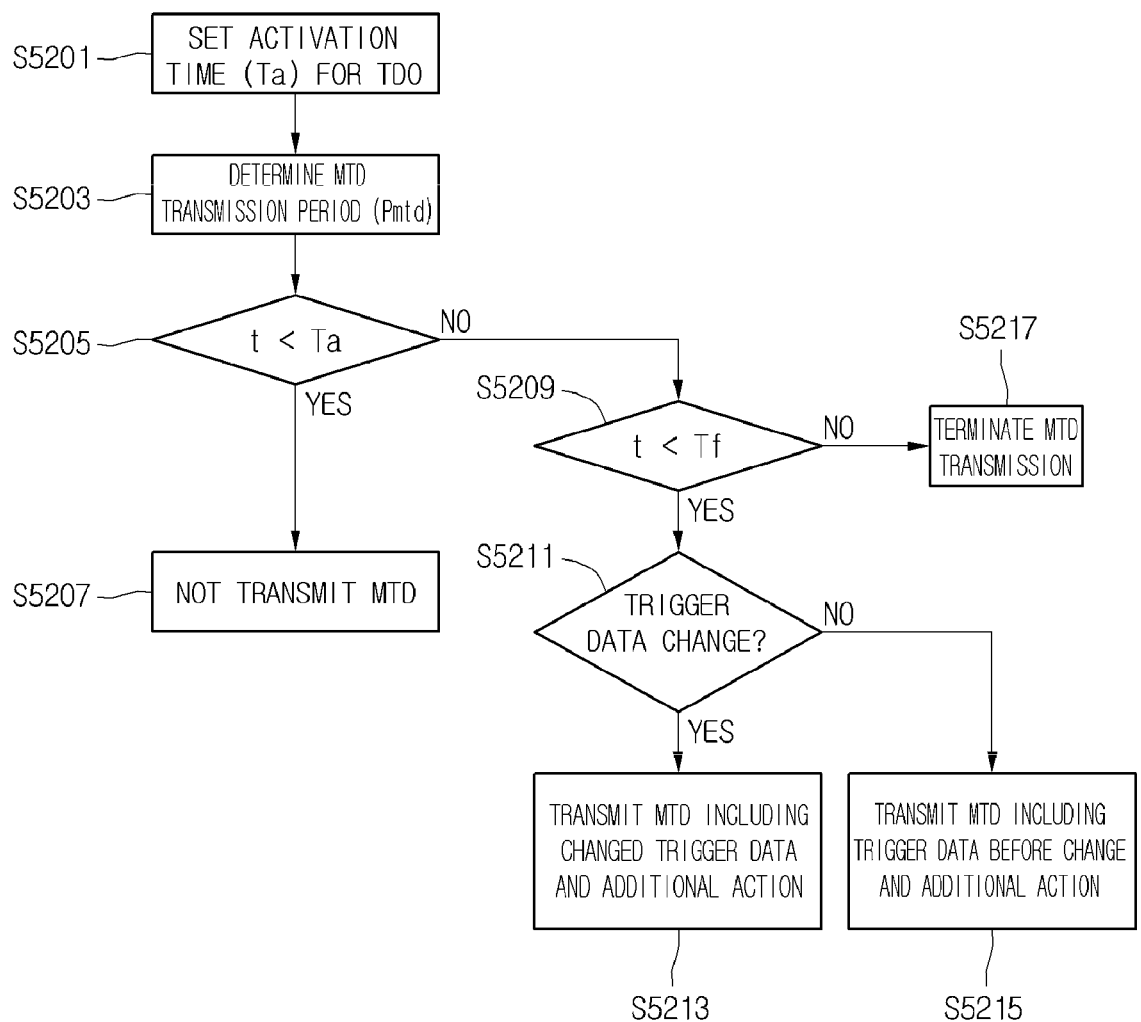
FIG. 46 is a flowchart illustrating a maintenance triggering data transmitting method according to an embodiment of the present invention.

FIG. 46 is a flowchart illustrating a maintenance triggering data transmitting method according to an embodiment of the present invention.

A trigger transmission unit 220 sets an activation time Ta for TDO, i.e., a target object, in operation S5201.

The trigger transmission unit 220 determines a transmission period Pmtd of MTD for a target object in operation S5203. The transmission period Pmtd of MTD may be set to a predetermined value. Additionally, the transmission period Pmtd of MTD may be set in consideration of a channel change time of the receiver 300 or a time for power on/off of the receiver 300.

When the current system time t is prior to the activation time Ta of a target object in operation S5205, the trigger transmission unit 220 does not transmit MTD for the target object in operation S5207.

Moreover, when the current system time t is subsequent to the activation time Ta of the target object in operation S5205 and is prior to the termination time Tf of the target object in operation S5209, the trigger transmission unit 220 confirms a change of triggering data in operation S5211.

If the triggering data is changed, the trigger transmission unit 220 transmits the changed triggering data and maintenance triggering data including an additional action in operation S5213.

If the triggering data is not changed, the trigger transmission unit 220 transmits the triggering data prior to the change and maintenance triggering data including an additional action in operation S5215.

Moreover, when the current system time t is subsequent to the termination time Tf of the target object in operation S5209, the trigger transmission unit 220 terminates the transmission of the maintenance triggering data in operation S5217.

Figure 47:
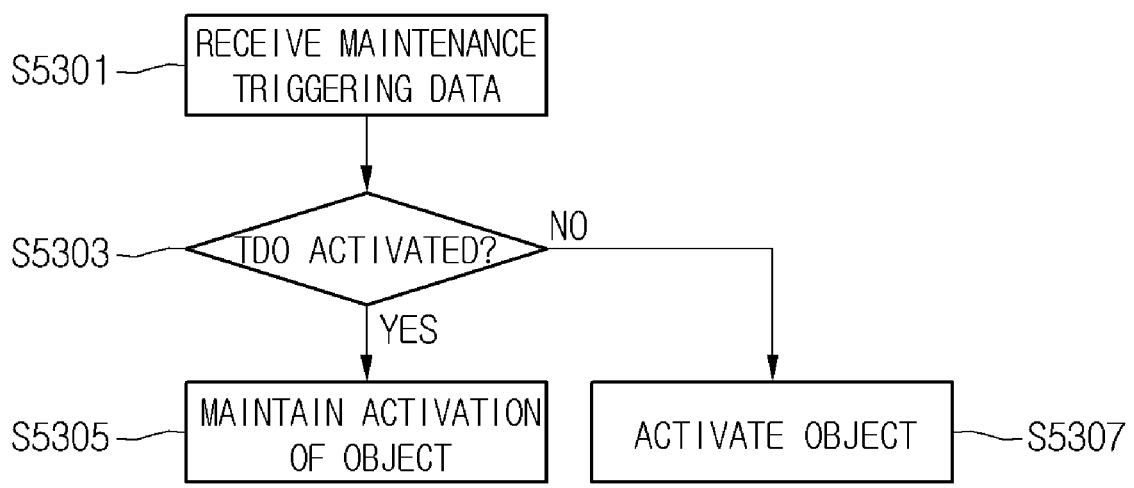
FIG. 47 is a view illustrating a maintenance trigger receiving method according to an embodiment of the present invention.

FIG. 47 is a view illustrating a maintenance trigger receiving method according to an embodiment of the present invention.

First, the trigger receiving unit 331 of the receiver 300 receives maintenance triggering data in operation S5301. The reception of maintenance triggering data may be performed according to the above-mentioned various embodiments.

If an object corresponding to a target service identifier of maintenance triggering data is activated already in operation S5303, the service manager 350 of the receiver 300 maintains the activation of the object in operation S5305.

If the object corresponding to a target service identifier of maintenance triggering data is not activated yet in operation S5303, the service manager 350 of the receiver 300 activates the object in operation S5307.

Hereinafter, referring FIGS. 48 to 50, a triggering data reception timing is described according to an embodiment of the present invention. Especially, a reception timing of preparation triggering data (PTD) is described.

According to an embodiment, triggering data including a trigger action set to a value corresponding to preparation may be preparation triggering data. A target service identifier and preparation trigger time for preparation may be obtained through parsing of preparation triggering data. The preparation triggering data triggers the preparation of an object corresponding to a target service identifier.

The transmitter 200 may provide preparation triggering data, i.e., a trigger for the following advance task, in order for a TDO requiring an advance task before an activation time.

When a task for downloading downloadable content linked to a TDO in advance by checking internet connection is required, preparation triggering data may be transmitted.

Additionally, when a TDO is required to be activated in the background because it takes a long time to generate a user interface, preparation triggering data may be transmitted. This may correspond to when decoding is requested in advance because there are many data such as picture data used for generating a user interface or it takes a long time to generate a user interface through metadata relating to a TDO. Or, this may correspond to when download of a web-based TDO is required in advance.

In order to check access availability with a server in advance or perform connection with a server in advance because a TDO to be activated is a TDO requiring a linkage with a server through a network, preparation triggering data may be transmitted.

The above advance tasks may be combined with each other.

Figure 48:
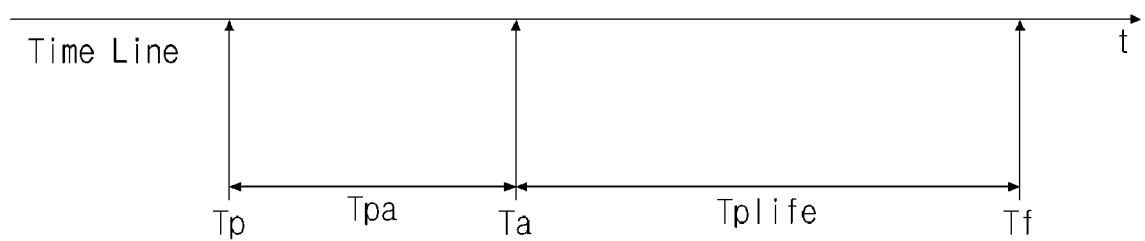
FIG. 48 is a timing diagram according to an embodiment of the present invention.

FIG. 48 is a timing diagram according to an embodiment of the present invention.

In FIG. 48, a preparation trigger time Tp indicates a time at which the preparation of a TDO is triggered by PTD. An activation time Ta indicates an activation time of a TDO and a termination time Tf indicates a termination time of a TDO.

A time window Tpa indicates a time between a preparation trigger time Tp and the activation time Ta and a time window Tplife indicates a time between the activation time Ta and the termination time Tf.

The time window Tpa may vary according to an advance task or a corresponding advance task.

When the receiver 300 receives preparation triggering data relating to content download, it may be better to download content as soon as possible. For this, the transmitter 200 may transmit preparation triggering data having a preparation trigger time set to 0. This is, when the receiver 300 receives the preparation triggering data having a preparation trigger time set to 0, it may start to download content immediately.

The receiver 300 may trigger preparation for a TDO when PTD for a TDO requiring download content for activation is not received or immediately before the activation time Ta. Although download content is necessary to activate a TDO but is not downloaded yet, the receiver 300 may not activate a TDO at the activation time Ta or may perform download of content after activation. If a TDO action includes such information, the receiver 300 may determine the activation of a TDO on the basis of the TDO action.

The transmitter 200 may set a preparation trigger time Tp for a TDO requiring UI generation or network check according to a type of the TDO. The transmitter 200 may continuously transmit PTD having a trigger time set to Tp in the time window Tpa.

The receiver 300 compares the preparation trigger time Tp and a current system time, and if the current system time is subsequent to the preparation time Tp, on receiving PTD, the receiver 300 may start to prepare a TDO so as to complete the preparation of the TDO as soon as possible before the activation time Ta.

Figure 49:
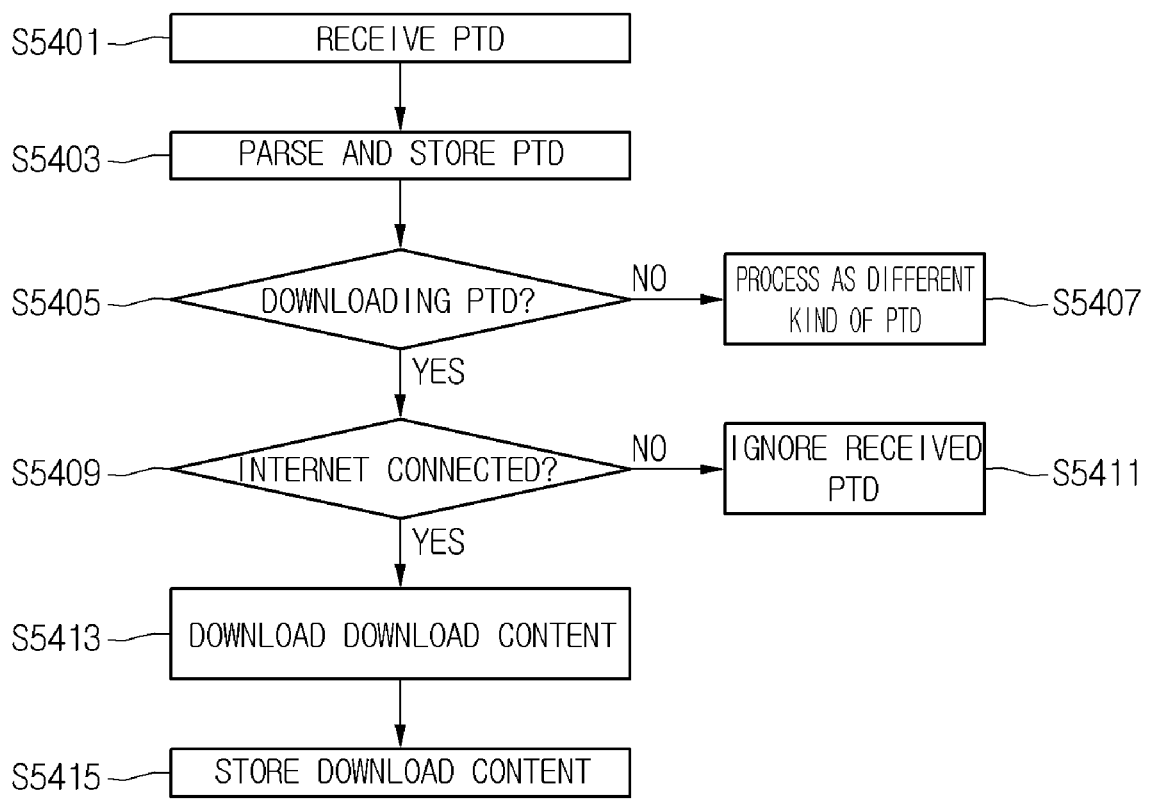
FIG. 49 is a flowchart illustrating a preparation trigger receiving method according to an embodiment of the present invention.

FIG. 49 is a flowchart illustrating a preparation trigger receiving method according to an embodiment of the present invention.

Especially, FIG. 49 illustrates a method of processing downloading preparation triggering data.

First, the trigger receiving unit 331 of the receiver 300 receives preparation triggering data in operation S5401, and parses and stores the received preparation triggering data in operation S5403. The reception of preparation triggering data may be performed according to the above-mentioned various embodiments.

If the received preparation triggering data is not the downloading preparation triggering data in operation S5405, the service manager 350 processes the received preparation triggering data as a different kind of preparation triggering data in operation S5407.

If the received preparation triggering data is the downloading preparation triggering data in operation S5405, the service manager 350 confirms internet connection in operation S5409.

If the internet connection is abnormal, the service manager 350 ignores the received PTD in operation S5411. In order to reduce the load for processing continuously received downloading PTD, the service manager 350 may not delete the received PTD while ignoring them. Once a TDO relating to the downloading PTD is terminated, the service manager 350 may delete the received PTD.

If the internet connection is normal, the service manager 350 starts to download content at the trigger time of the received preparation triggering data in operation S5413.

At this point, the service manager 350 activates a TDO corresponding to a target service identifier of the received preparation triggering data in the background so as to allow the activated TDO to download content. Additionally, the service manager 350 provides a target service identifier and downloading URL to a download manager, so that the download manager downloads content.

The activated TDO or download manager stores the downloaded content in operation S5415. Moreover, if the download manager downloads content, it stores the downloaded content in relation to a target service identifier.

FIG. 50 is a flowchart illustrating a preparation trigger receiving method according to another embodiment of the present invention.

Especially, FIG. 50 illustrates a processing method of PTD requiring the background activation of a TDO to prepare the TDO.

First, the trigger receiving unit 331 of the receiver 300 receives preparation triggering data in operation S5501, and parses and stores the received preparation triggering data in operation S5503. The reception of preparation triggering data may be performed according to the above-mentioned various embodiments for receiving triggering data. A target service identifier and preparation trigger time may be obtained through parsing of the received preparation triggering data.

When a current system time t is subsequent to a preparation trigger time Tp, the service manager 350 activates a TDO corresponding to a target service identifier of preparation triggering data in the background in operation S5507. That is, the reception time of PTD is prior to the preparation trigger time Tp, when the preparation trigger time Tp arrives, the service manager 350 activates a TDO in the background. Moreover, That is, when the reception time of PTD is subsequent to the preparation trigger time Tp, the service manager 350 activates a TDO in the background immediately. At this point, even when the tuning channel of the receiver 300 is changed, the service manager 350 does not terminate the TDO and maintains the background state.

When a current system time t is subsequent to an activation time Ta of a TDO, the service manager 350 changes a state of the TDO into the foreground in operation S5511. Especially, when the receiver 300 returns to a service channel of the TDO between the activation time Ta of the TDO and the termination time Tf of the TDO, the service manager 350 changes a state of the TDO into the foreground.

When the current system time t is subsequent to the termination time Tf of a TDO in operation S5513, the service manager 350 terminates the TDO in operation S5515. Especially, if there is a TDO that is activated in the background state and is not changed into the foreground state, the service manager 350 terminates the TDO. At this point, the service manager 350 is necessary to know a termination time of a corresponding TDO. For this, ATD may include a termination time of a corresponding TDO.

Thus, trigger may be classified as a preparation trigger, an activation trigger, and a maintenance trigger according to its characteristic.

That is, the preparation trigger is delivered to the receiver 300 prior to the activation trigger, and represents a pre-trigger that allows the receiver 300 to perform the preparation for a function performed through the activation trigger. The receiver 300 may perform a trigger action smoothly at an accurate time through the preparation trigger.

The activation trigger is a trigger for allowing a receiver to perform a specific function relating to a state change of a TDO such as execution or termination of a TDO at a specific time.

The maintenance trigger is a trigger for allowing the receiver 300 to instruct or guide a method of processing the trigger when the receiver 300 misses a trigger execution time designated by an activation trigger. In a broad sense, a maintenance trigger collectively means a trigger used for lifecycle management of a trigger.

Through a combination of three kinds of triggers, the receiver 300 completes preparation necessary for an action that an activation trigger indicates, prior to a triggering time that an activation trigger indicates, so that it may perform a natural action at an accurate time. Additionally, if the receiver 300 enters a corresponding channel immediately before/after a triggering point and thus cannot perform a trigger, this may be handled through a maintenance trigger. Accordingly, a trigger having such a configuration may provide a method of performing a trigger optically under various actual watching environments.

A method of identifying such three triggers and a cross-reference method between three triggers will be described later.

FIG. 51 is a flowchart illustrating a bitstream syntax of a trigger configured according to another embodiment of the present invention.

The trigger according to the syntax shown in FIG. 51 further includes a trigger type field trigge_type and a reference target trigger identifier field target_trigger_id_ref, compared to the trigger according to the syntax shown in FIG. 25.

The trigger type field trigge_type indicates a type of trigger. For example, a trigger where a value of the trigger type field is 0x00 may indicate "Reserved for future use". Triggers where values of trigger type fields are 0x01, 0x02, and 0x03 may indicate a preparation trigger, an activation trigger, and a maintenance trigger, respectively.

In order to distinguish the preparation trigger, the activation trigger, and the maintenance trigger, another method other than using a trigger type field may be used.

For example, according to an embodiment, triggering data may not have a trigger type field, and the preparation trigger, the activation trigger, and the maintenance trigger may be distinguished through a trigger_action field. That is, when the trigger_action field has a value corresponding to a preparation trigger, the receiver 300 may identify the received trigger as a preparation trigger. Additionally, when the trigger_action field has a value corresponding to an activation trigger, the receiver 300 may identify the received trigger as an activation trigger. When the trigger_action field has a value corresponding to a maintenance trigger, the receiver 300 may identify the received trigger as a maintenance trigger.

According to another embodiment, triggering data may not have a trigger type field, and a trigger_action field value corresponding to a maintenance trigger may be identical to a trigger_action field value corresponding to an activation trigger. Instead of this, the activation trigger may be identified as an activation trigger or a maintenance trigger according to whether a target TDO is activated. For example, if a target TDO of the received activation trigger is not activated yet, the receiver 300 may identify the received activation trigger as an activation trigger, and may activate the target TDO at a trigger time designated by the received activation trigger. On the other hand, if a target TDO of the received activation trigger is activated already, the receiver 300 may identify the received activation trigger as a maintenance trigger, and may maintain the activation of a target TDO.

According to another embodiment, triggering data may not have a trigger type field, and a trigger_action field value corresponding to a maintenance trigger may be identical to a trigger_action field value corresponding to an activation trigger. Instead of this, the activation trigger may be identified as an activation trigger or a maintenance trigger according to whether a trigger time elapses. For example, if a trigger time of the received activation trigger does not arrive yet, the receiver 300 may identify the received activation trigger as an activation trigger, and may activate the target TDO at a trigger time designated by the received activation trigger. On the other hand, if a trigger time of the received activation trigger arrives already, the receiver 300 may identify the received activation trigger as a maintenance trigger. At this point, if a target TDO of a trigger is not activated yet, the receiver 300 may activate a target TDO immediately. If a target TDO of the received activation trigger is activated already, the receiver 300 may maintain the activation of the target TDO.

If a trigger including a reference target trigger identifier field target_trigger_id_ref is a preparation trigger or a maintenance trigger, the reference target trigger identifier field may indicate a trigger identifier trigger_id of an activation trigger relating to a preparation trigger or a maintenance trigger. If a trigger including a reference target trigger identifier field target_trigger_id ref is activation trigger, the reference target trigger identifier field may indicate a trigger identifier trigger_id of a preparation trigger or a maintenance trigger. Through this, the receiver 300 may refer to an activation trigger when processing a preparation trigger or a maintenance trigger. Additionally, the receiver 300 may refer to a maintenance trigger when processing an activation trigger or a maintenance trigger. Through this, metadata necessary or used for actual trigger execution does not need to be all included in an activation trigger, and may be distributed and arranged through a preparation trigger. Through this, stream for activation trigger may be maintained to be compact as far as possible.

Thus, according to an embodiment, when three types of linked triggers have different trigger ids, the receiver 300 may recognize another trigger linked to one trigger through the reference target trigger identifier field.

Thus, according to another embodiment, when three types of linked triggers have the same id, the receiver 300 may recognize another trigger linked to one trigger through an id having the same value. For example, since the receiver 300 identifies a type of a trigger received through a trigger type field, a preparation trigger relating to an activation trigger may be recognized through a trigger id of each trigger.

The following describes the meaning of a trigger action field trigger action in a preparation trigger according to an embodiment of the present invention.

A preparation trigger where a value of the trigger action field is 0x00 may indicate "reserved for future use".

The preparation trigger where a value of the trigger action field is 0x00 may instruct the receiver 300 to prepare a content item for activation trigger in advance. At this point, the preparation may indicate download. The receiver 300 may download a content item designated by a preparation trigger in advance. This content item may be obtained through a broadcasting network or may be received through an IP network. In this case, content to be downloaded in advance may be designated by a service identifier field and a content linkage field of a preparation trigger. Additionally, a list of contents to be downloaded in advance may be designated by an SMT and an NRT-IT, or may be designated by a descriptor of a trigger. Additionally, location information of content to be downloaded in advance may be designated by an SMT, an NRT-IT, and an FDT, or may be designated by a descriptor of a trigger. Their specific methods will be described later.

The preparation trigger where a value of the trigger action field is 0x02 may instruct the receiver 300 to load a content item for activation trigger in advance. Through this, the receiver 300 may recognize that an execution time of a trigger action that the activation trigger instructs is imminent and may load a necessary content item in advance. In this case, content to be loaded in advance may be designated by a service identifier field and a content linkage field of a preparation trigger. Additionally, a list of contents to be loaded in advance may be designated by an SMT and an NRT-IT, or may be designated by a descriptor of a trigger. Additionally, information of content to be loaded in advance may be designated by an SMT, an NRT-IT, and an FDT, or may be designated by a descriptor of a trigger. Their specific methods will be described later.

The preparation trigger where a value of the trigger action field is 0x03 may instruct the receiver 300 to preset connection with a server. The receiver 300 may preset connection with a server designated by a preparation trigger. An address of a server to be connected may be designated through an internet location descriptor in a trigger.

The following describes the meaning of a trigger action field trigger action in an activation trigger according to an embodiment of the present invention.

An activation trigger where a value of the trigger action field is 0x00 may indicate "reserved for future use".

The activation trigger where a value of the trigger action field is 0x01 may instruct the receiver 300 to execute a target TDO of the activation trigger. According to an embodiment, on receiving the activation trigger where a value of the trigger action field is 0x00, the receiver 300 may execute the target TDO immediately. According to another embodiment, on receiving an activation trigger where a value of the trigger action field is 0x00, the receiver 300 displays a user that it may execute a target TDO, and on receiving a target TDO execution instruction from a user, the receiver 300 may execute the target TDO. An activation trigger where a value of the trigger action field is 0x02 may instruct the receiver 300 to terminate a target TDO of the activation trigger. On receiving the activation trigger where a value of the trigger action field is 0x02, the receiver 300 may return a resource or may not return a resource as terminating the target TDO according to an implementation of the receiver 300. In the case that a resource is not returned, if re-execution is performed in a short period, execution speed may be improved.

The activation trigger where a value of the trigger action field is 0x03 may instruct the receiver 300 to notify a user that a target TDO of the activation trigger may be executed. On receiving the activation trigger where a value of the trigger action field is 0x03, the receiver 300 may perform such notification only once or perform such notification in a period such as 5 min.

The activation trigger where a value of the trigger action field is 0x04 may instruct the receiver 300 to suspend a target TDO of the activation trigger. On receiving the activation trigger where a value of the trigger action field is 0x04, the receiver 300 may suspend an operation of the target TDO and return the target TDO to a standby state. Moreover, the receiver 300 may hide all UIs of the target TDO. "Suspend" is different from "termination" and a TDO suspended by an additional trigger or a user's instruction may be executed aging or terminated.

The activation trigger where a value of the trigger action field is 0x05 may instruct the receiver 300 to wake up a suspended target TDO designated by an activation trigger. A trigger instructing a suspended target TDO to wake up may be identical to a trigger instructing a target TDO to execute.

The activation trigger where a value of the trigger action field is 0x06 may instruct the receiver 300 to hide a target TDO of the activation trigger. On receiving the activation trigger where a value of the trigger action field is 0x06, the receiver 300 may hide the target TDO from a screen while maintaining an operation of the target TDO.

The activation trigger where a value of the trigger action field is 0x07 may instruct the receiver 300 to show a target TDO of the activation trigger. On receiving the activation trigger where a value of the trigger action field is 0x07, the receiver 300 may show the target TDO while maintaining an operation of the target TDO.

In an embodiment relating to activation information acquisition, while performing an action designated by a preparation trigger, the receiver 300 obtains from the received NRT-IT the information necessary for activation (e.g., execution, suspension, termination, notification to a user that a target TDO is executable, wake up, target TDO display, etc.) of a target TDO designated by a preparation trigger, stores the target TDO, and store the activation information together with the target TDO in a local memory. In addition to the case that the receiver 300 performs an action designated by a preparation trigger, the receiver 300 may obtain information for activation of a target TDO from the received NRT-IT, and store the activation information together with the target TDO in a local memory. The receiver 300 receiving an activation trigger may obtain from a local memory, activation information for a target TDO designated by the activation trigger, and may activate the target TDO designated by the activation trigger by referring to the activation information.

In another embodiment relating to activation information acquisition, the receiver 300 receiving an activation trigger may obtain information for activation of a target TDO from the received NRT-IT, and may activate the target TDO designated by the activation trigger by referring to the activation information.

The following describes the meaning of a trigger action field trigger action in a maintenance trigger according to an embodiment of the present invention.

The maintenance trigger where a value of the trigger action field is 0x00 may indicate "reserved for future use".

The maintenance trigger where a value of the trigger action field is 0x01 may instruct the receiver 300 to execute a target TDO of the maintenance trigger immediately. On receiving the maintenance trigger where a value of the trigger action field is 0x01, the receiver 300 may execute the target TDO immediately if the target TDO is not executed yet, and maintain the execution of the target TDO if the target TDO is executed already. The receiver 300 may display to a user that the target TDO is executable immediately, and may execute the target TDO if a target TDO execution instruction is received from a user as an additional condition. When a TDO is continuously used in a specific time window, a corresponding TDO may be immediately executed and used through this action.

The maintenance trigger where a value of the trigger action field is 0x02 may instruct the receiver 300 to be ready to execute a target TDO of the maintenance trigger. On receiving the maintenance trigger where a value of the trigger action field is 0x02, the receiver 300 may execute the preparation of the target TDO immediately if the target TDO is not ready yet, and maintain the preparation of the target TDO if the target TDO is ready.

The maintenance trigger where a value of the trigger action field is 0x03 may instruct the receiver 300 to notify a user of TDO availability of the maintenance trigger. On receiving the maintenance trigger where a value of the trigger action field is 0x03, the receiver 300 may notify the target TDO availability immediately if the target TDO availability is not notified to a user yet, and maintain the notification of the target TDO availability if the target TDO availability is notified to a user already. The receiver 300 may perform such notification only once or perform such notification in a period such as 5 min.

The maintenance trigger where a value of the trigger action field is 0x04 may instruct the receiver 300 to unload all the related resources relating to the target TDO of the maintenance trigger. On receiving the maintenance trigger where a value of the trigger action field is 0x04, the receiver 300 may unload a corresponding resource immediately if all resources relating to the target TDO of the maintenance trigger are not unloaded and may maintain unloading of a corresponding resource when the unloading of the corresponding resource is performed already. Through this, if a designated TDO is not to be used for a while, this trigger returns all resources that a receiver uses for the designated TDO currently thereby not affecting the execution of another TDO to be used later. If a corresponding TDO is in execution, the receiver 300 terminates a target TDO and returns a resource.

The maintenance trigger where a value of the trigger action field is 0x05 may instruct the receiver 300 to terminate a target TDO of the maintenance trigger immediately. On receiving the maintenance trigger where a value of the trigger action field is 0x05, the receiver 300 may terminate the target TDO immediately if the target TDO is not terminated yet, and maintain the termination of the target TDO if the target TDO is terminated already. On receiving the maintenance trigger where a value of the trigger action field is 0x02, the receiver 300 may return a resource or may not return a resource as terminating the target TDO according to an implementation of the receiver 300. In the case that a resource is not returned, if re-execution is performed in a short period, execution speed may be improved.

The maintenance trigger where a value of the trigger action field is 0x06 may instruct the receiver 300 to ignore a trigger designated by the maintenance trigger.

The maintenance trigger where a value of the trigger action field is 0x07 may instruct the receiver 300 to continuously execute a target TDO of the maintenance trigger. On receiving the maintenance trigger where a value of the trigger action field is 0x07, the receiver 300 may maintain the execution of the target TDO if the target TDO is executed already, and may not execute the target TDO if the target TDO is not executed yet.

In an embodiment relating to maintenance information acquisition, while performing an action designated by a preparation trigger, the receiver 300 obtains from the received NRT-IT the information necessary for maintenance (e.g., immediate execution, notification to a user that a target TDO is executable, resource return, termination, ignorance, execution continuity, etc.) of a target TDO designated by a preparation trigger, stores the target TDO, and store the maintenance information together with the target TDO in a local memory. In addition to the case that the receiver 300 performs an action designated by a preparation trigger, the receiver 300 may obtain information for maintenance of a target TDO from the received NRT-IT, and store the maintenance information together with the target TDO in a local memory. The receiver 300 receiving a maintenance trigger may obtain from a local memory, maintenance information for a target TDO designated by the maintenance trigger, and may maintain the target TDO designated by the maintenance trigger by referring to the maintenance information.

In another embodiment relating to maintenance information acquisition, the receiver 300 receiving a maintenance trigger may obtain information for maintenance of a target TDO from the received NRT-IT, and may maintain the target TDO designated by the maintenance trigger by referring to the maintenance information.

The following describes the meaning of a trigger time field trigger_time in a preparation trigger according to an embodiment of the present invention.

A delivery time of a preparation trigger may be greatly ahead of a delivery time of an activation trigger. The delivery trigger may provide approximate time information on a future triggering time. Accordingly, it may be considered that the time information on a preparation trigger is set to the UTC time instead of referencing a PCR.

The trigger time of a preparation trigger may indicate at least one of start time, end time, and scheduled activation time.

First, the trigger time of a preparation trigger may indicate the action start time of a preparation trigger. For example, when the preparation trigger instructs the receiver 300 to download content items for activation trigger in advance, the trigger time may indicate the start time of download.

The trigger time of a preparation trigger may indicate a deadline at which a preparation trigger action is to be terminated. In this case, an action of a preparation trigger needs to be terminated until a trigger time of the preparation trigger so that an activation trigger linked to the preparation trigger is processed normally. Accordingly, the receiver 300 starts an action of a preparation trigger so that the action of the preparation may be terminated before a trigger time of the preparation trigger.

Moreover, the trigger time of the preparation trigger may indicate a scheduled activation time. That is, the transmitter 200 may provide to the receiver 300 an approximately scheduled triggering time of the activation trigger linked to the preparation trigger. In this case, an actual accurate timing may be provided through a trigger time of an activation trigger.

Thus, the trigger time of the preparation trigger may indicate a time window of a preparation action to secure the timely activation of a target TDO designated by a preparation trigger, other than providing an accurate performance time of a preparation trigger.

Moreover, if the preparation trigger does not include a trigger time, the receiver 300 may perform a preparation trigger immediately.

The following describes the meaning of a trigger time field trigger_time in a maintenance trigger according to an embodiment of the present invention.

A maintenance trigger may be delivered after the triggering time of an activation trigger. Since the maintenance trigger may be seen as providing a processing method for a corresponding trigger, the trigger time of a maintenance trigger may require lower timing accuracy than the trigger time of an activation trigger. Accordingly, it may be considered that the time information on a maintenance trigger is set to the UTC time instead of referencing a PCR.

The trigger time of a maintenance trigger may indicate one of start time and end time.

The trigger time of a maintenance trigger may indicate a time at which an action of a maintenance trigger starts. If a current system time is subsequent to a trigger time of a received maintenance trigger, the receiver 300 may perform an action of a maintenance trigger immediately. If a trigger time such as start time is not designated in a maintenance trigger, the receiver 300 may recognize that execution time is over and may execute an action of a maintenance trigger immediately.

The trigger time of a maintenance trigger may indicate an end time at which an action of a maintenance trigger ends. In this case, If a current system time is subsequent to a trigger time of a received maintenance trigger, a corresponding trigger is not valid and the receiver 300 is not supposed to perform a designated action. If the end time is not designated, the receiver 300 may regard a valid time of a corresponding trigger as infinite.

Therefore, the trigger time of a maintenance trigger may designate a time window in which an action of a maintenance trigger is performed.

A content item designating method for a preparation trigger and an activation trigger according to various embodiments of the present invention will be described.

In an embodiment for content item designation, the transmitter 200 may designate a content item for a preparation trigger and an activation trigger as an identifier for identifying a target TDO of a trigger. As described above, an identifier for identifying a target TDO of a trigger may correspond to a combination of a service_id_ref field and a content linkage field.

As described above, the transmitter 200 may provide location information of a content item designated as a TDO identifier through an SMT, an NRT-IT, and an FDT. In more detail, the transmitter 200 provides information on a service channel corresponding to a service_id_ref field in a trigger through an SMT. Information on the signaling channel may be provided through information on a destination address and a destination port in an SMT. Moreover, the transmitter 200 provides a list of content items belonging to a service corresponding to the service_id_ref field through an NRT-IT. A list of content items may be provided through a list of content_linkage in an NRT-IT. The transmitter 200 provides an FDT including information on at least one file for each content item through a service channel corresponding to the service_id_ref field in a trigger. Information on each file may further include TOI and Content-Location fields.

In another embodiment for content item designation, the transmitter 200 may designate a list of content items for a preparation trigger and an activation trigger as in a form of a descriptor. The content item descriptor may be included in the trigger_descriptor( ) field of a trigger. The transmitter 200 may designate a list of content items for a preparation trigger and an activation trigger through a content item descriptor together with a target TDO identifier, and may designate the list only through a content item descriptor instead of designating the list through a target TDO identifier. One example of such a descriptor is described with reference to FIG. 52.

FIG. 52 is a view illustrating a syntax of a content item descriptor according to an embodiment of the present invention.

As shown in FIG. 52, the content item descriptor includes a descriptor tag field descriptor_tag, a descriptor length field descriptor_length, a service count field service_count, a service identifier field service_id, a content item count field content_item_count, and a content linkage field content linkage.

The descriptor tag field descriptor_tag may be an 8-bit unsigned integer to distinguish this descriptor as a content item descriptor.

The descriptor length field descriptor_length field may be an 8-bit unsigned integer to define the length from a field immediately following this field to the end of a content item descriptor.

The service count field service_count indicates the number of services included in a content item descriptor. The service identifier field service_id indicates the identifier of a service included in a content item descriptor. Accordingly, the content item descriptor may include a plurality of service identifier fields as many as the number corresponding to a service count field.

The content item count field content_item_count indicates the number of content items for a service corresponding to the service identifier field service_id. The content linkage field content_linkage indicates the identifier of a content item. Accordingly, the content item descriptor may include a plurality of content linkage fields as many as the number corresponding to a content item count field in relation to each service.

Such a method may be used when a content item used in a trigger is transmitted in an NRT format, and at this point, each content item may be uniquely identified in a combination of an NRT Service ID and a Content linkage value. In the same manner as in the previous embodiment, the transmitter 200 may provide location information of a content item designated as a TDO identifier through an SMT, an NRT-IT, and an FDT.

In another embodiment for content item designation, the transmitter 200 may designate a list of content items for a preparation trigger and an activation trigger as in a form of a descriptor. The transmitter 200 may designate contents transmitted by using such an internet location descriptor through a broadcast network and an IP network as a contend item for a trigger. The internet location descriptor may be included in the trigger_descriptor( ) field of a trigger. The transmitter 200 may designate a list of content items for a preparation trigger and an activation trigger through an internet location descriptor together with a target TDO identifier, and may designate the list only through an interne location descriptor instead of designating the list through a target TDO identifier. One example of such an internet location descriptor is described with reference to FIG. 53.

FIG. 53 is a view illustrating a syntax of an internet location descriptor according to an embodiment of the present invention.

As shown in FIG. 53, the internet location descriptor includes a descriptor tag field descriptor_tag, a descriptor length field descriptor_length, a URL count field URL_count, a URL length field URL_length, and a URL( ) field.

The descriptor tag field descriptor_tag may be an 8-bit unsigned integer to distinguish this descriptor as an internet location descriptor. For example, this field may have a value of 0xC9.

The descriptor length field descriptor_length may be an 8-bit unsigned integer to define the length from a field immediately following this field to the end of an internet location descriptor.

The URL count field URL_count may be a 5-bit unsigned integer to indicate the number of pairs of URL length fields and URL fields in an internet location descriptor. That is, the internet location descriptor includes a plurality of URL length fields whose number corresponds to a URL count field and a plurality of URL fields whose number corresponds to a URL count field.

The URL length field URL_length may be an 8-bit unsigned integer to indicate the length of the URL( ) field immediately following this field.

The URL( ) field is a character string indicating a Uniform Reference Locator (URL). When the URL( ) field indicates Relative URL or absolute tag URI, a corresponding URL may be seen as content transmitted only through a FLUTE of an NRT. In other cases, a corresponding URL may be seen as a content only transmitted through a broadcast network, a content transmitted through an IP network, or a content transmitted through both a broadcast network and an IP network.

Figure 54:
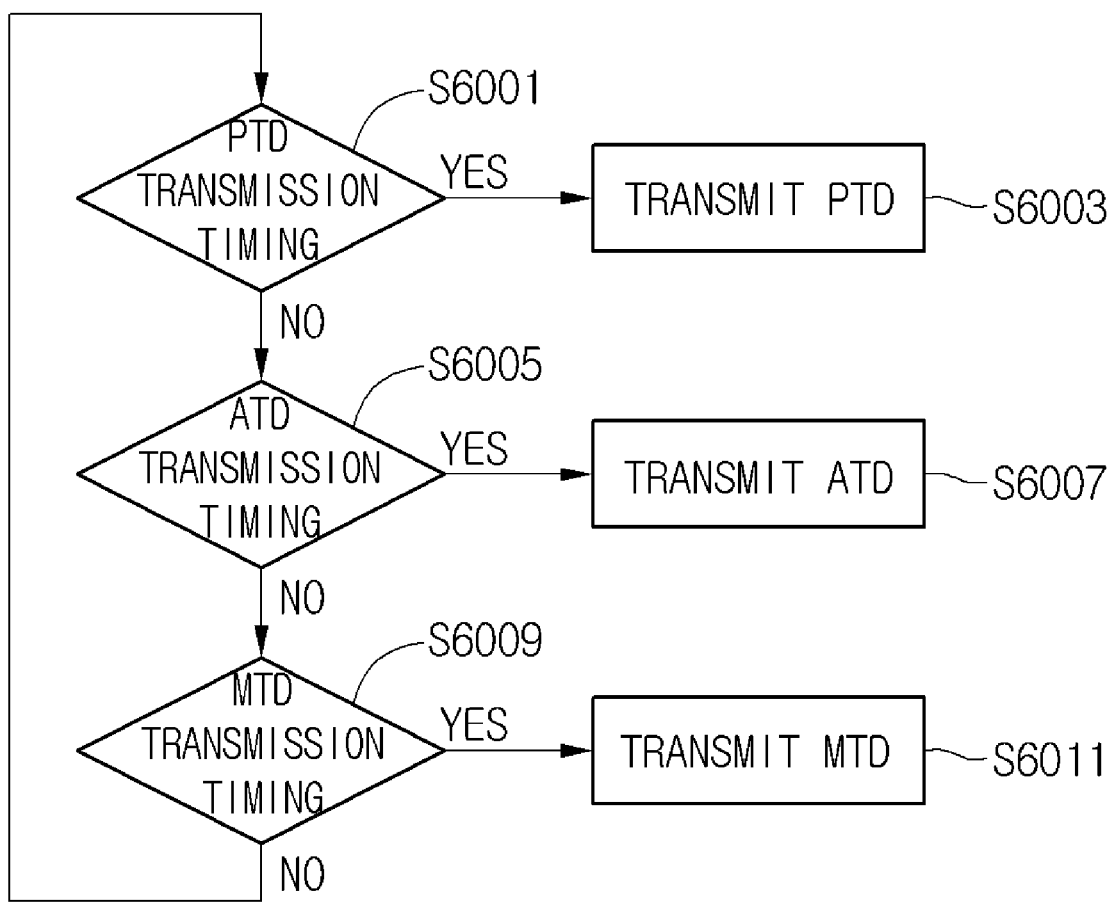
FIG. 54 is a flowchart illustrating a trigger transmitting method according to another embodiment of the present invention.

FIG. 54 is a flowchart illustrating a trigger transmitting method according to an embodiment of the present invention.

The transmitter 200 transmits a preparation trigger in operation S6003 at the transmission timing of the preparation trigger in operation S6001, transmits an activation trigger in operation S6007 at the transmission timing in operation S6005, and transmits a maintenance trigger S6011 at the transmission timing of the maintenance trigger in operation S6009.

A trigger may be transmitted through a PSIP table or a synchronized data stream.

Trigger transmission through a PSIP table may be understood through FIG. 37, FIG. 41, and FIG. 42. For example, according to an embodiment, a trigger may be included in a stream whose PSIP Base PID is 0x1FF and transmitted. In this case, the table ID of a trigger table may be uniquely allocated to be distinguished from another table. According to another embodiment, a trigger may be allocated through a Master Guide Table, and delivered through a stream corresponding to an identified PID. In this case, all tables in a corresponding stream may be regarded as a trigger table.

Trigger transmission based on a synchronized data stream may be understood through FIG. 38, FIG. 39, and FIG. 40. Since the synchronized data stream provides accurate synchronization with another stream through a PTS, the trigger transmission based on synchronized data stream may provide higher timing accuracy than trigger transmission through a PSIP table.

In relation to a preparation trigger, an activation trigger, and a maintenance trigger, according to an embodiment, a preparation trigger, an activation trigger, and a maintenance trigger may be included in one stream and transmitted.

According to another embodiment, the transmitter 200 may deliver a preparation trigger through a PSIP table, and may transmit an activation trigger and a maintenance trigger through a synchronized data stream. A time at which a preparation trigger is provided may be considerably earlier than a time at which an activation trigger needs to be performed. According to an embodiment, a time at which a preparation trigger is provided may be a few hours, a few days, or a few weeks earlier than a time at which an activation trigger needs to be performed. A preparation trigger may be required for the receiver 300 to download an activation trigger related content item in advance through a broadcast network or an IP network. Due to characteristics of such a preparation trigger, a preparation trigger may not require timing accuracy in a scene unit unlike an activation trigger. Accordingly, in order to secure timing accuracy in a scene unit of an activation trigger, a method of maintaining a stream containing an activation trigger to be compact if possible may be considered. For this purpose, the transmitter 200 may separate a preparation trigger as an additional table through an existing PSIP signaling stream and deliver it. A table containing a preparation trigger may include a preparation trigger and be delivered through PSIP stream, and an additional table id may be allocated to a preparation trigger.

According to another embodiment, the transmitter 200 may transmit a preparation trigger and a maintenance trigger in a PSIP table format, and may transmit an activation trigger on the basis of a synchronized data stream. Since a maintenance trigger serves to instruct or guide the receiver missing a trigger time about a method of dealing with a corresponding trigger, it may not be required to be performed accurately at a specific time. Accordingly, a maintenance trigger may require lower timing accuracy than an activation trigger. Accordingly, a method of separating a maintenance trigger from an activation trigger and transmitting it with a preparation trigger may be considered. In this case, the transmitter 200 may bind a preparation trigger and a maintenance trigger as one table and transmit the one table.

Moreover, the transmitter 200 may allocate different table IDs to a table for preparation trigger and a table for maintenance trigger and may transmit a preparation trigger and a maintenance trigger through the two tables distinguished by the different table IDs.

Then, an operating method of a receiver 300 according to an embodiment of the present invention will be described with reference to FIGS. 55 to 57.

Figure 55:
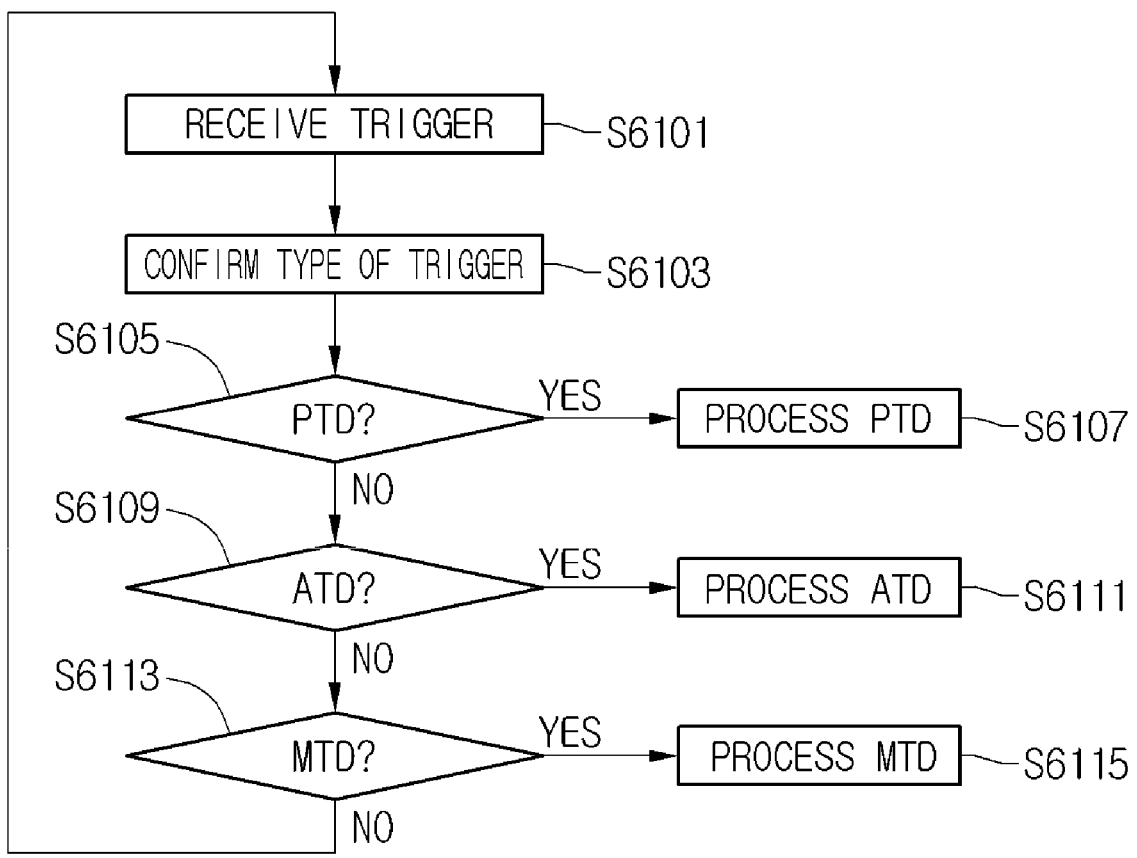
FIG. 55 is a flowchart illustrating an operating method of a receiver according to an embodiment of the present invention.
Figure 56:
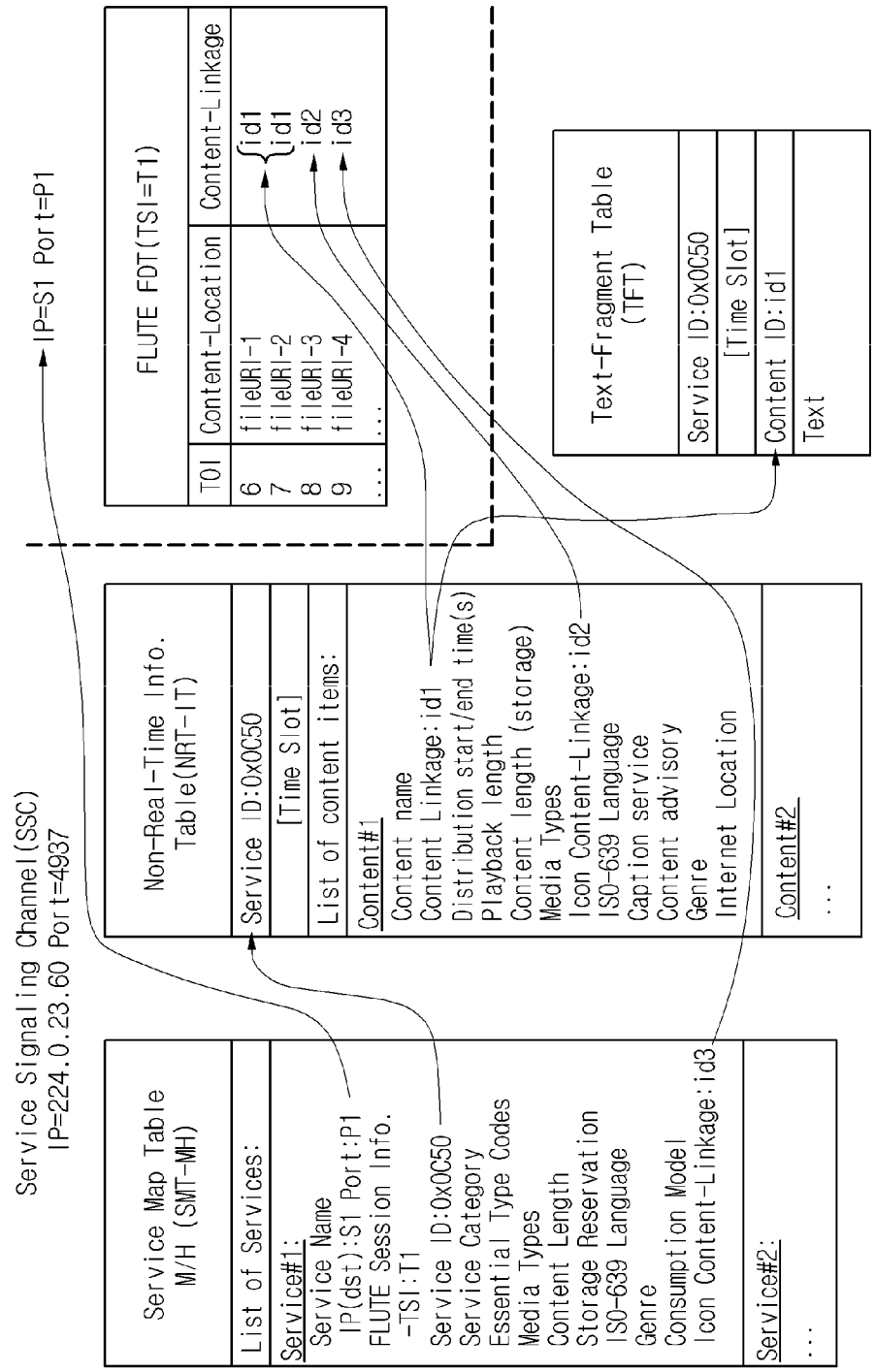
FIG. 56 is a view illustrating a method of a receiver to recognize location information of a content item according to an embodiment of the present invention.

FIG. 55 is a flowchart illustrating an operating method of a receiver according to an embodiment of the present invention.

The receiver 300 receives a trigger in operation S6101. Especially, receiver 300 may receive a trigger in the same manner as shown in FIGS. 36 to 42.

The receiver 300 confirms a type of the received trigger in operation S6103. The receiver 300 may confirm a type of the received trigger in a manner described above. For example, the receiver 300 may confirm a type of a trigger through at least one of a trigger type field trigge_type and a trigger action field trigger_action in the trigger. Additionally, the receiver 300 may confirm a type of a trigger on the basis of whether a target TDO is activated or whether a trigger time elapses.

If the received trigger is a preparation trigger in operation S6105, the receiver 300 processes the received preparation trigger in operation S6107. The processing of the preparation trigger by the receiver 300 was described in relation to a trigger action field of a preparation trigger. A state of a TDO may be changed through such processing of a preparation trigger.

According to an embodiment, when a preparation trigger triggers downloading of a content item, the receiver 300 recognizes content item location information through an SMT, an NRT-IT, and an FDT, and downloads a content item through the recognized location information. In more detail, the receiver 200 may obtain channel information corresponding to a service identifier in the preparation trigger, from an SMT. At this point, the channel information may include an IP address and a port number. Moreover, the receiver 200 may obtain a list of content linkages belonging to a service corresponding to a service identifier in the preparation trigger. The receiver 200 may recognize a content linkage field in a trigger, a content linkage field in a content_items_descriptor ( ) field in a trigger, or a plurality of content_linkage fields corresponding to a service identifier in an NRT-IT, as an identifier of a content item to be downloaded. The receiver 200 may recognize the content locations corresponding to content identifiers in an NRT-IT or content locations corresponding to a content identifier in a trigger by using a FLUTE FDT received through the IP address and port number of an SMT. If an NRT_it has the internet location information of a content item, the receiver 200 may recognize the location information of a content item through an NRT_IT.

According to another embodiment, when a preparation trigger triggers downloading of a content item, the receiver 300 may recognize the location information of a content item to be downloaded from an internet location descriptor in the preparation trigger, and may download the content item through the recognized location.

Again, FIG. 55 will be described.

If the received trigger is an activation trigger in operation S6109, the receiver 300 processes the received activation trigger in operation S6111. The processing of the activation trigger by the receiver 300 was described in relation to a trigger action field of an activation trigger. A state of a TDO may be changed through such processing of an activation trigger.

If the received trigger is a maintenance trigger in operation S6113, the receiver 300 processes the received maintenance trigger in operation S6115.

Figure 57:
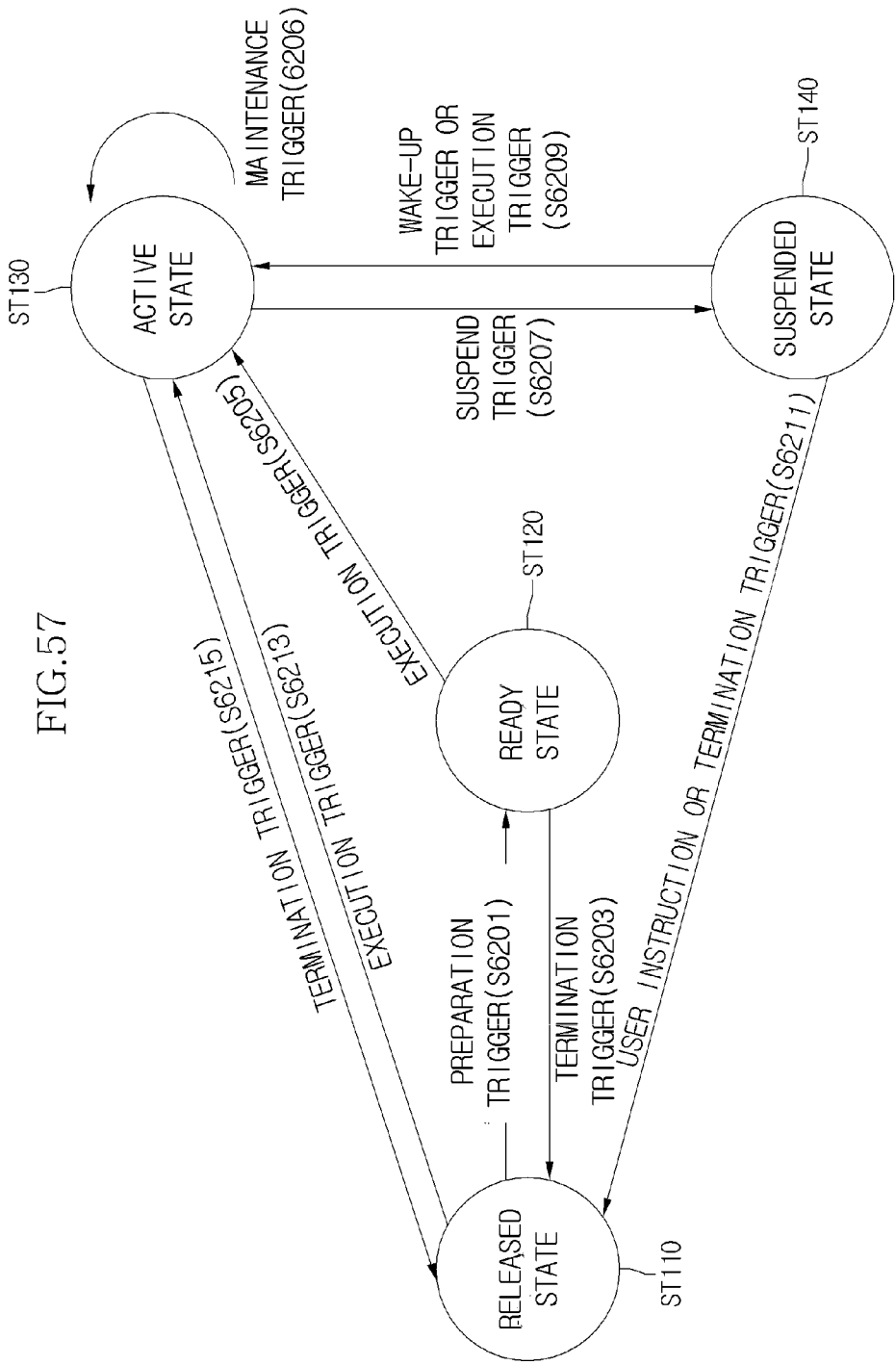
FIG. 57 is a TDO state transition diagram illustrating a method of processing a trigger by a receiver according to an embodiment of the present invention.

FIG. 57 is a TDO state transition diagram illustrating a method of processing a trigger by a receiver according to an embodiment of the present invention.

As shown in FIG. 57, a target TDO is in one of a released state ST110 such as a non-ready state, a ready state ST120, an active state ST130, and a suspended state ST140.

If the receiver 300 receives a preparation trigger and a target TDO of the preparation trigger is in the released state ST110, it prepares the target TDO and puts its state in the ready state ST120 in operation S6201.

If the receiver 300 receives a termination trigger where a value of a trigger action field is 0x02 and a target TDO of the termination trigger is in the ready state ST120, it terminates the target TDO and puts its state in the relapse state ST110 in operation S6203.

If the receiver 300 receives an execution trigger where a value of a trigger action field is 0x01 and a target TDO of the execution trigger is in the ready state ST120, it executes the target TDO and puts its state in the active state ST130 in operation S6205.

If the receiver 300 receives a maintenance trigger where a value of a trigger action field is 0x01 and a target TDO of the maintenance trigger is in the active state ST120, it maintains its state as the active state ST130 in operation S6206.

If the receiver 300 receives a suspension trigger where a value of a trigger action field is 0x04 and a target TDO of the suspension trigger is in the active state ST130, it suspends the target TDO and puts its state in the suspended state ST140 in operation S6207.

If the receiver 300 receives an additional trigger such as a wake up trigger or an execution trigger or a target TDO of the additional trigger is in the suspended state ST140, it executes the target TDO again and puts its state in the active state ST130 in operation S6209.

If the receiver 300 receives a termination trigger where a value of a trigger action field is 0x02 and a target TDO of the termination trigger is in the suspended state ST140, it terminates the target TDO and puts its state in the relapse state ST110 in operation S6211. Additionally, when the receiver 300 receives a user instruction such as an instruction for getting out of a channel relating to a target TDO, it may terminate the target TDO and puts its state in the released state ST110.

If the receiver 300 receives an execution trigger where a value of a trigger action field is 0x01 and a target TDO of the execution trigger is in the released state ST110, it executes the target TDO and puts its state in the active state ST130 in operation S6213.

If the receiver 300 receives a termination trigger where a value of a trigger action field is 0x02 and a target TDO of the termination trigger is in the active state ST130, it terminates the target TDO and puts its state in the released state ST110 in operation S6215.

Hereinafter, according to an embodiment of the present invention, a method of providing information on NRT service in linkage with an NRT service, a real time broadcast, and an internet network will be described.

As mentioned above, in an actual broadcast system, one broadcast program may include at least one application executed in linkage with a corresponding program, and such an application may be stored in the receiver 300 and executed through the above-mentioned NRT service receiving method.

However, since a PSIP table does not include information on an NRT service linked with a broadcast program, when the receiver 300 is to receive an NRT service linked with a broadcast program, an NRT-IT of a channel that a specific broadcast program belongs all needs to be parsed. Also, even when the receiver 300 receives the NRT-IT first to receive a content item of NRT service, it is difficult to identify a broadcast program linked with the content item. Additionally, since the PISP table does not include information on an internet network, the receiver 300 receives only a real time broadcast program, so that it is difficult to recognize related service transmitted through an internet network. Additionally, for the same reason as above, it is difficult for the receiver 300 to receive extended EPG on a specific real time broadcast program, which is transmitted through an internet network. Accordingly, a systematic linkage between a real time broadcast program, NRT service, and an internet network is required.

According to an embodiment of the present invention, the transmitter 200 may include NRT service information such as an NRT or a TDO or information used for linking with an internet network in a PSIP table corresponding to a specific channel or program, and then may transmit the PSIP table. Moreover, PSIP table information corresponding to specific real time broadcast channel information or program information may be included in an NRT service, and then transmitted.

Accordingly, the receiver 300 may receive a real time broadcast channel or program, and parses the PSIP table, so that it may selectively receive an NRT service linked with a specific broadcast program. Furthermore, the receiver 300 receives a real time broadcast channel or program, and parses the PSIP table, so that it may receive an NRT service linked with a specific broadcast channel or program, through an internet network. Then, the receiver 300 may receive NRT service to obtain PSIP table information on a broadcast program linkable with the NRT service and then, may provide it to a user.

According to an embodiment of the present invention, a descriptor providing information linked with a real time broadcast, for example, one of NRT service, preview information, extended EPG information, highlight information, and related internet portal information, may be included in one of PSIP tables and then, transmitted. According to an embodiment of the present invention, such a descriptor may be referred to as a link descriptor.

Additionally, according to an embodiment of the present invention, information on a broadcast program linkable with NRT service, for example, broadcast channel information or program information, may be included in one of an SMT and an NRT such as an NRT-IT and then, transmitted. According to an embodiment of the present invention, such a descriptor may be referred to as an event descriptor.

FIG. 58 is a view illustrating a syntax of a link descriptor link_descriptor according to an embodiment of the present invention. FIGS. 59 and 60 are views illustrating contents of fields included in a link descriptor.

As shown in FIG. 58, the link descriptor includes a descriptor tag field descriptor_tag, a descriptor length field descriptor_length, a link count field number_of_links, and a plurality of link data items. Each of the plurality of link data items includes a link type field link_type, a link media field link_media, an MIME type length field mime_type_length, an MIME type field mime_type, a descriptor length field description_length, a description field description, a link length field link_length, and a link byte field link_byte.

The descriptor tag field descriptor_tag may be an 8-bit unsigned integer to distinguish this descriptor as a link descriptor. For example, this field may have a value of 0xe8.

The descriptor length field descriptor_length may be an 8-bit unsigned integer to define the length from a field immediately following this field to the end of a link descriptor.

The link number field number_of_links may be an 8-bit unsigned integer to indicate the number of a plurality of link data items.

The link type field link_type indicates a type of a receivable related service on the basis of a link byte field in a link data item. For example, as shown in FIG. 44, the link type field may indicate type information of receivable specific service on the basis of a link byte field included in a link data item.

For example, a link data item having a link type field of 0X01 may relate to an HTML page of a broadcast program portal. A link data item having a link type field of 0x02 may relate to a thumbnail service of a broadcast program. A link data item having a link type field of 0x03 may relate to a Preview Clip service of a broadcast program. A link data item having a link type field of 0x04 may relate to an Extended EPG of a broadcast program. A link data item having a link type field of 0x05 may relate to a highlight service of a broadcast program. A link data item having a link type field of 0x06 may relate to a Multiview service of a broadcast program. Also, a link data item having a link type field of 0x07 may relate to a TDO service linkable to a broadcast program.

The link media field link_media may be an 8-bit unsigned integer indicating a transmission medium to receive related service on the basis of a link data item. For example, as shown in FIG. 60, when the link media field is 0x02, it indicates that related service receivable based on a link data item is receivable through NRT service. Additionally, when the link media field is 0x03, it indicates that related service is receivable through internet service.

The MIME type length field MIME_type_length may be an 8-bit unsigned integer that indicates the length of MIME type information indicating the MIME protocol type of a link byte field.

The MIME type field MIME_type may indicate the protocol type of a link byte field. The MIME type may indicate one type of text, multipart, massage, application, image, audio, and video, for example.

The description length field descriptor_length may be an 8-bit unsigned integer to indicate the length of a description field indicating detail information of a corresponding link.

The description field description may indicate detail information of a corresponding link.

The link length field link_length may be an unsigned integer to indicate the length of a link byte field.

The link byte field link_byte may be a field indicating data to receive the above-mentioned broadcast program related service. The link byte field may include identification information of contents receivable through a link medium. For example, as shown in FIG. 60, if the link medium is NRT service, the link byte field may include a service identifier and a content identifier service_id and content_linkage to receive NRT service. Additionally, if the link medium is internet service, the link byte field may include a uniform resource identifier (URL), i.e., internet address information, or URL information.

Figure 61:
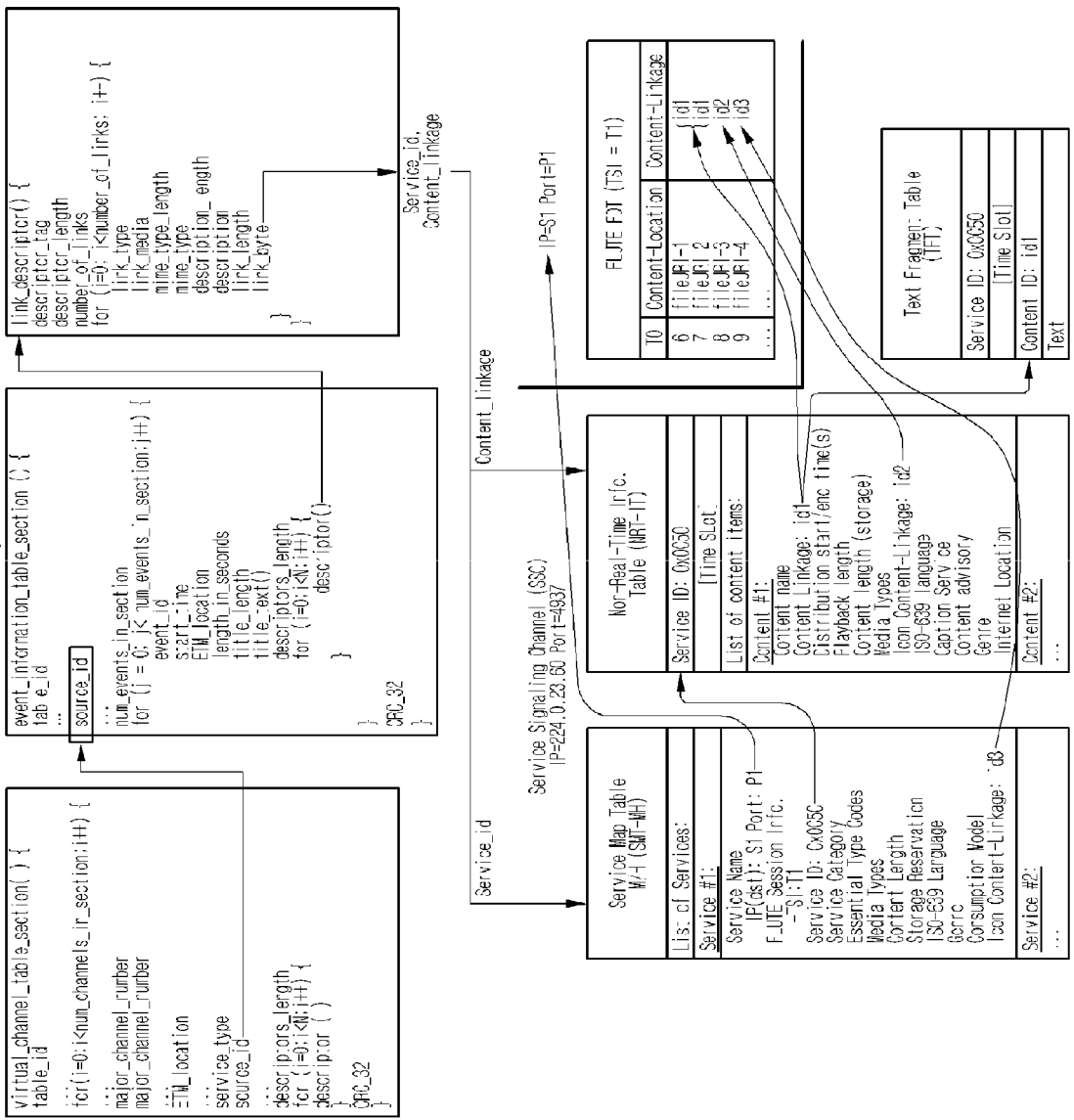
FIGS. 61 and 62 are views illustrating a linkage between each table when the link descriptor of FIG. 58 is included in a descriptor of an event information table (EIT) among PSIP tables according to an embodiment of the present invention.
Figure 62:
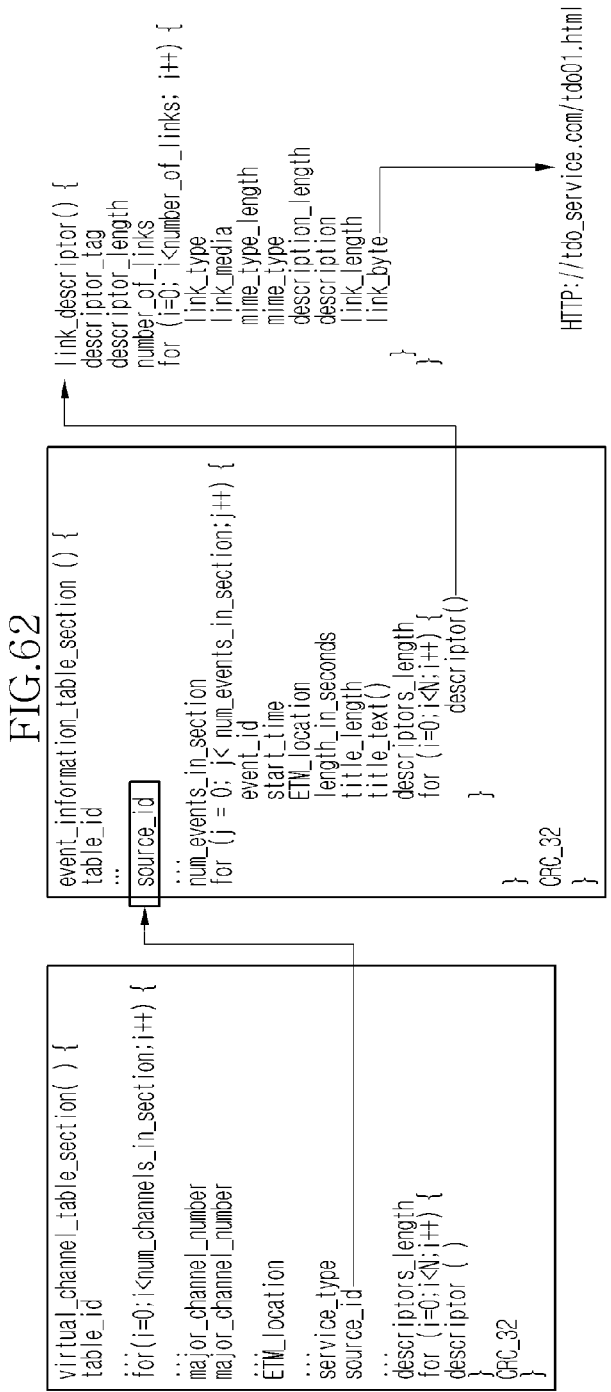

FIGS. 61 and 62 are views illustrating a linkage between each table when the link descriptor of FIG. 43 is included in a descriptor of an event information table (EIT) among PSIP tables according to an embodiment of the present invention.

As shown in FIG. 61, the link descriptor may be included in a descriptor loop of an EIT indicating broadcast program information and then, transmitted.

The EIT in addition to a VCT is included in a PSIP and then, transmitted. Since the VCT includes source_id corresponding to selected virtual channel number channel_number, the receiver 300 parses an EIT including the same source_id as the VCT to obtain information on each broadcast program provided from a corresponding virtual channel. Each broadcast program is identified by event_id Accordingly, the receiver 300 may extract a link descriptor from a loop including event_id of a specific broadcast program in an event loop in the parsed EIT, and may receive information linked to the specific broadcast program by using the extracted link descriptor through NRT service or an internet network.

For example, as shown in FIG. 61, if the link descriptor may include a service identifier service_id and a content identifier content_linkage of an NRT service linked to the specific broadcast program. In this case, the receiver 300 may recognize content item location information of the linked NRT service through an SMT, an NRT-IT, and an FDT, and downloads a content item through the recognized location information.

In more detail, the receiver 300 may obtain service signaling channel information corresponding to a service identifier included in a link byte field of a link descriptor, from an SMT. At this point, the service signaling channel information may include an IP address and a port number. Moreover, the receiver 300 may obtain a list of content indenters content linkage in a service corresponding to a service identifier included in a link byte field of a link descriptor, from an NRT_IT. The receiver 300 may recognize the identifier of a content item to be downloaded, which corresponds to a service identifier in an NRT_IT, through a content linkage field in a link byte field of a link descriptor. Then, the receiver 300 may recognize the locations of content item files corresponding to a content identifier in an NRT_IT from a FLUTE FDT received through the IP address and port number of an SMT. Accordingly, the receiver 300 may receive files configuring a content item of NRT service linked with a corresponding broadcast program by using a FLUTE FDT through a FLUTE session. Moreover, the receiver 300 may extract URL information of content items, for example, a URL list of files, linked with a broadcast program from an internet location descriptor described later in an NRT_IT, and based on the extracted list, may receive files configuring a content item of NRT service linked with a broadcast program through a network.

Furthermore, a link descriptor may include at least one of portal HTML page access information relating to a broadcast, Thumbnail reception information, Preview Clip reception informationz Extended EPG reception information, highlight reception information, Multiview reception information, and linkable TDO reception information, in addition to NRT service linked to a broadcast program. A link descriptor may include information to receive such reception information through NRT service or an internet network.

Additionally, as shown in FIG. 62, a link byte field of a link data item in a link descriptor may include internet address information (URL) to receive a service linked to a specific broadcast program. In this case, the receiver 30 may access an internet site according to internet address information in the link byte field, and may receive a broadcast program related service through an internet network. The broadcast program related service received through an internet network may include at least one of NRT service, a thumbnail, preview clip, an extended EPG, a highlight, a multiview, and TOD service.

In more detail, the receiver 300 may obtain an EIT corresponding to a selected virtual channel, obtain a link descriptor from a descriptor loop of an event loop (i.e., a for loop including event_id) corresponding to a selected broadcast program in the obtained EIT, extract an internet address from the obtained link descriptor, and receive a service linked to a selected broadcast program in access to an internet network according to the extracted internet address. Accordingly, a broadcast service provider may provide a service linked with a specific broadcast program through a real time broadcast. Moreover, the receiver 300 may access an internet network by using internet address information, and may receive a service linked with a corresponding broadcast program through an internet network.

Figure 63:
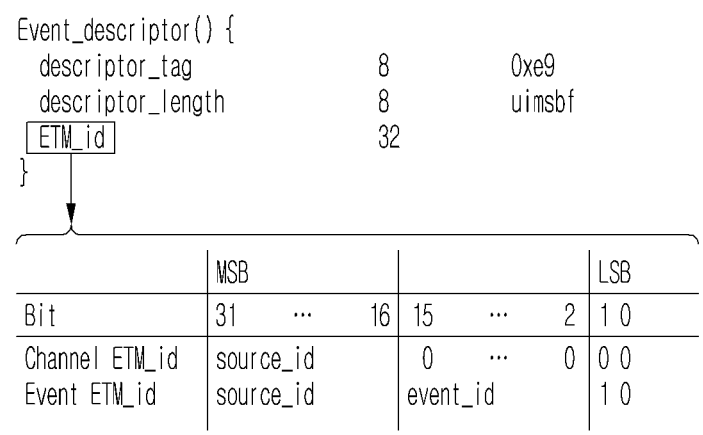
FIG. 63 is a view illustrating a syntax of an event descriptor (Event_descriptor) and contents of fields in the event descriptor according to an embodiment of the present invention.

FIG. 63 is a view illustrating a syntax of an event descriptor (Event_descriptor) and contents of fields in the event descriptor according to an embodiment of the present invention.

As shown in FIG. 63, the event descriptor includes a descriptor_tag field, a descriptor_length field, and an ETM_id field.

The descriptor_tag field may be an 8-bit unsigned integer to distinguish this descriptor as a link descriptor. For example, this field may have a 0xe8 value.

The descriptor_length field may be an 8-bit unsigned integer to define the length from a field immediately following this field to the end of the link descriptor.

The ETM_id field may be a 32-bit variable indicating broadcast channel information or broadcast program information linked with an NRT service including the event descriptor. The receiver 200 inserts a specific channel and program information into the event descriptor by using the ETM_id field, and includes the event descriptor in an NRT table signaling NRT service to transmit it. Additionally, the ETM_id field corresponds to ETM_id in an extended text table (ETT) providing additional information of a broadcast program and is used to provide additional information of a broadcast program.

In more detail, as shown in FIG. 63, when the ETM_id field includes broadcast channel information, it may be classified as channel ETM_id. In this case, the first 16 bits from the most significant bit (MSB) correspond to source_id of a corresponding virtual channel to identify a broadcast channel, and the remaining bits may be 0. Accordingly, the receiver 300 matches source_id with VCT of PSIP, so that it may identify a linkage channel of an NRT service including the event descriptor.

Additionally, when the ETM_id field includes all of broadcast program information and broadcast channel information, the least significant bit (LSB) is configured with 10. The first 16 bits from the MSB correspond to source_id of a corresponding channel and the 14 bits after that correspond to event_id of a corresponding program. Accordingly, the receiver 300 identifies a linkage channel of NRT service including the event descriptor and also identifies a broadcast program linked with NRT service by matching event_id with an EIT of PSIP.

Figure 64:
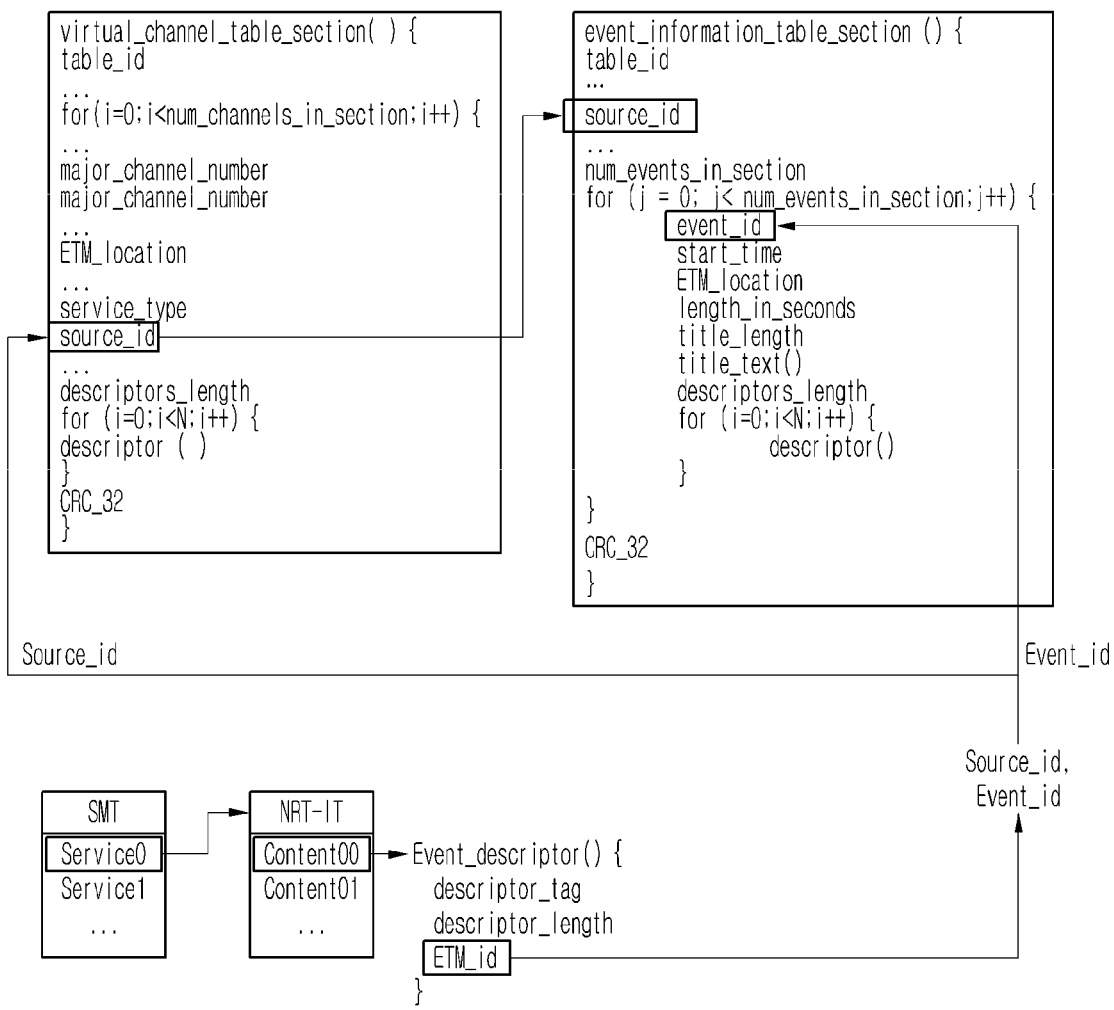
FIG. 64 is a view illustrating a method of identifying a linkage program through an event descriptor according to an embodiment of the present invention.

FIG. 64 is a view illustrating a method of identifying a linkage program through the event descriptor according to an embodiment of the present invention.

For example, as shown in FIG. 64, the service manager 350 of the receiver 300 identifies service_id through an SMT and receives and parses a content item of an NRT service corresponding to service_id identified by an NRT-IT.

Then, when the service manager 350 of the receiver 300 finds a specific part of the parsed NRT-IT, for example, the event descriptor (Event_descriptor) in a content loop, it may obtain ETM_id including broadcast program information linked with NRT service from the found event descriptor.

According to an embodiment of the present invention, the service manager 350 of the receiver 300 may obtain source_id of a channel including a broadcast program and event_id of a broadcast program from ETM_id. As mentioned above, the receiver 300 corresponds the first 16 bits of ETM_id to source_id, and 14 bits after that to event_id, so that it may obtain source_id and event_id.

Then, the service manager 350 of the receiver 300 may identify a virtual channel matching source_id from a VCT, and may identify an event loop of a broadcast program matching event_id from an EIT of a corresponding virtual channel. The service manager 350 of the receiver 300 receives NRT server related broadcast program information from the identified event loop and then, provides the information to a user. The broadcast program information may include at least one of a start time of a corresponding broadcast program, an ETT position, a broadcasting time, title information, and description information in the event loop of an EIT. Accordingly, the service manager 350 of the receiver 300 provides to a user the information on the received NRT service related broadcast program on the basis of the received broadcast program information.

Figure 65:
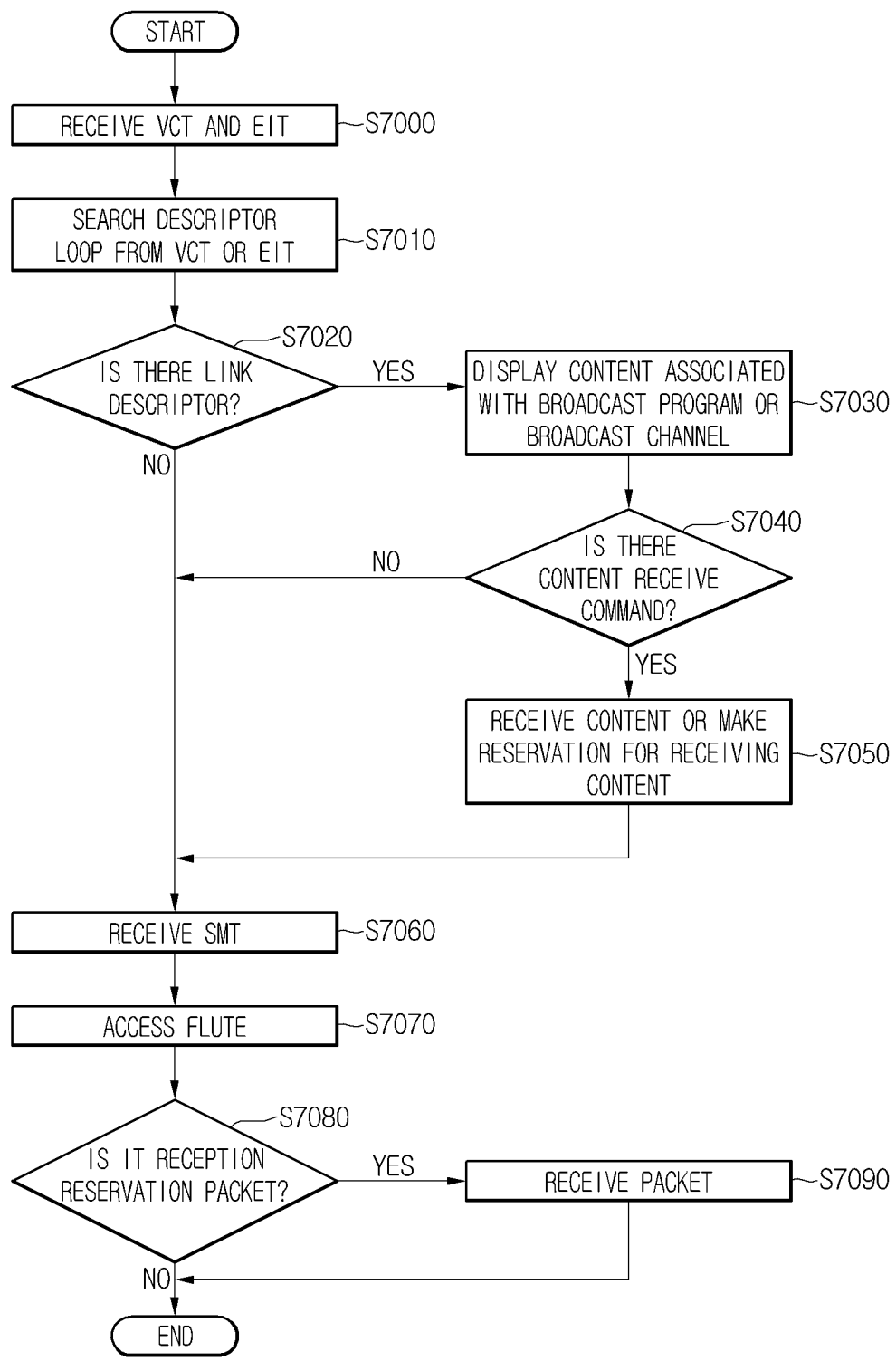
FIG. 65 is a flowchart illustrating an operation of receiving by the receiver 300 broadcast program or broadcast channel related contents by using a link descriptor according to an embodiment of the present invention.

FIG. 65 is a flowchart illustrating an operation of receiving by the receiver 300 broadcast program or broadcast channel related contents by using the link descriptor according to an embodiment of the present invention.

Referring to FIG. 65, when the receiver 300 is turned on, it receives a VCT or an EIT by receiving a PSIP table through a PSIP/PSI handler or service manager in operation S7000. The PSIP/PSI handler or service manager 350 of the receiver 300 parses each table of the PSIP table and obtains VCT or EIT from the parsed tables.

Also, the service manager 350 of the receiver 300 searches for a descriptor loop from the received VCT or EIT in operation S7010. Then, the service manager 350 of the receiver 300 determines whether there is a link descriptor through searching in operation S7020. The service manager 350 of the receiver 300 searches for descriptors in a descriptor loop and if a descriptor_tag field is identical to that of a predetermined link descriptor, it is determined that there is a link descriptor.

Also, when it is determined that there is a link descriptor, the service manager 350 of the receiver 300 extracts link information from the link descriptor, and based on the extracted link information, displays a broadcast program including the link descriptor or a broadcast channel related content list in operation S7030. Link information may include at least one of a link_type field, a link_media field, a mime_type field, a description field, and a link_byte field. The service manager 350 of the receiver 300 generates a list of contents linked with a specific broadcast channel or broadcast program on the basis of the extracted link information, for example, at least one of a related internet site address, thumbnail, a preview clip, extended EPG information, highlight information, multiview information, and TDO information, and then displays the list to a user. Therefore, a user may select content to be received from the displayed broadcast channel or broadcast program related content list.

Then, the service manager 350 of the receiver 300 determines whether content is selected and there is a receive instruction in operation S7040. The content may be selected by a user or a predetermined process. The selected content may be content displayed on the above-mentioned displayed broadcast channel or broadcast program related content list. Moreover, a user may input a receive instruction on the selected content, and also a receive instruction on the selected content may be performed by a predetermined process.

Then, when a receive instruction on the selected content is executed, the service manager 350 of the receiver 300 receives corresponding content immediately or perform reception reservation in operation S7050. The case that the reception reservation is performed includes the case that NRT service cannot be received because an SMT is not received, the case that a user sets to receive content after a predetermined time, or the case that NRT service to be received is TDO service that is real-time linked with a broadcast program.

Moreover, when the link information of content to be received includes a site address accessible through internet, the service manager 350 of the receiver 300 accesses a corresponding site and displays a broadcast channel or program related home page. Furthermore, when the content to be received is one of thumbnail, preview clip, extended EPG information, highlight information, and multiveiw information, the service manager 350 of the receiver 300 may download it through internet or another path and then, may display it.

Then, when contents reserved for reception is NRT service, the service manager 350 of the receiver 300 receives an SMT to identify corresponding NRT service in operation S7060. Then, the service manager 350 of the receiver 300 accesses a FLUTE session through the above-mentioned method in operation S7070 and identifies a packet for the content reserved for reception among packets of a content item file configuring NRT service in operation S7080. Then, the service manager 350 of the receiver 300 receives the identified packets for the content reserved for reception through FLUTE or an internet network in operation S7090.

In more detail, since the link information extracted from the link descriptor includes service_id and content_linkage information of NRT service, the service manager 350 of the receiver 300 receives and identifies the content reserved for reception, that is, a reserved packetized content item of NRT service, through the FLUTE session on the basis of the service_id and content_linkage information. The service manager 350 of the receiver 300, for example, extracts NRT service identification information from link_byte in the link descriptor as shown in FIG. 46, and receives an NRT service linked with a corresponding program through an SMT, an NRT-IT, and a FLUTE. Accordingly, the service manager 350 of the receiver 300 provides the information on content linked with a broadcast channel or broadcast program that is broadcasted currently or in the future through a VCT or an EIT. Moreover, the service manager 350 of the receiver 300 receives the selected content immediately through an internet network or NRT service or receives the content reserved for reception after a predetermined time. For example, as mentioned above, the receiver 300 obtains URL information of content items on the basis of NRT_IT and receives files configuring the selected content item of NRT service on the basis of the obtained URL information through an internet network.

Figure 66:
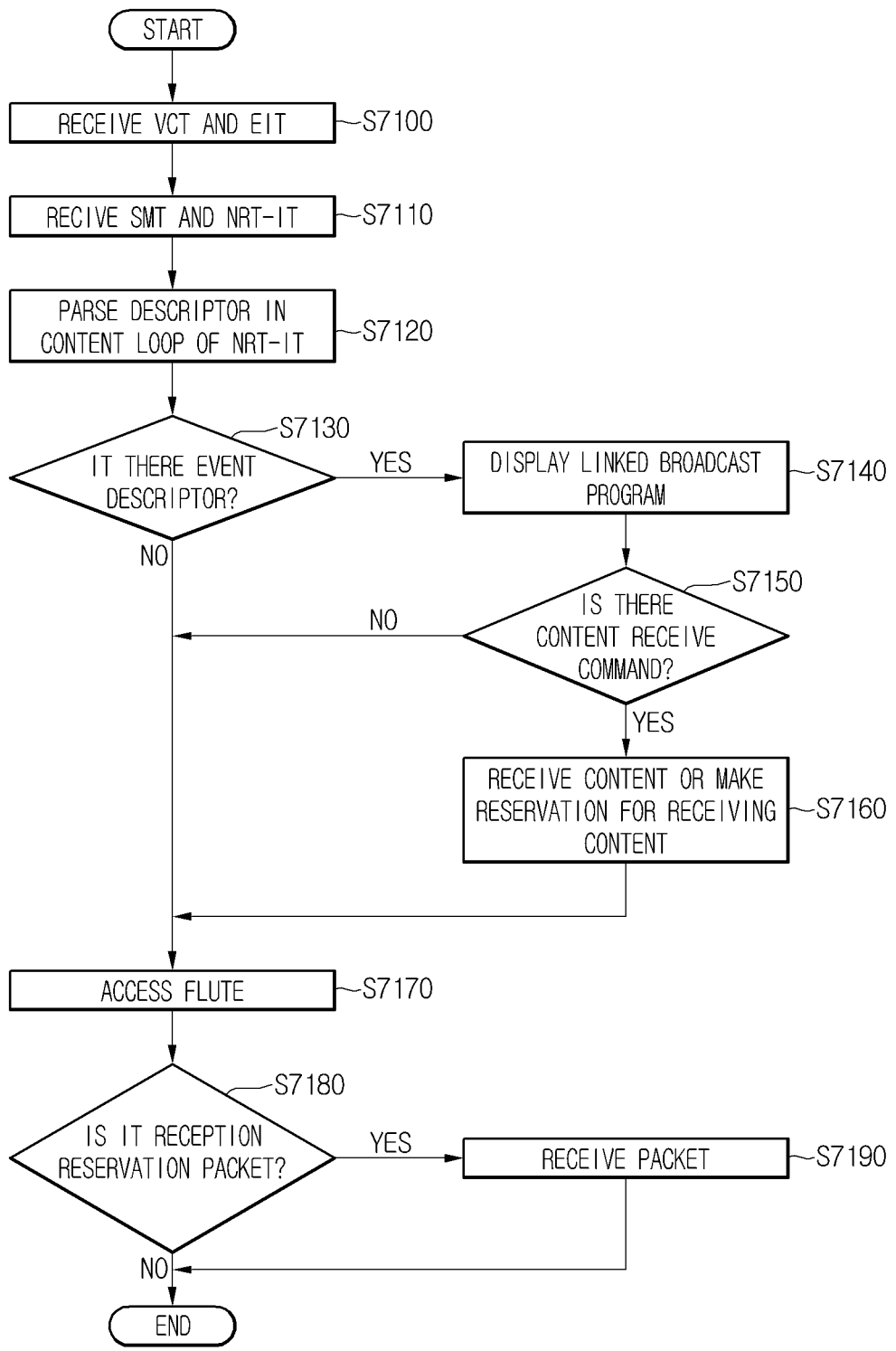
FIG. 66 is a flowchart illustrating an operation of providing by the receiver 300 broadcast program related content by using an event descriptor according to an embodiment of the present invention.

FIG. 66 is a flowchart illustrating an operation of providing by the receiver 300 broadcast program related content by using an event descriptor according to an embodiment of the present invention.

According to an embodiment of the present invention, as shown in FIG. 66, the transmitter 200 inserts broadcast program information linked with NRT service into the event descriptor and inserts the event descriptor into a content loop of NRT-IT to be transmitted to the receiver 300 through a broadcast channel or NRT service signaling channel.

When NRT-IT including the event descriptor is transmitted in such a way, a PSIP/PSI handler or service manager 350 of the receiver 300 parses a PSIP table to obtain a VCT and an EIT in operation S7100. The receiver 300 may provide information on a broadcast channel and broadcast program selected through a VCT and an EIT to a user.

Also, the service manager 350 of the receiver 300 determines whether NRT service is transmitted through an NRT service signaling channel or an internet network, and receives an SMT and an NRT-IT when NRT service is transmitted in operation S7120.

Then, the service manager 350 of the receiver 300 searches for a content loop of an NRT-IT and parses descriptor tag of each descriptor to identify descriptors in the content loop in operation S7120. Then, the service manager 350 of the receiver 300 determines whether there is an event descriptor in the parsed descriptor in operation S7130.

If there is an event descriptor, the service manager 350 of the receiver 300 displays broadcast channel information or broadcast program information in the event descriptor (for example, a broadcast channel number based on source_id or broadcast program EPG information based on event_id) in operation S7140, and represents that the information is linked with receivable NRT service.

Then, the service manager 350 of the receiver 300 determines whether the content of NRT service linked with a broadcast program is selected and there is a receive instruction in operation S7150. The content may be selected by a user or a predetermined process. For example, when a broadcast program that a user wants to view is selected, a receive instruction on NRT service linked with a corresponding broadcast program is performed. Moreover, when an NRT service that a user wants to receive is selected, a content receiving instruction is executed.

Then, when a receive instruction on the selected content is executed, the service manager 350 of the receiver 300 receives corresponding content immediately or perform reception reservation in operation S7160. According to an embodiment of the present invention, the selected content may be NRT service. Accordingly, the service manager 350 of the receiver 300 accesses a FLUTE session or internet network on the basis of the pre-received SMT and NRT-IT to receive the selected content such as NRT service in operation S7170. For example, as mentioned above, the receiver 300 obtains URL information of content items on the basis of an NRT_IT and then, confirms packets of the selected content item file.

Then, as shown in FIG. 65, the service manager 350 of the receiver 300 identifies a packet for content reserved for reception among packets of a content item file configuring NRT service in operation S7180. Then, the service manager 350 of the receiver 300 receives the identified packets for the content reserved for reception through FLUTE or an internet network in operation S7190.

In such a way, the transmitter 200 inserts the event descriptor into a content loop of an NRT-IT and also includes information on a broadcast program linked with NRT service in the event descriptor to transmit it. Moreover, the service manager 350 of the receiver 300 provides to a user the information on a broadcast channel or broadcast program that is currently transmitted based on the event descriptor of an NRT-IT.

Moreover, NRT service such as TDO may be signaled through an SMT or an NRT-IT, as mentioned above. Especially, if the service_category field of the SMT is a specific value, for example, it indicates that 0xOE, a service signaled through the SMT is NRT service. Additionally, the SMT may include a Service level descriptor to indicate an attribute of NRT service transmitted. A service level descriptor in the SMT may be in plurality and, for example, may be at least one of a Protocol Version Descriptor, an NRT Service Descriptor, a Capabilities Descriptor, an Icon Descriptor, an ISO-639 Language Descriptor, a Receiver Targeting Descriptor, a Genre Descriptor, and an ATSC Private information Descriptor. By using such a service level descriptor, the transmitter 200 transmits information on NRT service and the receiver 300 operates according to the NRT service information. However, a currently used service level descriptor may not include information specified to the TDO suggested by the present invention. Therefore, a service level descriptor to deliver information on a TDO is required.

FIG. 67 is a view illustrating a syntax of NRT_service_descriptor, that is, a service level descriptor.

As shown in FIG. 67, NRT_service_descriptor in service level descriptors may include information on NRT service transmitted. The information on NRT service may include auto update, the length of content, save reservation information, or consumption_model information.

Especially, a consumption_model field in a box may include information on a service providing method of NRT service transmitted. Accordingly, the service manager 350 of the receiver 300 determines a proper processing method according to each NRT service on the basis of the consumption_model field, and provides NRT service according to the determined method.

According to an embodiment of the present invention, the transmitter 200 presets an NRT service providing method applicable to an TDO and allocates a specific value to the consumption_model field to correspond to the TDO. Accordingly, the transmitter 200 may allocate a value corresponding to a TDO to the consumption_model field and then transmit it.

Then, the service manager 350 of the receiver 300 receives the consumption_model field and determines that an TDO is transmitted and then, receives the TDO according to a predetermined service providing method to provide it.

therefore, according to an embodiment of the present invention, when the consumption_model field indicates a value corresponding to a TDO, for example, when the consumption_model field is 0x04, the service manager 350 of the receiver 300 determines that NRT service is TDO service, and operates according to a service providing method thereof. A service providing method according to a TDO consumption model of the receiver 300 will be described later.

FIG. 68 is a view illustrating a meaning according to each value of a consumption_model field in NRT_service_descriptor according to an embodiment of the present invention.

The consumption_model field is included in NRT_service_ descriptor and is a field indicating which method for consumption_model NRT service that NRT_service_descriptor indicates uses. NRT service may be provided according to a consumption model of one of Browse&Download service, portal service, and push. Additionally, NRT service may be provided depending on a TDO consumption_model according to an embodiment of the present invention. Accordingly, the meaning of a value of a consumption_model field and an operation of a receiver suggested by the present invention will be described.

First, when a value of the consumption_model field is 0x00, it indicates that NRT service is not transmitted (forbidden).

Also, when a value of the consumption_model field is 0x01, it indicates that a corresponding NRT service is provided through a Browse&Download method. In this case, the service manager 350 of the receiver 300 browses a corresponding NRT service, and when content is selected, downloads the selected content.

When a value of the consumption_model field is 0x02, it indicates that a corresponding NRT service is provided through a Portal method. In this case, a corresponding NRT service may be provided through a method of accessing a web browser. Accordingly, files transmitted/received through a FLUTE session linked with a corresponding NRT service may include files for text or graphic rendering.

When a value of the consumption_model field is 0x03, it indicates that a corresponding NRT service is provided through a Push method. In this case, a corresponding NRT service may be provided based on a request of a user or the receiver 300. Additionally, the service manager 350 of the receiver 300 may allow a user to select whether to perform automatic update of content linked with a corresponding NRT service. If a user selects automatic update, the service manager 350 of the receiver 300 stores content linked with corresponding service to a cache, and automatically updates files to a new version. Also, when a user returns to the requested Push service, the service manager 350 of the receiver 300 may display preloaded content.

In addition, when a value of the consumption_model field is 0x04, it indicates that a corresponding NRT service is provided according to a TDO consumption model. In this case, the service manager 350 of the receiver 300 determines that NRT service such as a TDO is transmitted based on the consumption_model field and operates the NRT service in linkage with real-time broadcast.

In more detail, when the consumption_model field is a TDO consumption model, the service manager 350 of the receiver 300 receives a corresponding NRT service (TDO), and by using at least one of the link descriptor or event descriptor, obtains NRT service related real-time broadcast channel or program information. Additionally, the service manager 350 of the receiver 300 may receive a trigger included in real-time broadcast to operate a TDO at a specific time or may download a content item in advance.

Moreover, in the case of a TDO consumption model, when each content item is displayed in a currently selected NRT service, it may be downloaded immediately. When an update version of each content item is displayed in a currently selected NRT service, it may be updated immediately. Also, each content item may be executed or terminated by a trigger.

Figure 69:
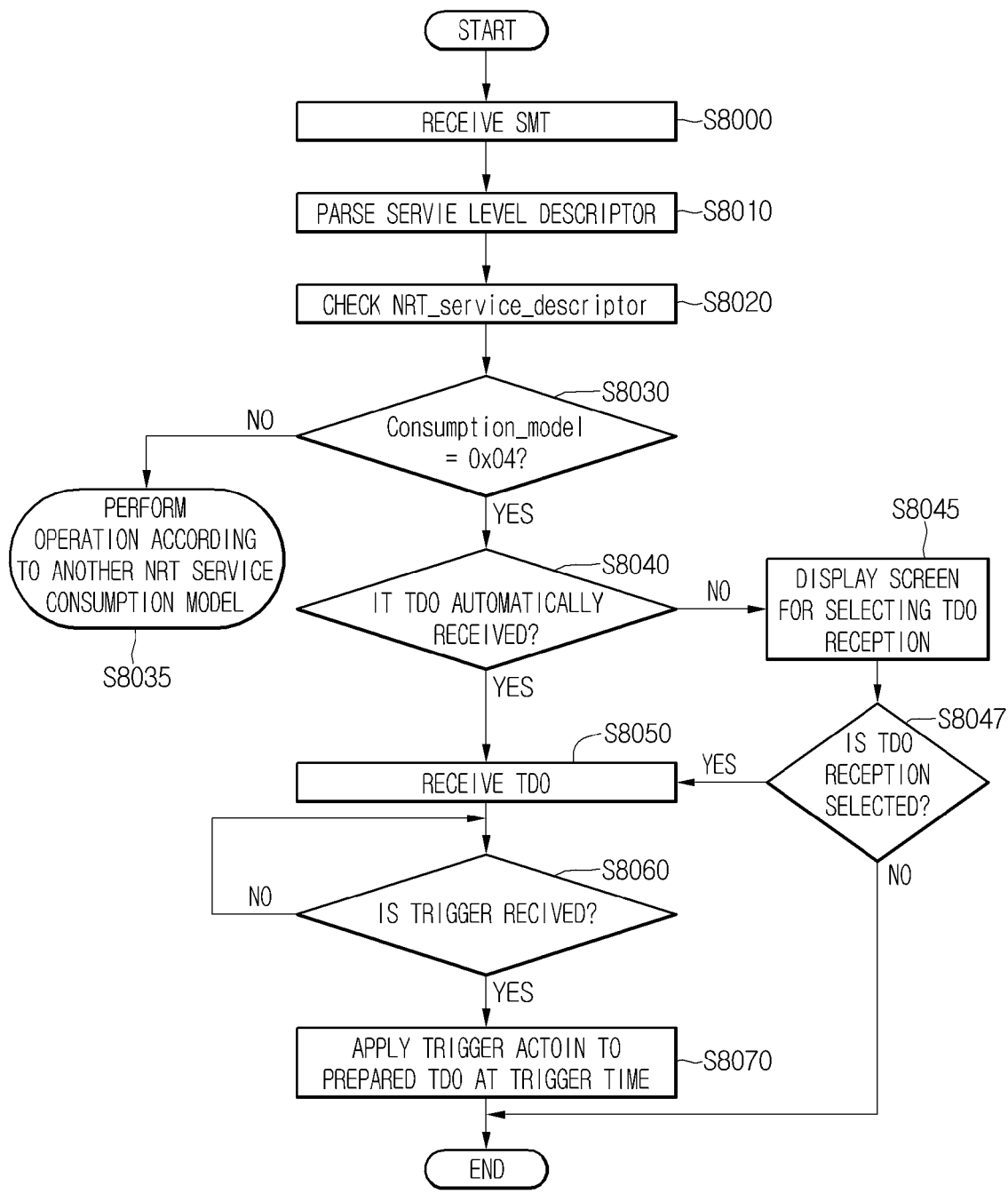
FIG. 69 is a flowchart illustrating an operation of the receiver 300 when a TDO is transmitted by a TDO consumption model according to an embodiment of the present invention.

FIG. 69 is a flowchart illustrating an operation of the receiver 300 when a TDO is transmitted by a TDO consumption model according to an embodiment of the present invention.

First, the receiver 300 receives an SMT in operation S8000, and parses a service level descriptor in operation S8010. The receiver 300 may receive an SMT through a service signaling channel by using the service manager 350, and may parse service level descriptors including an NRT descriptor in a service level descriptor loop in each NRT service loop.

Then, the receiver 300 confirms NRT_service_descriptor in the parsed each service level descriptor, and determines whether a value of the consumption_model field in NRT_service_descriptor is 0x04, i.e., a TDO consumption model, in operation S8030. If the value is not 0x04, the receiver 300 operates according to another NRT service consumption model.

However, if the value is 0x04, the receiver 300 determines that an NRT service designated as a TDO consumption model is transmitted. In this case, the receiver 300 determines whether a TDO automatic reception is set in operation S8040. If the automatic reception is not set, the receiver 300 displays TDO service and a list of contents in the TDO service, and displays a TDO reception selection screen in operation S8045. Then, the receiver 300 receives a TDO service selected by a user in operation S8047.

Moreover, when the automatic reception is set, the receiver 300 receives a TDO without a user's selection in operation S8050. Here, the receiver 300 may receive a TDO at a specific time regardless of a user's selection. For example, the receiver 300 may automatically receive and store a TDO in the background without a user's selection while not displaying to a user that the TDO is being received. Whether to execute the TDO is determined by a user's input, or may be received by the receiver 300 before the trigger time of the TDO. Additionally, the receiver 300 receives the TDO without a user's selection, so that it may smoothly operate in linkage with real-time broadcast during the execution of the TDO.

Then, the receiver 300 determines whether a trigger is received after receiving the TDO in operation S8060. The receiver 300 determines whether a trigger corresponding to the TDO is received through the trigger receiver 331. Also, when the trigger is received, the receiver 300 extracts a trigger time and a trigger action from the trigger through the service manager 350, and applies the trigger action to the TDO in ready at the trigger time in operation S8070. For example, the trigger target TDO may shift from one state of a non-ready state, a released state, a ready state, an active state, and a suspended state into another state. Accordingly, the receiver 300 may perform a shift operation according to a TDO state on the basis of the trigger action at the trigger time. As mentioned above, since the TDO is received automatically without a user's selection, and the trigger action is performed at the trigger time, the receiver 300 receives the TDO before the trigger time and prepares the TDO to be ready in the background before the trigger time.

Additionally, the receiver 300 receives and manages an NRT service that a user selects through the service manager 350. However, in the case of TDO service, since it operates in linkage with real-time broadcast and is triggered by a trigger, storing and managing the TDO service may be accomplished according to the intentions of real-time broadcast service providers.

Therefore, according to an embodiment of the present invention, in the case of a TDO consumption model type in which TDO service is transmitted, the receiver 300 allocates a predetermined area of a storage unit as a TDO storage area, and then, receives TDO service, stores the received TDO service in the allocated area, and manages it. Furthermore, the TDO storage area is designated by the transmitter 200, and then, the TDO service is transmitted to the receiver 300. In this case, the receiver 300 may receive, store, and manage the TDO service in the allocated area.

Figure 70:
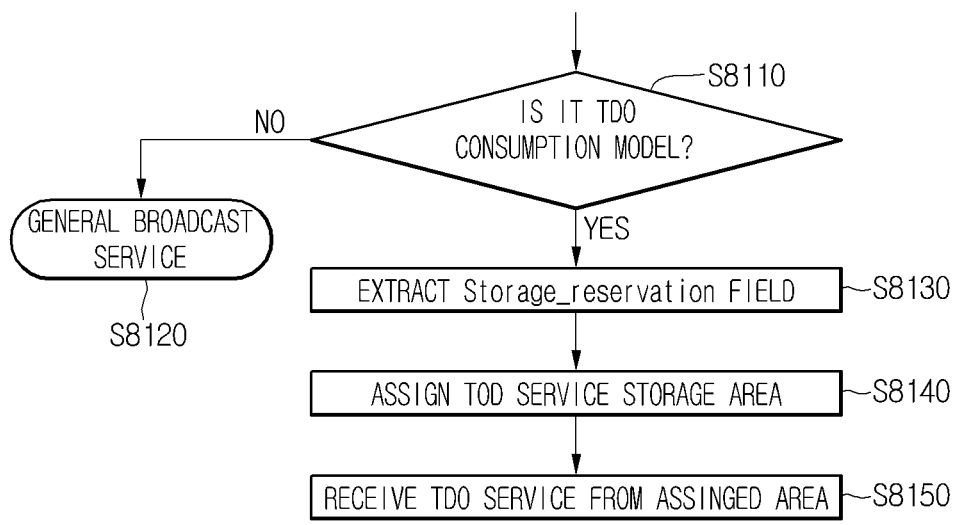
FIG. 70 is a flowchart illustrating a method of allocating and managing a TDO storage area according to a TDO consumption model according to an embodiment of the present invention.

FIG. 70 is a flowchart illustrating a method of allocating and managing by the receiver 300 a TDO storage area according to a TDO consumption model.

Referring to FIG. 70, first, the receiver 300 determines a consumption model of NRT service transmitted after operations S8000 to S8020 of FIG. 69 are performed. Then, the receiver 300 determines whether an NRT service of a TDO consumption model type, for example, TDO service, is transmitted based on a consumption model field in operation S8110.

When the consumption model field indicates a TDO consumption model, the receiver 300 extracts a storage_reservation field of NRT_service_descriptor in operation S8310. The storage_reservation field may be a value corresponding to a storage space essential for a corresponding TDO service. The transmitter 200 may designate a space value for TDO storage area in the storage_reservation field and transmits it.

Then, the receiver 300 allocates a storage area for TDO service reception and operation on the basis on the storage_reservation field value in operation S8140. The receiver 300 allocates an area designated in the storage_reservation field or a predetermined TDO service reception area as a storage area for TDO service, and separates the storage area from another area of a storage unit and manages it. Additionally, the receiver 300 maintains the storage space size of the allocated area continuously and uniformly. Accordingly, a broadcast service provider provides extended NRT service such as a TDO continuously.

Then, the receiver 300 receives TDO service in an area allocated as a TDO service storage area in operation 8150 and stores and manages the received TDO service.

In such a way, the receiver 300 allocates a storage area for TDO service and manages it on the basis of the consumption model field and storage reservation field of NRT service. However, the above method is just one embodiment and is not limited to a storage method according to each value of a consumption model field and a storage reservation field. Accordingly, the receiver 300 determines whether to store TDO service on the basis of a consumption model field value and a storage reservation field value, and determine whether to receive TDO service on the basis of a current storage reservation field value and the size of a remaining space of a storage unit. Furthermore, when receiving a plurality of TDOs, the receiver 300 designates a predetermined area of a storage unit according to each TDO and manages it, or allocates a comprehensive area for TDO service in a storage unit to receive a plurality of TDOs.

Moreover, a TDO may mean an NRT service providing a TDO, or each of content items configuring TDO service. Moreover, each content item is signaled through an NRT-IT, and the receiver 300 receives data signaled through the NRT-IT and recognizes information on a TDO. However, NRT-IT does not include information for TDO, for example, a trigger time, an execution termination time, an execution priority, and an additional data receiving path, besides information provided for general NRT service. Accordingly, it is difficult for the receiver 300 to understand the attribute of a TDO in detail and operates smoothly. Especially, when the receiver 300 manages a storage space, TDO services of a plurality of TDOs provided, or additional data of TDO service, information on TDO is insufficient.

Therefore, according to an embodiment of the present invention, a method of including specific property information of a TDO in TDO metadata and an operation of the receiver 300 according thereto are suggested.

FIG. 71 is a view illustrating a TDO metadata descriptor according to an embodiment of the present invention.

Referring to FIG. 71, TDO metadata includes a descriptor_tag field, a descriptor_length field, a scheduled_activation_start_time field, a scheduled_activation_end_time field, a priority field, an activation_repeat_flag field, and a repeat_interval field.

The descriptor_tag field may have a value to distinguish this descriptor as a TDO metadata descriptor.

The descriptor_length_field may be an 8-bit unsigned integer to define the length from a field immediately following this field to the end of a TDO metadata descriptor.

The scheduled_activation_start_time field may be a 32-bit unsigned integer indicating the fastest scheduled activation start time obtained by calculating GPS sec from the time 00:00:00 UTC on 6 Jan. 1980. When the scheduled_activation_start_time field is 0, it indicates that an activation start time of TDO is already passed.

The scheduled_activation_end_time field may be a 32-bit unsigned integer indicating the fastest scheduled activation end time obtained by calculating GPS sec from the time 00:00:00 UTC on 6 Jan. 1980. When the scheduled_activation_end_time field is 0, it indicates that an activation end time of TDO is not designated. Accordingly, when the scheduled_activation_end_time field is 0, the receiver 300 continuously provides service after the scheduled activation start time.

The scheduled_activation_start_time field and the scheduled_activation_start_time field may be used to allow the receiver 300 to synchronize a TDO with real-time broadcast and operate it. Additionally, the receiver 300 may selectively download a TDO on the basis of the scheduled_activation_start_time field and the scheduled_activation_start_time field and may determine the download order of TDOs. Additionally, the receiver 300 may determine the deletion order of TDOs on the basis of the scheduled_activation_start_time field and the scheduled_activation_start_time field. Especially, the receiver 300 identifies a TDO having a scheduled_activation_start_time field value closest to the current time (i.e., a TDO to be activated first), and downloads and stores the identified TDO first. Additionally, the receiver 300 may delete a TDO having a scheduled_activation_start_time field value that is the latest from the current time if a storage space is insufficient.

Moreover, a priority field may be an 8-bit unsigned integer indicating the priority of a TDO service or a content item. The receiver 300 determines that as a value of the priority field is higher or lower, a higher priority is provided. Moreover, the receiver 300 may sequentially receive or store a plurality of TDOs on the basis of a priority field allocated to each TDO. Moreover, the receiver 300 may execute at least one of a plurality of TDOs on the basis of a priority field allocated to each TDO.

Also, since a target TDO executed by a trigger at a trigger time may be one but a TDO executable at one time may be in plurality, a priority designation for each TDO is necessary. Accordingly, when a TDO (service or a content item) is in plurality, the transmitter 200 designates each priority by using the above-mentioned priority field.

Moreover, the receiver 300 may sequentially download TDOs on the basis of the priority field. Moreover, the receiver 300 may display a plurality of TDOs executable at a specific time on the basis of a priority field. For example, although displaying a plurality of TDOs executable at a specific time, the receiver 300 positions and displays a TDO having a high priority on a top list. Accordingly, a user recognizes priority information through a displayed list, and efficient selection of a TDO according to priority information becomes possible.

Moreover, the receiver 300 may automatically execute a TDO on the basis of such a priority field. For example, if there are a plurality of TDOs to be executed within a specific time range, the receiver 300 selects a TDO having a high or low priority field and automatically executes it on the basis of a priority field corresponding to each TDO.

An activation_repeat_flag field may be a 1-bit Boolean flag indicating whether a repeat_interval field is included in this descriptor.

The repeat_interval field may be an 8-bit unsigned integer to indicate the repeat interval of an activation schedule time. The repeat_interval field may indicate the execution period of a TDO. Accordingly, the receiver 300 may receive a TDO or manages a storage unit on the basis of the repeat_interval field. The repeat_interval field may mean the execution period of a TDO according to each value as shown in Table 4.

TABLE 4

| VALUE | MEANING |
| --- | --- |
| 0 | Reserved |
| 1 | Daily |
| 2 | Every week 4-6 times |
| 3 | Every week 2-3 times |
| 4 | Every week |
| 5 | Biweekly |
| 6 | Every month |
| 7 | Once in two months |
| 8 | Once a quarter |
| 9 | Once in six months |
| 10 | Every year |
| 11-255 | Reserved |

In such a way, the transmitter 200 may transmit a TDO metadata descriptor through an NRT service signaling channel or an internet network. Additionally, the transmitter 200 inserts a TDO metadata descriptor into a content_level_descriptor loop of NRT-IT to transmit additional information on a corresponding TDO.

Moreover, the receiver 300 may receive TDO metadata through an NRT service signaling channel or an internet network to obtain information on a TDO. The receiver 300 receives NRT-IT to search for a content level descriptor loop and obtains TDO metadata. Furthermore, when TDO metadata is transmitted through an internet network, the receiver 300 accesses a FLUTE session for receiving a corresponding TDO service and receives FDT, and also receives TDO metadata from an internet network through URL information of a content location field for each file.

Figure 72:
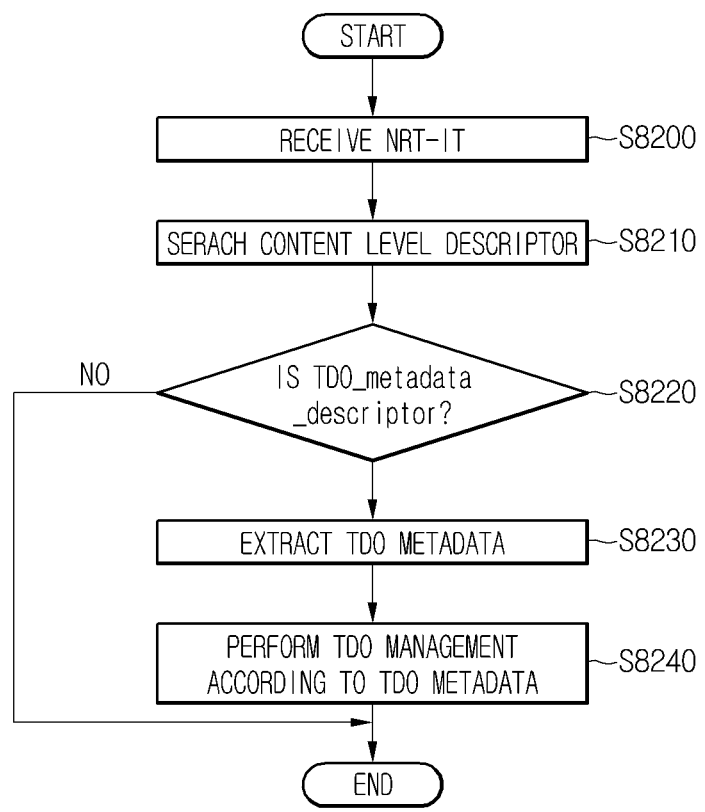
FIG. 72 is a flowchart illustrating an operation of receiving by the receiver 300 TDO metadata according to an embodiment of the present invention.

FIG. 72 is a flowchart illustrating an operation of receiving by the receiver 300 TDO metadata according to an embodiment of the present invention.

Referring to FIG. 72, the receiver 300 receives an SMT and an NRT-IT transmitted through a service signaling channel in operation S8200.

According to an embodiment, the transmitter 200 includes a TDO metadata descriptor in a content level descriptor loop and then, transmits it. Accordingly, the receiver 300 searches for the content level descriptor loop of the received NRT-IT in operation S8220 and then, determines whether there is a TDO metadata descriptor in operation S8220. The receiver 300 determines whether the descriptor tag field value of each descriptor corresponds to TDO_metadata_descriptor, and thus, determines whether there is a TDO metadata descriptor.

Then, if there is a TDO metadata descriptor, the receiver 300 extracts TDO metadata from a TDO metadata descriptor in operation S8230. As mentioned above, the TDO metadata may include at least one of scheduled activation start or end time information, priority information, related data reception information, and repeat interval information. Additionally, the related data reception information may include additional data on a corresponding TDO or reception path information of additional data.

Then, the receiver 300 obtains necessary information from the extracted TDO metadata and manages a TDO on the basis of the obtained information in operation S8240. The receiver 300 manages a TDO by receiving, storing, or deleting the TDO according to a predetermined condition on the basis of the TDO metadata. Moreover, the receiver 300 may receive related data that a service provider provides about a corresponding TDO on the basis of TDO metadata. For example, when a TDO is in execution, the receiver 300 extracts related data reception information from TDO metadata, receives additional action information on the TDO in execution through a broadcast channel or an internet network on the basis of the related data reception, and applies the received additional action to the TDO in execution.

Figure 73:
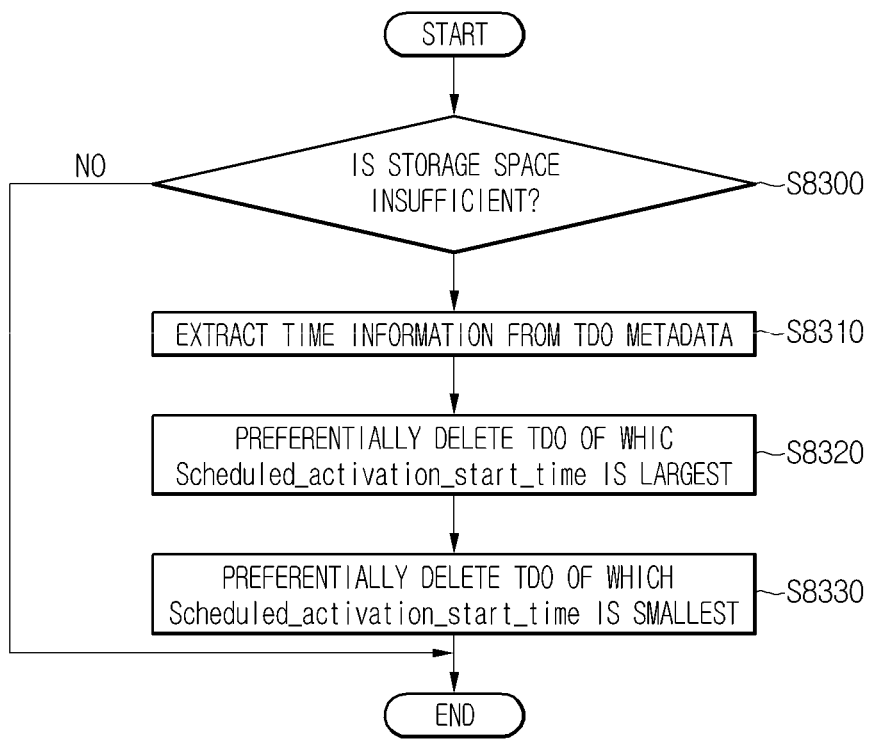
FIG. 73 is a flowchart illustrating a method of the receiver 300 to manage a TDO depending on time information in TDO metadata according to an embodiment of the present invention.

FIG. 73 is a flowchart illustrating a method of the receiver 300 to manage a TDO depending on time information in TDO metadata according to an embodiment of the present invention.

Referring to FIG. 73, the receiver 300 determines whether a storage space for TDO is insufficient in a storage unit in operation S8300. As mentioned above, the storage space may be a predetermined area of a storage unit for storing TDOs. Additionally, the receiver 300 determines a storage space necessary for TDO reception on the basis of an NRT service descriptor before receiving a TDO, and determines whether a storage space is insufficient in comparison to the remaining space of a current storage unit.

Then, if it is determined that a storage space is insufficient, the receiver 300 extracts time information from the TDO metadata on each TDO in operation S8310. Time information may include a scheduled activation start time or end time field of a TDO metadata descriptor. Moreover, the receiver 300 obtains TDO metadata on each TDO from a content level descriptor loop of NRT-IT as mentioned above, and extracts time information from the obtained TDO metadata.

Then, the receiver 300 first deletes a TDO having the largest value of a scheduled activation start time field on the basis of a scheduled activation start time for each TDO in operation S8320. As a scheduled activation start time is greater, the current needs may be reduced. Therefore, the receiver 300 first deletes a TDO to be executed at the time that is the farthest from the current time, so that storage space may be obtained.

Then, the receiver 300 first receives a TDO having the smallest value of a scheduled activation start time field on the basis of a scheduled activation start time for each TDO in operation S8330. As the scheduled activation start time value of a TDO is smaller, since the TDO is executed soon, if a storage space is insufficient, the receiver 300 first receives a TDO whose active start time reaches in the fastest time, so that reception is completed within a trigger time.

In addition, time information in TDO metadata may include a time slot descriptor for providing activation time information of a TDO in addition to scheduled activation start and end time fields. The time slot descriptor may include a slot start time, a slot length, and repeat information, by using a time at which a TDO is performed as one slot. Accordingly, the receiver 300 extracts a time slot at which a TDO is activated, so as to predict a repeated execution and end time of the TDO.

Figure 74:
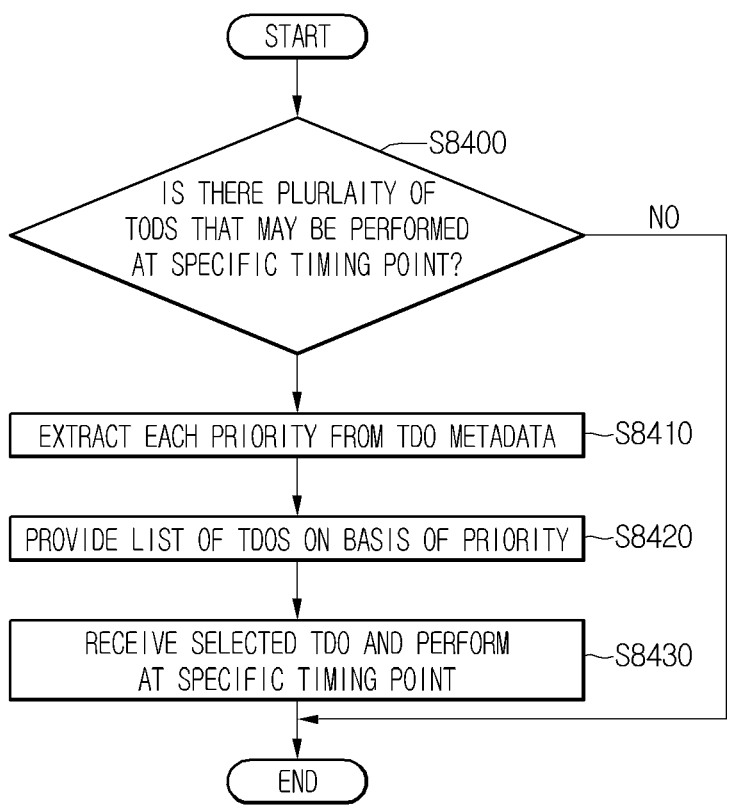
FIG. 74 is a flowchart illustrating a method of the receiver 300 to manage a TDO depending on time information and priority information in TDO metadata according to another embodiment of the present invention.

FIG. 74 is a flowchart illustrating a method of the receiver 300 to manage a TDO depending on time information and priority information in TDO metadata according to another embodiment of the present invention.

Referring to FIG. 74, first, the receiver 300 receives TDO metadata, and determines whether there are a plurality of TDOs executable at a specific time in operation S8400. The receiver 300 extracts TDO metadata in a content descriptor loop of NRT-IT through a service signaling channel as mentioned above, and then receives TDO metadata corresponding to each TDO. Then, the receiver 300 may determine whether there are a plurality of TDOs executable at the same time on the basis of the scheduled activation start time field of the extracted each TDO metadata. When there are a plurality of TDOs having the same scheduled activation start time field value or a plurality of TDOs whose scheduled activation start time field value is within a predetermined time range, the receiver 300 determines that there are a plurality of TDOs executable at the same time.

Also, when it is determined that there are a plurality of TDOs, the receiver 300 extracts a priority value for each TDO from the TDO metadata in operation S8410. The priority value is extracted from a priority field in the TDO metadata descriptor. Additionally, the receiver 300 matches a priority in the TDO metadata to each of a plurality of TDOs executable at the same time and then, stores them.

Then, the receiver 300 provides a list of a plurality of TDO executable at a specific time to a user on the basis of the extracted priority. The receiver 300 displays a list of a plurality of TDOs executable at a specific time or after a predetermined time in addition to a priority to a user, so that this leads to a user's selection. Additionally, the receiver 300 places a TDO having a high priority on the upper side of a TDO list and displays it so that priority information for each TDO may be provided together. Accordingly, a user sets which TDO is selected and performed at a specific time with reference to a TDO list, and selects which TDO is received and stored.

Then, when a TDO is selected by a user, the receiver 300 receives the selected TDO, and performs a trigger action on the selected TDO at a specific time, for example, a trigger time. The receiver 300 may omit an operation of receiving the selected TDO if the selected TDO is received and stored already. Moreover, the receiver 300 deletes the selected TDO from a storage unit, so that a storage space is obtained.

According to an embodiment, the receiver 300 receives and stores a TDO on the basis of priority information according to setting without a user's selection, and then performs a trigger action. Moreover, when there are a plurality of TDOs executable at the same time, the receiver 300 receives a TDO having a high priority first and stores it, and perform a trigger action on a TDO having a high priority at a corresponding time.

Furthermore, according to an embodiment, the transmitter 200 may transmit files configuring a content item of NRT service through an internet network. In more detail, the transmitter 200 generates an FDT by including URL information of each file configuring a content item in a content location attribute, and transmits the generated FDT through a FLUTE session. Furthermore, the transmitter 200 may designate the URL of content item files transmitted through a broadcast network and an IP network by using an internet location descriptor. This internet location descriptor may be included in a content level descriptor loop of an NRT-IT. Accordingly, the transmitter 200 includes URL information on internet where each file placed in an internet location descriptor and transmits it.

One example of such an internet location descriptor is described with reference to FIG. 75.

FIG. 75 is a view illustrating a syntax of an internet location descriptor according to an embodiment of the present invention.

As shown in FIG. 75, the internet location descriptor includes a descriptor_tag field, a descriptor_length field, a URL_count field, a URL_length field, and a URL( ) field.

The descriptor_tag field may be an 8-bit unsigned integer to distinguish this descriptor as an internet location descriptor. For example, this field may have a 0xC9 value.

The descriptor_length field may be an 8-bit unsigned integer to define the length from a field immediately following this field to the end of an internet location descriptor.

The URL_count field may be a 5-bit unsigned integer to indicate the number of pairs of URL length fields and URL fields in an internet location descriptor. That is, the internet location descriptor includes a plurality of URL length fields whose number corresponds to a URL count field and a plurality of URL fields whose number corresponds to a URL count field.

The URL_length field may be an 8-bit unsigned integer to indicate the length of the URL( ) field immediately following this field.

The URL( ) field is a character string indicating URL. When the URL( ) field indicates Relative URL or absolute tag URI, a corresponding URL may be seen as a content transmitted only through FLUTE of NRT. In other cases, a corresponding URL may be seen as a content only transmitted through a broadcast network, a content transmitted through an IP network, or a content transmitted through both a broadcast network and an IP network.

When the URLs of files configuring a content item are transmitted by using an internet location descriptor, a URL corresponding to each file is designated and needs to be included in an internet location descriptor. However, when the number of files is increased, the number of URLs to be designated is increased, so that transmission efficiency may be reduced. Moreover, the number of URLs is increased, their management becomes complex and difficult.

Accordingly, the transmitter 200 according to an embodiment of the present invention includes list information of URLs corresponding to each file in a FLUTE file description table (FDT), and transmits the FDT through an internet network instead of a FLUTE session. The transmitter 200 may transmit list information of URLs or an FDT by using the internet location descriptor, and also may transmit listinformation of URLs or an FDT by using the link descriptor.

Also, related information between each file and a content item may be designated by a content linkage field in an FDT. Additionally, when the URL of the FDT is transmitted through an internet location descriptor, since a list of files configuring a content item is included in the FDT, the receiver 300 may determine a relationship between a content item and each file without a content linkage field. For example, the receiver 300 parses a content level descriptor loop of a content item to be received on the basis of NRT-IT, extracts the URL of the FDT from an internet location descriptor in the content level descriptor loop, and receives the FDT through an internet network, so that it obtains a list of files configuring the content item to be received.

The receiver 300 receives URL information of the FDT located through a link descriptor or an internet location descriptor, and receives the FDT on the basis of the received URL information through an internet network. Then, the receiver 300 receives files configuring a content item on the basis of URL information of each file in the FDT. In such a way, by transmitting the URL of FDT, it is not necessary to designate a URL to each of a plurality of files. As a result, transmission efficiency may be increased.

Figure 76:
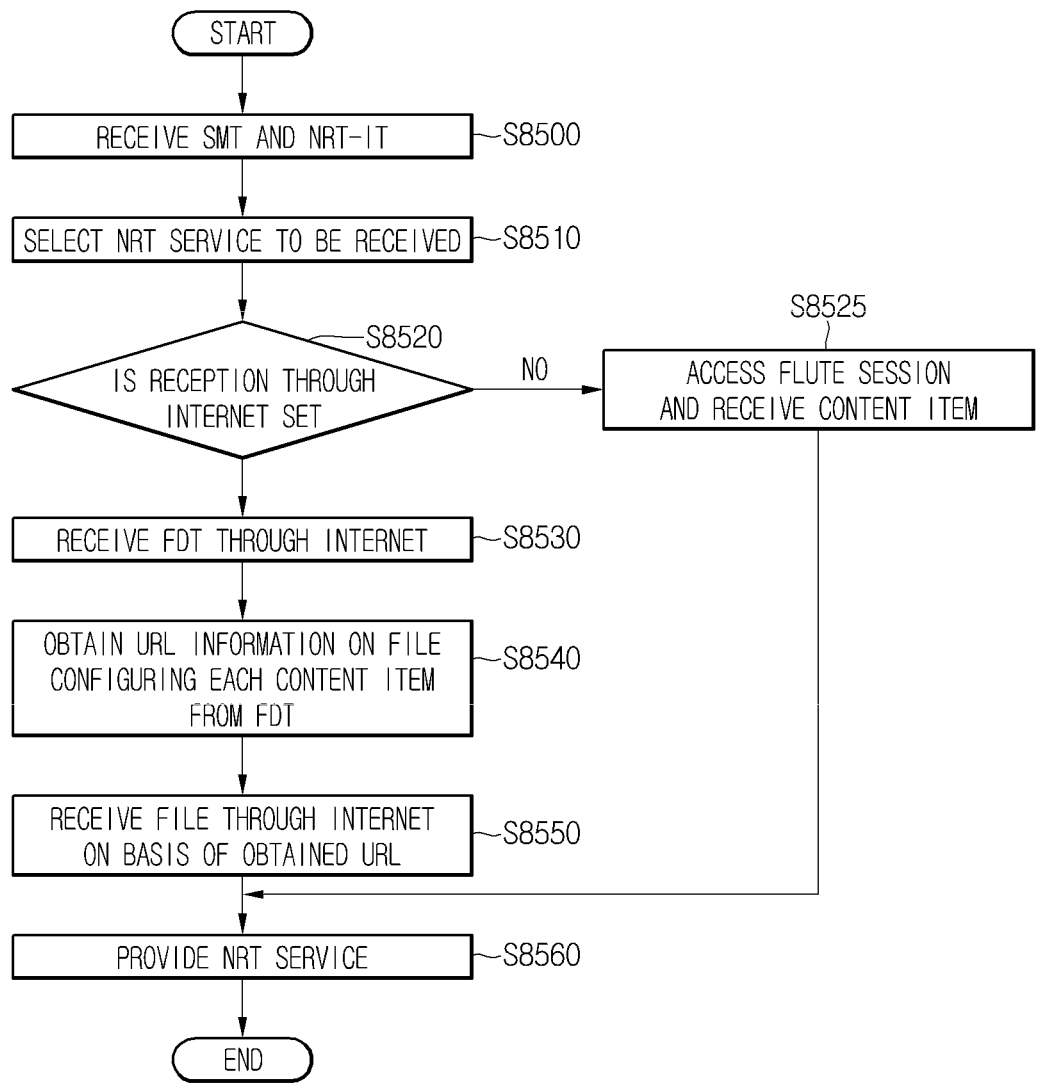
FIG. 76 is a flowchart illustrating an operation of the receiver 300 when an FDT is transmitted through an internet network according to an embodiment of the present invention.

FIG. 76 is a flowchart illustrating an operation of the receiver 300 when FDT is transmitted through an internet network according to an embodiment of the present invention.

Referring to FIG. 76, the receiver 300 first receives an SMT and an NRT-IT through the service manager 350 in operation S8500.

Then, the service manager 350 of the receiver 300 selects NRT service or a content item to be received in operation S8510. The service manager 350 of the receiver 300 selects NRT service to be received according to a predetermined condition. Additionally, the service manager 350 of the receiver 300 selects NRT service to be received according to a user's input.

Then, the service manager 350 of the receiver 300 determines whether to receive each file configuring a content item of the selected NRT service through internet in operation S8520. The service manager 350 of the receiver 300 determines whether to receive each file through internet on the basis of a connection state of the internet network. Additionally, the service manager 350 of the receiver 300 determines whether to receive each file through internet according to a user's setting.

Then, when it is determined that each file is not received through internet, the service manager 350 of the receiver 300 accesses a FLUTE session through an NRT service signaling channel, and receives each file configuring a content item of the selected NRT service in operation S8525. An operation of receiving NRT service through a FLUTE session is described above.

However, when it is determined that each file is received through internet, the service manager 350 of the receiver 300 receives FDT through internet in operation S8530. The service manager of the receiver 300 receives URL information of FDT through a link descriptor or an internet location descriptor, and receives the FDT located on an internet network on the basis of the received URL information of the FDT.

Here, the FDT may include a list index of each file configuring a content item in a FLUTE session. A MIME type designation is necessary in order to additionally transmit the FDT through an internet network. The MIME type means a specific format to indicate the type of a content transmitted through an internet network. Various file formats are registered as MIME types and are used in internet protocols such as HTTP and SIP. The MIME type registration is managed by IRNA. MIME may define a message format of a tree structure. According to an embodiment of the present invention, an MIME type corresponding to FDT may be defined as a format such as application/nrt-flute-fdt+xml. Additionally, the receiver 300 parses a URL having the MIME type and, based on this, receives FDT.

When receiving an FDT, the service manager 350 of the receiver 300 obtains URL information of files configuring each content item from the FDT in operation S8540. Then, the service manager 350 of the receiver 300 receives each file on the basis of the obtained URL information through internet in operation S8550. The service manager 350 of the receiver 300 connects the received files on the basis of a content linkage field of the FDT, so that it obtains a content item.

Then, the service manager 350 of the receiver 300 provides NRT service through the received content item in operation S8560.

As mentioned above, since the receiver 300 receives the FDT through internet, it is not necessary to receive URL information of each file and it is possible to efficiently receive NRT service through an internet network. Moreover, according to an embodiment of the present invention, an arbitrary file including a file list (index) may be transmitted instead of FDT.

Figure 77:
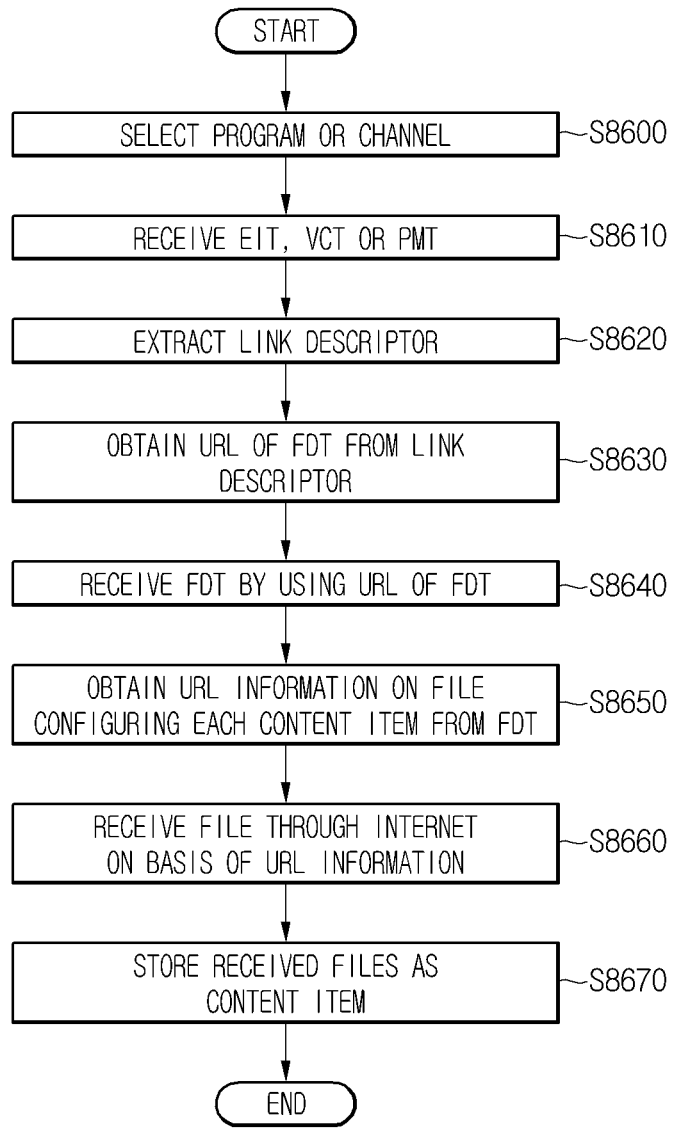
FIG. 77 is a flowchart illustrating an operation of the receiver 300 when the URL of an FDT is transmitted through a link descriptor according to an embodiment of the present invention.

FIG. 77 is a flowchart illustrating an operation of the receiver 300 when the URL of an FDT is transmitted through a link descriptor according to an embodiment of the present invention.

According to an embodiment of the present invention, the transmitter 200 includes the link descriptor in one of EIT, VCT, or PMT and transmits it, and the link descriptor includes URL information for obtaining FDT.

First, when the receiver 300 is turned on, a broadcast channel or a broadcast program is selected in operation S8600.

Then, the receiver 300 receives at least one of an EIT, a VCT, or a PMT through the service manager 350 or a PSIP/PSI handler in operation S8610, extracts a link descriptor in operation S8620, and obtains the URL information of an FDT from the link descriptor in operation S8630.

Here, the link descriptor may be included in the EIT and transmitted as shown in FIG. 46. In this case, the link descriptor includes information linked with a specific broadcast program. Additionally, a link descriptor may include URL information of an FDT in order to receive NRT service linked with the selected broadcast program through internet. Accordingly, the receiver extracts a link descriptor from an event descriptor loop of an EIT corresponding to the selected broadcast program, and obtains URL information of an FDT included in the link descriptor. Especially, when the MIME type field in the link descriptor indicates the MIME type of an FDT, the receiver 300 determines that information indicated by a link byte field is the URL of a FDT file.

Additionally, the link descriptor may be included in a VCT or a PMT and transmitted. In more detail, the link descriptor is included in the descriptor loop of a VCT or the program descriptor loop of a PMT and includes information on a content linked with a specific channel or service. The receiver 300 extracts the link descriptor in a VCT or a PMT, and obtains URL information of a FDT file in the link descriptor through a method that is identical to that of the case that a link descriptor is included in the EIT.

Then, the service manager 350 of the receiver 300 receives an FDT file by using the obtained URL information of the FDT through internet in operation S8640.

Then, the service manager 350 of the receiver 300 obtains URL information of each file included in the FDT in operation S8650. The URL information of each file included in the FDT may include position information on internet of files configuring a content item of NRT service.

Then, the service manager 350 of the receiver 300 receives designated files according to the obtained URL information through internet in operation S8660 and stores the received files as a content item in operation S8670. The service manager 350 of the receiver 300 may store each file as a content item of NRT service on the basis of the content linkage field of the FDT. Additionally, the service manager 350 of the receiver 300 provides to a user NRT service on the basis of the stored content item.

Through such a process, the receiver 300 may receive FDT including a file list configuring a content item of NRT service through an internet network. Moreover, since each file is received based on an FDT through internet, efficient transmission is possible.

Figure 78:
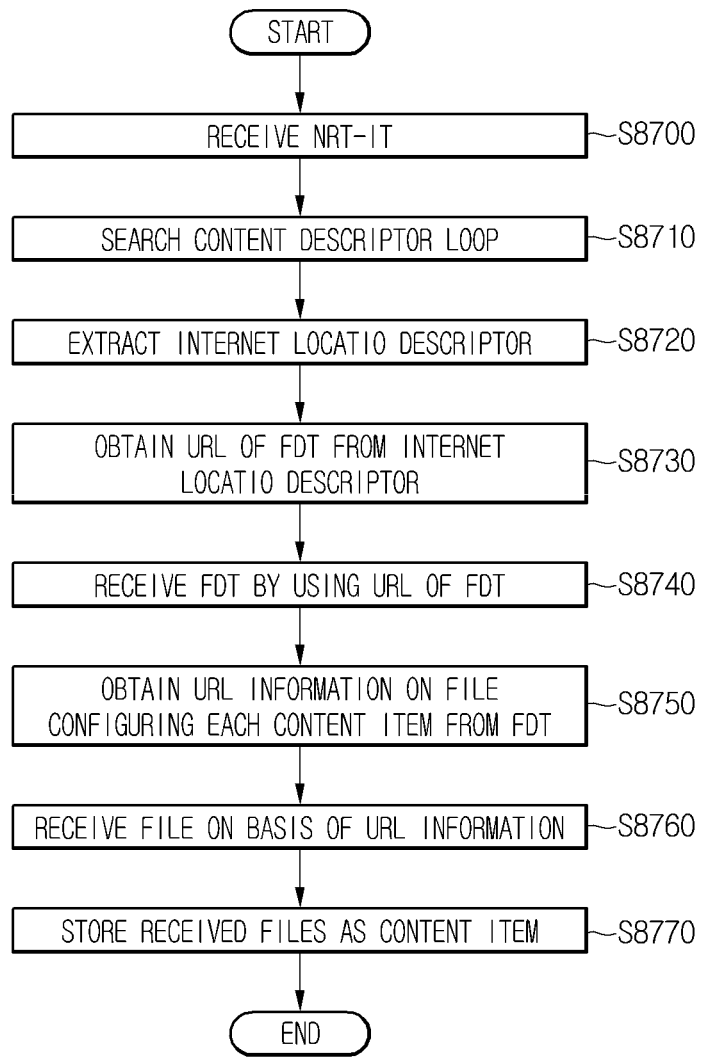
FIG. 78 is a flowchart illustrating an operation of the receiver 300 when the URL of an FDT is transmitted through an NRT-IT according to an embodiment of the present invention.

FIG. 78 is a flowchart illustrating an operation of the receiver 300 when the URL of FDT is transmitted through NRT-IT according to an embodiment of the present invention.

According to an embodiment of the present invention, the transmitter 200 includes the internet location descriptor in a content descriptor loop of an NRT-IT and transmits it, and the internet location descriptor includes URL information for obtaining FDT.

First, the receiver 300 receives the NRT-IT through the service manager 350 in operation S8700.

Then, the receiver 300 extracts an internet location descriptor from a content descriptor loop content_descriptor( ) of the NRT-IT through the service manager 350 in operation S8610, obtains URL information of an FDT from the internet location descriptor in operation S8630, receives the FDT by using the URL information of the FDT through an internet network in operation S8740, and obtains URL information of a file configuring each content item from the FDT in operation S8750.

Here, the receiver 300 receives URL information of FDT through an internet location descriptor, and also receives FDT in access to a FLUTE session through an SMT and an NRT-IT. Additionally, the URL of each file in an FDT may indicate the address of an internet network, and may also indicate a file position in a FLUTE session. Accordingly, the receiver 300 determines the URL format of each file from the FDT, and selectively receives each file through one of a FLUTE session and an internet network according to the determined format.

Additionally, the receiver 300 receives an FDT through an internet network, and receives files configuring a content item in access to a FLUTE session on the basis of the received FDT.

Moreover, the transmitter 200 designates a transmission preferred path when each file is transmittable through both a FLUTE session and an internet network. The transmission priority path may be designated as an attribute of File type: complex type by using xml schema. For example, it may be designated as <xs:attribute name="Internet_preferred" type="s:boolean" use="optional" default="false"/>. Here, internet_preferred means preferred transmission through an internet network, and when a type value is true, it means that preferred transmission through an internet network is performed. Additionally default is defined as false and this indicates that preferred transmission through a FLUTE session is performed by default. Accordingly, the receiver 300 confirms the attribute of each file type to selectively receive each file through one of a FLUTE session and an internet network.

Then, the service manager 350 of the receiver 300 receives designated files according to the obtained URL information of the files through a FLUTE session or an internet network in operation S8760 and stores the received files as a content item in operation S8670.

The service manager 350 of the receiver 300 may store each file as a content item of NRT service on the basis of the content linkage field of the FDT as mentioned above. Additionally, the service manager 350 of the receiver 300 provides to a user NRT service on the basis of the stored content item.

Furthermore, NRT service may include the above-mentioned TDO and an NRT service declarative object (NDO). The receiver 300 may receive a TDO or an NDO to provide NRT service. Moreover, NRT service may include at least one content item, and the receiver 300 may receive at least one content item to provide NRT service. In providing NRT service, the receiver 300 extracts the above-mentioned consumption model field from an NRT service descriptor, and determines a consumption model of NRT service, so that service is provided through different methods according to a consumption model.

A service provider determines a consumption model corresponding to NRT service and then, allocates a consumption model field value corresponding thereto to NRT service and transmits it. A consumption model field may be included in an NRT service descriptor as shown in FIG. 67, and the receiver 300 may operate according to the extracted consumption model field. Although such a consumption model field value and an operation of the receiver 300 are shown in FIG. 68, a more detailed operation will be described below.

A consumption model of NRT service may be Browse and Download. In this case, NRT service may include a selectable content for later download. Additionally, a user interface of NRT service provided from the receiver 300 may indicate selectable content. Also, a user may move between already-downloaded content items through a user interface of NRT service and may select a view command.

In the case of a browser and download consumption model, NRT service may include a plurality of content items. The receiver 300 may download at least one content item that a user selects to download. Here, a content item is downloaded in the background. Additionally, the receiver 300 monitors a content item downloaded for update in the background. The receiver 300 downloads a updated content item if update is confirmed based on a result of monitoring. Additionally, the receiver 300 may not update downloaded content items according to a setting.

Additionally, when at least one content that a user select is downloaded completely, the receiver 300 may execute or present it according to a user's selection. Then, the executed or presented at least one content item may be suspended or paused according to a user's instruction. Additionally, the receiver 300 may resume to execute or present the suspended or paused at least one content according to a user's instruction. In addition, when the executed or presented at least one content item is completed or a user instructs it to be terminated or a user selects to present another content item of browser and download service, the receiver 300 may terminate the executed or presented at least one content item. The receiver 300 may delete one content item when a user instructs to delete it.

Accordingly, a user may execute or present a content item of a browser and download consumption model, or may suspend or pause the executing or presenting, or after a user exit the NRT service and comes back again, may resume the executing or presenting again.

Moreover, a consumption model of NRT service may be Push. In this case, NRT service may include a request based content. For example, the receiver 300 may execute or present a content item included in NRT service according to a request of a user subscribed to an NRT service of a push consumption model. The receiver 300 receives from a user an input on whether an NRT service of a received push model or a content relating thereto is automatically updated.

According to an embodiment of the present invention, the receiver 300 displays topics that a user or subscriber can select in correspondence to content items included in an NRT service of a push consumption model, receives a content item corresponding to the selected topic, and automatically performs updating. Accordingly, a user is allowed to select a content item to be updated automatically. The receiver 300 may provide an updated content item by using a predetermined area of NRT service displayed, and may continuously perform updating. If a user selects a content item for automatic update, the receiver 300 stores a received push model NRT service or a content relating thereto in a cache, and automatically updates files configuring the content to a new version. The receiver 300 may pre-load content and then display it when returning to a push model NRT service that a user requests. Additionally, in the case of a push consumption model, download, execution, suspension, resume, and termination are performed identical to those of the browser and download service.

In the case of a push consumption model, NRT service may include one content item. The receiver 300 may download one content item in a push consumption model in the background. Then, the receiver 300 confirms update of the downloaded content item in the background. Additionally, the receiver 300 may execute the downloaded content item according to a user's NRT service select command. The receiver 300 may terminate the executed content item when a user makes an input for exiting NRT service. The receiver 300 may perform the automatic update when a user subscribes to a content item receiving service of a push consumption model. The receiver 300 determines whether to provide an automatic update option on the basis of an auto-update field in an NRT service descriptor in an SMT. Accordingly, the receiver 300 provides automatic update according to a user's selection on an automatic update option provided based on an NRT service descriptor and performs update in the background. When the automatic update option is off, for example, when a user closes the content item receiving service of the push consumption model, the receiver 300 may delete the downloaded content item.

Moreover, a consumption model of NRT service may be Portal. In this case, NRT service may include a service similar to accessing a web browser. Accordingly, a FLUTE session linked with an NRT service of a portal consumption model may include files for text or graphical components to configure a web page. Additionally, files providing portal NRT service are updated within near-real-time and then transmitted. Accordingly, the receiver 300 may generate a screen of a portal consumption model NRT service to be displayed while a viewer waits.

In the case of a portal consumption model, NRT service may include one content item. When a user selects a portable consumption model NRT service, the receiver 300 may download one content item therein. Additionally, the receiver 300 may launch a content item when an entry file is downloaded among files of the content item that is being downloaded. The receiver 300 may terminate and delete the launched content item when a user makes an input for exiting NRT service. Additionally, in the case of a portal consumption model, download, execution, suspension, resume, and termination are performed identical to those of the browser and download service.

In the case of the above consumption models, the receiver 300 provides NRT service on the basis of one content item. However, with one content item, it is difficult to generate a user interface linked with real-time broadcast or provide a complex and diverse NRT service.

Accordingly, according to an embodiment of the present invention, an NRT service provider may provide a plurality of content items through the transmitter 300.

Additionally, an NRT service provider may set one content item to control an operation of another content item. The receiver 300 receives this, and identifies a consumption model providing a plurality of content items to provide complex and various NRT services to a user. By using such a consumption model, an NRT service provider may generate a user interface that is interactive with NRT service (NDO or TDO) and transmit it. The receiver 300 generates a look and feel user interface interactive with a user on the basis of a plurality of content items in NRT service and provides it to a user.

Such a consumption model of NRT service may be the above-mentioned TDO consumption model. In this case, NRT service transmitted may include the above-mentioned TDO.

In the case of a TDO consumption model, NRT service may include a plurality of content items. The receiver 300 may download each content item founded in the currently selected NRT service. The receiver 300 may update each content item whose updated version is founded in the currently selected NRT service. Each content item is executed or terminated by a trigger.

Also, according to an embodiment of the present invention, a consumption model of NRT service may be a scripted consumption model. In Such an interactive content item may be referred to as an entry content item that controls content items but is not limited the name of the content item. For example, an interactive content item may be a master content item of other content items.

The receiver 300 first receives an entry content item or master content item and then launches it. The entry content item may include a function for managing the access and download of NRT service content items. Additionally, the entry content item may include a function for displaying usable contents. The receiver 300 may display a user interface for allowing a user to select a usable content and reserve download, according to the launch of an entry content item. A user interface displayed may include a menu for playing previously-downloaded contents.

An NRT service object in an NRT service of a scripted consumption model is automatically executed when a user accesses the scripted consumption model NRT service. For example, a scripted consumption model NRT service object may be triggered by a user's access and then, executed.

The scripted consumption model NRT service may include a plurality of content items. One of the plurality of content items may include an entry content item having a user input available and interactive interface. The transmitter 300 inserts such a user interactive interface into an entry content item and transmits it, and the receiver 300 receives and launches an entry content item first. Then, the receiver 300 may control the download, update, or execution of another content item by launching the entry content item. Accordingly, an entry content item may include at least one file for downloading, updating, or executing other content items.

Also, an NDO including an entry content item may be executed when a user selects an NRT service including an NDO. Additionally, the executed NDO may be terminated when a NRT service exiting command of a user is inputted. An NRT service object including an entry content item is downloaded in advance and updated. Additionally, after the downloaded NRT service object is executed and terminated, the receiver 300 may maintain its storage. Through this, each time NRT service is selected, a user does not need to wait the receivers to download the NRT service, and is allowed to receive an NRT service updated by an entry content item, so that user's convenience may be enhanced.

According to an embodiment, in the case of a scripted consumption model, the receiver 300 may operate similar to a push consumption model. An NRT service designated as a scripted consumption model may include a plurality of content items corresponding to a push consumption model or a portal consumption model. Accordingly, a scripted consumption model may mean a consumption model extending a push consumption model. Accordingly, a scripted consumption model may mean a consumption model extending a portal consumption model. Accordingly, a service provider may generate and transmit an NRT object by designating a push scripted consumption model or a portal scripted consumption model.

An NRT service object or NRT service of a scripted consumption model may include the above-mentioned plurality of content items and one of the plurality of content items is an entry content item. An entry content item is a content item that is launched first of all to provide by the receiver 300 NRT service according to an NRT service object. Then, files configuring each content item may include an entry file. The entry file is a file that is launched first of all when a content item is executed. Accordingly, a service provider generates an NRT service object through the transmitter 200, designates an entry content item to be launched first, and includes information on an entry content item in an NRT service object or transmits it through service signaling data. Then, a service provider may designate an entry file to be launched first of all among files configuring each content item through transmitter 200, and may transmit information on an entry file through service signaling data or a FLUTE session.

Moreover, an NRT service of a consumption model, push consumption model, or portal consumption model of the browser and download consumption model may include a plurality of content items.

For example, an NRT service of a browser and download consumption model may include a plurality of content items. The plurality of content items may include a set of different information, and each may include an NRT service object with a unique look and feel interface to indicate a set of information. Each object may include the above-mentioned entry file by each content item. A user may select which content item is to be downloaded through the receiver 300, and also may select a content item for presentation after a predetermined time. When a content item for presentation is selected, the receiver 300 executes an object including a look and feel interface in the content item, outputs presentation, and manages the outputted presentation.

Additionally, an NRT service of a push consumption model may include an NRT service object including an entry file. The receiver 300 continuously updates files used in an NRT service object. When a user selects automatic update of service, the receiver 300 may maintain the update of the files. Additionally, the receiver 300 may update the files by an operation of an NRT service object itself. When a user selects NRT service, the receiver 300 may execute an NRT object to manage the presentation of the selected NRT service data.

Additionally, an NRT service of a portal consumption model may include an NRT service object including an entry file. When a user selects an NRT service of a portal consumption model, the receiver 300 obtains and executes an NRT service object including an entry file. The NRT service object including an entry file may manage presentation for other files. In this case, an entry file is a simple HTML page, and each time service is provided, an obtaining process is necessary, so that a smooth operation may be guaranteed only when an acquisition time is very short. Accordingly, it is difficult for the receiver 300 to provide complex and various look and feel interactive interfaces by using only an entry file. Therefore, according to an embodiment, when an entry content item is designated and transmitted, the receiver 300 may store the entry content item in a predetermined storage space after an initial acquisition time of the entry content item. Since the receiver 300 does not require a following acquisition time for presentation, the presentation is possible using an interactive interface, and a smooth and natural operation is guaranteed. Accordingly, a service provider generates and transmits a look and feel interactive interface through the transmitter 200, and the receiver 300 provides a list of NRT service to a user through the interactive interface generated by the service provider without its own interface and executes a selected NRT service.

Figure 79:
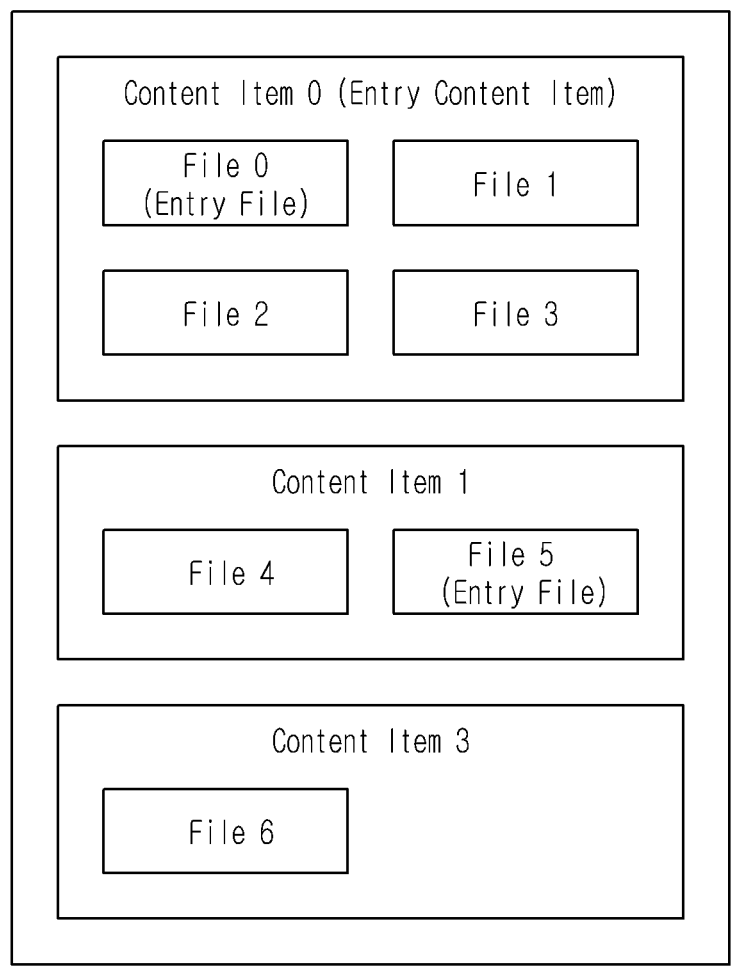
FIG. 79 is a conceptual view illustrating an NRT service including an entry content item.

FIG. 79 is a conceptual view illustrating an NRT service including an entry content item.

Referring to FIG. 79, the NRT service may include a plurality of content items such as a content item 0, a content item 1, and a content item 3. Also, a service provider may designate each entry content item or entry file through the transmitter 200. As shown in FIG. 79, an entry content item is designated as the content item 0, and the entry file is designated as a file 0 and a file 5.

When an NRT service of FIG. 79 is received and a user selects it, the receiver 300 executes the content item 0, i.e., an entry content item first of all. When launching the content item 0, the receiver 300 may execute the file 0, i.e., an entry file, first of all. Here, the entry content item may include a function for managing other content items. Accordingly, the receiver 300 may display the content item 1 and the content item 3 by an operation of the content item 0, and the content item 0 may execute or terminates at least one of the content item 1 and the content item 3 according to a user's selection. Moreover, when the content item 1 is executed, the file 5, i.e., an entry file, may be launched first.

FIGS. 65 and 66 are views illustrating an NRT-IT to transmit information on an entry content item.

The NRT-IT or NCT shown in FIGS. 65 and 66 is included in service signaling data, and the transmitter 200 includes information on an entry content item in service signaling data and transmits it. For example, the transmitter 200 may include a field, which indicates whether a specific content item is an entry content item, in the NRT-IT and then, may transmit it. Accordingly, the receiver 300 receives the service signaling data, extracts the NRT-IT, parses the field that indicates whether a specific content item is an entry content item, determines which content item is an entry content, and launches it first of all. As mentioned above, the NRT-IT may include individual information on a plurality of content items. Information of each of the plurality of content items may be included in a content item loop starting as for (j=0; j<num_content_items_in_section; j++). Then, each content item may correspond to each content item loop identified by a content linkage field. Accordingly, the receiver 200 parses a content item loop to obtain a no_entry_flag field corresponding to each content item. Since descriptions for other fields in FIGS. 65 and 66 are identical or similar to those of FIG. 16, their repeated descriptions are omitted.

A no_entry_flag field may be a 1-bit number indicating an entry content item. If this field is 0, a content item corresponding to a content item loop that this field belongs may be an entry content item of a service identified by service_id. If this field is 1, a content item corresponding to a content item loop that this field belongs may not be an entry content item of the above-mentioned service.

The transmitter 200 designates a content item to be launched first as an entry content item by using the no_entry_flag field and transmits it. The receiver 300 determines whether the no_entry_flag field is 0 or 1, and thus obtains information on a content item to be launched first.

FIG. 82 is a view illustrating an operation method of the receiver 300 when an entry content item is transmitted according to an embodiment of the present invention.

Referring to FIG. 82, the receiver 300 first receives an SMT and an NRT-IT from service signaling data in operation S8800, parses a service level descriptor loop from the SMT, and parses NRT_service_info_descriptor in the service level descriptor loop in operation S8810. The receiver 300 may receive an SMT through a service signaling channel by using the service manager 350, and may parse service level descriptors including an NRT service information descriptor in a service level descriptor loop in each NRT service loop.

Also, the receiver 300 obtains information on an NRT service transmitted based on the parsed NRT service information descriptor, for example, at least one of an application type, a service category, service capacity, and video or audio codec information, to generate service guide and displays it in operation S8820. The receiver 300 generates and displays service guide through the service manager 350.

For example, the service manager 350 calculates a capacity of NRT service on the basis of a storage requirement field in the NRT service information descriptor and displays it on the service guide. Moreover, the service manager 350 determines video or audio codec of NRT service on the basis of an audio_codec_type or video_codec_type field in the NRT service information descriptor, and displays information therefor on the service guide.

Then, the receiver 300 determines whether service reception on NRT service is selected in operation S8830. The service reception selection may be made by a user viewing the service guide. The service manager 350 determines which one of NRT service displayed on the service guide is selected by a user. The receiver 300 may maintain the service guide display when NRT service is not selected.

Moreover, when service reception on NRT service is selected, the receiver 300 obtains reception information of content items that a service to be received includes from an NRT-IT in operation S8840. The service manager 350 obtains the service identifier of the selected NRT service from an SMT. Then, the service manager 350 obtains information on content items to receive the selected NRT service by comparing the service identifier with the NRT-IT.

For example, the service manager 350 extracts service_id corresponding to the NRT service to be received from an SMT. Then, the service manager 350 determines whether the service_id field of the NRT-IT corresponds to an NRT service to be received, and when they are matched, extracts a content_linkage field from a content item loop to obtain reception information of content items. Additionally, according to an embodiment, the service manager 350 obtains the no_entry_flag field from each content item loop, and determines in advance whether a content item corresponding to each content item loop is an entry content item before reception.

Then, the receiver 300 receives content items of an NRT service transmitted from the transmitter 200 on the basis of the obtained content item reception information in operation S8850. The service manager 350 of the receiver 300 may receive files configuring content items in access to a FLUTE session on the basis of the obtained service_id field and content_linkage field, as mentioned above.

Then, the receiver 300 determines whether there is a execute command on the received NRT service in operation S8860. The service manager 350 of the receiver 300 determines whether there is a user's execute command when the content item of NRT service is received completely. Additionally, the service manager 350 may automatically execute the received NRT service without a user's execute command.

When the NRT service is executed, the receiver 300 first determines whether a consumption model is scripted in operation S8870. The service manager 350 of the receiver 300 parses a service level descriptor loop from SMT, extracts NRT_service_descriptor from the service level descriptor loop, and determines whether the NRT service is a scripted consumption model on the basis of a value of the consumption_model field in NRT_service_descriptor. A value of a consumption model field for a scripted consumption model may be pre-designated. When its value is not a scripted consumption model, the receiver 300 operates in a different way according to another consumption model to provide service in operation S8890.

However, when the consumption model field corresponds to a value designated as a scripted consumption model, the receiver searches for an entry content item among the received content items in operation S8875. The receiver 300 searches for files in the entry content item among content items to execute it first. For this, the receiver 300 may search for an entry content item by using the no_entry_flag field of the NRT-IT. Additionally, the receiver 300 first receives and stores an entry content item in order for fast search and execute. For example, when content items configuring the selected NRT service are not all received, the receiver 300 receives, searches for, and executes an entry content item in advance, so that the NRT service may be partially provided.

Then, when the entry content item is searched, the receiver 300 executes an entry file first among files in the entry content item in operation S8880. When there is no entry file, the receiver 300 may execute a file according to a file order or predetermined order.

Then, the receiver 300 operates by the executed file, and accordingly, provides NRT service to a user in operation S8885. The receiver 300 provides NRT service by sing an interactive interface in an entry content item. Additionally, the receiver 300 may execute or manage another content item according to a user input for an interactive interface in an entry content item.

In such a way, the receiver 300 executes an entry content item first to provide an interactive interface to a user. Additionally, the receiver 300 may manage content items of the selected NRT service through an interactive interface launched in an entry content item. The interactive interface may include a look and feel interface, and may be configured based on a graphic user interface for user's convenience. Moreover, the interactive interface may include a management menu such as execution, termination, storage, or deletion of NRT service. For this, the interactive interface may include an icon image or video corresponding to each management menu. A user may conveniently manage another NRT service or other content items through an interface in an entry content item.

In such a way, the transmitter 200 designates a consumption mode corresponding to NRT service or an NRT service object to a consumption model or one of the other consumption models, allocates a value corresponding to the designated consumption model to a consumption model field in an NRT service descriptor of an NRT service information table, and transmits the NRT service information table through a service signaling channel.

However, a recognizable consumption model field value may be limited according to the type or production time of the receiver 300 For example, the receiver 300 may operate by recognizing one of a push or portal consumption model value. In this case, when the transmitter 200 designates NRT service as a scripted consumption model and transmits it, the receiver 300 determines that a consumption model value is not designated, so that normal NRT service may not be provided.

Therefore, according to an embodiment of the present invention, the transmitter 200 generates a plurality of NRT service objects in correspondence to the same NRT service, and allocates different consumption model field values to the generated NRT service objects. The transmitter 200 may include allocation information of the consumption model field values in the above-mentioned NRT service table and then, may transmit it.

Figure 83:
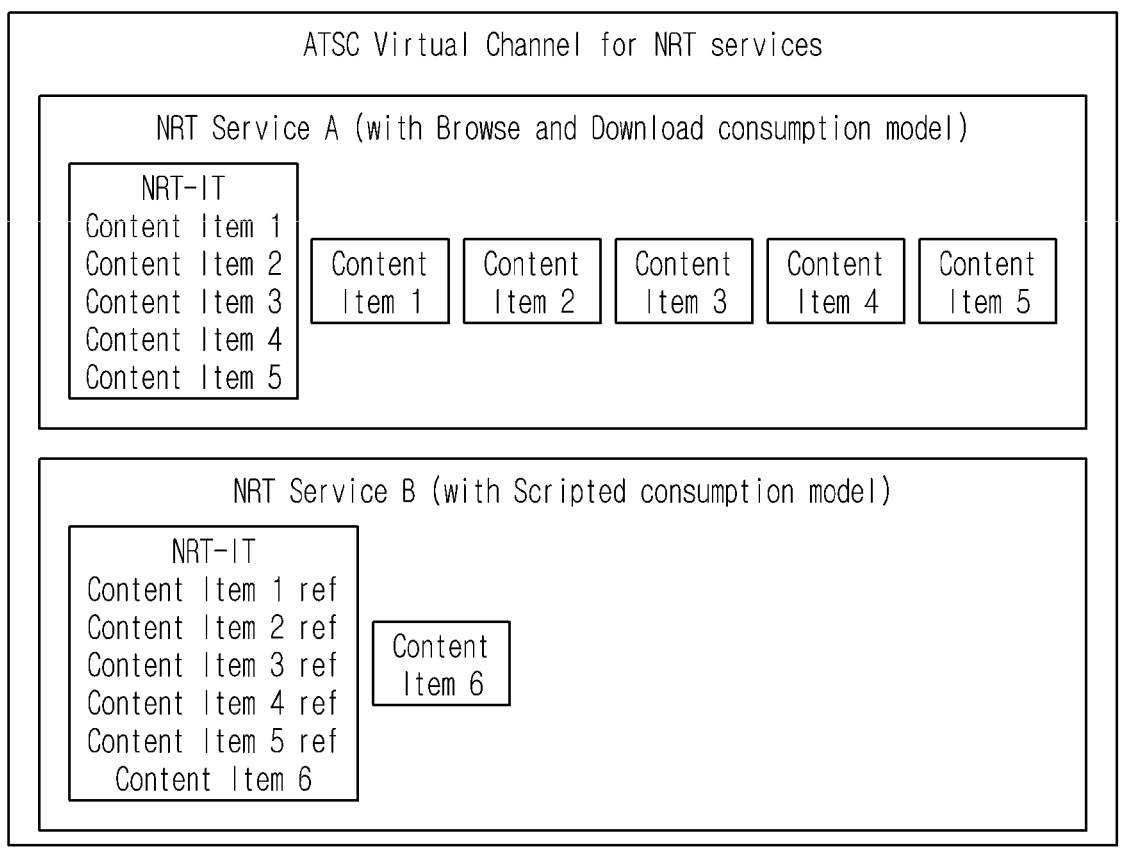
FIG. 83 is a conceptual view of a plurality of NRT service objects transmitted according to an embodiment of the present invention.

FIG. 83 is a conceptual view of a plurality of NRT service objects transmitted according to an embodiment of the present invention.

As shown in FIG. 83, an NRT service transmitted one virtual channel may include an NRT service object A and an NRT service object B. Also, A and B may provide the same NRT service. However, the NRT service object A may be designated as a browser and download consumption model and the NRT service object B may be designated as a scripted consumption model.

According to an embodiment of the present invention, a content item for providing the same NRT service may be the content item 1 to the content item 5 as shown in FIG. 83. Accordingly, the NRT service object A may include the content item 1 to the content item 5 provided by the browser and down consumption model. Also, the NRT service object B may include the content item 6, i.e., the entry content item of the scripted consumption model. The content item 6 may include the above-mentioned interactive interface controlling the content item 1 to the content item 5.

In this way, when transmitting a specific NRT service including the content item 1 to the content item 5 as a browser and download consumption model, the transmitter 200 includes the content item 1 to the content item 5 in the NRT service A and transmits it. When transmitting them as a scripted consumption model, the transmitter 200 includes the content item 6, which is an entry content item to control the content item 1 to the content item 5, in the NRT service B and transmits it. The NRT service B includes only an entry content item, and the content item provides an interface by using content items included in the NRT service B, so that redundant transmission of a content item may be prevented and the waste of a bandwidth may be reduced.

Here, the entry content item may refer to an NRT-IT or an SMT in order to execute content items included in another NRT service. The NRT-IT or SMT may include relationship information between NRT services and information on content items according thereto. For example, the NRT-IT may include relationship information or reference information that the NRT service A and the NRT service B provide services by using the same content item.

According to an embodiment, the NRT service A and the NRT service B provide service by using the same content item, but the NRT service A and the NRT service B may include different NRT service objects or content items.

FIG. 84 is a view illustrating a syntax of an NRT service descriptor included in the SMT according to an embodiment of the present invention.

The above-mentioned relationship information may be included in an NRT service descriptor in a service descriptor loop of the SMT. According to an embodiment of the present invention, service is provided using the same content item but NRT services having different consumption model field values may be referred to as the same service or equivalent service. The relationship information on the equivalent services, as shown in FIG. 84, may include an equivalent_service_not_present field, a num_equivalent_services field, and an equivalent_service_id field.

The equivalent_service_not_present field may be a 1-bit flag to indicate whether there is equivalent service among transmitted NRT services. If this field is 0, it means that there is equivalent service.

The num_equivalent_services field may be an 8-bit unsigned integer to indicate the number if there is equivalent service.

The equivalent_service_id field may be an 16-bit unsigned integer to indicate a service identifier corresponding to equivalent service. Here, the equivalent_service_id field may include on a service identifier when equivalent service is transmitted through the same broadcast channel. However, when the same service is transmitted through different virtual channels, the equivalent_service_id field may include a service identifier and a broadcast identifier. Moreover, an NRT service descriptor may further include an MH broadcast identifier field corresponding to a mobile broadcast identifier.

Since descriptions for other fields of an NRT service descriptor are identical to those of FIG. 67, repeated descriptions are omitted.

FIGS. 70 and 71 are views illustrating a syntax of another NRT-IT according to another embodiment of the present invention. Since descriptions for other fields of the NRT-IT of FIGS. 70 and 71 are identical to the above, repeated descriptions are omitted.

As shown in FIGS. 70 and 71, the NRT-IT may further include an available_on_current_service field. When equivalent service is transmitted, this field indicates whether there is a content item transmitted in another NRT service. Additionally, even when there is no equivalent service, this field indicates whether a content item linked with a currently executed NRT service is transmitted through another NRT service in order for the receiver 300 to receive or execute a content item of another NRT service through an entry content item.

The available_on_current_service field may be a 1-bit number to indicate whether a currently transmitted NRT service (NRT service corresponding to a service identifier field of NRT-IT) includes a content item that this field belongs. If a value of this field is 1, the content item is included in the currently transmitted NRT service and transmitted, and if a value of this field is 0, the content item is included in another NRT service and transmitted.

The available_on_current_service field may be used for the receiver 300 to determine whether there is a content item transmitted in another NRT service linked with the currently transmitted NRT service. For example, when NRT service is selected and an entry content item is launched in the receiver 300, an entry content item determines whether there is a content item transmitted in another NRT service on the basis of the available_on_current_service field in order to provide a content item in another NRT service, and receives or executes a content item transmitted in another NRT service. The transmitter 200 may include information on a content item transmitted through another NRT service in NRT-IT and then, may transmit it. For example, the transmitter 200 may include information on a content item transmitted through another NRT service in a specific descriptor of NRT-IT and then, may transmit it.

FIG. 87 is a view illustrating a syntax of Other_NRT_location_descriptor according to another embodiment of the present invention.

Referring to FIG. 87, an other NRT location descriptor includes a descriptor_tag field, a descriptor_length_field, a num_other_NRT_locations field, and an other_service_id field.

The descriptor_tag may be an 8-bit unsigned integer to distinguish this descriptor as a link descriptor. For example, this field may have a 0xe8 value.

The descriptor_length field may be an 8-bit unsigned integer to define the length from a field immediately following this field to the end of a link descriptor.

The num_other_NRT_locations field may be a 6-bit unsigned integer to indicate the number of other_service_id.

The other_service_id field may be an 16-bit unsigned integer to indicate a service identifier of another NRT services in which a content item is transmitted.

Such an other NRT service location descriptor may be one of content level descriptors in a content level descriptor loop (a loop starting with for (i=0; j<num_content_descriptors; i++)) of the NRT-IT of FIGS. 70 and 71. Accordingly, the NRT service location descriptor is included in the NRT-IT and then, transmitted.

The receiver 300 determines whether a content item is transmitted through another NRT services on the basis of the NRT-IT, and obtains the identifier of another NRT services in which a content item is transmitted on the basis of an NRT service location descriptor.

Figure 88:
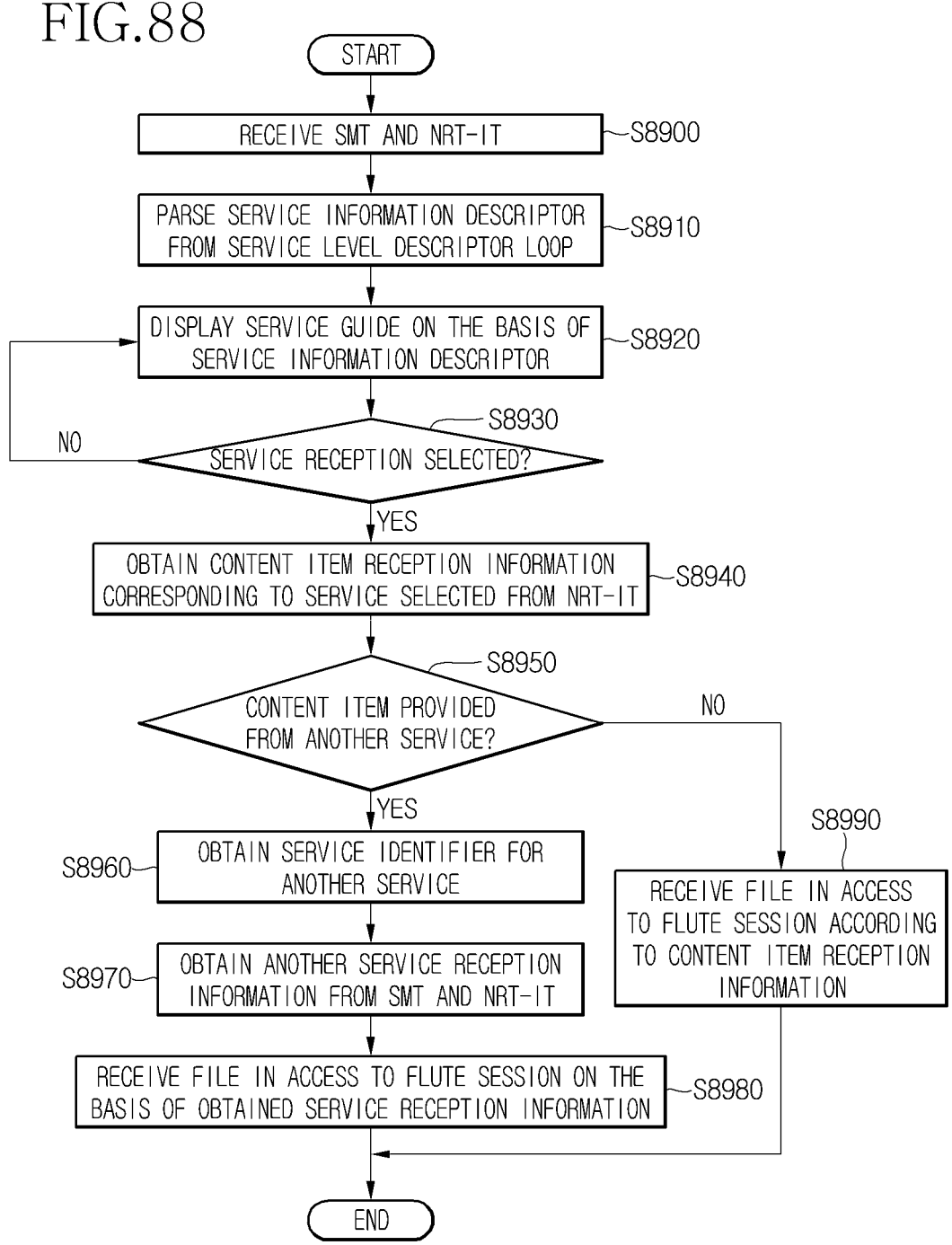
FIG. 88 is a flowchart illustrating a method of receiving broadcast service according to an embodiment of the present invention.

FIG. 88 is a flowchart illustrating a method of receiving broadcast service according to an embodiment of the present invention.

Referring to FIG. 88, the receiver 300 receives an SMT and an NRT-IT from the service signaling data in operation S8900, parses a service level descriptor loop from the SMT and parses NRT_service_info_descriptor in the service level descriptor loop in operation S8910, generates service guide on the basis of the parsed NRT service info descriptor and displays it in operation S8920, and determines whether service reception for NRT service is selected in operation S8930. The above operations may be performed by the service manager 350 of the receiver 300.

Moreover, when service reception on NRT service is selected, the receiver 300 obtains reception information of content items that a service to be received includes from the NRT-IT in operation S8940. The reception information on content items may include content_linkage of a content item and service_id of NRT service that each content item belongs.

Then, the receiver 300 first determines whether a content item is provided through NRT service by using the reception information in operation S8950. Here, the reception information of a content item may include relationship information indicating whether a content item is transmitted through a currently selected service or whether a content item is transmitted through another NRT services. For example, the reception information may include the available_on_current_service field. Additionally, when a content item is transmitted through another NRT service, the reception information of the content item may include the identifier of the other NRT service and the identifier of the content item in order to receive the content item. Accordingly, the receiver 300 determines whether a content item is provided through another NRT service by using the relationship information.

Additionally, the relationship information may include other_NRT_location_descriptor, and the service manager 350 of the receiver 300 determines whether a content item of NRT service that a current user selects to receive is transmitted through a selected service or another NRT service by using the relationship information, and identifies an object corresponding to the other NRT service to receive a content item therein.

If it is determined that the content item is not transmitted through another NRT service, the service manager 350 of the receiver 300 accesses a FLUTE session according to the obtained content item reception information, and receives files configuring each content item through the above method.

Moreover, if it is determined that the content item is transmitted, the service manager 350 of the receiver 300 obtains the service identifier for another NRT service from the reception information in operation S8960 and, by receiving SMT and NRT-IT corresponding thereto, obtains content item reception information in another NRT service in operation S8970. Then, the service manager 350 may receive files configuring a content item in access to a FLUTE session on the basis of the content item reception information.

Here, content items in another NRT service may be executed by an entry content item of the reception selected NRT service. The service manager 350 of the receiver 300 identifies the entry content item of the reception selected NRT service, receives and launches the entry content item first, and displays an interactive interface in the entry content item. Additionally, the receiver 300 may receive or execute a content item of another NRT service in correspondence to a user input for the displayed interface.

Additionally, as mentioned above, a content item of the same NRT service may be executed or received by an entry content item. When each content item is received or executed, the service manager 350 of the receiver 300 first receives and launches an entry file in files configuring each content item, as mentioned above. The service manager 350 of the receiver 300 may receive a list of files from a FLUTE session through FDT before receiving a file of a content item, and identifies an entry file first on the basis of the FDT.

Hereinafter, an adjunct service receiving method according to another embodiment of the present invention will be described.

The adjunct service may include service information, metadata, enhanced data, a compiled execution file, web application, Hypertext Markup Language (HTML) document, XML document, cascading style sheet (CSS) document, an audio file, a video file, and an address such as Uniform Resource Locator (URL). Additionally, the adjunct service may include signaling data, real time data, a trigger, an SMT, an NRT-IT, an EIT, a VCT, and a PMT.

As digital broadcasting is vitalized, a broadcasting station transmits main AV content together with adjunct service data that are used in linkage with the main AV content or separated from the main AV content.

However, under the current broadcasting environment, an image display device in each home may less likely receive broadcast signals directly through airwaves.

Rather, since an image display device in each home is connected to a broadcast receiving device such as a settop box, it may play an uncompressed AV content that the broadcast receiving device provides.

Furthermore, the broadcast receiving device receives content from a server called a multichannel video programming distributor (MVPD). After receiving a broadcast signal from a broadcasting station and extracting content from the received broadcast signal, the MVPD converts the extracted content into a signal of a format fit for transmission and provides the converted signal to the broadcast receiving device. In this process, since the MVPD excludes the extracted adjunct service data or adds another adjunct service data, a broadcasting station may only serve as a role providing AV content and thus, may not provide an adjunct service led by a broadcasting station.

Since only uncompressed AV data are provided to an image display device by extracting main AV data from signals that are received from a broadcast receiving device or an MVPD, adjunct service is available only under a control of a broadcast receiving device and no adjunct service is available under a control of an image display device. This may prevent a broadcasting station from providing a self-led adjunct service further more.

Furthermore, even when a broadcasting station provides an adjunct service through a wireless channel, no adjunct service may be provided sufficiently due to the limitations of a bandwidth.

Hereinafter, an image display device providing an adjunct service led by a broadcasting station and a control method thereof will be described.

Then, a network topology according to an embodiment of the present invention will be described with reference to FIGS. 89 to 97.

Figure 89:
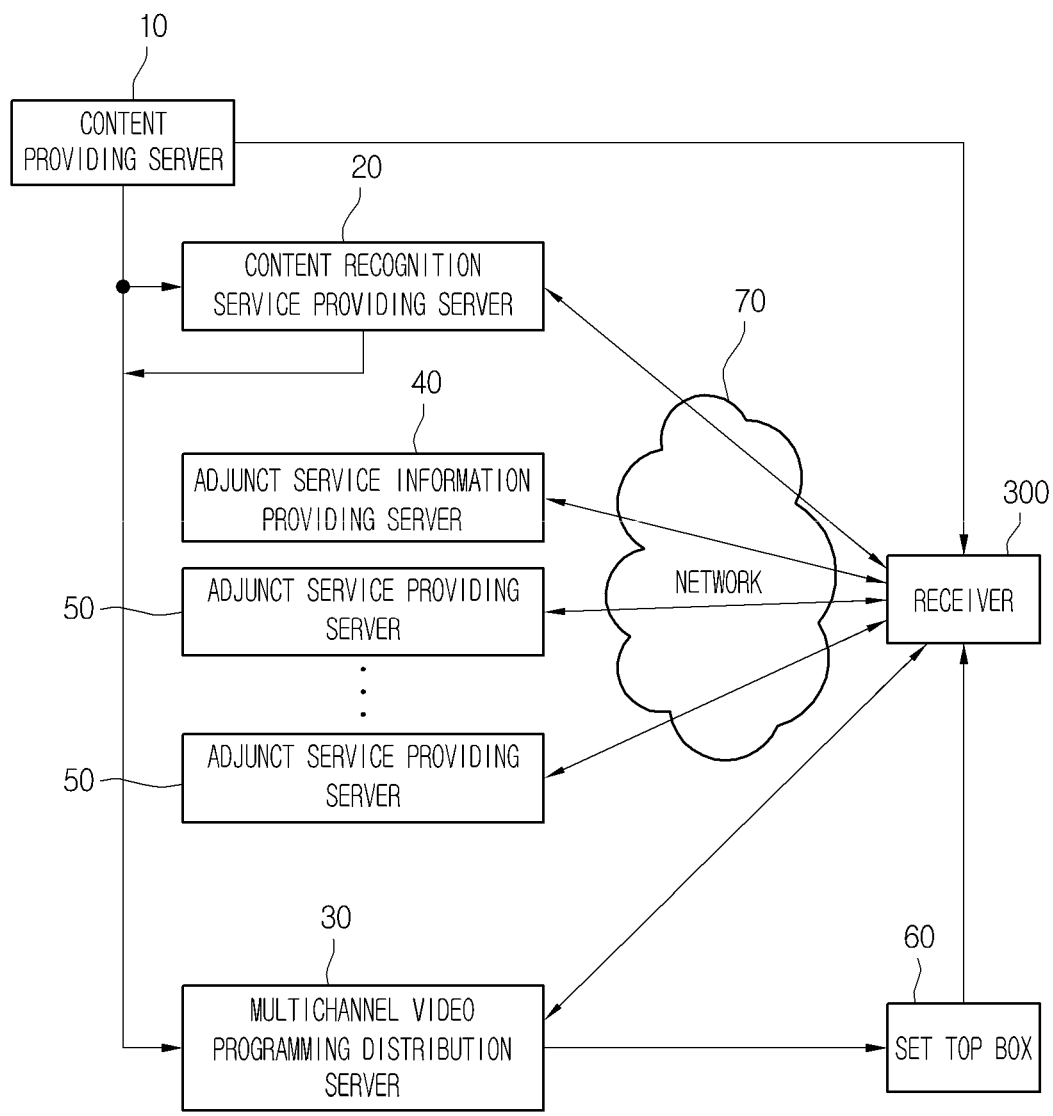
FIGS. 89 to 97 are views illustrating a network topology according to an embodiment of the present invention.

FIG. 89 is a block diagram of a network topology according to an embodiment of the present invention.

As shown in FIG. 89, the network topology according to an embodiment of the present invention includes a content providing server 10, a content recognition service providing server 20, a multichannel video distribution server 30, an adjunct service information providing server 40, a plurality of adjunct service providing servers 50, a settop box 60, a network 70, and a receiver 300.

The content providing server 10 may correspond to a broadcasting station, and broadcasts a broadcast signal including main audio-visual content. The broadcast signal may further include an adjunct service. The adjunct service may or may not relate to a main audio-visual content. At least one content providing server may exist.

The content recognition service providing server provides a content recognition service that allows the receiver 300 to recognize content on the basis of the main audio-visual content. The content recognition service providing server 20 may or may not modify the main audio-visual content. At least one content recognition service providing server may exist.

The content recognition service providing server 20 may be a watermark server inserting a visible watermark looking like a logo into the main AV content by applying a modification on the main audio-visual content. This watermark server may watermark the logo of a content provider at the top left or top right of each frame of the main AV content.

Moreover, the content recognition service providing server 20 may be a watermark server inserting content information as invisible watermark into the main audio-visual content by applying a modification on the main AV content.

Moreover, the content recognition service providing server 20 may be a fingerprint server extracting and storing feature information from some frames of the main AV content or a section of audio samples of the main AV content. This feature information is called a signature.

The multichannel video distribution server 30 receives broadcast signals from a plurality of broadcasting stations and multiplexes them to provide the multiplexed signals to the settop box 60. Especially, the multichannel video distribution server 30 performs a demodulation and channel decoding operation on the received broadcast signals to extract a main AV content and an adjunct service, and then performs a channel encoding operation on the extracted main AV content and adjunct service to generate multiplexed signals. At this point, since the multichannel video distribution server 30 excludes the extracted adjunct service data or adds another adjunct service data, a broadcasting station may not provide a service led by the broadcasting station. At least one multichannel video distribution server may exits.

The settop box 60 tunes a channel selected by a user, receives a signal of the tuned channel, and performs a demodulation and channel decoding operation on the received signal to extract main audio-video content. Then, the settop box 60 decodes the extracted main AV content by using H.264/Moving Picture Experts Group-4 advanced video coding (MPEG-4 AVC), Dolby AC-3, and a Moving Picture Experts Group-2 Advanced Audio Coding (MPEG-2 AAC) algorithm, so as to generate uncompressed main AV content. The settop box 60 provides the generated uncompressed main AV content to the receiver 300 through an external input port of the receiver 300.

The adjunct service information providing server provides adjunct service information for at least one available adjunct service relating to main AV content in response to a request of the receiver 300. The adjunct service information providing server 40 and the receiver 300 may communicate with each other through the network 70. At least one adjunct service address providing server may exist. The adjunct service information providing server 40 may provide adjunct service information for an adjunct service having the highest priority among a plurality of available adjunct services.

The adjunct service providing server 50 provides at least one adjunct service used in relation to main AV content in response to a request of the receiver 300. At least one adjunct service providing server may exist. The adjunct service providing server 50 and the receiver 300 may communicate with each other through the network 70.

The network 70 may be an IP based network or an Advanced Television Systems Committee—Mobile/Handheld (ATSC M/H) channel.

The receiver 300 may be a device having a display unit such as a television, a notebook, a mobile phone, a smart phone, etc. The receiver 300 may receive uncompressed main AV content from the settop box 60 through an external input port, or may receive a broadcast signal including encoded main AV content from the content providing server 10 or the multichannel video distribution server 30 through a broadcast network. The receiver 300 may receive a content recognition service from the content recognition service providing server 20 through the network 70, may receive an address of at least one available adjunct service relating to main AV content from the adjunct service information providing server 40 through the network 70, or may receive at least one available adjunct service relating to main AV content from the adjunct service providing server 50 through the network 70.

At least two of the content providing server 10, the content recognition service providing server 20, the multichannel video distribution server 30, the adjunct service information providing server 40, and the plurality of adjunct service providing servers 50 may be combined as a form of one server or operated by one provider.

Figure 90:
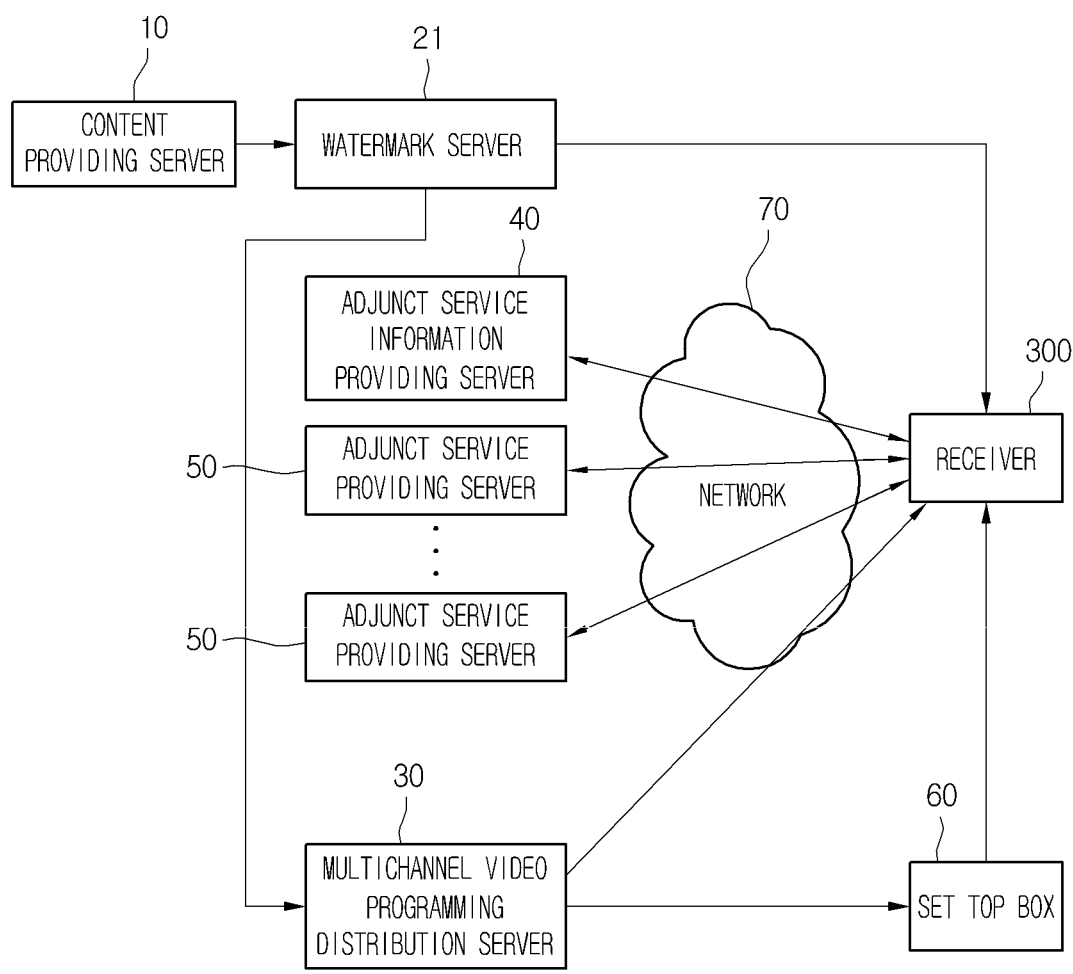

FIG. 90 is a block diagram of a watermark based network topology according to an embodiment of the present invention.

As shown in FIG. 90, the network topology according to an embodiment of the present invention further includes a watermark server 21.

The watermark server 21 shown in FIG. 90 applies a modification on main AV content to insert content information into the main AV content. The multichannel video distribution server 30 receives and distributes a broadcast signal including the modified main AV content. Especially, the watermark server may use a digital watermarking technology described below.

The digital watermark is a process for inserting information into a digital signal through a method of making deletion hard. For example, the digital signal may be audio, photo, or video. When this digital signal is copied, the inserted information is also contained in the copy. One digital signal may carry different several watermarks simultaneously.

In visible watermarking, the inserted information is distinguishable by the eye in photo or video. Typically, the inserted information is a text or logo identifying an owner of media.

When a television broadcasting station adds its logo to the corner of a transmitted video, this is a visually identifiable watermark.

In invisible watermarking, although information is added as digital data in audio, photo, or video, the fact that a predetermined amount of information is hidden may be detected but such information may not be recognized. A secrete message may be delivered through the invisible watermarking.

One application of watermarking is a copyright protection system for preventing illegal copy of digital media. For example, a copy device obtains a watermark from digital media before copying the digital media, and determines whether to copy the digital media on the basis of the content of the watermark.

Another application of watermarking is a source trace of digital media. A watermark is embedded in digital media at each point on a distribution path. When such digital media are found later, a watermark may be extracted from the digital media, and the source of distribution may be recognized from the content of the watermark.

Description on digital media is another application of invisible watermarking.

A file format for digital media includes additional information called metadata, and a digital watermark is distinguished from metadata in that the digital water mark is delivered as a visual signal itself of digital media.

A watermarking method includes spread spectrum, quantization, and amplitude modulation.

When a marked signal is obtained by additional modification, the watermarking method corresponds to the spread spectrum. Although the spread spectrum watermark is known to be quite robust, since the watermark interferes with an embedded host signal, a large amount of information is not loaded.

When a marked signal is obtained by the quantization, the watermarking method corresponds to a quantization type. Although the quantization watermark is less robust, a large amount of information is loaded.

When a marked signal is obtained through an additional modification method similar to the spread spectrum in a space domain, the watermarking method corresponds to the amplitude modulation.

Figure 91:
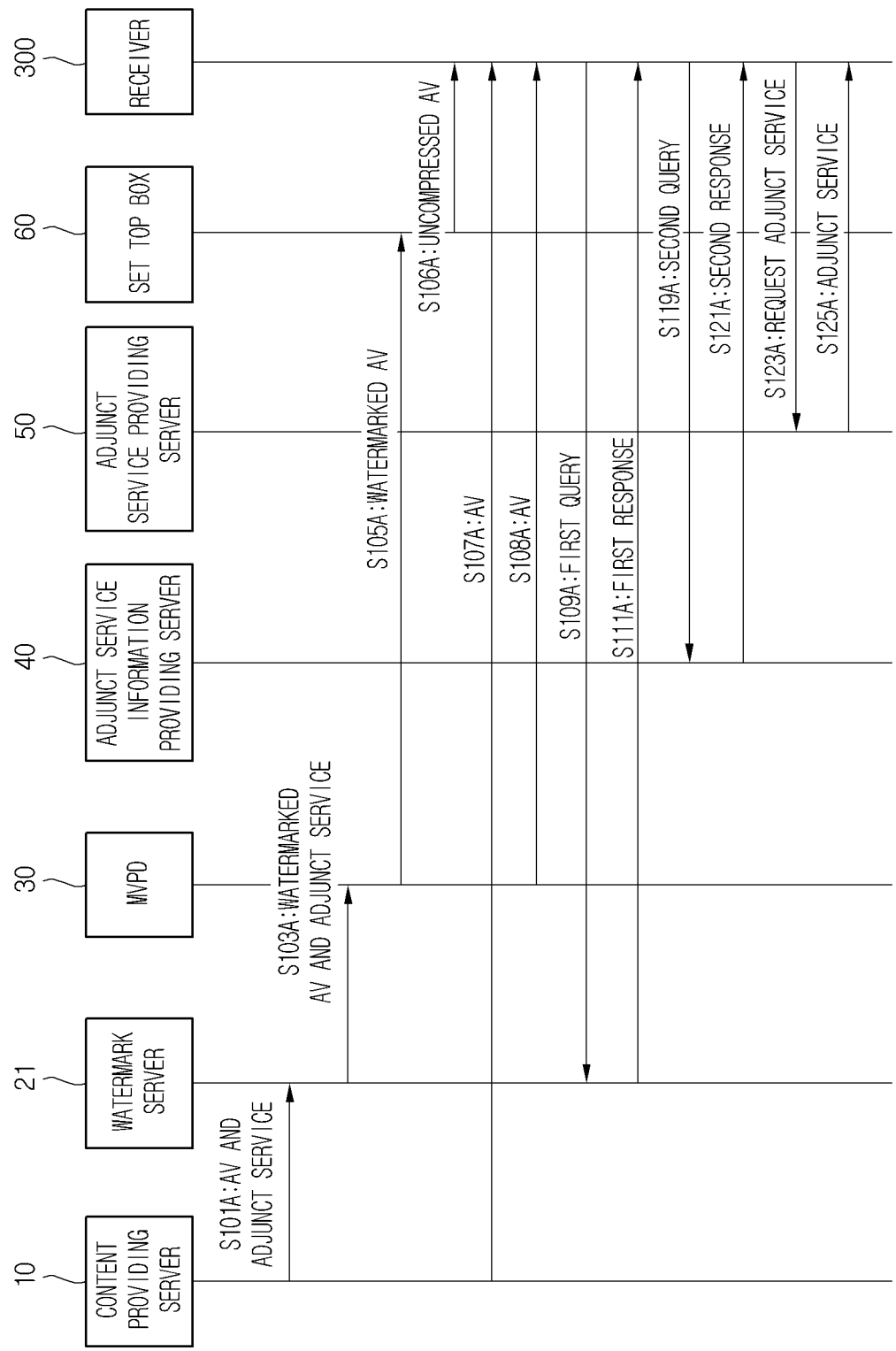

FIG. 91 is a ladder diagram illustrating a data flow in a watermark based network topology according to an embodiment of the present invention.

First, the content providing server 10 transmits a broadcast signal including main AV content and adjunct service in operation S101A.

The watermark server 21 receives a broadcast signal that the content providing server 10 provides, inserts a visible watermark looking like a logo into main AV content by applying a modification on the main AV content, inserts watermark information as invisible watermark into main AV content, and provides the watermarked main AV content and adjunct service to the MVPD 30 in operation S103A.

The watermark information inserted through an invisible watermark may include at least one of watermark purpose, content information, adjunct service information, and available enhance service. The watermark purpose may include one of illegal copy prevention, audience survey, and additional service acquisition.

The content information may include at least one of identification information of a content provider providing main AV content, main AV content identification information, main AV content rating information, time information of a content interval used for content information acquisition, the name of a channel broadcasting main AV content, the logo of a channel broadcasting main AV content, the name of a channel broadcasting main AV content, a usage information report address, a usage information report period, and a minimum usage time for usage information acquisition.

When the receiver 300 uses a watermark to obtain content information, time information of a content interval used for content information acquisition may be time information of a content interval where a watermark is embedded. When the receiver 300 uses a fingerprint to obtain content information, time information of a content interval used for content information acquisition may be time information of a content interval where feature information is extracted. The time information of a content interval used for content information acquisition may include at least one of a start time of a content interval used for content information acquisition, a duration of a content interval used for content information acquisition, and an end time of a content interval used for content information acquisition.

The usage information report address may include at least one of a main AV content viewing information report address and an adjunct service usage information report address. The usage information report period may include at least one of a main AV content viewing information report period and an adjunct service usage information report period. The minimum usage time for usage information acquisition may include at least one of a minimum viewing time for main AV content viewing information acquisition and a minimum usage time for adjunct service usage information extraction.

On the basis of the case that main AV content is watched more than a minimum viewing time, the receiver 300 may obtain the viewing information of the main AV content, and may report the extracted viewing information to the main AV content viewing information report address during the main AV content viewing information report period.

On the basis of the case that adjunct service is used more than a minimum usage time, the receiver 300 may obtains adjunct service usage information and may report the extracted usage information to the adjunct service usage information report address during the adjunct service usage information report period.

The adjunct service information may include at least one of information on whether adjunct service exits, an adjunct service address providing server address, an acquisition path of each available adjunct service, an address for each available adjunct service, a start time of each available adjunct service, an end time of each available adjunct service, a lifetime of each available adjunct service, an acquisition mode of each available adjunct service, a request period for each available adjunct service, priority information of each available adjunct service, description of each available adjunct service, a category of each available adjunct service, a usage information report address, and a minimum usage time for usage information acquisition.

An acquisition path of available adjunct service may indicate an IP based network or an Advanced Television Systems Committee—Mobile/Handheld (ATSC M/H) channel. In the case that the acquisition path of available adjunct service is the ATSC M/H, the adjunct service information may further include frequency information and channel information. The acquisition mode of each available adjunct service may indicate Push or Pull.

Moreover, the watermark server 21 may insert watermark information as an invisible watermark into the logo of main AV content.

For example, the watermark server 21 may insert a barcode into a predetermined position of a logo. At this point, the predetermined position of the logo may correspond to the first bottom line of an area where the logo is displayed. When receiving the main AV content including a logo with a bar code inserted, the receiver 300 may not display the bar code.

Moreover, the watermark server 21 may insert watermark information as a metadata form of the logo. At this point, the form of the logo may be maintained.

Moreover, the watermark server 21 may insert N bit watermark information into the logo of M frames. That is, the watermark server 21 may insert M*N watermark information through M frames.

The MVPD 30 receives a broadcast signal including the watermarked main AV content and adjunct service and generates a multiplexed signal to provide it to the settop box 60 in operation S105A. At this point, the multiplexed signal may exclude the received adjunct service or may include new adjunct service.

The settop box 60 tunes a channel that a user selects and receives a signal of the tuned channel, demodulates the received broadcast signal and performs channel decoding, performs AV decoding to generate uncompressed main AV content, and then, provides the generated uncompressed main AV content to the receiver 300 in operation S106A.

Moreover, the content providing server 10 also broadcasts a broadcast signal including main AV content through a wireless channel in operation S107A.

Additionally, the MVPD 30 may transmit a broadcast signal including main AV content to the receiver 300 directly without going through the settop box 60 in operation S108A.

The receiver 300 may receive uncompressed main AV content through the settop box 60. Or, the receiver 300 may receive a broadcast signal through a wireless channel, and may demodulates and decode the received broadcast signal to obtain main AV content. Or, the receiver 300 may receive a broadcast signal from the MVPD 30, and may demodulate and decode the received broadcast signal to receive main AV content. The receiver 300 extracts watermark information from some frames of the obtained main AV content or a section of audio samples of the obtained main AV content. When the watermark information corresponds to a logo, the receiver 300 confirms a watermark server address corresponding to the logo extracted from a corresponding relationship between a plurality of logos and a plurality of watermark server addresses. When the watermark information corresponds to the logo, the receiver 300 may not identify main AV content by only using the logo. Moreover, when the watermark information does not include content information, the receiver 300 may not identify main AV content but the watermark information may include content provider identification information or a watermark server address. When the watermark information includes content provider identification information, the receiver 300 may confirm a watermark server address corresponding to the content provider identification information extracted from a corresponding relationship between a plurality of content identification information and a plurality of watermark server addresses. In such a manner, when main AV content cannot be identified by using only the watermark information, the receiver 300 accesses the watermark server 21 corresponding to the obtained watermark server address to transmit a first query in operation S109A.

The watermark server 21 provides a first response to the first query in operation S111A. The first response may include at least one of content information, adjunct service information, and available enhance service.

If the watermark information and the first response do not include an adjunct service address, the receiver 300 may not obtain adjunct service. However, the watermark information and the first response may include an adjunct service address providing server address. In such a manner, if the receiver 300 does not obtain an adjunct service address or adjunct service through the watermark information and the first response but obtains an adjunct service address providing server address, it accesses the adjunct service information providing server 40 corresponding to the obtained adjunct service address providing server address to transmit a second query including content information in operation S119A.

The adjunct service information providing server searches for at least one available adjunct service relating to the content information of the second query. Then, the adjunct service information providing server 40 provides adjunct service information for at least one available adjunct service to the receiver 300 through a second response to the second query in operation S121A.

If the receiver 300 obtains at least one available adjunct service address through the watermark information, the first response, or the second response, it accesses the at least one available adjunct service address to request adjunct service in operation S123A and obtains the adjunct service in operation S125A.

Figure 92:
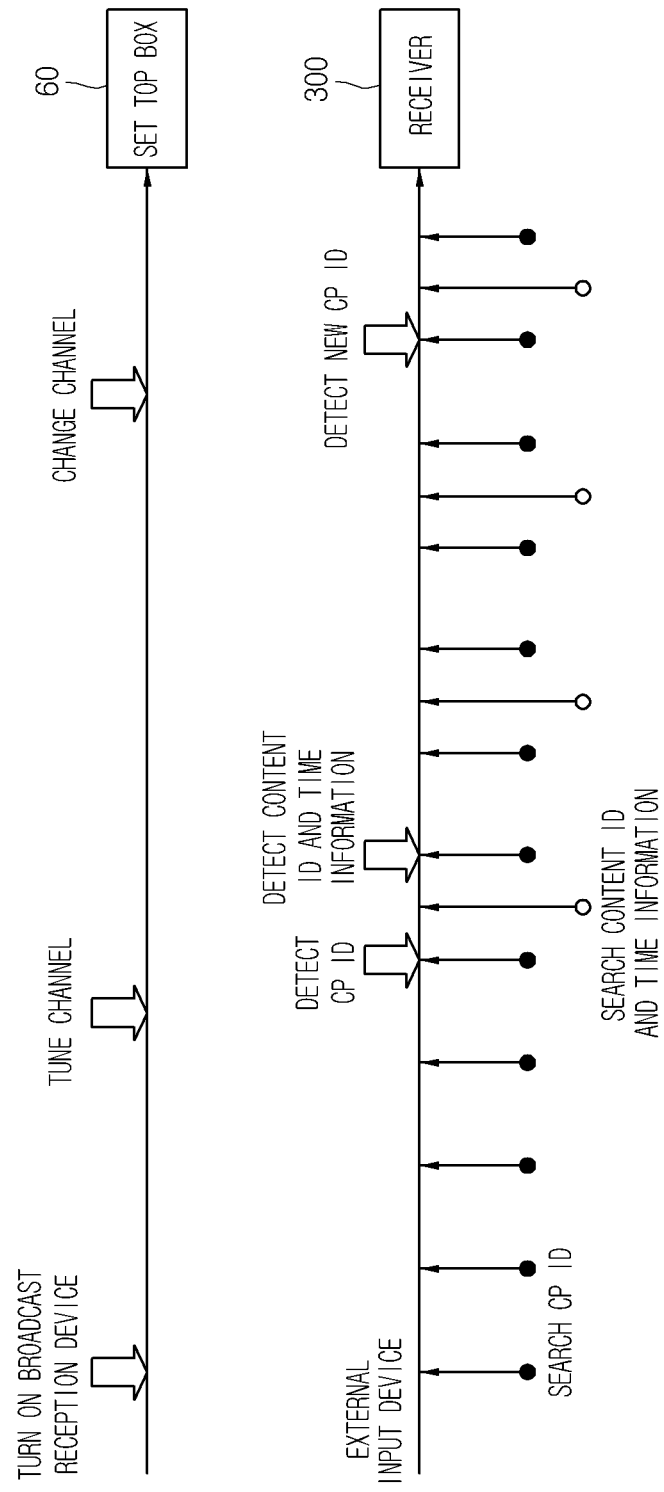

FIG. 92 is a view illustrating a watermark based content recognition timing according to an embodiment of the present invention.

As shown in FIG. 92, when the settop box 60 is turned on and tunes a channel and the receiver 300 receives a main AV content of the tuned channel from the settop box 60 through an external input port 311, the receiver 300 detects a content provider identifier (or a broadcasting station identifier) from the watermark of the main AV content. Then, the receiver 300 may detect content information from the watermark of the main AV content on the basis of the detected content provider identifier.

At this point, as shown in FIG. 92, the detection available period of the content provider identifier and the detection available period of the content information may be different from each other. Especially, the detection available period of the content provider identifier may be shorter than the detection available period of the content information. Through this, the receiver 300 may have an efficient configuration for detecting only necessary information.

Figure 93:
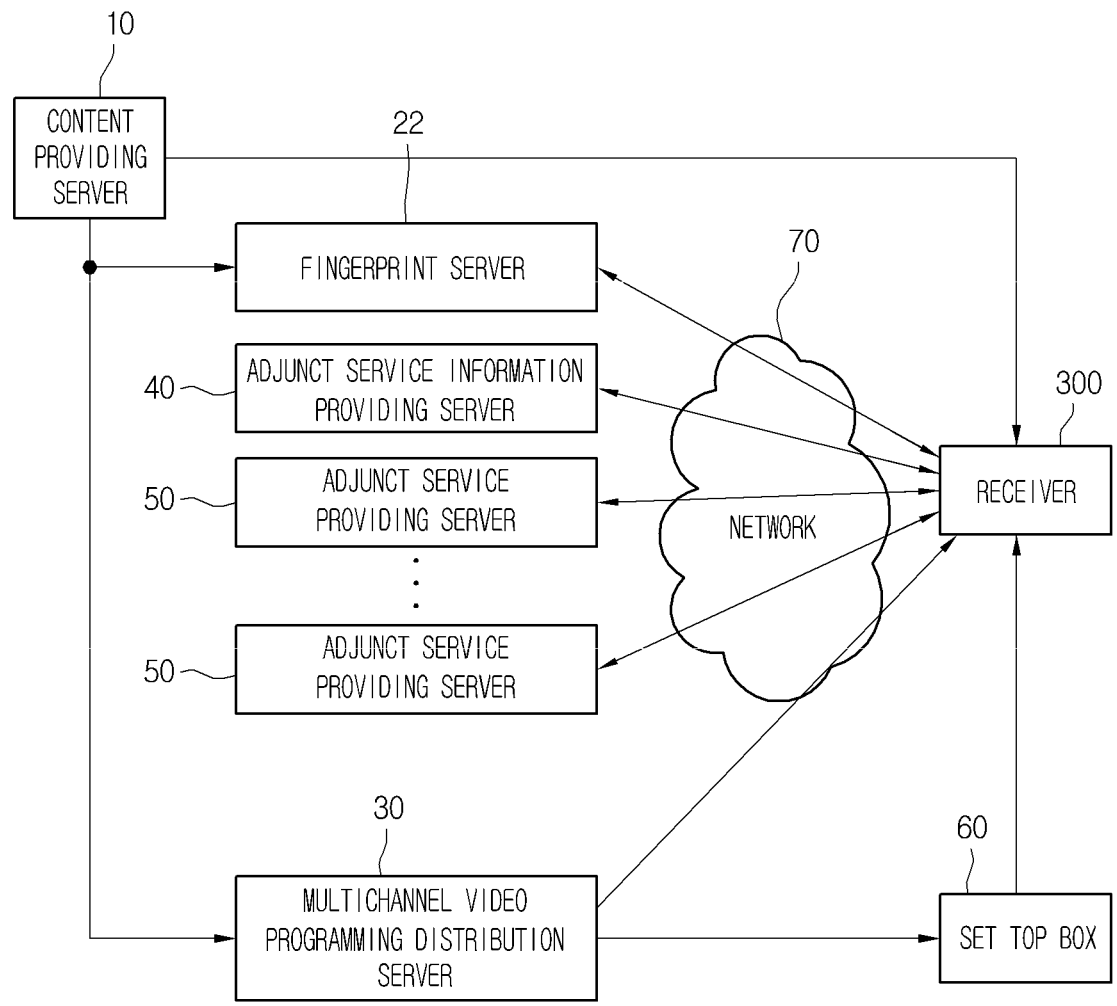

FIG. 93 is a block diagram of a fingerprint based network topology according to an embodiment of the present invention.

As shown in FIG. 93, a network topology according to an embodiment of the present invention further includes a fingerprint server 22.

The fingerprint server 22 shown in FIG. 93 does not apply a modification on main AV content, and extracts feature information from some frames of the main AV content or a section of audio samples of the main AV content and stores it. Then, on receiving the feature information from the receiver 300, the fingerprint server 22 provides the identifier and time information of the AV content corresponding to the received feature information.

Figure 94:
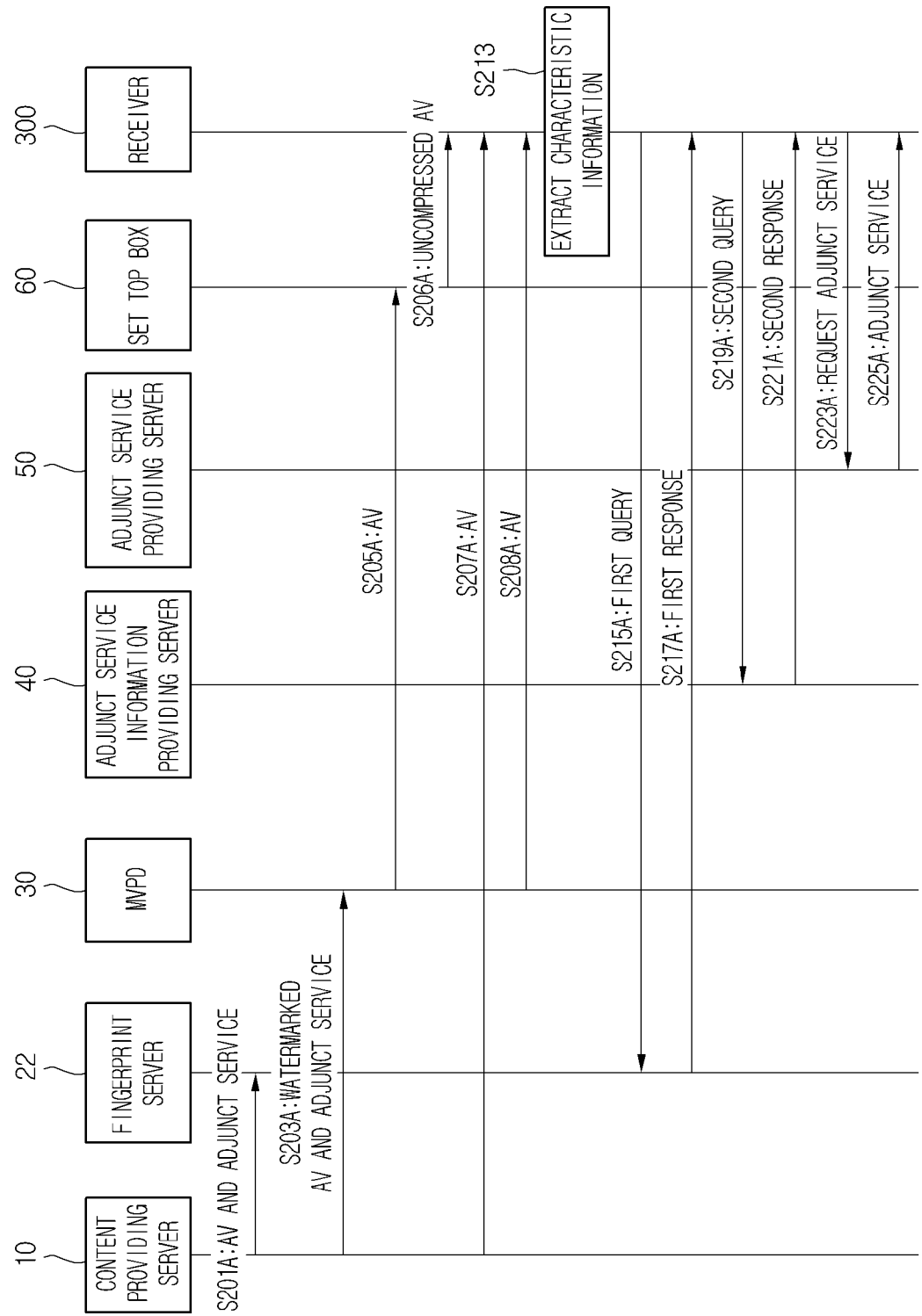

FIG. 94 is a ladder diagram illustrating data flow in a fingerprint based network topology according to an embodiment of the present invention.

First, the content providing server 10 transmits a broadcast signal including main AV content and adjunct service in operation S201A.

The fingerprint server 22 receives the broadcast signal that the content providing server 10 provides, extracts a plurality of feature information from a plurality of frames of the main AV content or a plurality of sections of audio samples of the main AV content, establishes a database for a plurality of query results corresponding to the plurality of feature information, respectively, in operation S203A. The query result may include at least one of content information, adjunct service information, and available enhance service.

The MVPD 30 receives a broadcast signal including main AV content and generates a multiplexed signal to provide it to the settop box 60 in operation S205A. At this point, the multiplexed signal may exclude the received adjunct service or may include new adjunct service.

The settop box 60 tunes a channel that a user selects and receives a signal of the tuned channel, demodulates the received broadcast signal and performs channel decoding, performs AV decoding to generate uncompressed main AV content, and then, provides the generated uncompressed main AV content to the receiver 300 in operation S206A.

Moreover, the content providing server 10 also broadcasts a broadcast signal including main AV content through a wireless channel in operation S207A.

Additionally, the MVPD 30 may transmit a broadcast signal including main AV content to the receiver 300 directly without going through the settop box 60 in operation S208A.

The receiver 300 may receive uncompressed main AV content through the settop box 60. Or, the receiver 300 may receive a broadcast signal through a wireless channel, and may demodulates and decode the received broadcast signal to obtain main AV content. Or, the receiver 300 may receive a broadcast signal from the MVPD 30, and may demodulate and decode the received broadcast signal to receive main AV content. The receiver 300 extracts feature information from some frames of the obtained main AV content or a section of audio samples of the obtained main AV content in operation S213A.

The receiver 300 accesses the fingerprint server 22 corresponding to a predetermined fingerprint server address to transmit a first query including the extracted feature information in operation S215A.

The fingerprint server 22 provides a query result as a first response to the first query in operation S217A. If the first response is failed, the receiver 300 accesses the fingerprint server 22 corresponding to another fingerprint server address to transmit the first query including the extracted feature information.

The fingerprint server 22 may provide Extensible Markup Language (XML) document as the query result. The XML document containing the query result will be described with FIG. 7 and Table 1.

Figure 95:
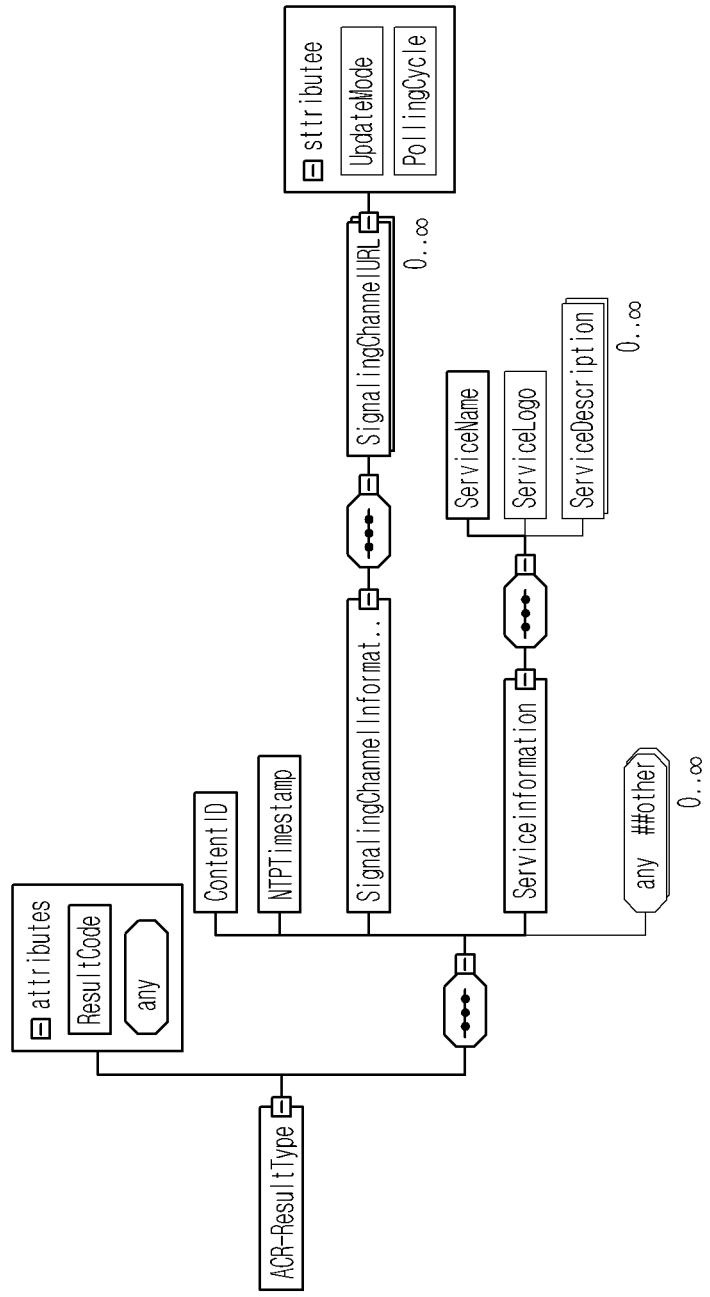

FIG. 95 is an XML schema diagram of ACR-Resulttype containing a query result according to an embodiment of the present invention.

As shown in FIG. 95, ACR-Resulttype containing a query result includes a ResultCode attribute and ContentID, NTP-Timestamp, SignalingChannelInformation, and ServiceInformation elements.

For example, if the ResultCode attribute has a value of 200, this means that a query result is successful. If the ResultCode attribute has a value of 404, this means that a query result is unsuccessful.

A SignalingChannelInformation element has a SignalingChannelURL element, and a SignalingChannelURL element has UpdateMode and PollingCycle attributes. The UpdateMode attribute may have a Pull value or a Push value.

The ServiceInformation element has ServiceName, ServiceLogo, ServiceDescription elements.

Table 5 shows an XML Schema of ACR-ResultType containing this query result.

TABLE 5

```
<xs:complexType name="ACR-ResultType">
    <xs:sequence>
        <xs:element name="ContentID" type="xs:anyURI"/>
        <xs:element name="NTPTimestamp" type="xs:unsignedLong"/>
        <xs:element name="SignalingChannelInformation">
            <xs:complexType>
                <xs:sequence>
                    <xs:element name="SignalingChannelURL"
                        maxOccurs="unbounded">
                        <xs:complexType>
                            <xs:simpleContent>
                                <xs:extension base="xs:anyURI">
                                    <xs:attribute name="UpdateMode">
                                        <xs:simpleType>
                                            <xs:restriction base="xs:string">
                                                <xs:enumeration value="Pull"/>
                                                <xs:enumeration value="Push"/>
                                            </xs:restriction>
                                        </xs:simpleType>
                                    </xs:attribute>
                                    <xs:attribute name="PollingCycle"
                                        type="xs:unsignedInt"/>
                                </xs:extension>
                            </xs:simpleContent>
                        </xs:complexType>
                    </xs:element>
                </xs:sequence>
            </xs:complexType>
        </xs:element>
        <xs:element name="ServiceInformation">
            <xs:complexType>
                <xs:sequence>
                    <xs:element name="ServiceName" type="xs:string"/>
                    <xs:element name="ServiceLogo" type="xs:anyURI"
                        minOccurs="0"/>
                    <xs:element name="ServiceDescription" type="xs:string"
minOccurs="0" maxOccurs="unbounded"/>
                </xs:sequence>
            </xs:complexType>
        </xs:element>
        <xs:any namespace="##other" processContents="skip"
minOccurs="0" maxOccurs="unbounded"/>
    </xs:sequence>
    <xs:attribute name="ResultCode" type="xs:string" use="required"/>
    <xs:anyAttribute processContents="skip"/>
</xs:complexType>
```

As the ContentID element, an ATSC content identifier shown in Table 2 below may be used.

TABLE 6

| Syntax | The Number of bits | format |
| --- | --- | --- |
| ATSC_content_identifier( ) { | | |
|    TSID | 16 | uimsbf |
|    reserved | 2 | bslbf |
|    end_of_day | 5 | uimsbf |
|    unique_for | 9 | uimsbf |
|    content_id | var | |
| } | | |

As shown in Table 6, the ATSC content identifier has a structure including a TSID and a house number.

The TSID, i.e. a 16-bit unsigned integer, carries a transport stream identifier.

end_of_day, i.e. a 5-bit unsigned integer, is set to an hour of a day at which a content_id value is reused as broadcast ends.

unique_for, i.e., a 9-bit unsigned integer, is set to the number of day in which the content_id value cannot be reused.

content_id indicates a content identifier. The receiver 300 reduces unique for by 1 in a time corresponding to end_of_day everyday, and regards content_id as unique one if unique_ for is not 0.

Moreover, as the ContentID element, a Global Service Identifier for ATSC-M/H service described below may be used.

The global service identifier may have the following form.

-urn:oma:bcast:iauth:atsc:service:<region>:<xsid>:<serviceid>

Here, <region> is a two-letter international country code as defined in ISO 639-2. <xsid> for local service is a decimal number of a TSID defined in <region>, and <xsid> for regional service (major >69) is "0". <serviceid> is defined by <major> and <minor>. <major> indicates a Major Channel number, and <minor> indicates a Minor Channel Number.

An example of a global service identifier is as follows.

-urn:oma:bcast:iauth:atsc:service:us:1234:5.1

-urn:oma:bcast:iauth:atsc:service:us:0:100.200

Moreover, as a ContentID element, an ATSC content identifier described below may be used.

The ATSC content identifier may have the following form.

um:oma:bcast:iauth:atsc:content:<region>:<xsidz>:<contentid>:<unique_for>:<end_of_day>

Here, <region> is a two-letter international country code as defined in ISO 639-2. <xsid> for local service is a decimal number of a TSID defined in <region>, and may be followed by "."<serviceid>. <xsid> for regional service (major >69) is <serviceid>. <content_id> is a base64 code of the content_id field defined in Table 2, <unique_for> is a decimal code of the unique_for field defined in Table 2, and <end_of_day> is a decimal code of the end_of_day field defined in Table 2.

Hereinafter, FIG. 94 will be described again.

If a query result does not include an adjunct service address or adjunct service but includes an adjunct service address providing server address, the receiver 300 accesses the adjunct service information providing server 40 corresponding to the obtained adjunct service address providing server address to transmit a second query including content information in operation S219A.

The adjunct service information providing server searches for at least one available adjunct service relating to the content information of the second query. Then, the adjunct service information providing server 40 provides adjunct service information for at least one available adjunct service as a second response to the second query to the receiver 300 in operation S221A.

If the receiver 300 obtains at least one available adjunct service address through the first response or the second response, it accesses the at least one available adjunct service address to request adjunct service in operation S223A and obtains the adjunct service in operation S225A.

If the UpdateMode attribute has a Pull value, the receiver 300 transmits an HTTP request to the adjunct service providing server 50 through SignalingChannelURL, and in response to this, receives an HTTP response including PSIP binary stream from the adjunct service providing server 50. In this case, the receiver 300 may transmit an HTTP request according to a Polling period designated by a PollingCycle attribute. Additionally, the SignalingChannelURL element may have an update time attribute. In this case, the receiver 300 may transmit an HTTP request at an update time designated by an update time attribute.

If the UpdateMode attribute has a Push value, the receiver 300 may receive an update from a server asynchronously by utilizing an XMLHTTPRequest API. After the receives 300 transmits an asynchronous request to a server through an XMLHTTPRequest object, if there is a change in signaling information, the server provides signaling information through this channel in response to the request. If there is a restriction on a waiting time of a session, a session timeout response is generated, and a receiver recognizes the generated session timeout response immediately to transmit a request again, so that a signally channel between the receiver and the server may be maintained at all times.

Figure 96:
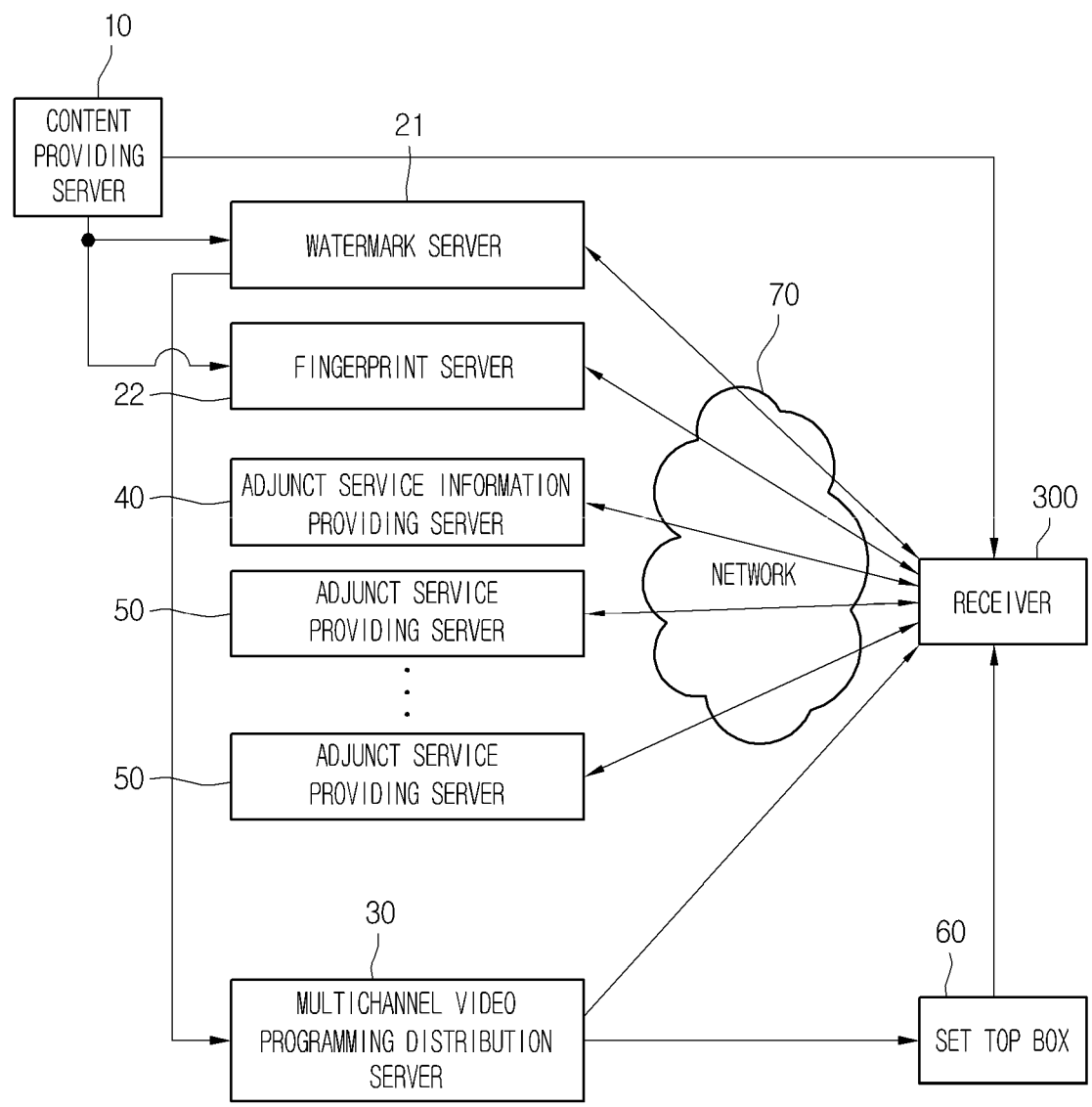

FIG. 96 is a block diagram of a fingerprint based network topology according to an embodiment of the present invention.

As shown in FIG. 96, a network topology according to an embodiment of the present invention further includes a watermark server 21 and a fingerprint server 22.

The watermark server 21 shown in FIG. 96 inserts content provider identification information into main AV content. The watermark server 21 may insert content provider identification information as a watermark looking like a logo into main AV content, or may insert content provider identification information as an invisible watermark into main AV content.

The fingerprint server 22 does not apply a modification on main AV content, and extracts feature information from some frames of the main AV content or a section of audio samples of the main AV content and stores it. Then, on receiving the feature information from the receiver 300, the fingerprint server 22 provides the identifier and time information of the AV content corresponding to the received feature information.

Figure 97:
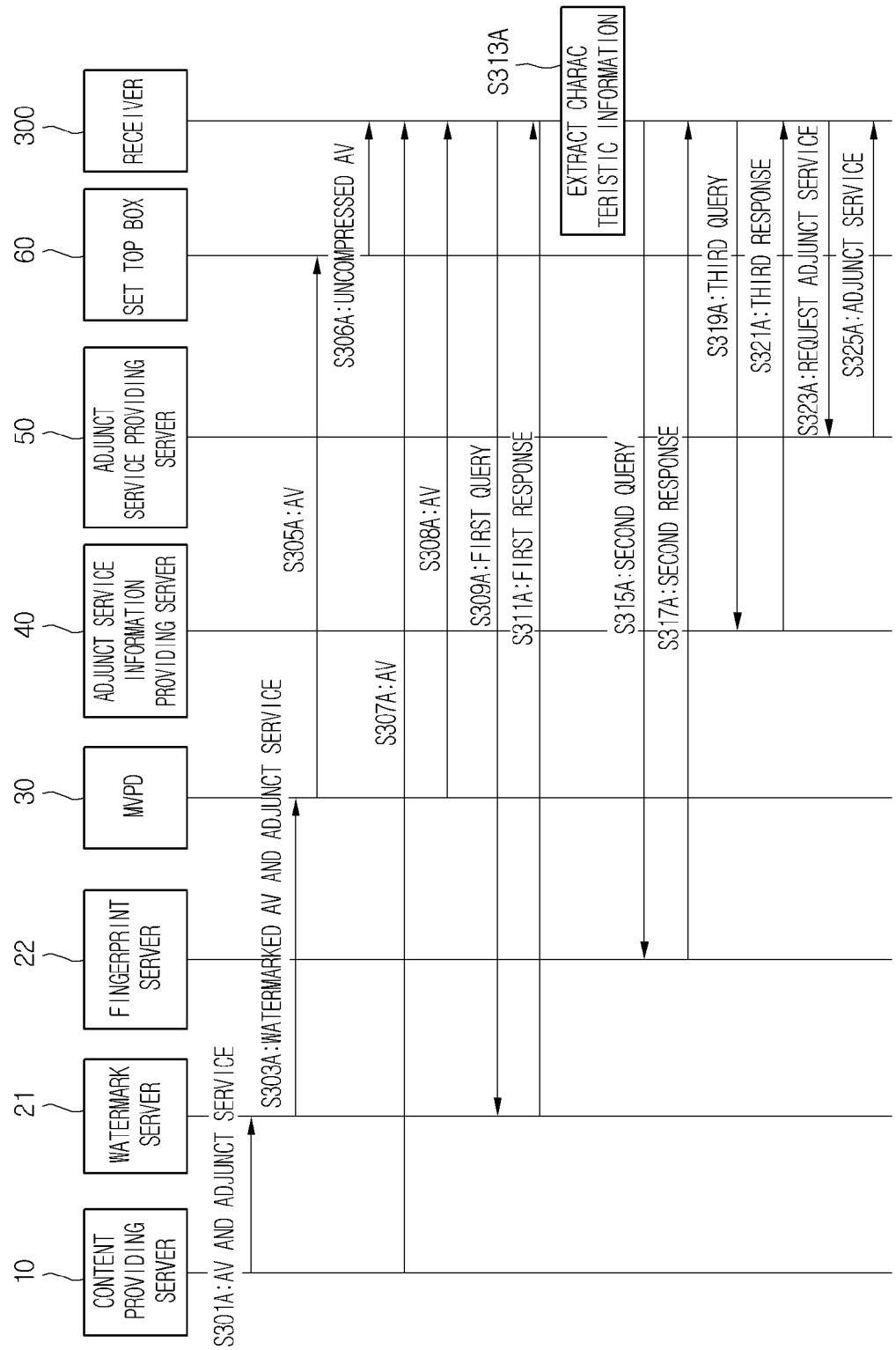

FIG. 97 is a ladder diagram illustrating data flow in a watermark and fingerprint based network topology according to an embodiment of the present invention.

First, the content providing server 10 transmits a broadcast signal including main AV content and adjunct service in operation S301A.

The watermark server 21 receives a broadcast signal that the content providing server 10 provides, inserts a visible watermark looking like a logo into main AV content by applying a modification on the main AV content, inserts watermark information as invisible watermark into main AV content, and provides the watermarked main AV content and adjunct service to the MVPD 30 in operation S303A. The watermark information inserted through an invisible watermark may include at least one of content information, adjunct service information, and available enhance service. The content information and the adjunct service information are the same as described above.

The MVPD 30 receives a broadcast signal including the watermarked main AV content and adjunct service and generates a multiplexed signal to provide it to the settop box 60 in operation S305A. At this point, the multiplexed signal may exclude the received adjunct service or may include new adjunct service.

The settop box 60 tunes a channel that a user selects and receives a signal of the turned channel, demodulates the received broadcast signal and performs channel decoding, performs AV decoding to generate uncompressed main AV content, and then, provides the generated uncompressed main AV content to the receiver 300 in operation S306A.

Moreover, the content providing server 10 also broadcasts a broadcast signal including main AV content through a wireless channel in operation S307A.

Additionally, the MVPD 30 may transmit a broadcast signal including main AV content to the receiver 300 directly without going through the settop box 60 in operation S308A.

The receiver 300 may receive uncompressed main AV content through the settop box 60. Or, the receiver 300 may receive a broadcast signal through a wireless channel, and may demodulates and decode the received broadcast signal to obtain main AV content. Or, the receiver 300 may receive a broadcast signal from the MVPD 30, and may demodulate and decode the received broadcast signal to receive main AV content. The receiver 300 extracts watermark information from some frames of the obtained main AV content or a section of audio samples of the obtained main AV content. When the watermark information corresponds to a logo, the receiver 300 confirms a watermark server address corresponding to the logo extracted from a corresponding relationship between a plurality of logos and a plurality of watermark server addresses. When the watermark information corresponds to the logo, the receiver 300 may not identify main AV content by only using the logo. Moreover, when the watermark information does not include content information, the receiver 300 may not identify main AV content but the watermark information may include content provider identification information or a watermark server address. When the watermark information includes content provider identification information, the receiver 300 may confirm a watermark server address corresponding to the content provider identification information extracted from a corresponding relationship between a plurality of content identification information and a plurality of watermark server addresses. In such a manner, when main AV content cannot be identified by using only the watermark information, the receiver 300 accesses the watermark server 21 corresponding to the obtained watermark server address to transmit a first query in operation S309A.

The watermark server 21 provides a first response to the first query in operation S311A. The first response may include at least one of a fingerprint server address, content information, adjunct service information, and available enhance service. The content information and the adjunct service information are the same as described above.

If the watermark information and the first response include a fingerprint server address, the receiver 300 extracts feature information from some frames of the main AV content or a section of audio samples of the main AV content in operation S313A.

The receiver 300 accesses the fingerprint server corresponding to the fingerprint server address in the first response to transmit a second query including the extracted feature information in operation S315A.

The fingerprint server 22 provides a query result as a second response to the second query in operation S317A.

If a query result does not include an adjunct service address or adjunct service but includes an adjunct service address providing server address, the receiver 300 accesses the adjunct service information providing server 40 corresponding to the obtained adjunct service address providing server address to transmit a third query including content information in operation S319A.

The adjunct service information providing server searches for at least one available adjunct service relating to the content information of the third query. Then, the adjunct service information providing server 40 provides adjunct service information for at least one available adjunct service to the receiver 300 through a third response to the third query in operation S321A.

If the receiver 300 obtains at least one available adjunct service address through the first response, the second response, or the third response, it accesses the at least one available adjunct service address to request adjunct service in operation S323A and obtains the adjunct service in operation S325A.

Then, a receiver 300 according to an embodiment of the present invention will be described with reference to FIG. 98.

As shown in FIG. 98, the receiver 300 according to an embodiment of the present invention includes a broadcast signal receiving unit 301, a demodulation unit, 310, a channel decoding unit 305, a demultiplexing unit 320, an AV decoding unit 309, an external input port 311, a playback control unit 313, a playback device 320, a service manager 350, a data transceiving unit, and a memory 350.

The broadcast signal receiving unit 301 receives a broadcast signal from the content providing server 10 or the MVPD 30.

The demodulation unit 310 generates a demodulated signal by demodulating the received broadcast signal.

The channel decoding unit 305 generate channel-decoded data by channel-decoding the demodulated signal.

The demultiplexing unit 320 separates main AV content and adjunct service from the channel-decoded data. The separated adjunct service is stored in the adjunct service storage unit 352.

The AV decoding unit 309 AV decodes the separated main AV content to generate uncompressed main AV content.

Moreover, the external input port 311 receives uncompressed main AV content from the settop box 60, a digital versatile disk (DVD) player, and a Blu-ray disk player. The external input port 311 may include at least one of a DSUB port, a High Definition Multimedia Interface (HDMI) port, a Digital Visual Interface (DVI) port, a composite port, a component port, and an S-Video port.

The playback control unit 313 plays at least one of an uncompressed main AV content generated by the AV decoding unit 309 or an uncompressed main AV content received from the external input port 311, in the playback device 320 in response to a user selection.

The playback device 320 includes a display unit 321 and a speaker 323. The display unit 321 may include at least one of a liquid crystal display (LCD), a thin film transistor-liquid crystal display (a TFT LCD), an organic light-emitting diode (OLED), a flexible display, and a 3D display.

The service manager 350 obtains content information of main AV content, and obtains available adjunct service on the basis of the obtained content information. Especially, as described above, the service manager 350 may obtain identification information of main AV content on the basis of some frames of the uncompressed main AV content or a section of audio samples of the uncompressed main AV content, and this is called an automatic contents recognition (ACR) in the specification.

The service manager 350 corresponds to the service manager 350 of FIG. 34.

The data transceiving unit 341 may include an Advanced Television Systems Committee—Mobile/Handheld (ATSC-M/H) channel transceiving unit 341*a* and an IP transceiving unit 341*b*.

The ATSC-M/H channel transceiving unit 341*a* communicates with another device or server through an ATSC-M/H channel.

The IP transceiving unit 341*b* communicates with another device or server through an IP based network.

The memory 350 may include at least one type of storage medium among a flash memory type, a hard disk type, a multimedia card micro type, card type memory (for example, SD or XD memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, and optical disk. The receiver 300 may operate in relation to a web storage performing the storage function of the memory 350 on internet.

The memory 350 may include a content information storage unit 351, an adjunct service storage unit 352, a logo storage unit 353, a setting information storage unit 354, a bookmark storage unit 355, a user information storage unit 356, and a usage information storage unit 357.

The content information storage unit 351 stores a plurality of content information corresponding to a plurality of feature information.

The adjunct service storage unit 352 may store a plurality of adjunct services corresponding to a plurality of feature information or may store a plurality of adjunct services corresponding to a plurality of content information.

The logo storage unit 353 stores a plurality of logos. Also, the logo storage unit may further store a content provider identifier corresponding to a plurality of logos or a watermark server address corresponding to a plurality of logos.

The setting information storage unit 354 stores setting information for ACR.

The bookmark storage unit 355 stores a bookmark.

The user information storage unit 356 stores user information. The user information may include at least one of at least one account information for at least one service, local information, family member information, preferred genre information, image display device information, and a usage information providing range. The at least one account information may include account information for usage information measurement server and account information of social network service such as twitter and facebook. The local information may include address information and a zip code. The family member information may include the number of family members, each member age, each member sex, each member religion, and each member job. The preferred genre information may be set with at least one of sports, movies, drama, education, news, entertainment, and other genres. The image display device information may include information on an image display device type, a manufacturer, a firmware version, a resolution, a model name, OS, a browser, storage device existence, a capacity of a storage device, and network speed. Once the usage information providing range is set, the receiver 300 collects and reports main AV content viewing information and adjunct service usage information within a set range. The usage information providing range may be set with respect to each virtual channel. Additionally, a usage information measurement allowable range may be set with respect to an entire physical channel.

The usage information storage unit 357 stores main AV content viewing information and adjunct service usage information collected by the receiver 300. Moreover, the receiver 300 analyzes a service usage pattern on the basis of the collected main AV content viewing information and the collected adjunct service usage information, and stores the analyzed service usage pattern in the usage information storage unit 357.

The service manager 350 obtains the content information of main AV content from the fingerprint server 22 or the content information storage unit 351. If there is no content information corresponding to the extracted feature information or sufficient content information in the content information storage unit 351, the service manager 350 may receive additional content information through the data transceiving unit 341. Moreover, the service manager 350 may update content information continuously.

The service manager 350 obtains available adjunct service from the adjunct service providing server 50 or the adjunct service storage unit 353. If there is no adjunct service or sufficient adjunct service in the adjunct service storage unit 353, the service manager 350 may update adjunct service through the data transceiving unit 341. Moreover, the service manager 350 may update adjunct service continuously.

The service manager 350 extracts a logo from main AV content and queries the logo storage unit 355 to obtain a content provider identifier or watermark server address corresponding to the extracted logo. If there is no logo corresponding to the extracted logo or sufficient logo in the logo storage unit 355, the service manager 350 may receive an additional logo through the data transceiving unit 341. Moreover, the service manager 350 may update the logo continuously.

The service manager 350 may perform various methods to reduce the burden of calculation while a logo extracted from main AV content is compared to a plurality of logos in the logo storage unit 355.

For example, the service manager 350 may perform a comparison operation on the basis of color characteristics.

That is, the service manager 350 compares the color characteristic of an extracted logo with the color characteristic of a logo in the logo storage unit 355, so that it is determined whether they are matched to each other.

Furthermore, the service manager 350 may perform a comparison operation on the basis of character recognition. That is, the service manager 350 compares the character of an extracted logo with the character of a logo in the logo storage unit 355, so that it is determined whether they are matched to each other.

Furthermore, the service manager 350 may perform a comparison operation on the basis of the outline form of a logo. That is, the service manager 350 compares the outline form of an extracted logo with the outline form of a logo in the logo storage unit 355, so that it is determined whether they are matched to each other.

The service manager 350 obtains content information of main AV content on the basis of some frames of the uncompressed main AV content and a section of audio samples of the uncompressed main AV content, obtains signaling data for adjunct service on the basis of the obtained content information, and then, obtains adjunct service on the basis of the signaling data.

Hereinafter, trigger metadata according to another embodiment of the present invention will be described.

A trigger may execute or activate the TDO, and may include action information on the TDO. By a trigger action, a TDO may start various operations.

A trigger may include the following information.

Trigger identifier: the receiver 300 may not receive a trigger due to an error during a transmission process. In order to reduce this, the transmitter 200 may transmit the same trigger several times. In order for the receiver 300 to avoid receiving the same trigger several times and processing it several times identically, a trigger may include a trigger identifier. Each trigger may be uniquely identified by a trigger identifier among triggers for specific service.

Trigger Time: since a trigger has strong temporal relation with another program element, for example, video stream, each trigger needs to be executed at a specific time. Accordingly, a trigger time may indicate when a trigger including the information needs to be executed.

Trigger Type: basically, a trigger allows a content item triggered at a specific time to perform a specific operation. Such a trigger may be referred to as an activation trigger. However, the receiver 300 may need to prepare a trigger operation of a content item before a trigger time of the trigger In order for such preparation, the above-mentioned preparation trigger may exist. The receiver 300 may receive a preparation trigger before an activation trigger is received, and may prepare execution of a content item to be triggered according to the preparation trigger. The receiver 300 may receive a preparation trigger a few seconds or a few minutes before a trigger time of an activation trigger. A trigger time may be expressed in a PTS (in the case of fixed broadcast) or RTP time stamp (in the case of mobile broadcast) format. A trigger time in a preparation trigger may indicate an approximate time interval before a trigger time of an activation trigger, and the receiver 300 may prevent a waste of execution time due to discontinuity between a preparation trigger reception time and a trigger time of an activation trigger on the basis of the approximate time interval.

Trigger version: there may be triggers of a plurality of version with respect to broadcast stream. For example, a preparation trigger may have just an early version of an activation trigger, and a preparation trigger may be replaced by the following received activation trigger. For this, a trigger may include a version number. Accordingly, the receiver 300 may ignore the triggers of the same version received again repeatedly, and may process a trigger of a new version.

Trigger action: a trigger may largely include two pieces of information.

First, a trigger may include an action code allowing the receiver 300 to manage a life cycle of a trigger. An example of such an action is as follows.

Execute: this action indicates that a trigger target content item is activated at a trigger time.

Terminate: this action indicates that a trigger target content item is terminated.

Supend: this action indicates that a trigger target content item is suspended.

Wakeup: this action indicates that a suspended trigger target content item wakes up.

In the case of a preparation trigger, such action codes may be included. Accordingly, the receiver 300 may perform a series of operations (a downloading operation and a preloading to memory operation) until an activation trigger is received, by an action included in a trigger.

Moreover, a body part of a trigger may include opaque data that the receiver 300 does not know if a TDO, i.e., a trigger target, does not perform a processing operation, except for information on a target TDO that the trigger indicates. A TDO, i.e., a trigger target, may access opaque data configured in a format that the receiver 300 does not know, when a change of a life cycle and a state is necessary. A TDO may access such opaque data by using an API predefined by the receiver 300 or an API included in the TDO itself, and may obtain the content information of the opaque data. By the opaque data, which is unknown to the receiver 300 and whose content is obtained only by an operation of a TDO, useful information may not be provided to advertisement providers.

opaque data: besides an action code, a trigger may include the above-mentioned predetermined opaque data used in a TDO.

Identification of target for trigger: a TDO may mean a content item transmitted through an NRT service designated as a trigger consumption model. In this case, a target identifier of each trigger may indicate identification information of a trigger target content item. The content item identification information may include a service identifier reference service id ref field information for indicating a specific content item and a content linkage field information.

Moreover, hereinafter, another embodiment for transmitting such a trigger will be described.

A transmission mechanism of a trigger according to an embodiment of the present invention may require less overhead and provide a time stamp indicating a trigger time at a standard position. Accordingly, the transmitter 200 may properly maintain the position of a trigger included in a broadcast stream through re-multiplexing. For example, the transmitter 200 may guarantee that a trigger is delivered before a trigger time.

One of data broadcasting formats defined by ATSC A/90 may include data having strong temporal relation with a stream referenced by another PES stream or one or more PIDSs, as synchronized streaming data. The synchronized data stream may be transmitted through a packet similar to a PES packet for audio and video data transmission. The header of each PES packet may have a PTS value.

Accordingly, a trigger may be transmitted through synchronized data streaming for fixed broadcast. Trigger data may be included in the payload of a PES packet corresponding to the synchronized data stream. For a mobile broadcast, a trigger may be transmitted through an RTP packet. Trigger data may be included in the payload of an RTP packet. A time stamp field included in the RTP header may include a trigger time. Accordingly, when an RTCP stream is used, a time stamp field corresponding to a trigger may be linked to the time stamp field of video or audio stream.

Besides that, the receiver 300 may receive a trigger transmitted through various methods. For example, the transmitter 300 may obtain trigger information from a broadcast stream and may receiver a trigger on the basis of the trigger information. The trigger information may include the URL of a server receiving a trigger, for example. Also, a trigger receivable by using the trigger information may include a trigger time, target TDO identification information or reception information of a target TDO.

Moreover, the receiver 300 may provide a TDO service according to an operation of a TDO due to a trigger. The transmitter 200 may transmit real-time data necessary for an operation of such a TDO. Accordingly, the receiver 300 may provide a real-time linked TDO service by receiving real-time data. For example, a TDO may provide real-time stock information by using real-time data. In such a manner, real-time data for TDO may be transmitted to the receiver 300 through various paths.

Real-time data for TDO may be transmitted based on MPEG-2 elementary stream (ES).

First, data piping defined by A/90 may be used. In this case, a service description framework of A/90 may not be used. In more detail, the transmitter 200 may designate a real-time data piped specific stream type in order for real-time data transmission. In this case, a specific stream including real-time data may correspond to one virtual channel. Accordingly, a data stream designated as a specific stream type may include real-time data for TDOs related to a virtual channel corresponding to the data stream. When a real-time data request necessary for an operation of a TDO occurs, the receiver 300 may receive a data stream of the designated specific stream type according to a virtual channel corresponding to the TDO, extracts a payload from the received data stream, and use data in the payload as real-time data of the TDO. The transmitter 200 may generate and transmit a new descriptor in order to signal a specific data stream including real-time data for TDO. For example, if there are a plurality of streams including real-time data for TDO, the new descriptor may include identification information for identifying each stream.

Also, the real-time data may be transmitted through a stream having a stream type of 0x06 (a PES packet including personal data).

Additionally, the real-time data may be included in a trigger and then transmitted. A trigger including such real-time data may be called a data type trigger. Therefore, the real-time data may be included in the payload of a data trigger type trigger. The data trigger type trigger may be transmitted through the above-mentioned PES packet, and may be transmitted through another path.

Moreover, real-time data for TDO may be transmitted based on an IP.

In order for the IP based transmission, the transmitter 200 may transmit real-time data by using file transmission through the FLUTE. A real-time data file transmitting method through FLUTE may be similar to the portal consumption model NRT service transmitting method. The receiver 300 may obtain URL information in a FLUTE session of real-time data files in advance from a TDO itself. Accordingly, when a real-time data request for an operation of a TDO occurs, the receiver 300 may access a FLUTE session on the basis of the previously obtained URL information and then may receive real-time through the FLUTE session. In the case of file transmission through FLUTE, aggregation of a very large amount of data may be accommodated and forward error correction (FEC) may be supported. In a fixed broadcast, the FEC may have a lower priority. However, as an extended meaning, if aggregation of a large amount of data is transmitted in a mobile broadcast, the FEC may be very important. In order to transmit the real-time data through FLUTE, a FLUTE session of NRT data may be used. Additionally, the transmitter 200 may signal a FLUTE session for real-time data stream and may transmit real-time data through the FLUTE session.

Additionally, the transmitter 200 may allocate another consumption model for NRT data service, in order for real-time IP based transmission. This consumption model may be called a data stream consumption model. A file stream designated as a data stream consumption model may be downloaded into the receiver 300 and delivered to a TDO only by an operation of the TDO. The download and delivery operations of such a real-time data may be performed by an operation of an API provided to an execution environment of a TDO.

Also, the transmitter 200 may transmit real-time data by using a raw user datagram protocol (UDP) packet. The UDP is a protocol used for transmitting data under a communication environment where there is no actual physical access like an IP. In this case, a transmission method may be similar to data piping. When a real-time data request occurs by a TDO operation, the receiver 300 receives a raw UDP stream and uses the payload included in the raw UDP stream as real-time data.

FIG. 99 is a flowchart illustrating an operation of a receiver receiving real-time data for TDO and a broadcast service receiving and service providing method according thereto.

Referring to FIG. 99, first, the receiver 300 enters a terrestrial channel and starts broadcast service reception, and then receives service signaling data from a broadcast service in operation S9000. The service signaling data may include a PSIP table such as a VCT and a DST, a PSI table such as a PAT and a PMT, and NRT service signaling data such as an SMT and an NRT-IT. Accordingly, the receiver 300 may identify a real time service or an NRT service by using service signaling data and may receive data necessary for service provision.

Then, the receiver 300 receives a TDO service on the basis of the service signaling data in operation S9005. As mentioned above, a TDO may be transmitted in the same way as the NRT service. For example, the receiver 300 may identify an NRT service of a TDO consumption model from an SMT, identify a content item corresponding to the identified NRT service from an NRT-IT, and receive content items corresponding to a TDO by receiving the identified content items through an access to a FLUTE session using the reception information in the NRT-IT or an internet network.

Then, the receiver 300 receives a trigger in operation S9010. The trigger may include at least one of a trigger action, a trigger target content item, and a trigger time. The receiver 300 may receive a trigger through the above-mentioned various methods. For example, the receiver 300 may receive a trigger by using a broadcast stream. Moreover, the receiver 300 may receive a trigger through an internet network in addition to a broadcast network. When the receiver 300 uses an ACR, it may receive a trigger from the adjunct service server.

Also, the receiver 300 performs a trigger action on a target TDO at a trigger time obtained from the trigger in operation S9015. The receiver 300 may perform an operation corresponding to the trigger action obtained from the trigger, on the identified content item, on the basis of the content item identification information of the target TDO obtained from the trigger at the trigger time obtained from the trigger. The TDO may be downloaded, executed, or terminated at a specific time according to a trigger action. Additionally, The TDO service may be provided according to the download, execution, and termination operations of the TDO. In order to provide such a TDO service, real-time data may be required.

Accordingly, the receiver 300 determines whether a real-time data request for TDO occurs and, when the real-time data request occurs, receives real-time data corresponding thereto in operation S9020.

The real-time data for TDO may be transmitted through the above-mentioned various paths. The real-time data may be transmitted based on ES or may be transmitted based on IP. The real-time data may be included in the payload in a trigger of a data trigger type. The real-time data may be piped into a data stream of a specific stream type and then transmitted. Also, the real-time data may be included in a PES packet including personal data of 0x06 and then transmitted. Also, the real-time data may be transmitted through FLUTE and if transmitted through FLUTE, the real-time data may be transmitted through an NRT service designated as a data consumption model. Additionally, the real-time data may be included in a raw UDP packet and then transmitted.

Then, the receiver 300 provides a TDO service by using the received real-time data in operation S9025. The receiver 300 may receive necessary real-time data as a TDO is executed and may then deliver them to the TDO. Moreover, the receiver 300 may provide a TDO service according to an operation of a TDO using the real-time data. For example, when the TDO provides stock information, the receiver 300 may receive real-time stock data and then may deliver them to the TDO in execution. Accordingly, the TDO executed already may provide a real-time stock information service by using the real-time stock data.

FIG. 100 is a flowchart illustrating an operation of a receiver receiving real-time data for TDO and a broadcast service receiving and service providing method according thereto in accordance with another embodiment of the present invention.

As mentioned above, the real-time data for TDO may be transmitted through various paths. FIG. 100 illustrates the case that real-time data are included in a trigger of a data type and transmitted. The trigger type may be designated as various types. According to an embodiment, a trigger type of a trigger including real-time data may be designated as a data trigger type. A trigger designated as such a data trigger type may include real-time data in the payload.

Additionally, the trigger may include the above-mentioned opaque data, and real-time data may be included in the opaque data. A broadcast service provider may designate a trigger of such a format as a data type trigger. When the real-time data are included in the opaque data of the data type trigger, the trigger may include a trigger action. Additionally, the data type trigger may not include a trigger action and may only include pure opaque data. The data type trigger not including a trigger action may have a new identifier different from that of a previously transmitted trigger.

Also, if there is no trigger action in the data type trigger, the receiver 300 may obtain opaque data by receiving the trigger and deliver the opaque data to a TDO, and therefore, the TDO may obtain real-time data from the opaque data.

A trigger of the data trigger type may include or may not include a time stamp selectively. When a trigger of the data trigger type includes a time stamp, it may include the real-time data synchronized with the time stamp in video stream and audio stream. Furthermore, when a trigger of the data trigger type does not include a time stamp, it may include the real-time data not synchronized with another stream.

First, the receiver 300 receives a trigger in operation S9100, and performs a trigger action on a target TDO at a trigger time in operation S9105. Its detailed operation will be described as follows.

Then, the receiver 300 determines whether real-time data for TDO are required in operation S9110. Since the receiver 300 determines whether a real-time data request occurs according to an operation of a TDO, it determines whether real-time data are required. Moreover, the receiver 300 may determine whether real-time data are required on the basis of the real-time data reception information in the TDO. The receiver 300 may determine whether real-time data are required according to an operation of an API corresponding to the TDO.

If real time data are required, the receiver 300 receives a trigger of the above-mentioned data type in operation S9115.

Each trigger may be transmitted to correspond to each virtual channel. Additionally, a plurality of triggers may be transmitted to correspond to one virtual channel. When a plurality of triggers may be transmitted to correspond to one virtual channel, the transmitter 200 may separately generate a stream including only a data type trigger and transmit it. The transmitter 200 may transmit signaling data to allow the receiver 300 to identify a stream including only the data type trigger.

For example, the transmitter 200 may designate a specific service identifier in a trigger stream including only a trigger of a data trigger type. The transmitter 200 may designate an identifier of 0x02 as a service identifier corresponding to a trigger stream including only a data type trigger. Also, the transmitter 200 may include the designated service identifier in a service ID descriptor. The transmitter 200 may insert such a service ID identifier into an ES descriptor loop in an ES loop of a PMT and may include the PMT in service signaling data and transmit it.

Accordingly, the receiver 300 may obtain a PMT from service signaling data and may parse a service ID descriptor from the ES descriptor loop in the ES loop of the PMT, and if the service identifier corresponds to the trigger stream including only the data type trigger through the service ID descriptor, the receiver 300 may receive a data type trigger by receiving a stream corresponding to the service identifier.

Moreover, the transmitter 200 may generate a trigger descriptor including trigger type information and may then transmit the generated trigger descriptor. Such a trigger descriptor may be included in an ES descriptor loop of a PMT. Accordingly, the receiver 300 may receive a stream including a data type trigger by using the trigger descriptor. For example, the trigger descriptor may include a trigger type field of an 8-bit flag format. The trigger type field may indicate a type of a trigger that a trigger descriptor indicates.

Also, the transmitter 300 may designate a stream type for data trigger stream. The receiver 300 may determine that a stream corresponding to a designated stream type is a data trigger stream. Since a typical receiver does not know a stream type and ignores the stream, backward compatibility is guaranteed.

In such a way, upon receiving a data type trigger, the receiver 300 obtains real-time data from the payload of a data type trigger in operation S9120 and provides a TDO service by using the obtained real-time data in operation S9125. If there is a time stamp in a data type trigger, the receiver 300 may perform processing to deliver the time stamp to a TDO. The receiver 300 may generate a javascript event on a time stamp and then may deliver time information on real-time data to the TDO. The time information may be one of a local time corresponding to real-time data, a UTC standard time, or a PTS value.

Moreover, as mentioned above, the real-time data for TDO may be transmitted through an IP based broadcast network or internet network.

First, the real-time data may be transmitted through FLUTE. The transmitter 200 may transmit real-time data for TDO through an NRT service using FLUTE. For this, the transmitter 200 may allocate a specific consumption model to the real-time data for TDO. The consumption model, as described with FIG. 68, may be designated by a value of a consumption model field included in an NRT service descriptor in a service level descriptor loop of an SMT. The receiver 300 may receive an NRT service corresponding to a data stream consumption model by identifying the consumption model. An NRT service corresponding to a data stream consumption model may include real-time data for TDO, and also may include other data for an NRT service object not the TDO.

FIG. 101 is a view illustrating a consumption model field including a data stream consumption model according to an embodiment of the present invention. Descriptions for other fields are the same as described with reference to FIG. 68.

Referring to FIG. 101, an NRT service in which a value of a consumption model field is designated as a data stream (0x05) may include one or more file stream for DO (for example, a downloadable object or a declarative object). Here, the DO (for example, a downloadable object or a declarative object) may be used to mean that it includes a Triggered Declarative Object (TDO) or a general NRT service object. The TDO may be one of objects operable in a DO execution environment. An NRT service where a consumption model is designated as a data stream may be received only when the DO operating in the receiver 300 requests downloading and delivery through an API provided as part of an execution environment, and a file stream included in the received data stream service may be delivered to the DO.

FIG. 102 is a flowchart illustrating a broadcast service receiving method of a receiver that provides data for DO by receiving an NRT service allocated as a data stream consumption model.

Referring to FIG. 102, first, the receiver 300 obtains an SMT from service signaling data in operation S9200. The receiver 300 may receive service signaling data by accessing a broadcast service channel, and may obtain an SMT from the service signaling data.

Then, the receiver 300 parses an NRT service information descriptor from the SMT in operation S9205. The receiver 300 may parse an NRT service information descriptor by parsing a descriptor including a descriptor tag corresponding to an NRT service information descriptor from a service level descriptor loop of an SMT. The NRT service information descriptor may include the application type and requirements information of each NRT service. Accordingly, the receiver 300 may identify services available for the receiver 300 on the basis of the NRT service information descriptor and may display this to a user in a guide form.

Here, the receiver 300 identifies an NRT service corresponding to a data stream consumption model from among the identified NRT services in operation S9210. The receiver 300 may determine to receive an NRT service corresponding to a data stream consumption model according to a user reception setting of a data stream consumption NRT service for a channel unit or entire channels. Additionally, the receiver 300 may provide fast service by automatically receiving an NRT service corresponding to a data stream consumption model. Also, the receiver 300 may receive a data stream consumption model NRT service in response to the real-time data request of the DO.

When the reception of the data stream consumption model is selected, the receiver 300 obtains a content item configuring an NRT service identified as the data stream consumption model from an NRT-IT in operation S9215. The content item information may include the identification information of a content item and information for receiving the content item. The content item identification information may be a content item identifier content linkage, and the content item reception information may include location information (for example, address information through which a file is received using FLUTE like content location information included in a file element of a FLUTE FDT instance) in a URL or FLUTE session through which files configuring a content item are received.

Moreover, there may be no NRT-IT for an NRT service designated as a data stream consumption model. Therefore, this stage may be omitted if necessary. For example, the NRT service designated as a data stream consumption model may be configured with only one content item. Accordingly, in this case, since there is no additional content item signaling, the receiver 300 may access a FLUTE session by using an SMT and may receive an FDT to receive all files designated by the FDT.

Then, the receiver 300 receives files configuring a content item on the basis of an SMT and an NRT-IT in operation S9220. The receiver 300 may access a FLUTE session on the basis of FLUTE session access information in an SMT, and may receive files configuring a content item corresponding to a data stream consumption model NRT service on the basis of file position information in an NRT-IT. In more detail, the service manager 350 of the receiver 300 receives an FDT in access to a FLUTE session, and receives and the content identifier content id of each file in a FLUTE session in an FDT receives and stores a file object matching the identifier of a content item corresponding to a stream consumption model NRT service included in an NRT-IT. Moreover, if there is no NRT-IT, the receiver 300 may receive all files indicated by an FDT and store them.

Then, the service manager 350 of the receiver 300 provides real-time data for DO to the DO by using the received files in operation S9225. The service manager 350 may deliver the received real-time data to the DO. For example, the service manager 350 may deliver the received file to the DO if the DO requests a specific content item or file. The service manager 350 may limit a user selection on whether to receive an NRT service designated as a data stream consumption model. However, according to a user setting on an interactivity function of ATSC2.0, the service manager 350 may automatically download an NRT service designated as a data stream consumption model.

Also, once downloading is completed, the service manager 350 of the receiver 300 may deliver a file to the DO. In this case, once file downloading is completed, the service manager 350 may deliver a file to the DO immediately through a DOM event. Moreover, the service manager 350 may notify the DO of a message indicating the downloading completion. For example, the service manager 350 may generate a DOM event corresponding to the file downloading completion and then, may deliver the generated DOM event to the DO. Then, the service manager 350 may include content location information on an FDT in the generated event. Accordingly, the DO may obtain the content location information on an FDT on the basis of the generated event and may request a file corresponding to the content location information from the service manager 350 through an API, and the service manager 350 may deliver a file corresponding to the request to the DO.

When the trigger stream consumption model NRT service is selected in response to the request of the DO, the service manager 350 of the receiver 300 may receive all files included in the NRT service and provide them to the DO. Additionally, when specific files are selected in response to the request of the DO, the service manager 350 may receive only a requested file separately and provide it to the DO. Also, when the DO requests individual file reception, the service manager 350 may receive and store the remaining all files to prepare additional requests.

Additionally, the receiver 300 receives and manages the real-time data requested by the DO through the service manager 350 in a storage unit. However, the storage and management of real-time data may need to be made in accordance with the intent of a real-time broadcast service provider.

Therefore, according to an embodiment of the present invention, in the case of files corresponding to the data stream consumption model, the receiver 300 may allocate a predetermined area of a storage unit of the receiver 300 as a real-time data storage area for TDO, and then, may receive, store, and manage the real-time data in the allocated area. For this, the transmitter 200 may designate a required storage space for real-time data in a storage reservation field storage_reservation of an NRT service descriptor NRT_service_descriptor.

Then, the receiver 300 allocates a storage area for real-time data reception in a storage unit on the basis of a storage reservation field value. The receiver 300 may separate an area designated by a storage reservation field from another area of a storage unit and manage it. Additionally, the receiver 300 may maintain the storage space size of the allocated area continuously and uniformly. Accordingly, a broadcast service provider provides real-time data continuously.

In such a way, the receiver 300 provides improved service in linkage with real-time broadcast by using and receiving real-time data in response to the request of the DO through an NRT service of a data stream consumption model.

Moreover, a content item configuring a DO or TDO may be transmitted through an internet or may be transmitted through a broadcast network. Here, all files configuring a specific content item may be transmitted through an interne or may be transmitted through a broadcast network. Accordingly, in order for efficient transmission, when the receiver 300 receives a content item configured with at least one file, there is a need to know through which network all files are transmitted.

FIG. 103 is a view illustrating a configuration of an NRT-IT that further includes information on a network through which all files configuring a content item are transmitted according to an embodiment of the present invention.

According to an embodiment, an NRT-IT may further include an available on internet field and an available in broadcast field. Other fields are the same as described above.

The available on internet field may be a 1-bit field indicating that all files required when a content item including this field is configured are receivable through an internet connection. When a value of this field is 1, it may indicate that all files configuring a content item including this field are receivable through an internet connection. When a value of this field is 0, it may indicate that there is no information on whether reception is available through an internet connection.

Additionally, the available on internet field may indicate whether one or a plurality of items are downloadable from an internet. In this case, address information downloadable through an internet may be signaled through a content descriptor included in an NRT information table section shown in FIG. 103. The content descriptor may include descriptors containing various kinds of information, and among them, may include a descriptor notifying a resource location on the internet. Accordingly, the receiver 300 may download a content item from an internet on the basis of the descriptor notifying a resource location on the internet included in a content descriptor.

The available in broadcast field may be a 1-bit field indicating that all files configuring a content item including this field are receivable through a broadcast network. When a value of this field is 1, it may indicate that all files configuring a content item including this field are receivable through an internet connection. When a value of this field is 0, it may indicate that there is no content item receivable through a broadcast network.

The receiver may confirm in advance whether all files configuring a specific content item are transmitted through an internet network or a broadcast network by parsing such an NRT-IT and thus may receive files efficiently. Therefore, according to the present invention, service providers transmit large amounts of files through a broadcast network and small amounts of data through an internet network, if necessary. Moreover, according to the present invention, commonly-used data are transmitted through a broadcast network so that an internet network and a broadcast network are utilized effectively.

Figure 104:
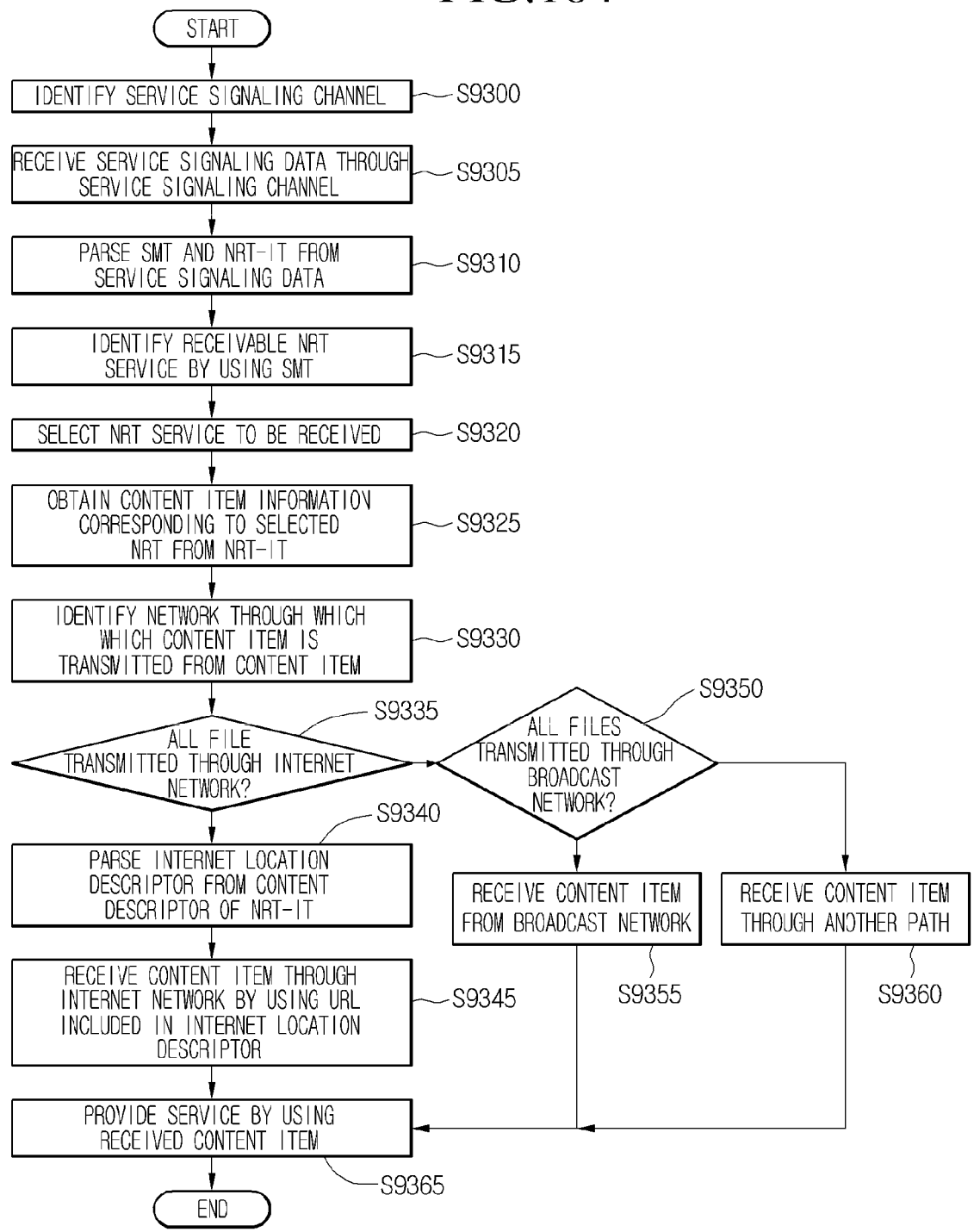
FIG. 104 is a flowchart illustrating a method of providing a service by receiving a content item transmitted through an internet network or a broadcast network according to an embodiment of the present invention.

FIG. 104 is a flowchart illustrating a method of providing a service by receiving a content item transmitted through an internet network or a broadcast network according to an embodiment of the present invention.

First, the receiver 300 identifies a service signaling channel by accessing a broadcast network in operation S9300.

The receiver 300 may parse a service descriptor loop from an ES loop of a PMT received through a tuned virtual channel and may identify a service having a service identifier of 0x00 from the service descriptor loop, thereby identifying a service signaling channel (SSC).

Then, the receiver 300 receives service signaling data through a service signaling channel in operation S9305 and parses an SMT and an NRT-IT from the service signaling data in operation S9310.

Then, the receiver 300 identifies a receivable NRT service by using the SMT in operation S9315.

As mentioned above, the receiver 300 may identify a receivable NRT service on the basis of an NRT service information descriptor in a service level descriptor loop in an SMT, and may display the identified receivable NRT service to a user in a guide form. A user may select an NRT service to be received on the basis of the displayed guide. Moreover, when the NRT service is a TDO service or a data stream service including real-time data, the receiver 300 may select a service to be received by itself.

Then, the receiver 300 obtains content item information corresponding to the selected NRT service from the NRT-IT in operation S9325, and identifies a network, through which a content item is transmitted, from the content item information.

First, the receiver 300 determines whether all files configuring a content item are transmitted through an internet network in operation S9335.

The receiver 300 may determine whether all files configuring a content item are receivable through an internet network on the basis of the above-mentioned available on internet field. Through this, the receiver 300 may determine whether the content item is obtainable completely through an internet network.

As mentioned above, one adjunct service may be configured with several content items and transmitted. Accordingly, the receiver 300 may distinguish whether some or all of files on large amounts of partial data are received through an internet by using this field.

Also, when all files are transmitted through an internet network, the receiver 300 parses an internet location descriptor corresponding to a content item from a content descriptor of an NRT-IT in operation S9340. Then, the receiver 300 accesses an internet network and receives a content item by using the URL information included in the internet location descriptor in operation S9345.

The receiver 300 may obtain URL information of files configuring a content item or URL information of an index file including URLs of files configuring a content item, from the internet location descriptor. Accordingly, the receiver 300 may receive files through an internet network by using the URL information included in the internet location descriptor. Moreover, the receiver 300 may receive index files by using the URL information included in the internet location descriptor, and may receive files through an internet network on the basis of an index file. The received files may configure a content item completely.

Moreover, when all files are not transmitted through an internet network, the receiver 300 determines whether all files are transmitted through a broadcast network in operation S9350.

The receiver 300 may determine whether all files configuring a content item are transmitted from an NRT-IT through a broadcast network on the basis of the above-mentioned available on broadcast field.

If it is determined that all files are not transmitted through a broadcast network, the receiver 300 receives a content item by receiving files through several different paths (for example, an internet network) other than one network in operation S9360.

According to an embodiment, the receiver 300 may determine first whether reception is available through an internet network and then may determine whether reception is available through a broadcast network. However, this is just an embodiment of the present invention and is not limited to a determination order. The receiver 300 may first determine the broadcast network reception availability.

Then, when it is determined that all files are transmitted through a broadcast network, the receiver 300 receives a content item from a broadcast network in operation S9355. Then, the receiver 300 receives files configuring a content item transmitted from a broadcast network by accessing a FLUTE session through an SMT and an NRT-IT.

Then, once the content item is received, the receiver 300 provides a service by using the received content item in operation S9365. The service manager 350 of a receiver may provide various services by using a content item, for example, executing a content item according to a user input, executing a target content item at a trigger time when a trigger is received, or providing real-time data included in a content item when a request occurs by a DO executed already.

A broadcast service transmitting and receiving method according to the above-mentioned embodiments of the present invention may be implemented by a program executed in a computer and stored in a computer readable recoding medium. Examples of the computer readable recording medium include read-only memory (ROM), random-access memory (RAM), CD-ROM, magnetic tape, floppy disk, and optical data storage device, and carrier wave (such as data transmission through the Internet).

The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

The invention claimed is:

1. A method for a broadcast receiving device to receive a broadcast, comprising:
    receiving a broadcast stream including audio or video through a broadcast receiver;
    receiving a trigger including an identifier for identifying a triggered declarative object (TDO) being triggered by the trigger through a trigger receiver;
    receiving a table which includes the metadata of the TDO through a service manager;
    receiving a content item being used by the TDO based on the table which relates to the TDO through a service manager;
    extracting a value identifying an action from the table through the service manager; and
    performing the action based on the value through the service manager,
    wherein the table includes a URL of a file and an entry flag,
    wherein the file is part of the content item and the entry flag indicates whether the file is an entry file which is needed to launch the content item.

2. The method of claim 1, wherein the value represents at least one of a preparation, an execution, a suspension and a termination.

3. The method of claim 1, wherein the table includes an available-on-Internet flag,
    wherein the available-on-internet flag indicate that the content item is available for downloading over the Internet.

4. The method of claim 1, wherein the table includes an available-in-broadcast flag, wherein the available-in-broadcast flag indicates whether the content item is available for extraction from the broadcast.

5. The method of claim 1, wherein the content item is updatable.

6. The method of claim 1, wherein the receiving a trigger including an identifier for identifying a triggered declarative object (TDO) comprising:
    receiving a polling period; and
    requesting the trigger to a server based on the polling period; and
    receiving the trigger from the server.

7. The method of claim 1, wherein the trigger includes a trigger time, and
    wherein the performing the action based on the value comprising:
    performing, in the trigger time, the action based on the value.

8. An apparatus for receiving a broadcast service, comprising:
    a broadcast receiver for receiving a broadcast stream including audio or video;
    a trigger receiver for receiving a trigger including an identifier for identifying a triggered declarative object (TDO) being triggered by the trigger; and
    a service manager for receiving a table which includes the metadata of the TDO, receiving a content item being used by the TDO based on the table which relates to the TDO, extracting a value identifying an action from the table and performing the action based on the value,
    wherein the table includes a URL of a file and an entry flag,
    wherein the file is part of the content item and the entry flag indicates whether the file is an entry file which is needed to launch the content item.

9. The apparatus of claim 8, wherein the value represents at least one of a preparation, an execution, a suspension and a termination.

10. The apparatus of claim 8, wherein the table includes an available-on-internet flag,
    wherein the available-on-internet flag indicate that the content item is available for downloading over the Internet.

11. The apparatus of claim 8, wherein the table includes an available-in-broadcast flag, wherein the available-in-broadcast flag indicates whether the content item is available for extraction from the broadcast.

12. The apparatus of claim 8, wherein the content item is updatable.

13. The apparatus of claim 8, wherein the trigger receiver receives a polling period; and
    requests the trigger to a server based on the polling period; and
    receives the trigger from the server.

14. The apparatus of claim 8, wherein the trigger includes a trigger time,
    wherein the service manager performs, in the trigger time, the action based on the value.

* * * * *